United States Patent [19]
Ueyama et al.

[11] Patent Number: 5,670,071
[45] Date of Patent: Sep. 23, 1997

[54] MAG ARC WELDING APPARATUS

[75] Inventors: Tomoyuki Ueyama, Toyonaka; Shoji Harada; Toshiaki Nakamata, both of Osaka; Masuo Shibata, Takarazuka; Toshimitsu Doi, Nishinomiya; Shunichi Ogawa, Takatsuki; Ichiro Matsumoto, Higashiosaka; Hiroshi Nakai, Izumi, all of Japan

[73] Assignee: Daihen Corporation, Japan

[21] Appl. No.: 488,125

[22] Filed: Jun. 7, 1995

Related U.S. Application Data

[62] Division of Ser. No. 778,845, Dec. 13, 1991, Pat. No. 5,508,493.

[30] Foreign Application Priority Data

| Apr. 17, 1990 | [JP] | Japan | 2-102102 |
| Oct. 1, 1990 | [JP] | Japan | 2-264493 |
| Oct. 1, 1990 | [JP] | Japan | 2-264494 |
| Nov. 16, 1990 | [JP] | Japan | 2-311957 |
| Dec. 28, 1990 | [JP] | Japan | 2-418489 |

[51] Int. Cl.⁶ ............................................. B23K 9/09
[52] U.S. Cl. .................................................. 219/130.51
[58] Field of Search .................. 219/130.51, 137 PS

[56] References Cited

U.S. PATENT DOCUMENTS 4,994,646  2/1991  Tabata et al. ............... 219/130.51

Primary Examiner—Clifford C. Shaw
Attorney, Agent, or Firm—Scully, Scott, Murphy & Presser

[57] ABSTRACT

An MAG arc welding method and apparatus is capable of achieving a welding bead in a regular ripple pattern or in a suitable sectional form. The welding power source generates the first welding current I1 and a second welding current I2 larger than the first welding current. The wire melting speed is changed by switching between the first and the second welding currents. The welding method or apparatus according to the invention generates the first arc length more than 2 mm and the second arc length more than the first arc length and switches between both arc length at a switching frequency F of 0.5 to 25 Hz. The ratio of the second to the first welding currents is made to be in 1.03 to 1.20. In addition to a welding method to change the arc length by switching the first and the second welding currents at a constant wire feeding rate, the present welding method makes it possible to carry out the lap welding or butt welding even when there is a large gap. The large gap requires a large amount of molten metal which is prepared by increasing the wire melting speed caused by an increase in the wire feeding rate by 5 to 20%. The resultant reinforcement has a beautiful appearance.

12 Claims, 74 Drawing Sheets

Fig. 10
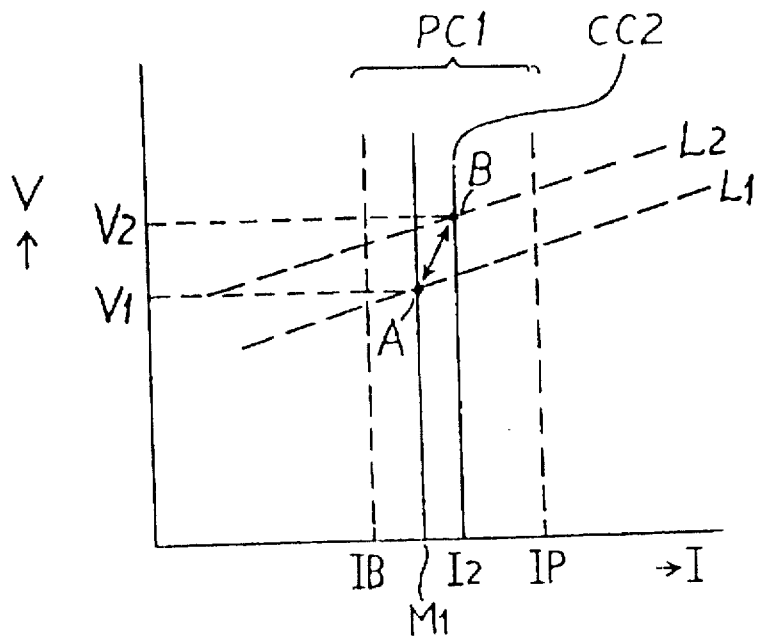
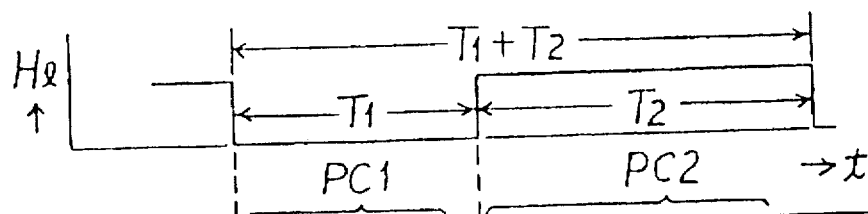
Fig. 11(A)
Fig. 11(B)
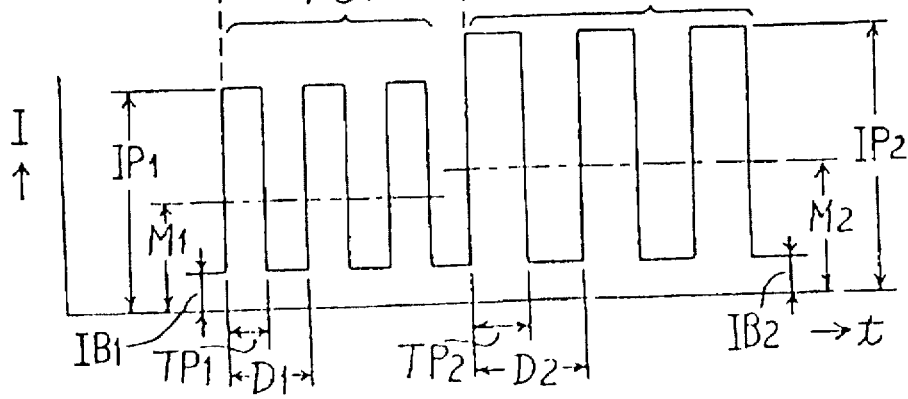

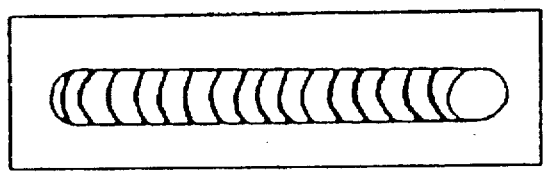
Fig. 20(A)
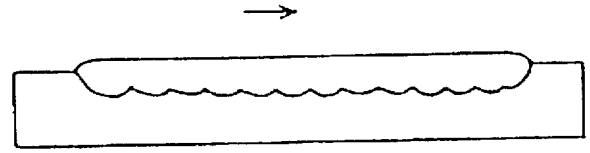
Fig. 20(B)
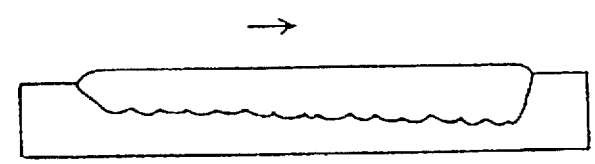
Fig. 20(C)
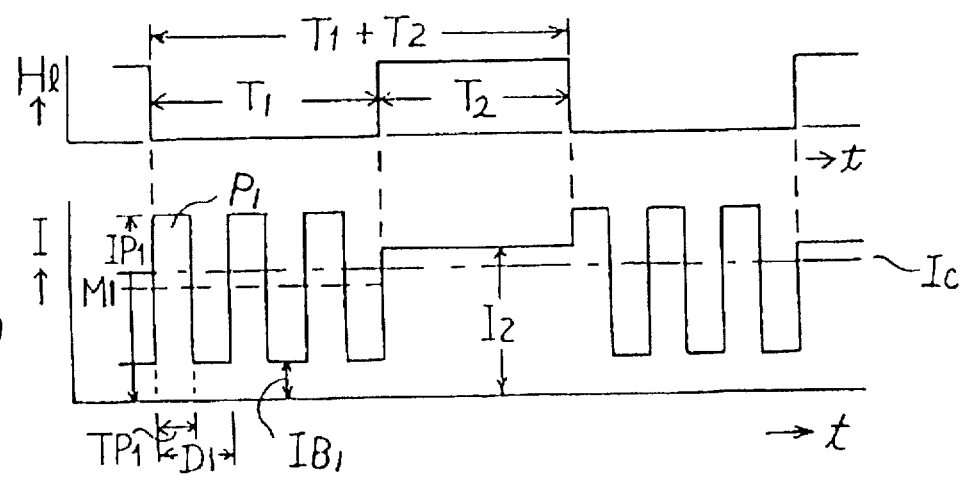
Fig.21(A)
Fig.21(B)

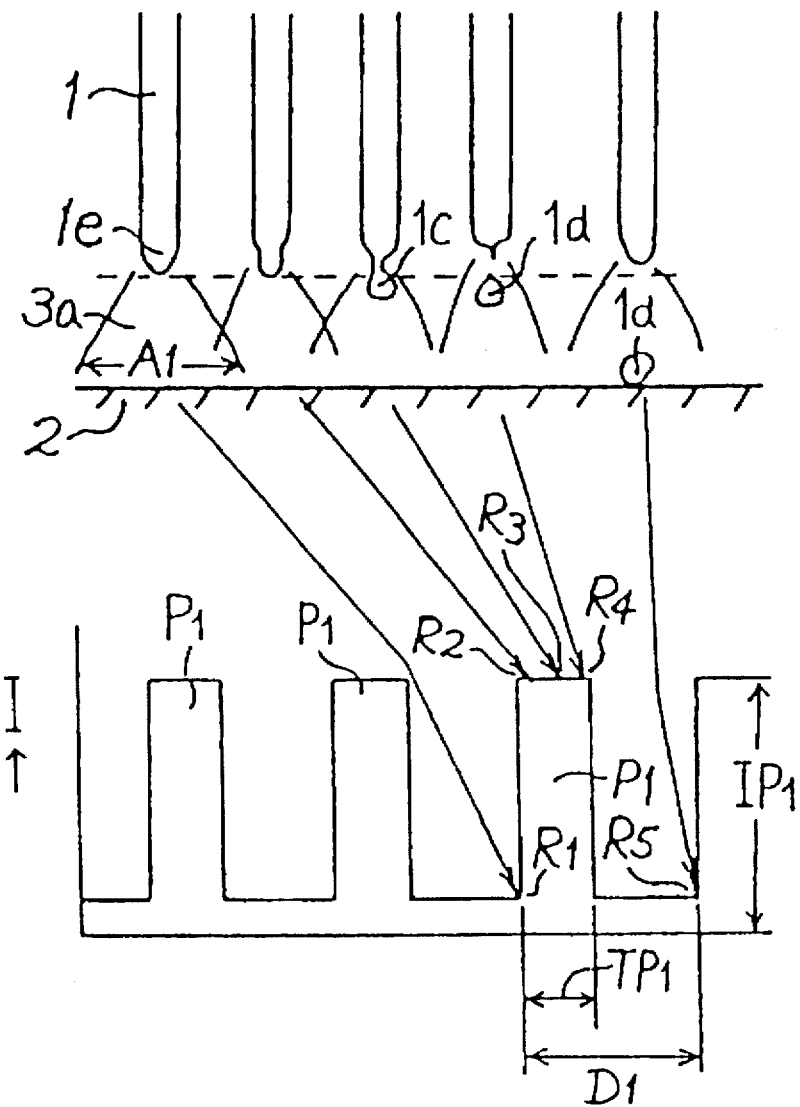

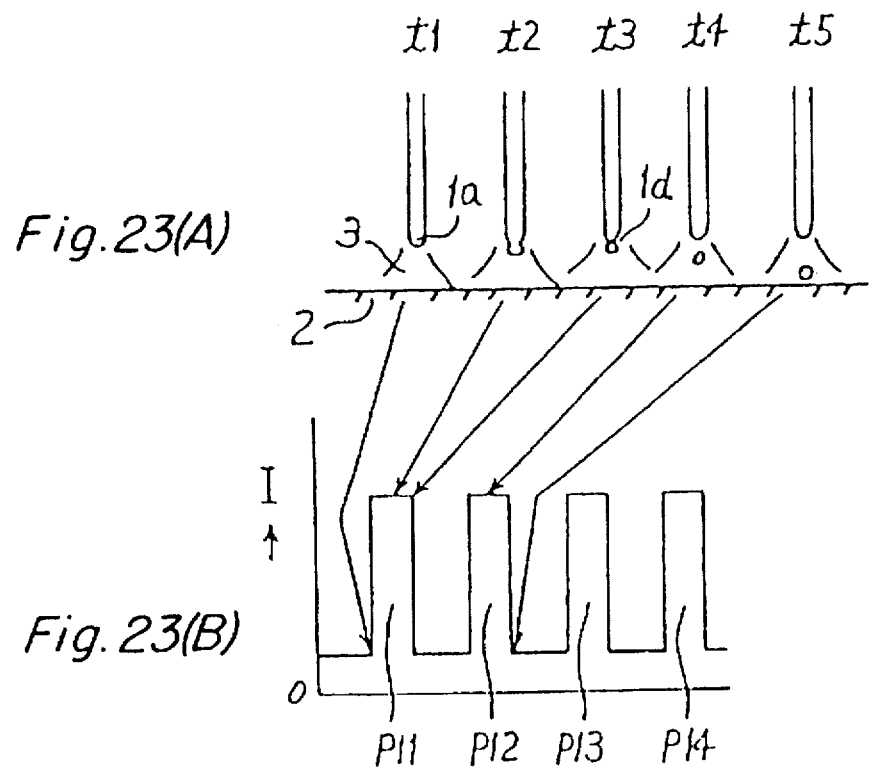
Fig. 23(A)
Fig. 23(B)
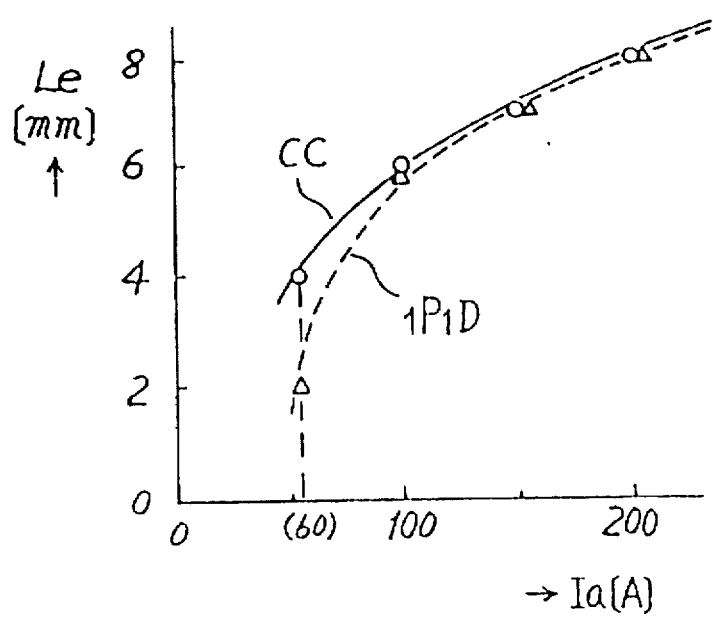
Fig. 26

Fig.42

| Decision : Wn → Un | |
|---|---|
| Wn | w1, w2, ⋯, wn |
| Un | u1, u2, ⋯, un |
| Decision : Un → Vn | |
| Un | u1, u2, ⋯, un |
| Vn | v1, v2, ⋯, vn |

Fig.43

| Decision : Wn → Un | |
|---|---|
| Wn | w1, w2, ⋯, wn |
| Un | u1, u2, ⋯, un |
| Decision : Xn ,Un → Vn | |
| Xn / Un | x1, x2, ⋯, xn |
| u1 | v11, v12, ⋯, v1n |
| u2 | v21, v22, ⋯, v2n |
| ⋮ | ⋮ |
| un | vn1, vn2, ⋯, vnn |

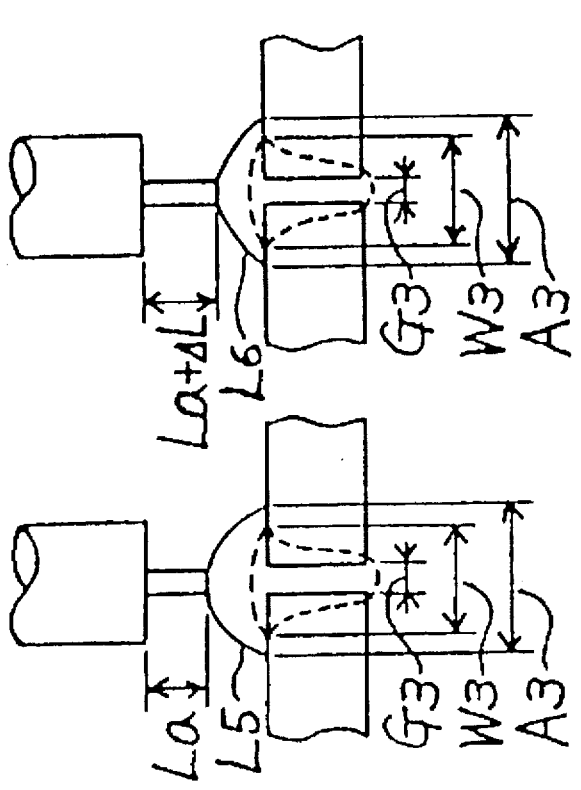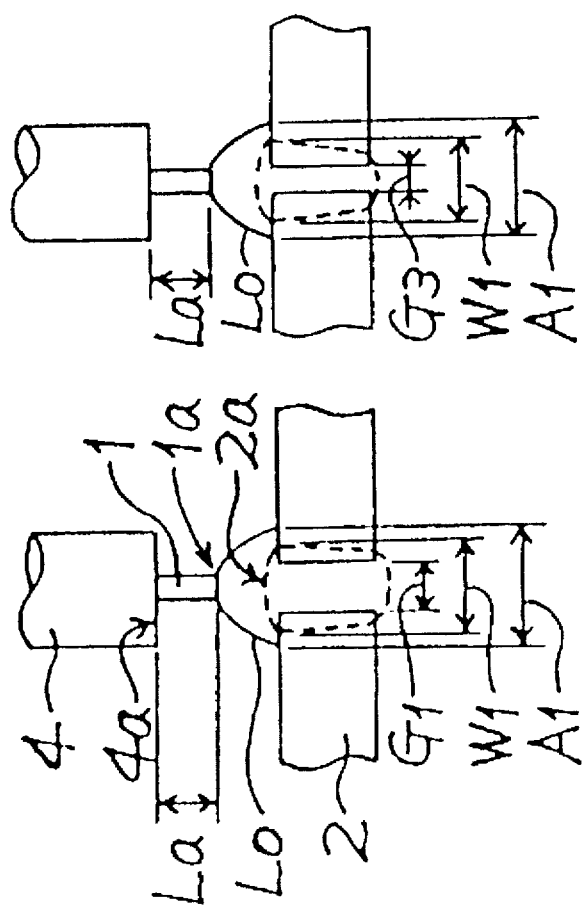

Fig.III

MAG ARC WELDING APPARATUS

This is a divisional of application Ser. No. 07/778,845 filed on Dec. 13, 1991, now U.S. Pat. No. 5,508,493.

FIELD OF ART

The present invention relates to a method and apparatus for pulse MAG arc welding which can obtain a welding bead having a regular waveform appearance or showing an appropriate cross-sectional shape.

BACKGROUND OF THE ART

In the recent years, aluminum and aluminum alloy (referred to an aluminum herein after) have been used widely for interior materials of buildings, various vehicles and transportation machines. Welded joints of these aluminum used in the above fields form directly an outside appearance and hence are required to have a beautiful appearance of the welding beads in addition to a sufficient mechanical strength. As an arc welding method showing a beautiful appearance of welding beads, a widely used method is a TIG arc welding method having a filler wire added thereto. The welded joint obtained with a TIG arc welding having the filler wire added thereto (referred to a TIG filler arc welding method hereinafter) shows a bead appearance in regular wave form (referred to a scale bead hereinafter) as shown in FIG. 1. The welding bead according to the TIG filler arc welding method has an appearance more beautiful than that of the MIG arc welding method.

The TIG arc welding method is lower in the welding speed than that of MIG arc welding method which melts the consumable electrode and is in a lower production efficiency. Therefore, various proposals have been conducted to a method in which the MIG arc welding method could be able to achieve the welding bead appearance near to the scale bead due to the TIG arc welding method having the filler wire added thereto.

Prior Art 1

The prior art 1 is a MIG arc welding method disclosed in the Japanese Patent Publication (examined) Syo 46-650 and is to change alternatively the arc spray amount between the high value and the low value. In order to actually execute this method, the electric power supplied to the arc is alternatively changed between the relatively high value and relatively low value (for example 3:2).

FIG. 2 shows a block diagram of an electric source for use in this welding method. FIG. 3 is a graph showing a V-I characteristic between an output current (horizontal axis) and an output voltage (vertical axis) (referred to V-I characteristic hereinafter) and an arc characteristic. With reference to FIG. 2, a reference numeral 101 denotes an output circuit for welding electric source; a reference numeral 102, a resistor for switching the V-I characteristic of the output circuit for welding electric circuit 101; a reference numeral 103, a contact for shortcircuiting and opening the resistor 101; and a reference numeral 104, a timer for switching periodically the contact 103. A reference numeral 1 denotes a consumable electrode wire (referred to a consumable electrode hereinafter) transferred to a welding material 2 through an electric supplying tip 4 at a predetermined speed by a wire supplying motor WM. An arc 3 is generated between the consumable electrode 1 and the welding material 2 and is to weld the welding material 2.

FIG. 3 shows a V-I characteristic AA applied between the consumable electrode 1 and the welding material 2 when the resistor 102 is connected to the output circuit, a V-I characteristic BB when the resistor 102 is short circuited and an arc characteristic at arc lengths of L1 to L3 shown by dotted lines L1 to L3. It is assumed that an operation point is a crossing point A of a solid line AA and a dotted line L1 of FIG. 3 when the consumable electrode 1 is transferred at predetermined value of wire supplying speed WF1. At this time, a welding electric current is in I1 and an arc voltage is in V1.

There are three methods for switching the above electric power.

(1) A first method is to switch an output voltage supplied across the consumable electrode 1 and the welding material 2. For example, in FIG. 3, when the V-I characteristic is switched from AA to BB, the welding electric current I1 does not change but the operation point moves usually to B point of the V-I characteristic curve BB because the wire supplying speed and the welding electric current are not proportional perfectly to each other. However, at the transient time, the arc length L1 does not rapidly change with the rapid change in the V-I characteristic curve into the BB curve. Therefore, the operation point moves from a point A on the arc characteristic curve L1 the same as the above curve to a point D. The movement causes an increase in the welding electric current and then an increase in the wire melting speed which results in an increase in the arc length. Then, the arc length changes from the curve L1 to an arc characteristic curve L2 having a long arc length and finally moves to a point B. Therefore, the welding current changes largely from I1 to I3 at a transient state and from I1 to I2 at a stationary state.

(2) A second method is to switch the wire supplying speed. For example, in FIG. 3, when the wire supplying speed is switched, the switching is carried out so as to change the arc length on the V-I characteristic AA and hence the operation point changes from a point B to a point C. Accordingly, the welding electric current changes largely from I2 to I4 and the arc length moves from the operation point of the arc characteristic curve L2 to the operation point of the curve L3.

(3) A third method is to change the V-I characteristic of above case (1) and the wire supplying speed at case (2) simultaneously. Accordingly, the welding electric current changes largely from I1 to I4.

Prior Art 2

The prior art 2 is a MAG welding method described in Japanese Patent Publication (examined) Sho 49-48057 and is to supply the consumable electrode at a predetermined speed by using a constant voltage characteristic of a welding electric source. The welding method according to prior art 2 is to change periodically the welding electric current and simultaneously change the welding wire supplying speed with a change in the welding electric current. That is, this method is to switch between a high electric current (a high output voltage) due to a high speed of wire supplying and a low current (a low output voltage) due to a low speed of wire supplying and to control input heat. FIG. 4 (A) to (C) are graphs showing V-I characteristic curves AA and BB between the output current of the welding electric source (horizontal axis) and the output voltage (vertical axis) and arc characteristic curves L1 and L2.

There are three practical methods for controlling the input heat mentioned above.

(1) A first method is not to change the arc length at both of the high electric current and the low electric current. As shown in FIG. 4 (A), for example, when the both of the V-I characteristic of the welding electric source and the wire supplying speed are switched, the operation point moves from the operation point A at the crossing point of the V-I characteristic curve AA and the arc characteristic curve L1 to the operation point B of the crossing point of the V-I characteristic curve BB and the arc characteristic curve L1. At this time, the welding current changes largely from I1 to I2 while the arc length is L1 on the same curve does not change.

(2) A second method is to change in a larger degree the wire supplying speed than the case (1) when the arc length does not change. That is, with a high electric current, the wire supplying speed is made higher and the arc length is made shorter while with a low electric current, the wire supplying speed is made low and the arc length is longer. For example, as shown in FIG. 4 (B), when the wire supplying speed is switched, the operation point moves from the crossing point A of the V-I characteristic curve AA and the arc characteristic curve L2 to the crossing point B of the V-I characteristic curve AA and the arc characteristic curve L1. In this time, the welding current changes largely from I1 to I2 while the arc length changes from L2 to L1.

(3) A third method is to change the wire supplying speed in a smaller degree than the case (1) where the arc length does not change. At the high electric current, the wire supplying speed is made low and the arc length is made long while at the low electric current, the wire supplying speed is made high and the arc length is made short. For example, as shown in FIG. 4 (C), when both of the V-I characteristic of the welding electric source and the wire supplying speed are switched, the operation point at the stationary state moves from the crossing point A of the V-I characteristic curve AA and the arc characteristic curve L1 to a crossing point B of the V-I characteristic curve BB and the arc characteristic curve L2. However, at the transient state, even when the V-I characteristic curve changes rapidly into the curve BB, the arc length does not rapidly change. However, the operation point moves from the point A to the point D with the same arc length to each other, while the welding electric current increases. As a result, the wire melting speed is also higher and the arc length is longer. The arc length moves from the curve L1 to the curve L2 and finally the operation point moves to the point B. Therefore, the welding electric current changes largely from I1 to I3 at the transient state and from I1 to I2 at the stationary state.

Prior Art 3

The prior art 3 is a pulse MIG welding method described in the Japanese Patent Publication (unexamined) Syo 62-279087 and is to switch a base current or base voltage switch between a spray transfer and a short circuit transfer to form a scale bead without melting down aluminum thin plate.

(1) For example, as shown with a wave form of a welding electric current in FIG. 5 (A), the use of a pulse welding electric source comprising a constant pulse current in which either of pulse current, pulse width or pulse frequency is a constant value and a variable base current permits the spray transfer and the short circuit transfer to be carried out alternatively by changing the base current periodically in a large degree.

(2) As shown with a wave form of a welding voltage in FIG. 5 (B), the use of a pulse welding electric source outputting a welding voltage composed of a pulse voltage in which either of a pulse voltage, pulse width or pulse frequency is a constant value and variable base voltage permits the spray transfer and the short circuit transfer to be carried out alternatively by changing the base voltage periodically in a large degree.

Accordingly, this prior art 3 switches the wire feed rate as shown in FIG. 5(A) and hence changes periodically the average value of welding current in a large scale by changing the welding current values into an average value H1 at the high current period T8 and the average value N1 at the low current period T9. Thus, it is possible to switch between the spray transfer and the short circuit transfer. Further this prior art 3 switches the output power of the base electric source in a large scale as shown in FIG. 5(B). In the method shown in FIG. 5 (B), the welding current value changes in a small scale at the stationary state but changes in a large scale at the transient state in a similar way to that of the prior art 1.

DISCLOSURE OF THE INVENTION

Problems to be Solved by the Invention

Problem of Prior Art 1

In a welding method according to prior art 1, it is necessary to switch alternatively the arc spray value between a high value and a low value at a current range higher than the critical current Ic necessary for the spray transfer. Accordingly, the wire feed rate must be switched at the same time and thus the welding current I2 necessary for obtaining a high value of the arc spray amount is comparatively higher than the critical current Ic. This prevents the welding method according to the prior art 1 from welding a thin plate.

Further, the welding method according to prior art 1 manages the welding current to change relatively in a large scale (for example 2:3) and can be applicable for a working step such as a step to change the arc force in a large scale, to change the penetration depth or to change the amount and the shape of the reinforcement by changing the amount of the deposited metal. However, the welding method according to the prior art 1 is not suitable for the method for obtaining a bead appearance of the molten pool surface, for example, a scale bead with a constant size of the penetration depth and the reinforcement. The method described above is an object of the present invention. As a result, the welding method according to the prior art 1 shows a bead appearance shown in FIG. 6 and can not achieve the beautiful scale bead having a regular ripple pattern as shown in FIG. 1 in connection with the TIG filler arc welding method.

Problem of Prior Art 2

The welding method according to the prior art 2 changes the welding current in a large scale (in the embodiment, 260 [A] and 100 [A], 90 [A] or 60 [A]) to control the input heat by switching periodically the output voltage of the welding electric source of constant voltage characteristic and the wire feed rate.

Therefore, in a similar way to that of the welding method according to the prior art 1, the welding method according to the prior art 2 manages the welding current to change relatively in a large scale and can be applicable for a working step such as a step to change the arc force in a large scale, to change the penetration depth or to change the amount and the shape of the reinforcement by changing the amount of the deposited metal. However, in a similar manner to the welding method according to the prior art 1, the welding method according to the prior art 2 is not suitable for the method at which the present invention aims.

Problem of Prior Art 3

The welding method according to the prior art 3 is to change periodically the base current or the base voltage in a large scale to switch between the spray transfer and the short circuit transfer while keeping constant values of either of pulse current, pulse voltage, pulse width or a pulse frequency. Finally, the welding method according to the prior art 3 is to achieve the scale bead without melting down a thin plate of aluminum.

However, the welding method according to the prior art 3 manages the switching between the spray transfer and the short circuit transfer to be repeated periodically. During the short circuit transfer, the heading terminal of wire is in contact with the molten pool to carry out the metal transfer. As a result, the bead appearance by the welding method according to the prior art 3 is the same as that shown in FIG. 6 in a similar way to that of the welding method according to the prior art 1 and does not show the scale bead as shown in FIG. 1.

When the above welding methods are adapted for the present invention, there appears at least one problem described below.

(1) When the short circuit transfer is carried out, a large grain of the molten metal is transferred irregularly.

The conventional MIG arc welding method is to change the wire molten amount by changing largely the average value of the welding current with the switching of the wire feed rate. An aluminum alloy A-5183 plate in a thickness of 4 mm is welded by the MIG arc welding method based on the switching between the spray transfer and the short circuit transfer under the following welding conditions; electrode, aluminum alloy consumable electrode A-5183 of thickness of 1.2 mm; switching period, 2 Hz between a first setting condition of welding current 90 A and welding voltage 19 V and a second setting condition of welding current 180 A and 21 V; welding voltage 21 V; and a welding speed, 40 cm/min. As a result, the bead appearance so obtained is the same as that shown in FIG. 6 and does not show a beautiful scale bead having a regular ripple pattern obtained with the TIG filler arc welding method as shown in FIG. 1.

Specially, in the high speed welding with a thin plate, it is necessary to decrease the welding current in addition to increase the pulse switching frequency more than 3 Hz. Hence, it is possible to set the second welding condition at the welding current necessary for the spray transfer. However, the first condition is to set the welding current in a small size which permits no spray transfer but the short circuit transfer. As a result, a large grain of molten metal at the heading end of the wire is in contact with the molten pool and hence it is difficult to make the welding bead to be in a scale bead obtained with the TIG filler arc welding method.

(2) When the wire feed rate is switched, the response time is low due to the mechanical inertia.

On the other hand, in connection with the welding of thin plate at a high speed, it is necessary to elevate the switching frequency between the first welding condition setting value and the second welding condition setting value in response to the welding speed. Otherwise, the weld beads are different in the height and width between the area where the molten metal transfers and the area where the molten metal does not transfer. However, in a conventional MIG arc welding method to change largely the average value of the welding current, it has been necessary to switch the wire feed rate in a large degree. Hence, the response time is made low by the mechanical inertia of a wire feed motor and feed mechanism, and the switching frequency is only 3 HZ. In addition, the mechanical inertia causes the boundary of switching uncertain. As a result, it is difficult to obtain the scale bead having a regular ripple pattern as shown with the TIG arc welding method.

(3) The welding current has a large variation value.

In the conventional welding electric source, the welding current varies in a large degree upon the switching of the wire feed rate, because of the constant voltage characteristic of both the first welding condition and the second welding condition. Further, upon the switching of the output voltage of the welding electric source, the welding current varies in a large degree at the transient state because of the constant voltage characteristic. With the large variation in the welding current, there is a large variation in the arc strength, in the penetration depth, or in the height and the shape of the reinforcement due to the variation in the amount of the deposited metal. As a result, it is not possible to change only the surface of the molten metal.

(4) When the wire feed rate is switched, the variation in the arc length is low.

In order to keep the welding at the constant arc length with the MIG or MAG arc welding method, it is necessary to hold the following equation in a principle way.

$$\text{wire feed rate} = \text{wire melting speed} \tag{1}$$

(The wire melting speed is a function of the welding current value.)

In a welding electric source having a constant voltage characteristic, the welding current varies with the variation in the wire feed rate as described above. The welding current is approximately proportional to the power of 1.05 to 1.5 of the wire feed rate depending upon the variation in the quality of the consumable electrode or the arc length etc.

In the equation (1), the variation in the arc length can be achieved by the variation in the wire feed rate or wire melting speed, that is, the welding current. However, in the welding electric source having a constant voltage characteristic, since the welding current is determined by the wire feed rate, only the welding current is not set previously with the constant speed of the wire feed rate. Accordingly, in the welding electric source having a constant voltage characteristic, a method to change the wire feed rate is adopted first. The change in the wire feed rate results in the change in the wire melting speed resulting from the change in the welding current. As a result, the variation in the arc length is low.

Further, a method to change the output voltage with the change in the V-I characteristic of the welding electric source having a constant voltage characteristic determines the arc length by the output voltage and the welding current when the wire is fed at a constant speed. Accordingly, it is not possible for this method to change the arc length by the direct control of the welding current.

Means For Solving The Problem

An object of the present invention is to provide a MAG arc welding method and a welding apparatus capable of solving any of the problems accompanied with the welding method or apparatus known in the prior art and being characterized by the following features:

(1) no short circuit transfer;
(2) no switching of the wire feed rate in principle;
(3) no large variation in the welding current; and
(4) switching periodically the wire melting speed, that is, the welding current by a small amount in view of the equation, (wire feed rate)=(wire melting speed).

Switching the output current of the welding electric source

A principle of the present invention is to change largely the arc length by switching the welding output current of the welding electric source without changing the wire feed rate.

A process to set or control the switching output current can suppress the variation in the output current at the transient state within the tolerance of 10%. As a result, it is possible to make the transferring grains of the molten metal to be in a uniform size and to prevent the short circuit due to the large grain size of the molten metal even with the short arc length. Further, in the present invention, it is possible to elevate the switching frequency F to 25 Hz without changing the wire feed rate.

In the welding electric source according to the prior art, the welding output voltage only can be switched but the welding current itself can not be switched. It is possible to change the output current due to the self controlling effect of the V-I characteristic of the welding electric source by switching the wire feed rate with an use of welding electric source having constant voltage characteristic. Accordingly, it is not possible for the welding electric source having the constant voltage characteristic according to the prior art to set or control the output current value of the welding electric source. Therefore, it is not possible for the prior art to set or control the variation value of the output current in a manner as shown by the present invention.

The present invention is to provide a welding method to change the arc length by switching the welding output current without changing the wire feed rate (referred to a basic welding method hereinafter). In addition to the basic welding method, the present invention is to provide another welding method described in the following. When the basic welding method is applied for the butt welding or the lap welding described later, it is possible for the basic welding method to carry out welding even with the large gap. In such a case, since the molten metal to fulfill the gap lacks, the reinforcement can be obtained by increasing the wire feed rate by 5 to 20% and then increasing the wire melting speed. This welding method is referred to an additional welding method hereinafter.

A welding method described herein is a MAG arc welding method (referred to MAG welding method hereinafter) comprising the following steps of; a step of changing a wire melting speed by switching, at a switching frequency of $F=0.5$ to 25 Hz, a welding current between a first welding current I1 and a second welding current I2 larger slightly than the first welding current I1; a step for changing periodically an arc length between a first arc length Lt larger than arc length of 2 mm and a second arc length Lr larger than the first arc length; and a step for holding a ratio of the second welding current I2 to the first current I1 to be 1.03 to 1.20.

The MAG welding method further comprises a step for switching between the first welding current I1 and the second welding current I2 at a switching frequency F; and a step for holding a variation value Le between a first voltage Va1 at the first arc length Lt and a second voltage Va2 at the second arc length Lr to be 0.3 to 4.0 V.

The MAG welding method further comprises a step for supplying a first welding current carrying out a spray transfer to generate a small short circuit at a first arc length from a welding output controlling circuit for outputting a direct current having a constant current characteristic and a step for supplying a second welding current carrying out a spray transfer not to generate a small short circuit at a second arc length from a welding output controlling circuit outputting a direct current having a constant current characteristic in a similar way to the above.

The MAG welding method further comprises a step for supplying a first welding current carrying out a spray transfer to generate a small short circuit at a first arc length from a welding output controlling circuit for outputting a group of pulse currents and a step for supplying a second welding current carrying out a spray transfer not to generate a small short circuit at a second arc length from a welding output controlling circuit for outputting a direct current having a constant current characteristic.

The MAG welding method is further characterized in that said first welding current for obtaining said first arc length is a first group of pulse currents and said second welding current for obtaining said second arc length is a second group of pulse currents.

The MAG welding method further comprises a step for making a graph having a vertical axis composed of a variation value Le mm between said first arc length Lt and said second arc length Lr and a horizontal axis composed of switching frequency $F=0.5$ to 25, a step for determining, on said graph, specified positions of a first position at the switching frequency $F=0.5$ Hz and the arc length variation value $Le=2.5$ mm, a second position at the switching frequency $F=12$ and the arc length variation value $Le=1.0$ mm and a third position at the switching frequency $F=25$ Hz and the arc length variation value $Le=0.5$ mm, and a step for carrying out the welding by using the arc length variation value Le and the switching frequency F Hz on said graph positioned upper the curves obtained by connecting said first, said second and said third positions to each other.

The welding apparatus for carrying out the method described above is embodied as a pulse MAG welding apparatus capable of switching periodically, with a switching signal, between a first group of pulse currents for obtaining a first arc length Lt and a second group of pulse currents for obtaining a second arc length Lr, wherein the apparatus comprises:

an arc voltage detection circuit VD for outputting an arc voltage detection signal upon detection of an arc voltage;

an arc voltage controlling circuit including a comparator CM2 for outputting an arc voltage controlling signal Cm2 corresponding to a difference between an arc voltage detection signal Vd and a switching arc voltage signal S6 for switching between a first arc voltage setting signal Vs1 and a second arc voltage setting signal Vs2;

a pulse base current controlling circuit for outputting a pulse base current controlling signal to control a pulse frequency f3, a pulse duration TP3, a base current IB3 or a pulse current TP3 corresponding to an arc voltage controlling signal Cm2;

a first pulse base current setting circuit for outputting a first pulse base current setting signal by setting three conditions excluding a condition to control with a pulse base current controlling signal from four conditions of a pulse current value, a pulse duration, a pulse frequency and a base current value of a first group of pulse currents;

a second pulse base current setting circuit for outputting a second pulse base current setting signal by setting three conditions excluding a condition to control with a pulse base current controlling signal from four conditions of a pulse current value, a pulse duration, a pulse frequency and a base current value of a second group of pulse currents;

a switching circuit HL for outputting a switching signal H1 by switching at a switching frequency $F=0.5$ to 25 Hz;

at least one switching setting circuit for outputting a switching arc voltage signal S6 to switch, with a switching signal H1, between a first arc voltage setting signal Vs1 and a second arc voltage setting signal Vs2, a switching setting signal to switch, with a switching signal H1, between a first pulse base current setting signal and a second pulse base current setting signal or both of said switching arc voltage signal S6 and said switching setting signal;

a pulse control signal generator circuit for outputting a first pulse control signal Pf1 and a second pulse control signal Pf2 upon receiving a pulse base current control signal and a switching setting signal; and a welding output control circuit for outputting a first group of pulse currents upon receiving a first pulse control signal Pf1 and a second pulse control signal Pf2 upon receiving a second pulse control signal Pf2.

The welding apparatus described above is further based on a pulse MAG welding apparatus wherein said pulse base current control circuit for outputting a pulse base current control signal is a pulse frequency control signal generator circuit VF3 for outputting a pulse frequency control signal Vf3 to control a pulse frequency f3, and said first pulse current setting circuit for outputting a first pulse base current setting signal comprises a pulse value setting circuit IP1 for setting a pulse current setting signal Ip1, a pulse duration setting circuit TP1 for setting a pulse duration setting signal Tp1 and a base current value setting circuit IB1 for setting a base current setting signal Ib1.

The welding apparatus described above is further based on a pulse MAG welding apparatus wherein said pulse base current control circuit for outputting a pulse base current control signal is a comparator circuit CM2 for outputting an arc voltage control signal Cm2 to control a pulse duration, and said first pulse current setting circuit for outputting a first pulse base current setting signal comprises a pulse current value setting circuit IP1 for setting a pulse current value setting signal Ip1, a pulse frequency setting circuit FP1 for setting a pulse frequency setting signal Fp1 and a base current setting circuit IB1 for setting a base current setting signal Ib1.

The welding apparatus described above is further based on a pulse MAG welding apparatus wherein said pulse base current control circuit for outputting a pulse base current control signal is a base current control circuit IB3 for outputting a base current control signal Ib3 upon receiving an arc voltage control signal Cm2, and said first pulse current setting circuit for outputting a first pulse base current setting signal comprises a pulse current value setting circuit IP1 for setting a pulse current value setting signal Ip1, a pulse duration setting circuit TP1 for setting pulse duration setting signal Tp1 and a pulse frequency setting circuit FP1 for setting a pulse frequency setting signal Fp1.

The welding apparatus described above is further based on a pulse MAG welding apparatus wherein said pulse base current control circuit for outputting a pulse base current control signal is a pulse current value control circuit IP3 for outputting a pulse current value control signal Ip3 upon receiving an arc voltage control signal Cm2, and said first pulse current setting circuit for outputting a first pulse base current setting signal comprises a pulse duration setting circuit TP1 for setting a pulse duration setting signal Tp1, a pulse frequency setting circuit FP1 for setting a pulse frequency setting signal Fp1 and a base current setting circuit IB1 for setting a base current setting signal Ib1.

The pulse MAG welding apparatus further comprises a first wire feed rate setting circuit IM1 for outputting a wire feed rate setting signal Im1, a second wire feed rate setting circuit IM2 for outputting a second wire feed rate setting signal Im2 and a wire feed rate switching circuit for outputting a switching wire feed rate signal S7 to a wire feed rate control circuit WC by switching, at a switching frequency F=0.5 to 5 Hz, between said first feed rate setting signal Im1 and said second wire feed rate setting signal Im2.

Operation
Description of FIG. 7

FIG. 7 is a structural model view showing a variation in the expansion of an arc 3 when an arc length Left and right or Lt varies. In FIG. 7, the arc 3 expands between a wire terminal 1a or 1b of a consumable electrode 1 supplied with a power from a terminal 4a of the power supplying tip 4 and welding material 2. In an arc welding of aluminum, the arc transfers easily to an area having an oxide film of aluminum as a welding material 2 from the terminal of the consumable electrode. Hence, the actual arc length L11 or L21 is longer than apparent arc length Left and right or Lt which is a shortest distance between the terminal 1a of wire and the surface of the welding material 2. When the wire projection is in a length of Ln, the apparent arc length is Left and right. However, the actual arc length is L21 at the maximum. Next, when the wire projection is Lm in the length, the apparent arc length (referred to arc length hereinafter) is Lt but actually L11. In such a way, in aluminum welding material, the arc easily moves to the oxide film and the aluminum plate has a high cooling speed resulting from the low melting point of aluminum. A periodical variation in the arc length between Lt and Left and right causes the actual arc length to change into a first arc length L11 and a second arc length L21. With a change in the actual arc length, the size of a molten pool can be directly changed. (This is different from the conventional art in which the molten pool is indirectly changed by an molten amount of wire and an arc force.) Accordingly, it is possible for the MAG arc welding method according to the present invention to obtain a scale bead having regular ripple pattern in a similar way to that of TIG filler arc welding method.

In FIG. 7, a variation value in the wire projection length between the first welding condition setting value and the second welding condition setting value or the variation value Le in the arc length is expressed by the following equation; Le=Left and right−Lt=Lm−Ln. Further it is noted that the arc length Lt and Left and right in FIG. 7 are positioned on the characteristic curves L1 and L2 in FIG. 8 as described later.

Description of FIG. 8

A basic welding method according to the present invention is to change the arc length by changing the wire melting speed by switching the output current value of the welding electric source while keeping the wire feed rate constant. The following explains the basic welding method.

FIG. 8 is conducted to a case where a welding electric source outputting a direct current in a constant current characteristic supplies a first welding current for obtaining a first arc length in a short size and a second welding electric source outputting a direct current in a constant characteristic supplies a second welding current for obtaining a second arc length in a long size. FIG. 8 is a graph showing a V-I characteristic curves CC1 and CC2 and the arc characteristic curves L1 and L2 by expressing the output current I of a constant current electric source at the horizontal axis and the output voltage V at the vertical axis. With reference to FIG. 8, when the first welding current value I1 is switched to a second welding current value I2, the operation point moves from a point A on the first arc length L1 in a short size to a point B on a second arc length L2 in a long size. Thus, the arc voltage changes from V1 to V2. In this case, a variation value in the welding current is expressed by the following equation; $\Delta Ia=I2-I1$; a variation value in the arc voltage, $\Delta Va=V2-V1$, a variation in the arc length, $\Delta Le=L2-L1$.

The description will be directed to a comparison between the welding method according to the present invention shown in FIG. 8 and the welding method according to the prior art shown in FIGS. 3 and 4. In the movement of operation points A and B in FIG. 8, the variation value in the welding current $\Delta Ia=I2-I1$ can be limited to a value obtained from I2 and I1 which are predetermined by the welding electric source having a constant current characteristic. For example, it is possible to make the following limitation; $I2/I1=1.03$ to 1.10 according to the basic welding method and $I2/I1=1.05$ to 1.20 according to the additional welding method. However, in the movement of the operation points A-B, B-C or A-C shown in FIG. 3 or FIG. 4, it is not possible to set in advance or control the variation value in the welding current. Hence, there appears a big variation of I1-I2, I1-I3, I1-I4 or I2-I4 with an addition of a variation at the transient state. The next description will be directed to the movement of the operation points A and B in FIG. 8. The variation value in the arc length $Le=L2-L1$ is not limited by a switching range of the output voltage of a welding electric source in a constant voltage characteristic and can be made in a large variation by enlarging I2/I1 because the present method uses a welding electric source having a constant current characteristic.

It is noted that the operation point C in FIG. 8 is explained with reference to embodiment 5.

Description of FIGS. 9 and 10

FIGS. 9 and 10 indicate the case where a first welding current for obtaining a first arc length in a short size is supplied from a welding electric source for outputting a pulse current having a constant current characteristic and second welding current for obtaining a second arc length in a long size is supplied from a welding electric source having a constant current characteristic the same as that of FIG. 8, which does not supply a pulse current.

FIG. 9 is a graph of a welding current obtained by the repetition of a first welding current of a pulse current PC1 and a second welding current of a constant current CC2 without a pulse. A reference character IP1 denotes a pulse current value; a reference character TP1, a pulse duration; a reference character D1, pulse period, that is, an inverse number of a pulse frequency f1; a reference character IB1, a base current value; a reference character I2, a second welding current value; and a reference character M1, an average value of the welding currents in a group of pulse currents. It is noted that the various values mentioned above have the following relationships.

$$D1=1/f1$$

$$I1=M1=[IP1\times TP1+IB1\times(D1-TP1)]/D1$$

FIG. 10 is a graph showing a V-I characteristic curve of a welding electric source outputting a first welding current of a pulse current PC1 and a second welding current of a constant current CC2 without pulse and the arc characteristic curves L1 and L2 by expressing the output current I of a constant current electric source at the horizontal axis and the output voltage V at the vertical axis. In FIG. 10, when the pulse current PC1 is switched to the constant current CC2 without pulse under keeping the wire feed rate at a constant value, the description the same as that of FIG. 8 can be obtained.

A difference between the welding method according to the present invention shown in FIG. 10 and the welding method according to the prior art as shown in FIGS. 3 and 4 is the same description as that of FIG. 8. When the first welding current value I1 is positioned at the vicinity of the critical current value Ic, it is possible for the welding method according to the present invention to prevent the short circuit even with a first arc length in a short size because the molten metal to be transferred due to a pulse current do not form a large grain.

Description of FIGS. 11 and 12

FIGS. 11 and 12 are graphs illustrating a case where a first welding current for obtaining a first arc length in a short size and a second welding current for obtaining a second arc length in a long size are supplied, as pulse currents PC1 and PC2, from the welding electric source.

FIG. 11(A) is a graph showing the time passage of the welding current I composed of the repeat of a first pulse current group PC1 and the second pulse currents group. FIG. 11 (B) is a graph showing the time passage of a switching signal H1 for switching periodically between a first pulse energizing period T1 for energizing the first pulse currents group and a second pulse energizing period T2 for energizing the second pulse currents group PC2. A reference character IP1 denotes a pulse current value; a reference character TP1, a pulse duration; a reference character D1, pulse period, that is, an inverse number of a pulse frequency f1; a reference character IB1, a base current value; a reference character T1, a first pulse energizing period; and a reference character M1, an average value of the welding currents during the first pulse energizing period. It is noted that the various values mentioned above have the following relationships.

$$D1=1/f1$$

$$M1=[IP1\times TP1+IB1\times(D1-TP1)]/D1$$

Next, a reference character IP2 denotes a second pulse current value; a reference character TP2, a second pulse duration; a reference character D2, a second pulse period, that is, an inverse number of a pulse frequency f2; a reference character IB2, a second base current value; a reference character T2, a second pulse energizing period; and a reference character M2, an average value of the welding currents during the second pulse energizing period. It is noted that the various values mentioned above have the following relationships.

$$D2=1/f2$$

$$M2=[IP2\times TP2+IB2\times(D21-TP2)]/D2$$

FIG. 12 is a graph showing a V-I characteristic curve of a welding electric source outputting a first pulse current group PC1 and a second pulse currents group PC2 and the arc characteristic curves L1 and L2 by expressing the output current I of a constant current electric source at the horizontal axis and the output voltage V at the vertical axis. In FIG. 12, when the pulse currents group PC1 is switched to the second pulse currents group PC2 under keeping the wire feed rate at a constant value, the description the same as that of FIG. 8 can be obtained.

A difference between the welding method according to the present invention as shown in FIG. 12 and the welding method according to the prior art as shown in FIGS. 3 and 4 is the same description as that of FIG. 8. When the average value M1 or M2 for the first or second energizing period is lower then the critical current value Ic, it is possible for the welding method according to the present invention to prevent the short circuit even with a first arc length in a short size because the molten metal to be transferred due to a pulse current do not form a large grain.

BRIEF DESCRIPTION OF THE DRAWINGS

FIG. 10 is a graph showing the V-I characteristic curves of the first welding current of pulse current PC1 and the second welding current of a constant current without the pulse and the arc characteristic L1 and L2.

FIG. 11(A) is a graph showing the time passage of welding current obtained with the repeat of the first pulse currents group PC1 and the second pulse currents group PC2; and FIG. 11(B) is a graph showing a time passage of the switching signal for switching the first pulse energizing period T1 and the second pulse current energizing period T2.

FIG. 20(A) is a perspective view of a scale bead obtained with welding method according to the present invention; FIG. 20 (B) is a sectional view showing, in a weld proceeding direction, the penetration depth of a bead obtained by the method according to the present invention; FIG. 20 (C) is a sectional view showing the penetration depth of the bead obtained by the welding method according to the prior art.

FIG. 21(A) and 21(B) are graphs showing waveforms of welding current for use in the welding method according to the present invention.

FIGS. 22 (A) and (B) are, respectively, a structural model view showing a time passage of phenomenon to separate the molten metal grain from the terminal of wire when the first pulse currents group carries out the one pulse to one molten grain transfer, and a graph showing the time passage of the energized pulse current of the pulse currents group.

FIGS. 23 (A) and (B) are, respectively, a structural model view showing a time passage of phenomenon to separate the molten metal grain form the terminal of wire when the first pulse currents group carries out a plurality of pulses to one molten metal grain transfer, and a graph showing the time passage of the energized pulse current of the pulse currents group.

FIG. 26 is a graph showing the relationship between the average value of the welding current Ia and the maximum value of the arc length variation Le in connection with a welding method based on a plurality of pulses to one molten metal grain transfer shown by a solid line CC and a welding method based on one pulse to one molten metal grain transfer shown by a dotted line.

FIG. 30 (B) is a graph showing the time passage of the energized pulse current of the pulse currents group.

FIG. 42 is a table for determining in advance each of first arc voltage setting values Un corresponding to each of wire feed rate setting values Wn when a consumable electrode is fed at predetermined wire feed rate in accordance with a MAG welding method and for determining in advance each of second arc voltage setting values Vn corresponding to each of first arc voltage setting values Un.

FIG. 43 is a table for determining in advance each of first arc voltage setting values Un corresponding to each of first wire feed rate setting values when the consumable electrode is fed at a rate obtained by switching periodically between the first wire feed rate and the second wire feed rate in accordance with a MAG arc welding method, and for determining in advance each of second arc voltage setting values Vn corresponding to each of first arc voltage setting values Un in accordance with each of second wire feed rate setting values Xn.

FIGS. 55 (A) to (D) are structural model views for illustrating the phenomenon occurring with the decrease in the gap of butt joint in the butt welding method of a preferred embodiment according to the present invention.

FIG. 68 (B) is a graph showing the time passage of the amplitude of vibration of the molten pool under welding in a melt proceeding direction; and FIG. 68 (C) is a structural model view showing the convection of the welding metal in the molten pool.

DESCRIPTION OF THE SYMBOLS

Figure 1:
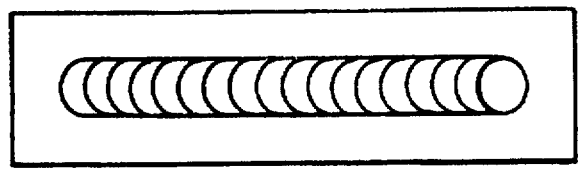
FIG. 1 is a perspective view showing a scale bead in a regular ripple pattern obtained by a conventional TIG filler arc welding method.
Figure 2:
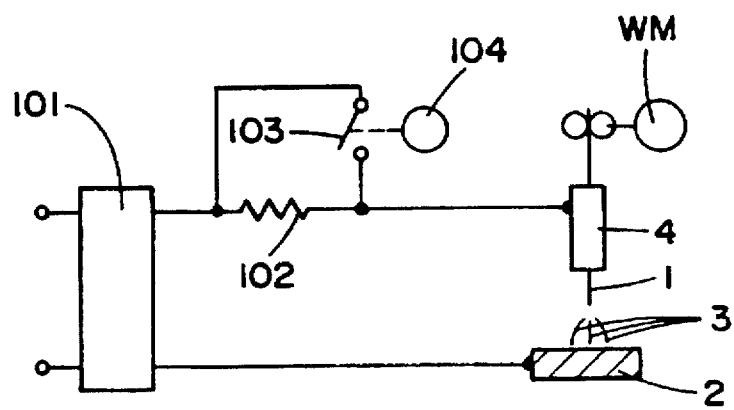
FIG. 2 is a block diagram showing the output signal switching circuit for use in a conventional MIG welding method according to the prior art 1 (Japanese Patent Publication (examined) SYO 46-650).
Figure 3:
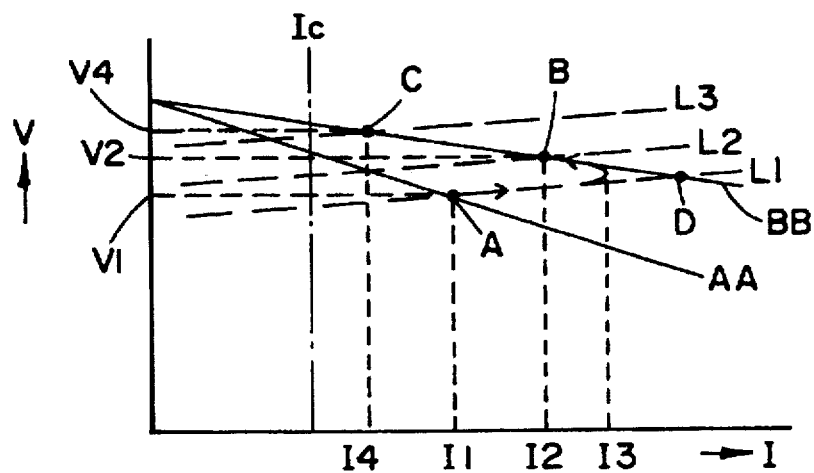
FIG. 3 is a graph showing a V-I curve and the arc characteristic curve of a welding electric source for use in the conventional MIG welding method according to the prior art 1.
Figure 4A:
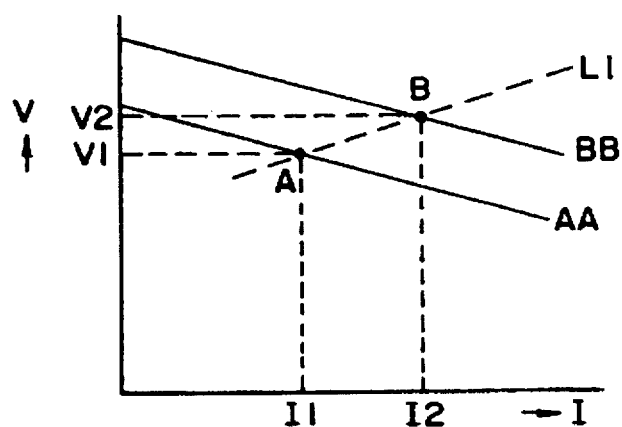
FIGS. 4(A) to (C) are graphs showing the V-I characteristic curve and the arc characters curves for use in the conventional MAG welding method according to the prior art 2 (Japanese Patent Publication (examined) Syo 49-48057.
Figure 4B:
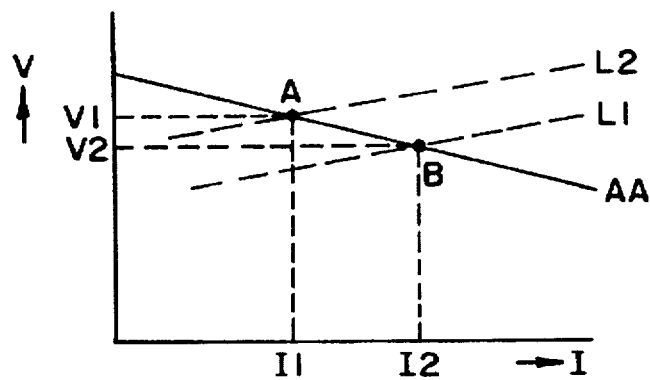
Figure 4C:
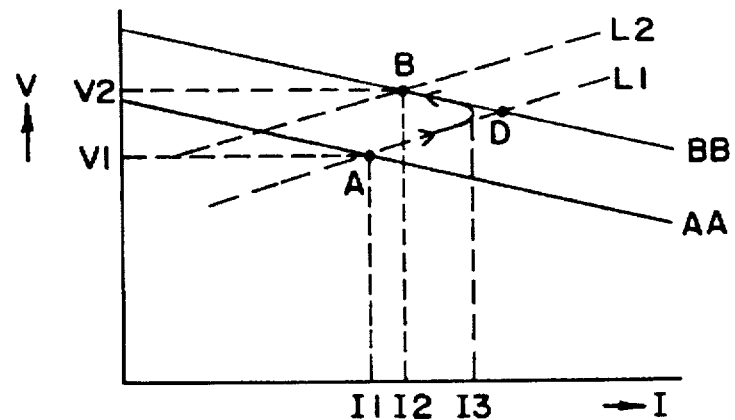
Figure 5A:
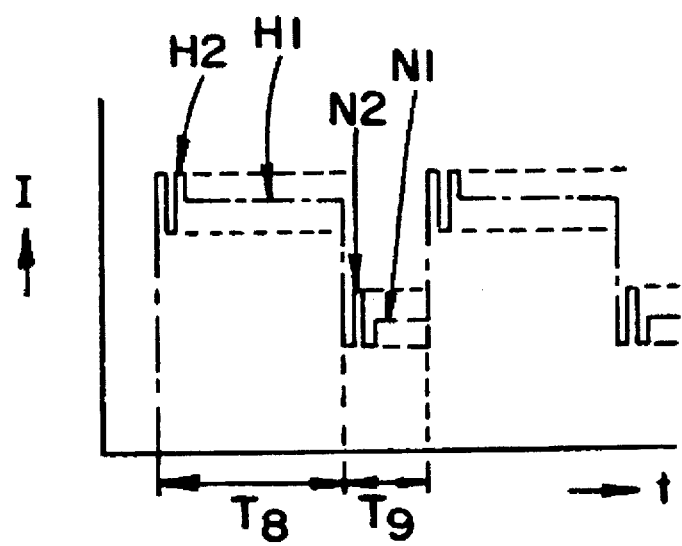
FIGS. 5(A) and (B) are graphs showing a wave form of welding voltage obtained by switching largely the base current with a variation in the wire feed rate through MIG method according to the prior art 3 (Japanese Patent Publication (unexamined) Syo 62-279087) and by switching largely the base voltage with the variation in the waveform of welding current obtained by switching the average value of the welding current between the high current and the low current and in the output voltage of the base electric source.
Figure 5B:
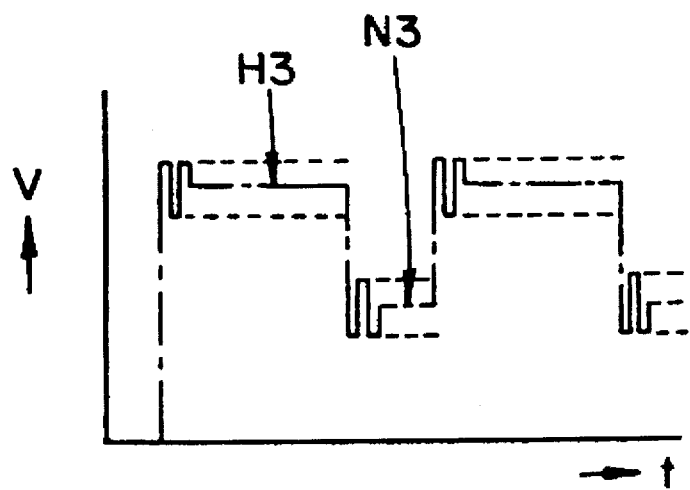
Figure 6:
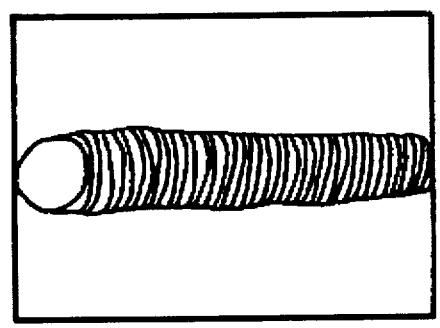
FIG. 6 is a perspective view showing the appearance of a scale bead having no regular ripple pattern formed by the conventional MIG arc welding method.

1 . . . consumable electrode (wire)
1a, 1b . . . terminal of the wire
2 . . . welding material
3 . . . arc
4 . . . electric supplying tip
4a . . . terminal of electric supplying tip
L11, L21 . . . actual arc length
Ln, Lm . . . wire projection length Lt, Left and right . . . apparent first and second arc lengths
Le . . . variation value of wire projection length (apparent) arc length variation value
L1, L2 . . . arc characteristic of arc length L1, and L2
1PnD . . . one pulse to a plurality of molten metal grains transfer range
1P1D . . . one pulse to one molten metal grain transfer range
nP1D . . . plurality of pulses to one molten metal grain range
P1, P1, . . . P1 . . . first pulse currents group
P2, P2, . . . P2 . . . second pulse currents group
IP . . . pulse current (value)
IP1 . . . first pulse current value
IP2 . . . second pulse current value
IP3 . . . pulse current value
Ip31, IP32 . . . first and second pulse current value
TP . . . pulse duration
TP1 first pulse duration
TP2 . . . second pulse duration
Tp3 . . . pulse duration
TP31, TP32 . . . first and second pulse duration
f . . . pulse frequency
f1, f2 . . . first and second pulse frequency
f3 . . . pulse frequency
f31, f32 . . . first and second pulse frequency
Ib . . . base current (value)
Ib1 . . . first base current
IB2 . . . second base current
IB3 . . . base current
IB31, IN32 . . . first and second base current value
f . . . switching frequency
WS . . . welding speed
WF, WF1, WF2, WF3 . . . wire feed rate
Wf . . . wire feed rate setting value
D1 . . . (first) pulse period
D2 . . . second pulse period
I1 . . . first welding current value
I2 . . . second welding current value
T1 . . . first welding current energizing time (first pulse energizing period)
T2 . . . second welding current energizing time (second pulse energizing period)
Ds . . . energizing ratio
M1 . . . average value of welding current during first pulse energizing period
M2 . . . average value of welding current during second pulse energizing period
I . . . welding current (value)
Ia . . . average value of welding current
ΔIa . . . variation value of welding current
V . . . arc voltage
Va . . . average value of arc voltage
Va1 . . . first arc voltage value
Va2 . . . second arc voltage value
ΔVa . . . variation value of arc voltage
WM . . . wire feeding motor
WC . . . wire feed rate control circuit WD . . . wire feed rate detection circuit
Im . . . average current setting circuit (wire feed rate setting circuit)
Im1 . . . first welding current setting circuit (first wire feed rate setting circuit)
Im2 . . . second welding current setting circuit (second wire feed rate setting circuit)
vs1 . . . (first) arc voltage setting circuit
VS2 . . . second arc voltage setting circuit
VD . . . arc voltage detection circuit
ID . . . welding current detection circuit
CM1 . . . wire feed rate comparing circuit (first comparator)
CM2 . . . (second) comparator
CM6 . . . welding current comparator
IP1 . . . (first) pulse current value setting circuit
IP2 . . . second pulse current value setting circuit
TP1 . . . (first) pulse duration setting circuit
TP2 . . . second pulse duration setting circuit
FP1 . . . (first) pulse frequency setting circuit
FP2 . . . second pulse frequency setting circuit
IB1 . . . (first) base current setting circuit
IB2 . . . second base current setting circuit
IB3 . . . base current controlling circuit
IP3 . . . pulse current value controlling circuit
SW1 . . . pulse current value switching circuit
SW2 . . . pulse duration switching circuit
SW3 . . . base current switching circuit
SW4 . . . pulse frequency switching circuit
SW5 . . . pulse base current switching circuit
SW6 . . . arc voltage switching circuit
SW7 . . . wire feed rate switching circuit (welding current switching circuit)
SW8 . . . constant current switching circuit
SW9 . . . short circuit current switching circuit
SW10 . . . pulse constant current switching circuit
PS . . . welding electric source controlling circuit
VF . . . pulse frequency signal generating circuit
VF3 . . . pulse frequency control signal generating circuit
DF . . . pulse duration frequency signal generating circuit
DF3 . . . pulse duration and frequency controlling signal generating circuit
HL . . . switching signal generating circuit
DT . . . energizing ratio setting circuit
FT . . . energizing frequency setting circuit
IS1 . . . first constant current setting circuit
IS2 . . . second constant current setting circuit
IT . . . short circuit current setting circuit
SD . . . short circuit detection circuit
WS . . . welding speed setting circuit
Wc . . . wire feed rate controlling circuit
Wd . . . feed rate detection circuit
Im . . . average current setting signal (wire feed rate setting signal)
Im1 . . . first welding current setting signal (first wire feed rate setting signal)
Im2 . . . second welding current setting signal (second wire feed rate setting signal)

Vs1 . . . (first) arc voltage setting signal
Vs2 . . . second arc voltage setting signal
Vd . . . arc voltage detection signal
Id . . . welding current detection signal
Cm1 . . . wire feed rate controlling signal
Cm2 . . . arc voltage controlling signal
Cm6 . . . welding current controlling signal
Vf . . . pulse frequency signal
Vf1, Vf2 . . . first and second pulse frequency signal
Vf3 . . . pulse frequency controlling signal
Vf31, Vf32 . . . first and second pulse frequency controlling signal
H1 . . . switching signal
Ip . . . pulse current value setting signal
Ip1, Ip2 . . . first and second pulse current value setting signal
Ip3 . . . pulse current controlling signal
Ip31, Ip32 . . . first and second pulse current controlling signal
Tp . . . pulse duration setting signal
Tp1, Tp2 . . . first and second pulse duration setting signal
Tp3 . . . pulse duration controlling signal
Tp31, Tp32 . . . first and second pulse duration setting signal
Fp . . . pulse frequency setting signal
Fp1, Fp2 . . . first and second pulse frequency setting signal
Ib . . . base current setting signal
Ib1, Ib2 . . . first and second base current setting signal
Ib3 . . . base current controlling signal
Ib31, Ib32 . . . first and second base current controlling signal
S1 . . . switching pulse current signal
S2 . . . switching pulse duration signal
S3 . . . switching base current signal
S4 . . . switching pulse frequency signal
S5 . . . switching pulse base current signal
S6 . . . switching arc voltage signal
S7 . . . switching wire feed rate signal
S8 . . . switching constant current signal
S9 . . . short circuit switching signal
S10 . . . pulse constant current switching signal
Df . . . pulse duration frequency signal
Df1, Df2 . . . first and second pulse duration frequency signal
Df3 . . . pulse duration frequency controlling signal
Df31, Df32 . . . first and second pulse duration frequency controlling signal
Dt . . . energizing ratio signal
Pf . . . pulse controlling signal
Pf1, Pf2 . . . first and second pulse controlling signal
It . . . short circuit current setting signal
Sd . . . short circuit detection signal

BEST MODE FOR EMBODYING THE INVENTION

Figure 13:
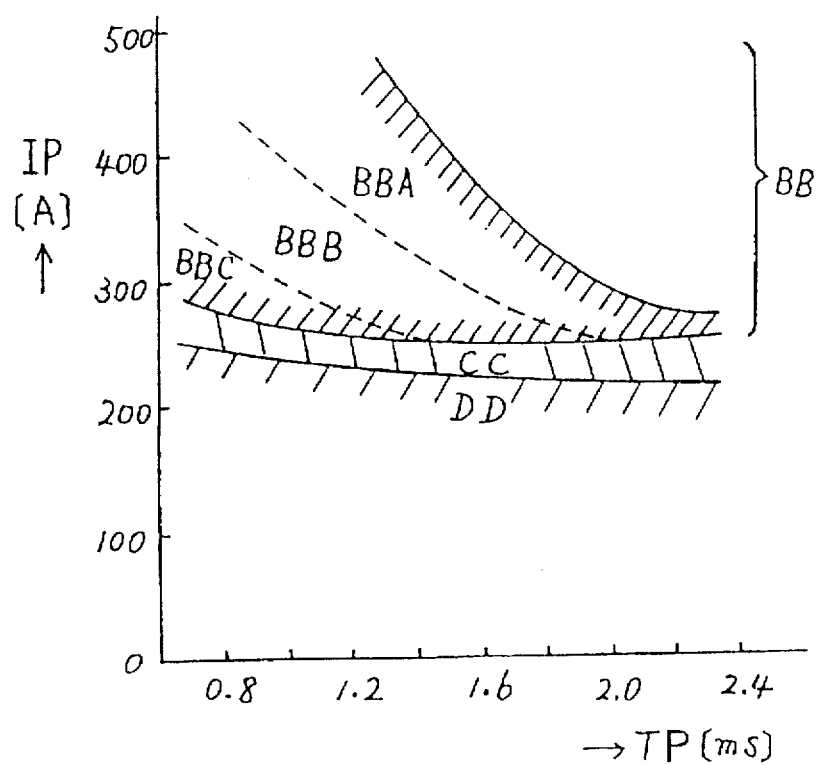
FIG. 13 is a graph showing the pulse energizing time and the form of the molten metal transferred corresponding to the pulse energizing time.

Embodiment 1, Description of FIG. 13 FIG. 13 shows various ranges for various forms of molten metal grains transfer on a graph having a pulse energizing time TP ms (referred to pulse duration) plotted at a horizontal axis and a pulse current IP A plotted at a vertical axis when an aluminum plate is welded with aluminum wire of 1.2 mm diameter at an average welding current Ia=100 A, and a base current Ib=30 A with a pulse MIG arc welding method. In FIG. 13, a range BB is a spray transfer range for a long arc length, while a range DD is a short circuit transfer range at which the arc disappears. At a range CC, an arc length is an intermediate length between a length at the spray transfer range BB and a length at the short circuit transfer range DD. The range CC has a slight short circuit generated therein. The molten metal transfer is carried out by the spray transfer. The range CC is a so called meso spray transfer range. Among the above spray transfer range BB, a range shown by a oblique line is a one pulse to one molten metal grain range where the pulse current and the molten metal transfer are synchronized to each other. Further, this range is divided into a BBA range at which the arc length is more than 6 mm, a BBB range at which the arc length is 4 to 6 mm and BBC range at which the arc length is 2 to 4 mm.

Figure 14A:
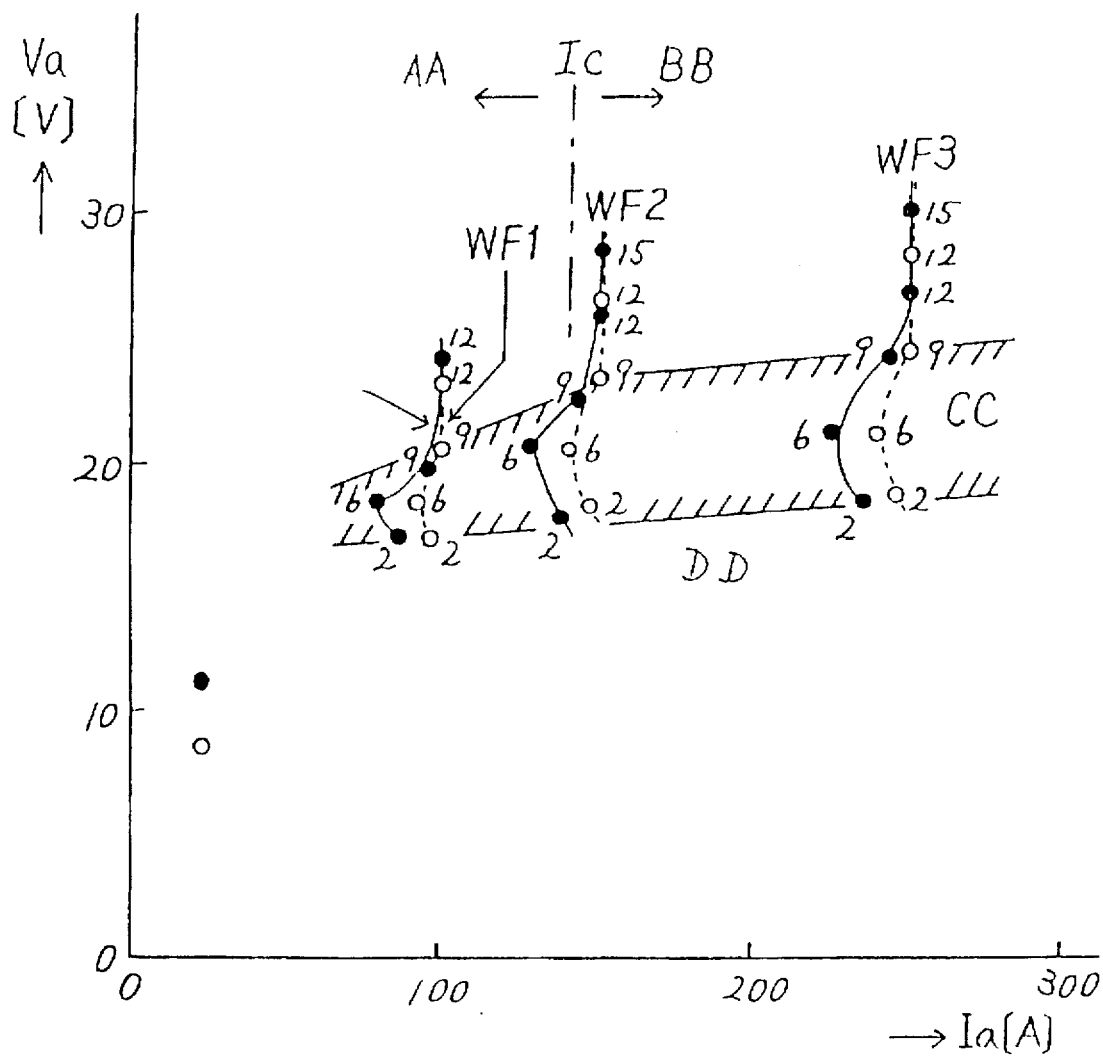
FIG. 14(A) is a graph showing the relationship between the average value of the welding current Ia (horizontal axis) and the average value of the arc voltage Va (vertical axis) obtained when the arc length L varies from the first arc length 2 mm which is the shortest length to produce a slight short circuit to the second arc length 12 mm or 15 mm which is longest.
Figure 14B:
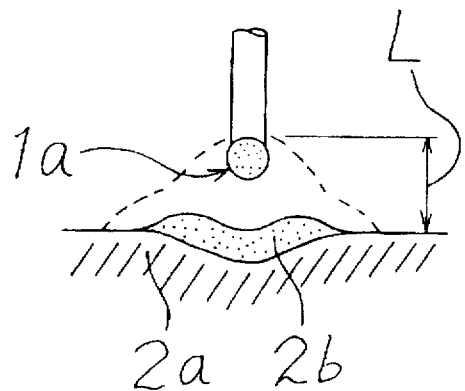
FIG. 14(B) is a structural model view showing the arc length L.

Embodiment 2, Description of FIG. 14

FIG. 14 (A) shows a relationship between an average value Ia A of the welding currents (horizontal axis) and an average value Va V of arc voltages (vertical axis) when aluminum alloy plate is welded with an aluminum alloy consumable electrode of 6 mm diameter through a MIG arc welding method. In FIG. 14 (A), a wire feed rate WF1 to WF3 is predetermined at a given value, and the distance between the terminal 4a of electricity supplying tip and the surface of the welding material 2a is changed mechanically. The measurement is carried out with the relationship among the average value Ia A of welding current, the average value Va V of the arc voltages and arc length L mm shown in FIG. 14 (B). A range AA lower in the current than the critical current IC is a drop transfer range, and a range BB higher in the current than the critical current Ic is a spray transfer range. A range CC shown by a oblique line is a range having an intrinsic self-regulation effect of arc length, that is, a so called meso spray transfer range, and a range DD below the oblique line is a short circuit transfer range.

In a meso spray transfer range CC of FIG. 14 (A), the average value Ia of the welding currents decreases with a decrease in the arc length L at the constant value of the wire feed rate WF as described above. This is equivalent to a fact that the wire feeding amount, that is, the melting speed of the wire fed increases with a decrease in the arc length at a constant value of the welding current. As a result, the arc length is controlled automatically in a way that the arc length increases with an increase in the wire melting amount resulting from the lowering of the arc voltage. This is an intrinsic self-regulation effect of arc length. This regulation can be seen with the welding of an aluminum plate.

In the meso spray transfer range CC in FIG. 14 (A), a white circle and a dotted line indicate a case in which the first pulse currents group are controlled to be in one pulse to one molten grain mode, and a black circle and a solid line indicate the meso spray mode in which the first pulse currents group or the first welding current value without pulse is set to be a value to generate a slight short circuit. In a range having the arc length of 2 to 9 mm of the meso spray transfer range in FIG. 14 (A), the meso spray mode shown by a solid line is larger in the curvature than the one pulse to one molten metal grain mode shown by a dotted line. Accordingly, the first pulse current group or the first welding current set to the meso spray mode causes a large variation in the wire melting amount at the wire feed rate and the welding current the same as that of other case. As a result, it is possible to make the slight short circuit time shorter, the slight short circuit number less and then the arc length shorter.

In view of the above reason, the one pulse to one molten metal grain mode is set up at the spray transfer range BB while the meso spray mode to generate the slight short circuit is set up at the meso spray transfer range CC. A periodical switching method between both modes repeats alternatively the enlargement of the molten pool due to the expansion of the arc and the fulfilling of the molten metal due to the convergence of the arc. As a result, the control of the molten metal has a larger effect than the control at the spray transfer range BB not to produce the short circuit. It is noted that the first pulse currents group or the first welding current causes the slight short circuit to generate 2 to 8 times per sec and then the short circuit transfer is not carried out because tile short circuit time is less than 1.5 msec per one time according to the welding method of the present invention. The conventional short arc welding method has the short circuit generated 20 to 100 times per sec and has a long short circuit more than 2 msec per one time. There is accordingly a clear difference in the slight short circuit between the welding method according to the present invention and the welding method according to the prior art. The welding method according to the present invention differs clearly from the conventional welding method to repeat periodically the spray transfer and the short circuit transfer and can obtain the scale bead in a regular ripple pattern in a similar way to that of the TIG filler arc welding method.

Figure 15:
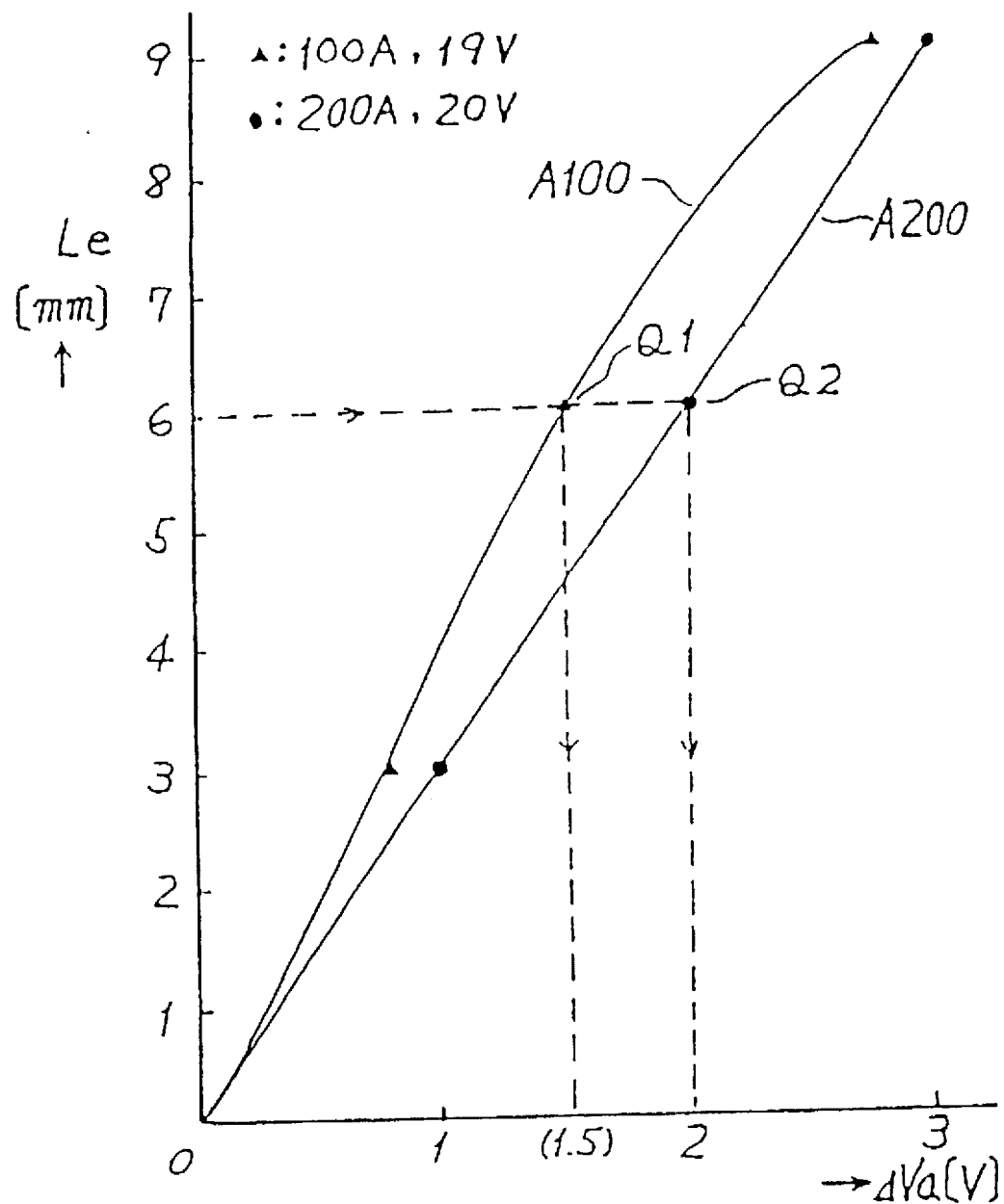
FIG. 15 is a graph showing the relationship between the variation value in the arc voltage $\Delta Va$ and the variation in the arc length Le with a constant value of the wire feed rate in connection with the aluminum welding.
Figure 16:
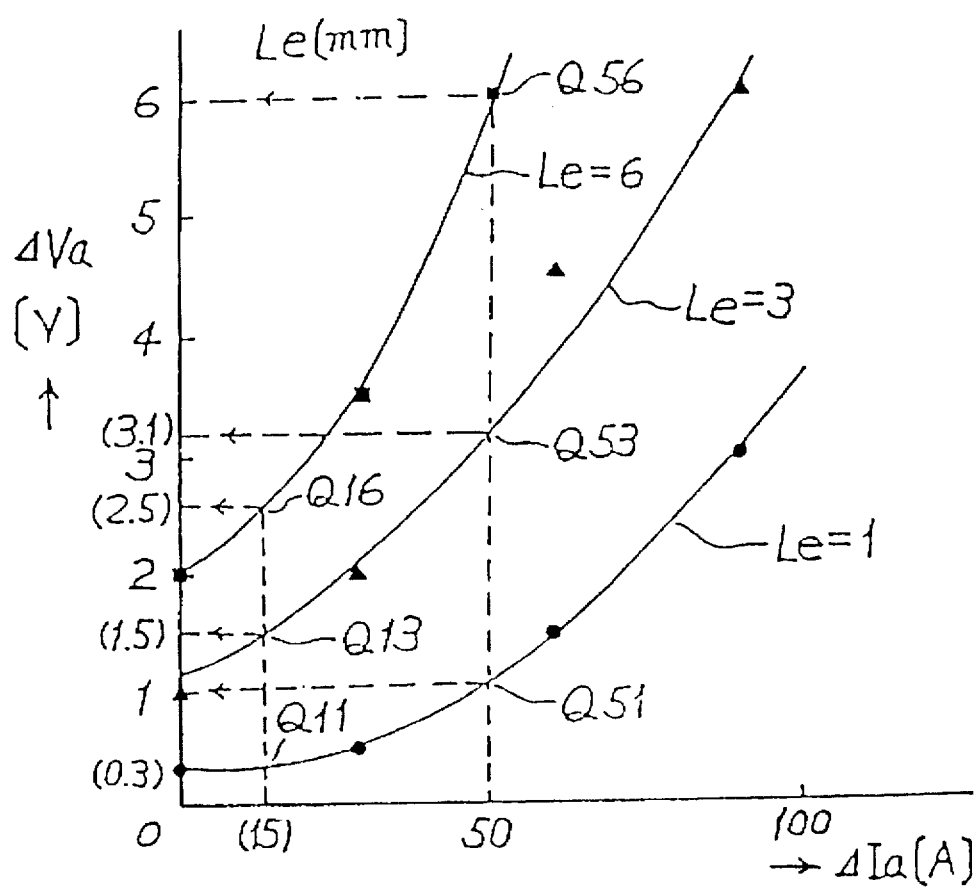
FIG. 16 is a graph showing a variation in the arc length Le with a variation in the welding current value and the arc voltage value under switching the wire feed rate in connection with aluminum welding.

With reference to FIGS. 15 and 16, the description will be directed to the relationship among the average value Ia A of the welding currents or the variation value ΔIa A, the variation value ΔVa V of the arc voltages and the variation value Le mm of the arc Length.

Embodiment 3, Description of FIG. 15

FIG. 15 relates to the embodiment of the basic welding method according to the present invention and is a graph showing the relationship between the variation value ΔVa V of the arc voltages (horizontal axis) and the variation value Le mm of the arc length (vertical axis) with a constant setting value of the wire feed rate. The welding conditions of FIG. 15 are as follows: electrode, aluminum wire 5183 of 1.2 mm diameter; pulse current value IP, 280 A; pulse duration TP, 1.2 ms; average value of the welding current Ia, 100 A as shown by a curve 100; average value of the arc voltage Va, 19 V; or average value of the welding current Ia, 200 A as shown by a curve 200; average value of arc voltage Va, 20 V. With reference to FIG. 15, the description will be directed to a case when the set average value of welding current Ia changes from 100 A to 200 A. In order to obtain the variation value of the arc length Le of 6 mm the same as each other, the variation value of the arc voltage is ΔVA=1.5 V as shown by a point Q1 on the curve A100 at the case of Ia=100 A whereas the variation value of the arc voltage is ΔVa=2.0 V as shown by a point Q2 on the curve A200 at the case of La=200 A. It is clear that the latter case has the variation value of the arc voltage higher than that of the former case. That is, an increase in the average value of the welding currents Ia requires an increase in the variation value of the arc voltages ΔVa in order to obtain the variation value of the arc length the same as each other.

Embodiment 4, Description of FIG. 16

FIG. 16 is a graph showing the variation value of the arc length Le obtained with a case when the welding is carried out at a larger welding current by changing largely the conventional wire feed rate and the Le obtained by changing the welding current value and the arc voltage value in the additional welding method according to the present invention as mentioned above. The welding conditions in FIG. 16 are carried out by using an aluminum wire A5183 at the average value of the welding current Ia=90 A and the arc voltage Va=19 V. The graph shown in FIG. 16 has the variation value of the welding current ΔIa A plotted at a horizontal axis and the variation value of the arc voltages ΔVa V plotted at a vertical axis. The curves Le=1, Le Feibush and Le=6 can be obtained by plotting the measuring points corresponding to the variation value Le of the arc length of 1, 3 and 6 mm, respectively. With reference to FIG. 16, the case ΔIa=0 is the same case as that when the average value of the welding currents Ia is made constant without changing the wire feed rate according to the basic welding method of the present invention. In order to obtain Le=1, Le Feibush and Le=6 mm, the variation value of the arc voltage must be 0.3, 1.1 and 2.0 V.

On the horizontal axis of FIG. 16, ΔIa=50 A is corresponding to a case when the welding is carried out by switching the conventional wire feed rate to change largely the variation value of the welding current ΔIa. As shown by points Q51, Q53 and Q56, in order to obtain the variation value of the arc length Le=1, Le Feibush and Le=6 mm, it is necessary to satisfy the following relation; the variation value of the arc voltage ΔVa=1, 3.1 and 6 V, respectively.

In the additional welding method according to the present invention, when the variation value ΔIa is determined to be 15 A which is within a range of 10 to 15% of the average value of the welding current, for example, 100 A, the variation value of the arc length Le=1, Le Feibush and Le=6 mm can be obtained by determining the variation value of the arc voltage in the following way; ΔVa=0.3, ΔVa=1.5 and ΔVa=2.5 V, respectively which are lower than those of the conventional welding method.

In the conventional welding method changing largely the welding current, a large variation in the arc length requires a large variation in the variation value of the arc voltage ΔVa. In order to achieve the requirement, it is necessary to change largely one or more than two among the pulse current, pulse duration, pulse frequency and base current of the second pulse currents group in response to the pulse current value, pulse duration, pulse frequency and the base current value of the first pulse currents group. However, the base current in a too much large size prevents the molten transfer from synchronizing with the pulse. On the other hand, the pulse current value in a too much large size causes the arc force to be too much strong and the penetration depth to be large and then results in the melt down. Accordingly, it has not been possible for the conventional welding method having the welding current changed largely to change the arc length largely.

Figure 17:
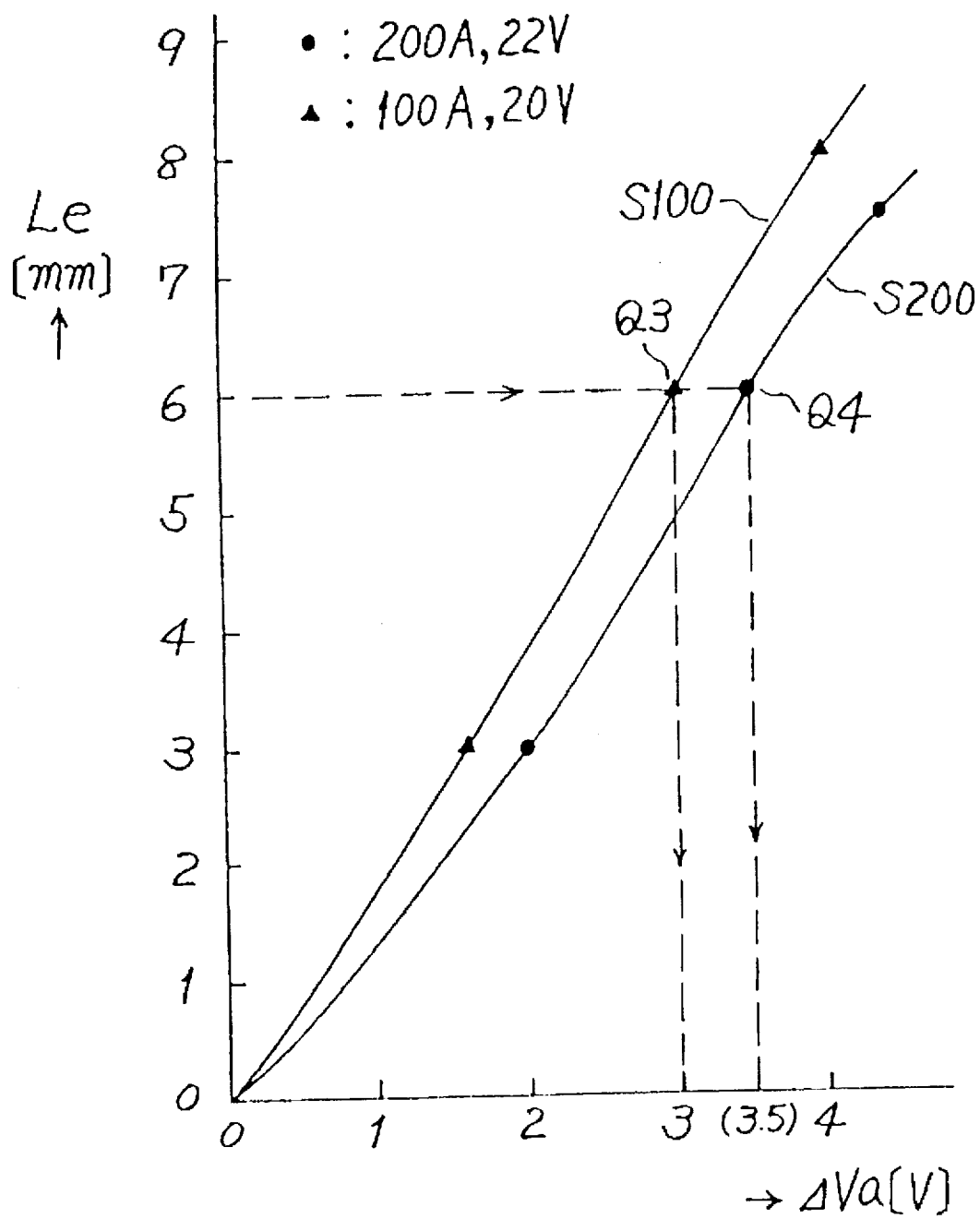
FIG. 17 is a graph showing a relationship between a variation in the arc voltage $\Delta Va$ and a variation in the arc length Le at a constant value of the wire feed rate in connection with stainless steel welding.
Figure 18:
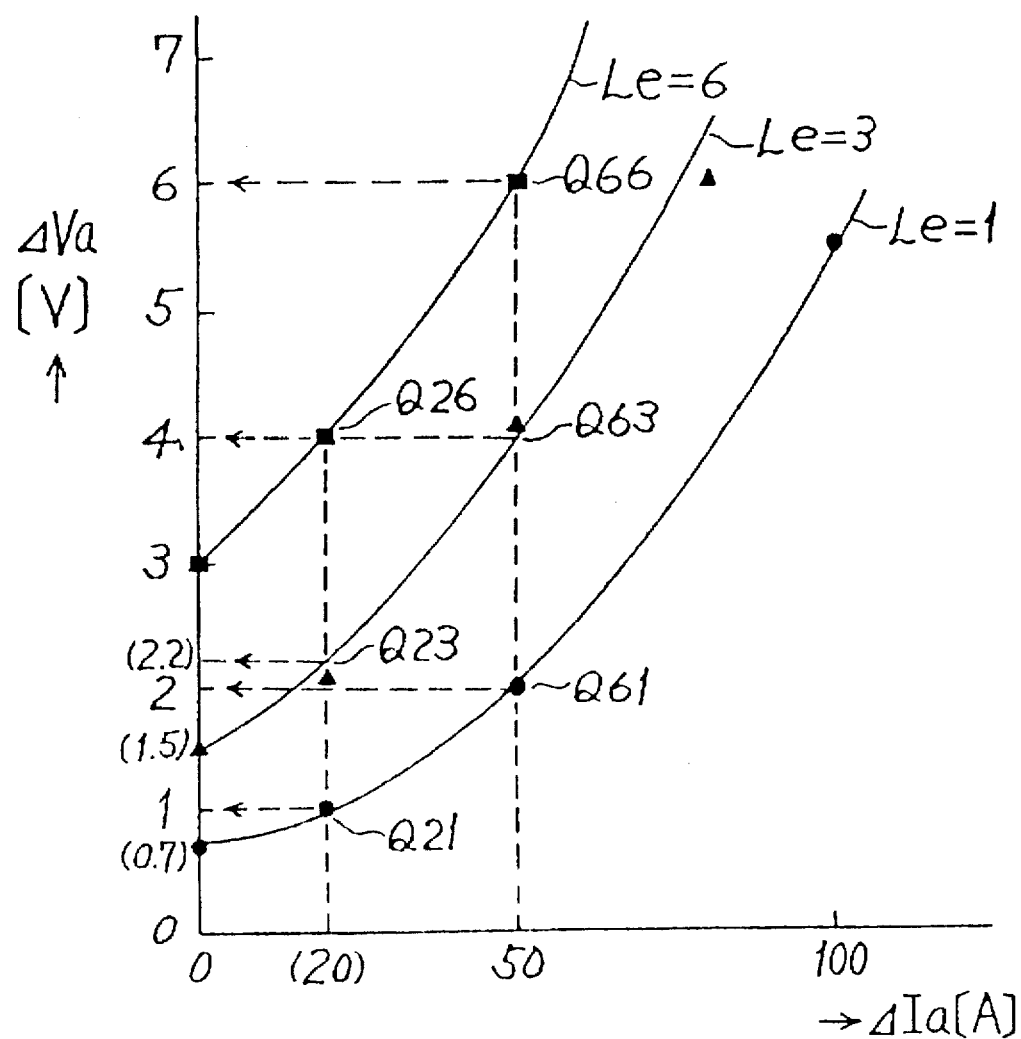
FIG. 18 is a graph showing the variation in the arc length Le with the variation in the welding current value and arc voltage at various wire feed rates in connection with stainless steel welding.

With reference to FIGS. 17 and 18, the following description will be directed to the relationship among the average value of the welding current Ia, the variation value of the average welding current ΔIa A, the variation value of the arc voltage ΔVa V, and the variation value of the arc length Le mm.

Embodiment 5, Description of FIG. 17

FIG. 17 is a graph showing the relationship between the variation value of the arc voltage ΔVa V and the variation value of the arc length Le mm when the basic welding method according to the present invention is carried out in a way for managing the wire feed rate to have the average value of the welding current Ia held at a constant value. The welding condition of FIG. 17 is as follows: electrode= stainless steel SUS308 in a diameter 1.2 mm; pulse current value IP=380 A; pulse duration TP=1.2 ms; average value of welding current Ia=100 A and arc voltage Va=20 V as shown by a curve S 100 or average value of welding current Ia=200 A and average value of arc voltage Va=22 V as shown by a curve S 200. With reference to FIG. 17, the description will be directed to a case when the set average value of welding current Ia changes from 100 A to 200 A. In order to obtain the variation value of the arc length Le of 6 mm the same as each other, the variation value of the arc voltage is ΔVA=3.0 V as shown by a point Q3 on the curve S100 at the case of Ia=100 A whereas the variation value of the arc voltage is ΔVa=3.5 V as shown by a point Q4 on the curve S200 at the case of La=200 A. It is clear that the latter case has the variation value of the arc voltage higher than that of the former case. That is, an increase in the average value of the welding currents Ia requires an increase in the variation value of the arc voltages ΔVa in order to obtain the variation value of the arc length the same as each other.

Embodiment 6, Description of FIG. 18

FIG. 18 is a graph showing the variation value of the arc length Le obtained with a case when the welding is carried out at a larger welding current by changing largely the conventional wire feed rate and the Le obtained by changing the welding current value and the arc voltage value in the additional welding method according to the present invention as mentioned above. The welding conditions in FIG. 18 are carried out by using a stainless steel wire SUS 308 of diameter 1.2 mm at the average value of the welding current Ia=90 A and the arc voltage Va=19 V. The graph shown in FIG. 18 has the variation value of the welding current ΔIa A plotted at a horizontal axis and the variation value of the arc voltages ΔVa V plotted at a vertical axis. The curves Le=1, Le Feibush and Le=6 can be obtained by plotting the measuring points corresponding to the variation value Le of the arc length of 1, 3 and 6 mm, respectively.

With reference to FIG. 18, the case ΔIa=0 is the same case as that when the average value of the welding currents Ia is made constant without changing the wire feed rate according to the basic welding method of the present invention. In order to obtain Le=1, Le 'Feibush and Le=6 mm, the variation value of the arc voltage ΔVa must be 0.7, 1.5 and 3.0 V.

On the horizontal axis of FIG. 18, ΔIa=50 A is corresponding to a case when the welding is carried out by switching the conventional wire feed rate to change largely the variation value of the welding current ΔIa. As shown by points Q61, Q63 and Q66, in order to obtain the variation value of the arc length Le=1, Le Feibush and Le=6 mm, it is necessary to satisfy the following relation; the variation value of the arc voltage, ΔVa=2, 4 and 6 V, respectively.

In the additional welding method according to the present invention, when the variation value ΔIa is determined to be 20 A which is within a range of 10 to 20% of the average value of the welding current, for example, 90 A, the variation value of the arc length Le=1, Le Feibush and Le=6 mm can be obtained by determining the variation value of the arc voltage in the following way; ΔVa=1.0, ΔVa=2.2 and ΔVa= 4.0 V, respectively which are lower than those of the conventional welding method.

The next description is the same as that of the embodiment 4 in FIG. 16 and accordingly should be omitted.

Description of current switching

In FIG. 11, a switching signal shown in FIG. 11 (B) switches between the first pulse currents group and the second currents group with an energizing ratio Ds=T2/(T1+T2) between the second pulse energizing period T2 and the first pulse energizing period T1. This switching frequency F=1/(Ti+T2) is set: to a suitable value, for example, 0.5 to 25 Hz in order to achieve the aimed welding result. The pulse switching frequency is in a close relation to the welding speed and is preferably selected in connection with the welding speed from the following table.

TABLE 1

| welding speed [cm/min] | switching frequency [Hz] |
|---|---|
| 10–30 | 1.5 |
| 30–50 | 3 |
| 50–90 | 5 |
| 90–120 | 8 |
| 120–180 | 10 |
| 180–300 | 15 |

As shown in Table 1, the switching frequency is in a close relation to the welding speed for obtaining a suitable welding result. Hence, it is possible to switch between the first pulse energizing period and the second energizing period by generating a switching signal in a frequency corresponding to that of the signal set to the welding speed.

In connection with the selection of the energizing ratio Ds, when the second pulse energizing period T2 is longer than the first energizing period, the arc length becomes larger and the sputter is easily generated. Therefore, it is desirable that the second pulse energizing period T2 is shorter than the first energizing period T1, and the energizing ratio Ds=T2/(Ti+T2) is selected to be less than 0.5.

Further, when the variation value of the pulse current between the first pulse current IP1 and the second pulse current IP2 is large, the sputter is easily generated with the switching of both currents at the same time. It is desirable to switch at a plurality of times in order to achieve a gradual increase or decrease shown by a step form, a slope form or the combination of the both.

Figure 19:
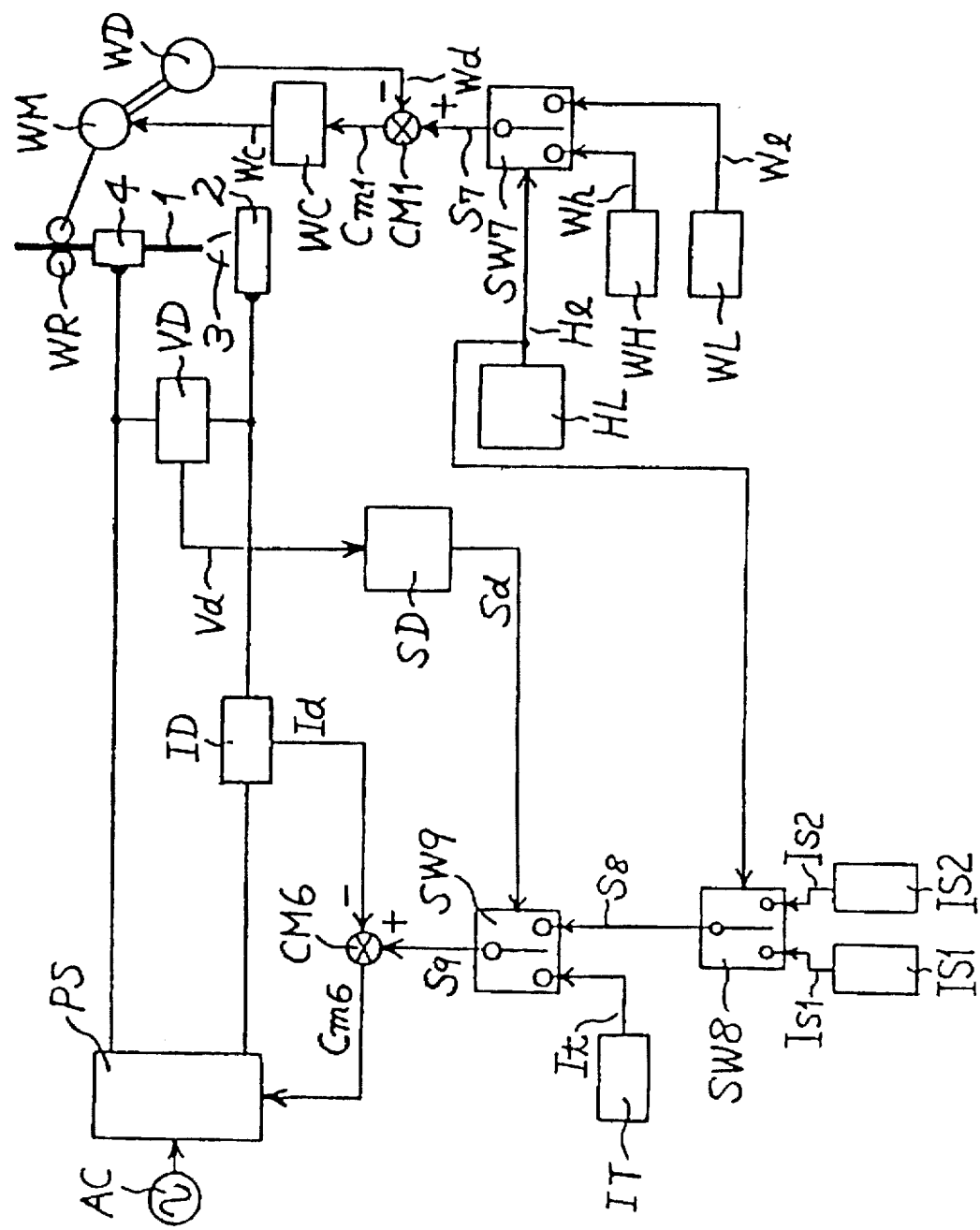
FIG. 19 is a block diagram of a welding apparatus effecting the welding method of the present invention.

Description of FIG. 19

FIG. 19 is a block diagram of the welding apparatus for carrying out the MIG arc welding at the meso spray transfer range at which the slight short circuit generates as described with the FIG. 14.

In general, the welding at the meso spray transfer range can be carried out by using a welding output control circuit having a constant current characteristic. The wire feed rate is set in advance to a constant value and the arc length is controlled to be in a constant value according to the intrinsic self-regulation effect of arc length as mentioned above. When the short circuit generates, this welding method detects the short circuit and energizes the welding current higher than that of the ordinal time to make the re-ignition of the arc.

In the welding apparatus according to this embodiment, the MIG arc welding at this meso spray transfer range CC is carried out by using a welding output power having a constant current characteristic. Hence, there are two methods for switching periodically the arc length; one is to switch the setting value of the welding current, and another is to switch the wire feed rate. Because the wire feed rage is changed at the same time with the switching of the setting value of welding current, the present embodiment adapts a method to change the arc length periodically by switching periodically the wire feed rate.

In FIG. 19, a first wire feed rate setting circuit WH and a second wire feed rage setting circuit WL are circuits to set the arc lengths respect to the first and second welding conditions, and output a first wire feed rate setting signal Wh and a second wire feed rate setting signal Wi, respectively. A switching circuit H generates a switching signal H1 to switch between the first welding condition and the second welding condition. A wire feed rate switching circuit SW7 generates a wire feed rate switching signal S7 by managing the switching Signal H1 to switch between a signal Wh and a signal Wi. A wire feed rate comparator circuit CM1 generates a wire feed rate control signal Cm1 obtained with the difference between a signal S7 and a rate detection signal Wd. A first constant current setting circuit IS1 generates a first constant setting signal Is1 for energizing the first constant current I1 at the small arc length. A second constant current setting circuit IS2 generates a second constant current setting signal Is2 for energizing a second constant current I2 for the long arc length. A constant current switching circuit SW generates a constant current switching signal S8, and a short circuit current setting circuit IT generates a short circuit setting signal It for energizing the welding current higher than that at the arc generation. A short circuit detection circuit SD generates a short circuit detection signal Sd when the short circuit is generated by an input of arc voltage detection signal Vd generated from an arc voltage detection circuit VD. A short circuit current switching circuit SW9 generates a short circuit switching signal S9 by switching a switching constant current signal S8 to a short circuit current setting signal It. A welding current comparator circuit CM6 receives a welding current detection signal Id from a short circuit switching signal S9 and a welding current detection circuit ID and outputs a welding current control signal Cm6 corresponding to the difference between both signals to a welding output control circuit PS no control the welding current. In such a case when an aluminum plate is welded by a MIG welding method at the meso spray transfer range CC, the variation in the arc voltage increases with the large variation in the arc length because the arc flies far away to the oxide film. Hence, it is difficult to control the arc length by detecting the arc voltage. Therefore, it is possible to control the penetration shape by changing the arc length equivalent to the shortest distance between the terminal 1a of consumable electrode and the surface of molten pool of the welding material.

In FIG. 19, when the switching signal H1 switches between the first constant current setting circuit IS1 and the second constant current setting circuit IS2, the operation point mentioned before moves between points A and B. In FIG. 19, the first wire feed rate setting circuit WH and the second wire feed rat setting circuit WL are switched to each other, the operation point mentioned before moves between points A and C, and the arc length changes from Lt to Left and right without changing the welding current I1 with a variation in the arc voltage value from V1 to V3.

Welding method

Figure 7:
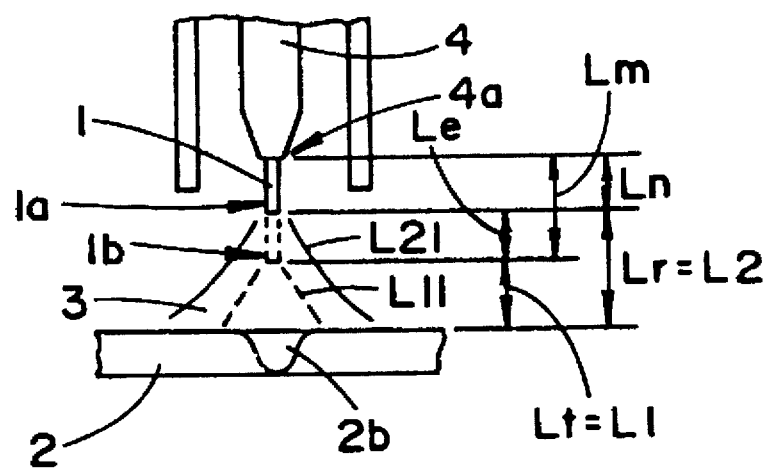
FIG. 7 is a structural model view showing the expansion of the arc with the variation in the arc length performed by a welding method according to the present invention.
Figure 8:
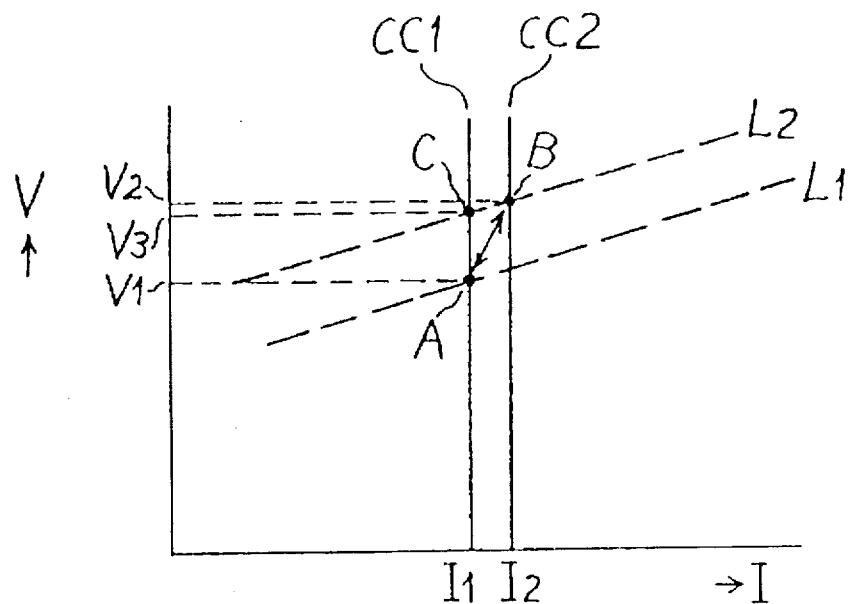
FIG. 8 is a graph showing the relationship between the V-I characteristic CC1 and CC2 of a welding electric source having the constant current characteristic and the arc characteristic L1 and L2.
Figure 9:
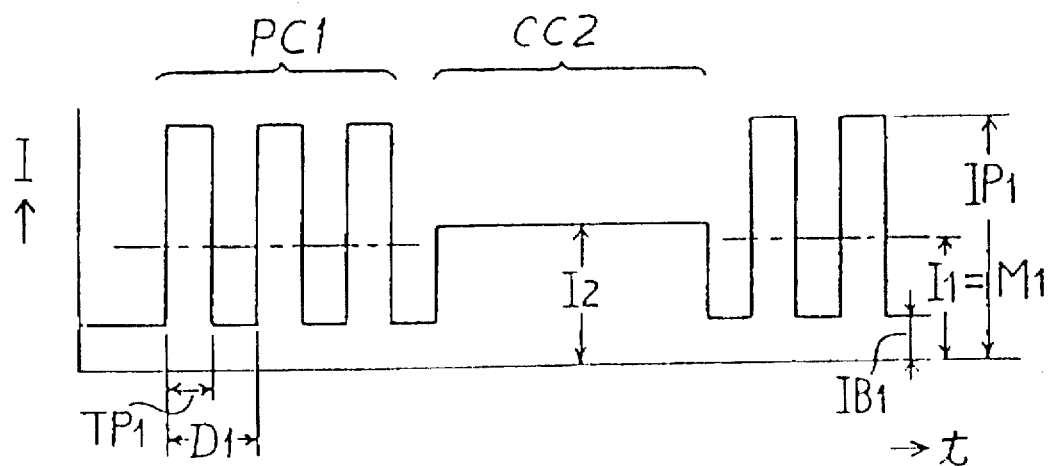
FIG. 9 is a graph showing a current obtained with the repeat of the first welding current of the pulse current PC1 and the second welding current of a constant current without the pulse CC2.
Figure 12:
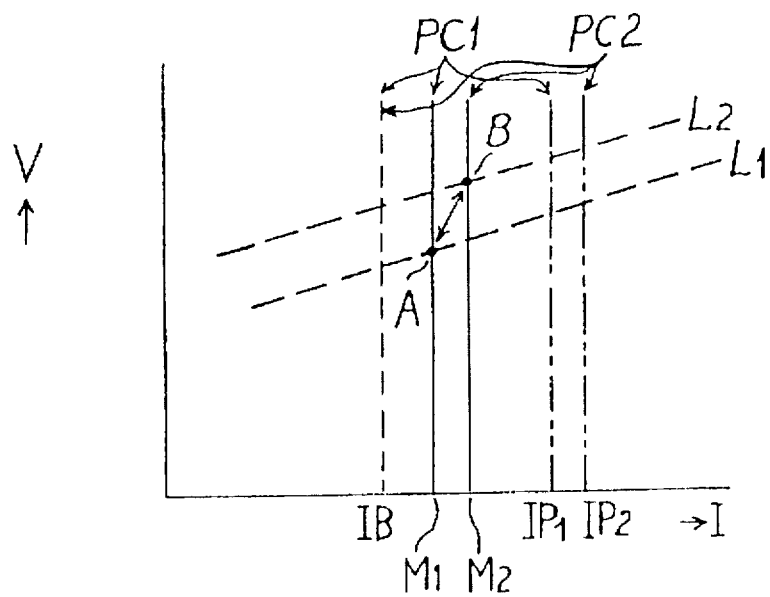
FIG. 12 is a graph showing the V-I characteristic curves of the first pulse current PC1 and the second pulse current PC2 and the arc characteristic curves L1 and L2.

A pulse MAG arc welding method is characterized by the following steps: A first welding current of the pulse currents group is set to a value to form the spray transfer accompanied with a slight short circuit with holding the wire feed rate at a nearly constant value. The second welding current value without pulse is switched periodically within the spray transfer range at which a slight short circuit does not generate. As shown in FIG. 7, the wire extension length Ln or Lm between the terminal 4a of the electric supplier tip and the end terminal of wire 1a or 1b is periodically switched to each other while the arc length Left and right or Lt of a shortest distance between the terminal 4a and the surface of welding material 2 is periodically changed.

The pulse MAG arc welding method is a pulse MAG arc welding method to energize the welding current obtained with the periodic switching between the first welding current of the pulse current group and the second welding current without pulse and is characterized by the following steps: First, the wire is fed at a constant rate determined in advance. A pulse current value, pulse energizing time and a pulse frequency as well as a base current value of each of the first welding current is set to a value to permit the material in a synchronizing way with each of pulse currents accompanied slightly with a slight short circuit. The second welding current is energized within the spray transfer range at which a slight short circuit does not generate. The welding is carried out by changing periodically the arc length in accordance with the variation in the wire extension length between the terminal of the electric supplier tip and the end terminal of the wire.

Embodiment 7, Description of FIG. 20

The embodiment 7 is a case where an aluminum alloy plate A5052 in thickness of 6 mm is welded by using an aluminum alloy A5183 electrode of 1.2 mm diameter with a pulse MIG arc welding method. FIG. 20 (A) shows an appearance of the bead obtained with the welding conditions described below. The bead has a regular ripple of pattern the same as that obtained with TIG filler arc welding method as shown in FIG. 1.

A first welding current is a pulse current group having a constant characteristics and a second welding current is a direct current having a constant current characteristic. The average value of the welding current is Ia=150 A.

first arc voltage Va1=19.5 V (slight short circuit transfer mode, arc length Lt Feibush mm)

second arc voltage Va2=22.5 V (spray mode, arc length Left and right=8 mm)

switching frequency F=2 Hz welding speed WS=40 cm/min pulse condition for slight short circuit spray transfer mode pulse current value IP=320 A pulse energizing time TP=1.2 ms base current value IB=30 A The penetration depth obtained with the same welding condition as the above increases with a welding proceeding direction according to the prior art as shown in FIG. 20 (C). On the other hand, the penetration depth is of the repeat of a given value in a synchronizing way to the switching frequency and is a stable depth as shown in FIG. 20 (B) according to the welding method of the present invention Embodiment 8, Description of FIG. 21

FIG. 21 (A) is a graph showing a waveform to practice the welding method according to claim 8. A first welding current comprises pulse current group which has a short arc length in 2-4 mm and carries out the meso spray transfer accompanied occasionally with a slight short circuit during the spray transfer. The average value of the welding current is expressed by M1. The second welding current is a direct current to carry out the spray transfer without generation of the slight short circuit having the arc length more than 6 mm. The average value is expressed by I2. FIG. 21 (B) is a graph showing a switching signal H1 for switching between the first welding current and the second welding current.

Figure 24:
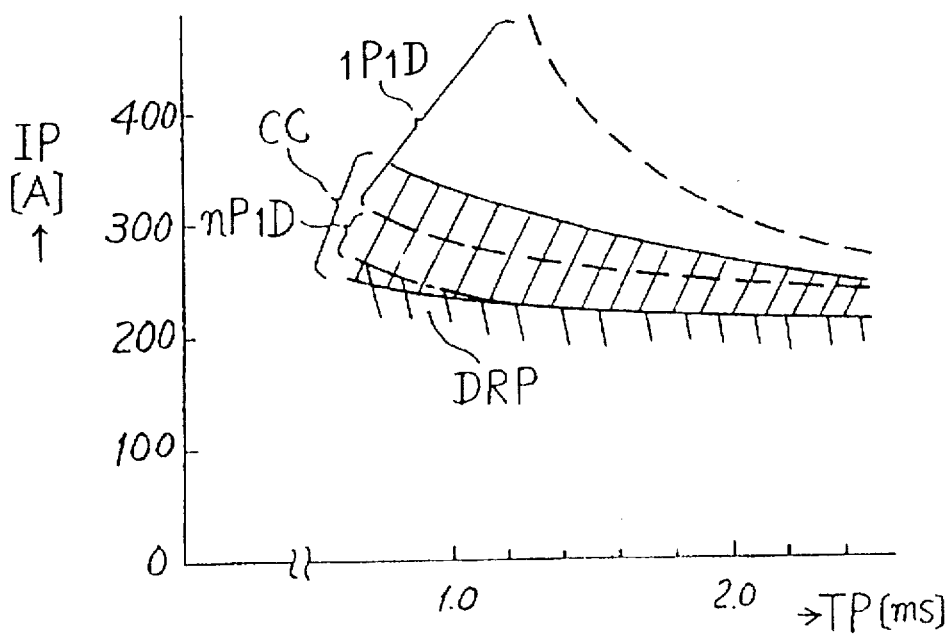
FIG. 24 is a graph showing a slight short circuit transfer range and illustrating a form of the molten metal grain transfer against the relationship between a pulse duration TP and a pulse current IP when the welding is carried out by switching periodically between the first pulse currents group and the second welding current under using aluminum wire of 1.2 mm diameter.

Description of FIGS. 22 to 24

FIGS. 22 to 24 are graphs illustrating the welding method.

FIG. 22 (A) is a structural model view showing the time passage of the phenomenon in which the molten metal grain separates from the terminal of the wire when one pulse to one molten metal grain transfer mode is achieved. FIG. 22 (B) is a graph showing the time passage of the pulse current. In FIG. 22 (B), a reference character P1 denotes each of the pulse currents; a reference character IP1, a pulse current value; a reference character TP1, pulse duration; a reference character D1, pulse frequency. The positions R1 to R5 of the time passage of each pulse current P1 are corresponding to the various steps of melting at the wire terminal 1e, formation of molten bead 1c, separation of molten bead 1c from the wire terminal 1a and transportation of the molten metal grain to the welding material 2. In such a way, the one pulse to one molten metal grain mode 1P1D is carried out with each of pulses to execute the molten metal grain transfer.

Description of FIG. 23

FIG. 23 (A) is a structural model view showing the time passage of the phenomenon in which the molten metal grain separates form the wire terminal when a plurality of pulse to one molten metal grain transfer mode is carried out. FIG. 23 (B) is a graph showing the time passage of the pulse current.

When the arc length is made shorter by decreasing the pulse current IP or pulse duration TP or both of them to a size smaller than the 1P1D range mentioned above, at the time t3 shown in FIG. 23 (A), there is generated a state just after the separation of the molten bead 1d from the wire terminal 1a. The pulse at this time synchronizes with the pulse P11 at the first position of the first pulse group. After that, the molten metal grain is not transferred with the pulse currents P12 to P14 at the second to the fourth positions. That is, in the first pulse current group, there is generated a plurality of pulses to one molten metal grain mode in which one pulse current among a plurality of pulse currents synchronizes with the one molten metal transfer. The plurality of pulses to one molten metal grain transfer range nP1D has no spatter generated therein and is practically useful in the same way as the one pulse to one molten metal grain range 1P1D.

However, when the pulse current Ip or pulse energizing time TP or both of them is made lower than the plurality of pulse to one molten metal grain transfer range nP1D, the short circuit starts to generate and the pulse current does not synchronize with the molten metal transfer. The short circuit generates the spatter. Accordingly, the short circuit transfer range DRP is excluded from the range for which the present invention is applicable because the short circuit transfer range can not produce a scale bead obtained with the TIG filler arc welding method included in the aluminum MIG arc welding method which is one of the application of the present invention.

Figure 25:
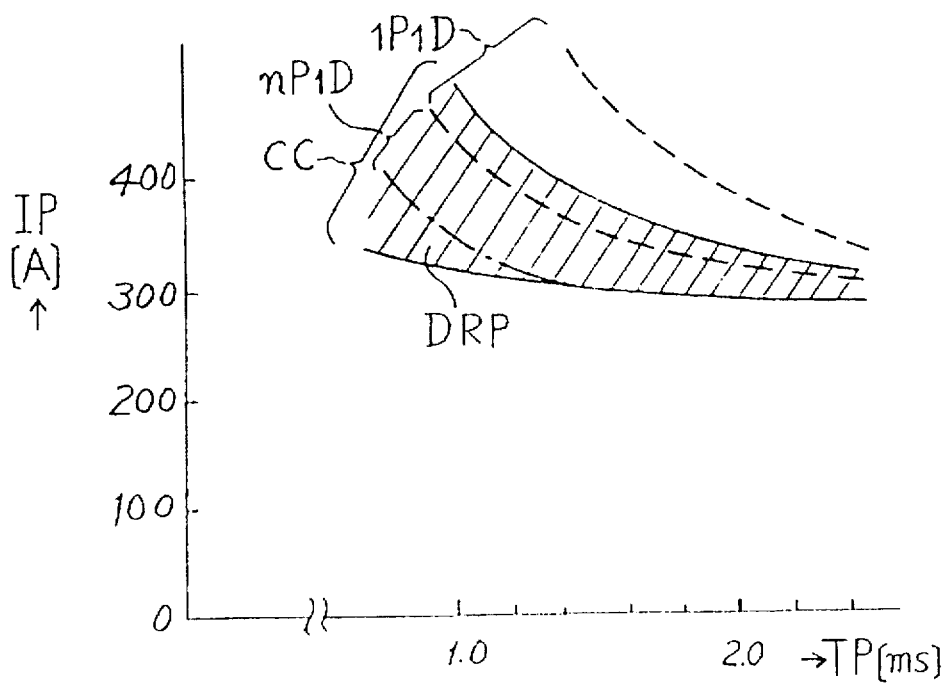
FIG. 25 is a graph showing a slight short circuit transfer range and illustrating a form of the molten metal grain transfer against the relationship between a pulse duration TP and a pulse current IP when the welding is carried out by switching periodically between the first pulse currents group and the second welding current under using aluminum wire of 1.6 mm diameter.

Description of FIGS. 24 and 25

FIG. 24 is a graph showing a molten metal grain transfer form as a function of the pulse duration TP ms (horizontal axis) and the pulse current IP A (vertical axis) when the welding method is carried out with an aluminum wire A5183 by using the pulse current in a welding current average value Ia=100 A. Reference characters DRP, nP1D and 1P1D denote the short circuit transfer range, a plurality of pulse to one molten metal grain transfer range and one pulse to one molten metal grain transfer range, respectively as mentioned with FIGS. 22 and 23. A symbol CC indicates a range which has the slight short circuit generated therein and comprises a total of the one pulse to plurality of molten metal grain transfer range, a lower part of the one pulse to plurality of molten metal grain transfer range and a upper part of the short circuit transfer range and is nearly the same as the meso spray transfer range described in FIG. 14.

FIG. 25 is a graph showing a molten metal grain transfer form as a function of the pulse duration TP ms (horizontal axis) and the pulse current IP A (vertical axis) when the welding method is carried out with an aluminum wire A5183 by using the pulse current in a welding current average value Ia=120 A. The next description will be the same as the description with FIG. 24 and accordingly, should be omitted.

Description of FIG. 26

FIG. 26 is a graph showing the relationship between then average value of the arc welding current Ia A (horizontal axis) and the maximum value of the variation value of the arc length Le mm, in connection with a welding method in a plurality of pulse to one molten metal grain transfer range having a slight short circuit shown by a solid line and a welding method in a one pulse to one molten metal grain transfer range shown by a dotted line in a case when an aluminum wire A5183 of a diameter 1.2 mm is used. With reference to FIG. 26, at the average value of the welding current Ia=60 A, the welding method 1P1D shown by a dotted line has the maximum value of the arc length variation value Le=2 mm whereas the welding method shown by a solid line CC has the maximum value of the arc length variation value Le=4 mm which is two times larger than that of the 1P1D welding method. As a result, the welding method shown by a solid line CC can expand the application field carried out by the welding method 1P1D shown by a dotted line in connection with the welding for the thin plate executed by a low current.

Figure 27:
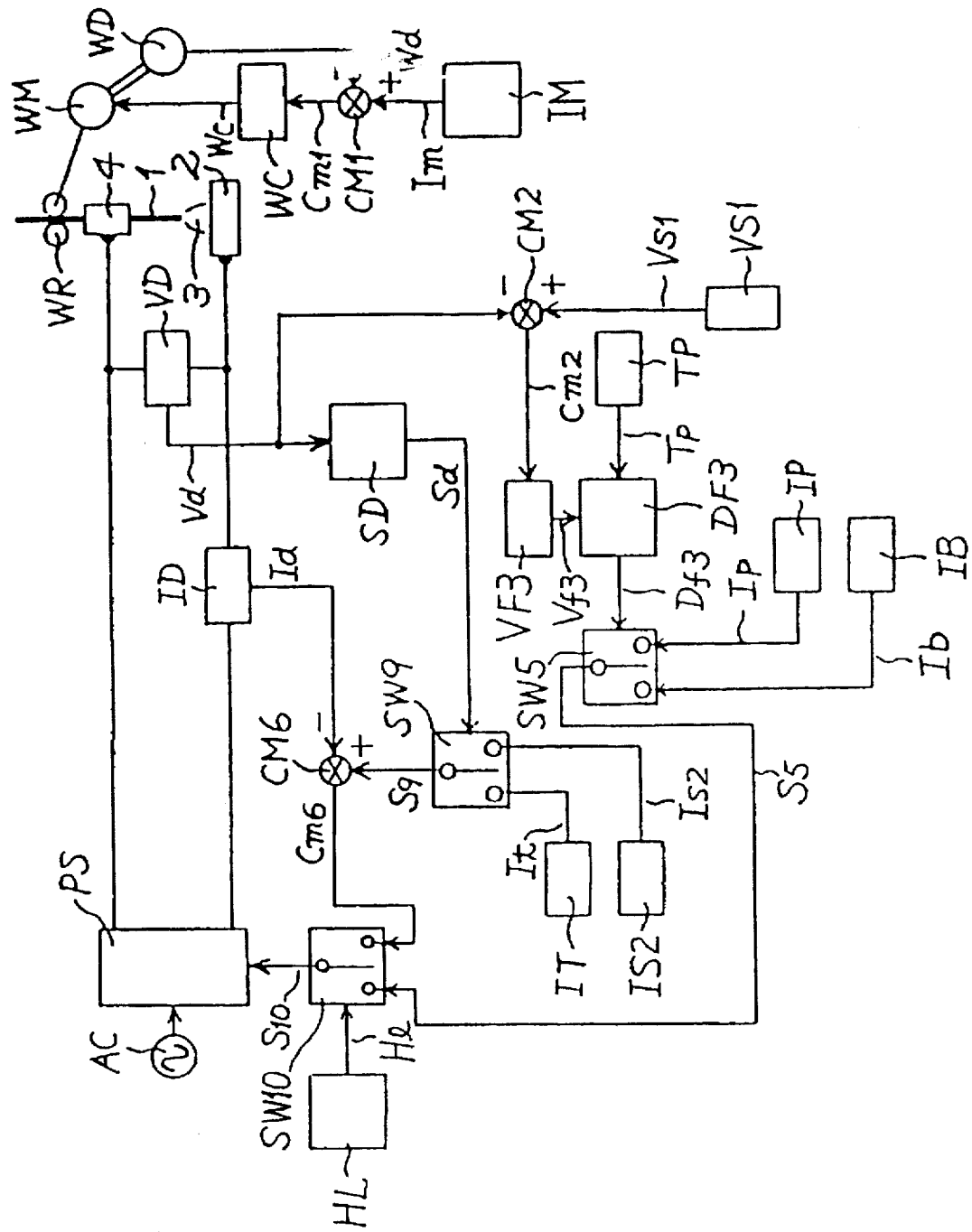
FIG. 27 is a block diagram of a welding apparatus effecting a pulse MAG arc welding method of a preferred embodiment according to the present invention.

Embodiment 9, Description of FIG. 27

FIG. 27 is a block diagram of a welding apparatus of the embodiment practicing the pulse MAG arc welding method. This block diagram has a controlling circuit for energizing the pulse current formed therein instead of the first constant current setting circuit IS1 and the constant current switching circuit SW of FIG. 19. The description the same as that of FIG. 19 therefore should be omitted. In FIG. 27, a pulse current value setting circuit IP generates a pulse current value setting signal while a base current setting circuit IB generates a base current value setting signal Ib. A pulse duration setting circuit TP generates a pulse duration setting signal Tp. A pulse frequency control signal generator circuit VF3 generates a pulse frequency control signal Vf3 in response to the arc voltage control signal Cm2. A pulse duration frequency control signal generator circuit DF3 generates a pulse duration frequency control signal Df3 comprising a pulse duration setting signal Tp and a pulse frequency control signal Vf3. A pulse base current switching circuit SW5 generates, at the first welding current, a pulse current setting signal Ip and a base current setting signal Ib as well as a switching pulse base current signal S5 repeating at a frequency f determined by the first pulse duration frequency control signal Df3. Next, the second welding current, the pulse base current switching circuit SW5 generates a constant current setting signal Is2 set by constant current setting circuit IS2. Further, a short circuit switching circuit SW9 generates a short circuit switching signal S9 by switching between a constant current setting signal Is2 and a short circuit current setting signal It, whereas a pulse constant current switching circuit 10 outputs a pulse constant current switching signal S10 to a welding output control circuit PS by switching between a welding current control signal Cm9 and a switching pulse base current signal S5.

The welding method is carried out in a way that a first welding current for obtaining the first arc length is a first pulse current group and the second welding current for obtaining the second arc length energizes the second pulse current group.

In welding methods, when the first pulse current group has a small current and a short arc length, the mode becomes a spray transfer mode having a slight short circuit generated therein as described above.

In welding methods, when the first pulse current group has a relatively large pulse current value or a relatively long arc length, the mode is in a spray transfer mode having no slight short circuit.

The following description will be directed to a suitable range of a pulse current IP and a pulse duration TP capable of energizing the first pulse current group and the second pulse current group without causing the short circuit transfer mode and a transfer form.

Figure 28:
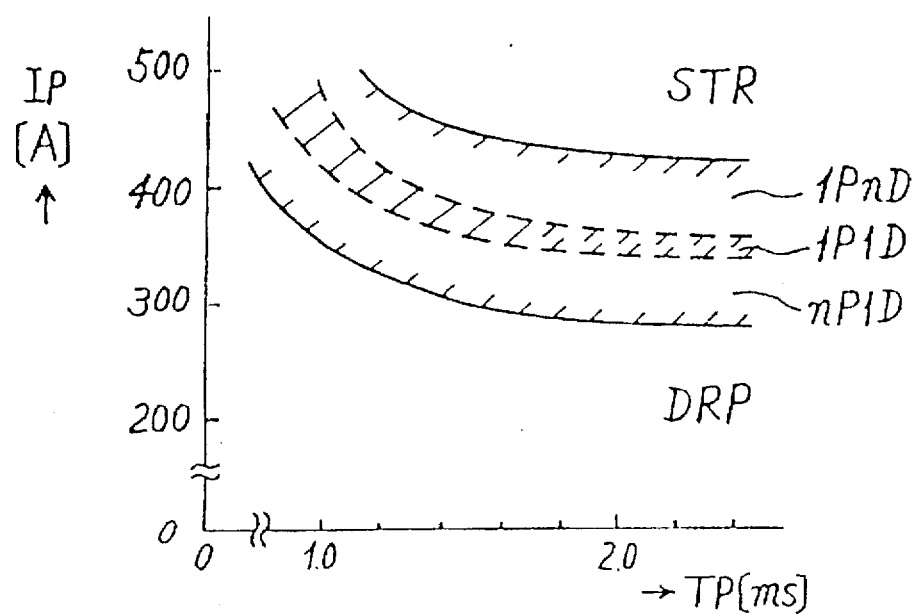
FIG. 28 is a graph illustrating a form of the molten metal grain transfer against the relationship between a pulse duration TP and a pulse current IP when the welding is carried out by switching periodically between the first pulse currents group and the second welding current under using a soft steel wire of 1.2 mm diameter.

Embodiment 10, Description of FIG. 28

FIG. 28 is a graph showing that a range permitting the one pulse to one molten metal grain transfer mode is within a range Δ1P1D shown by a oblique line in connection with a pulse duration TP ms (horizontal axis) and a pulse current IP A (vertical axis) when the pulse MAG arc welding method is carried out at a welding current average value of 100 A at an arc length of 3 mm by using a soft steel wire of 1.2 mm diameter (JIS, YGW-12) and a sealed gas of a mixture of 80% of argon gas and 20% of carbon dioxide gas.

Figure 29:
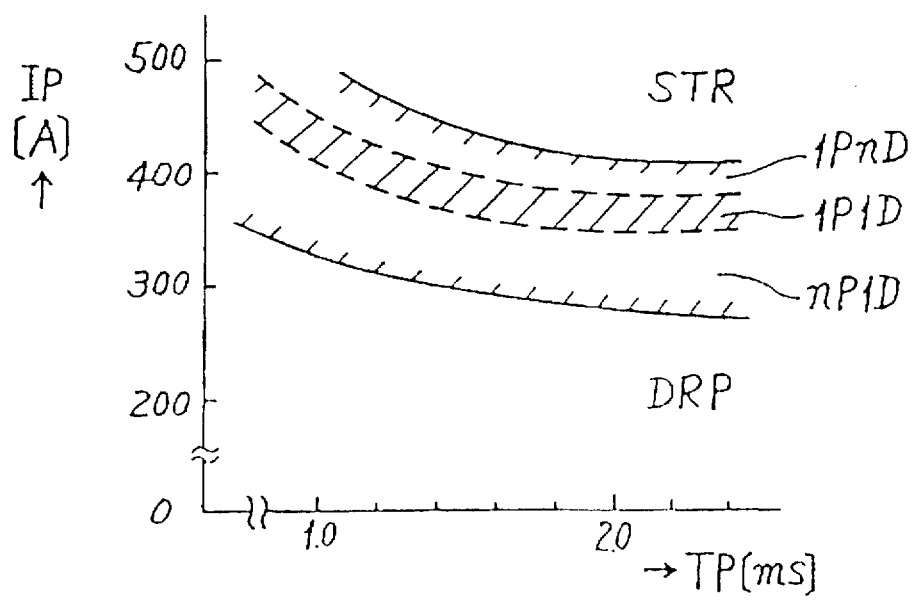
FIG. 29 is a graph illustrating a form of the molten metal grain transfer against the relationship between a pulse duration TP and a pulse current IP when the MIG welding is carried out by switching periodically between the first pulse currents group and the second welding current under using a stainless steel wire of 1.2 mm diameter.

FIG. 29 is a graph showing that a range permitting the one pulse to one molten metal grain transfer mode is within a range 1P1D shown by a oblique line in connection with a pulse duration TP ms (horizontal axis) and a pulse current IP A (vertical axis) when the pulse MAG arc welding method is carried out at a welding current average value of 100 A at an arc length of 3 mm by using a stainless steel wire of 1.2 mm diameter and a sealed gas of a mixture of 98% of argon gas and 2% of oxygen gas.

As shown in FIGS. 28 and 29, the range shown by a oblique line is narrow. It is difficult for the welding method in a one pulse to one molten metal grain transfer mode to switch periodically a suitable pulse current, pulse duration or the both of them.

The following description will be directed to a welding method capable of enlarging the applicable range which has less short transfer mode generated therein than the range capable of generating the one pulse to one molten metal grain transfer mode is possible.

Figure 30:
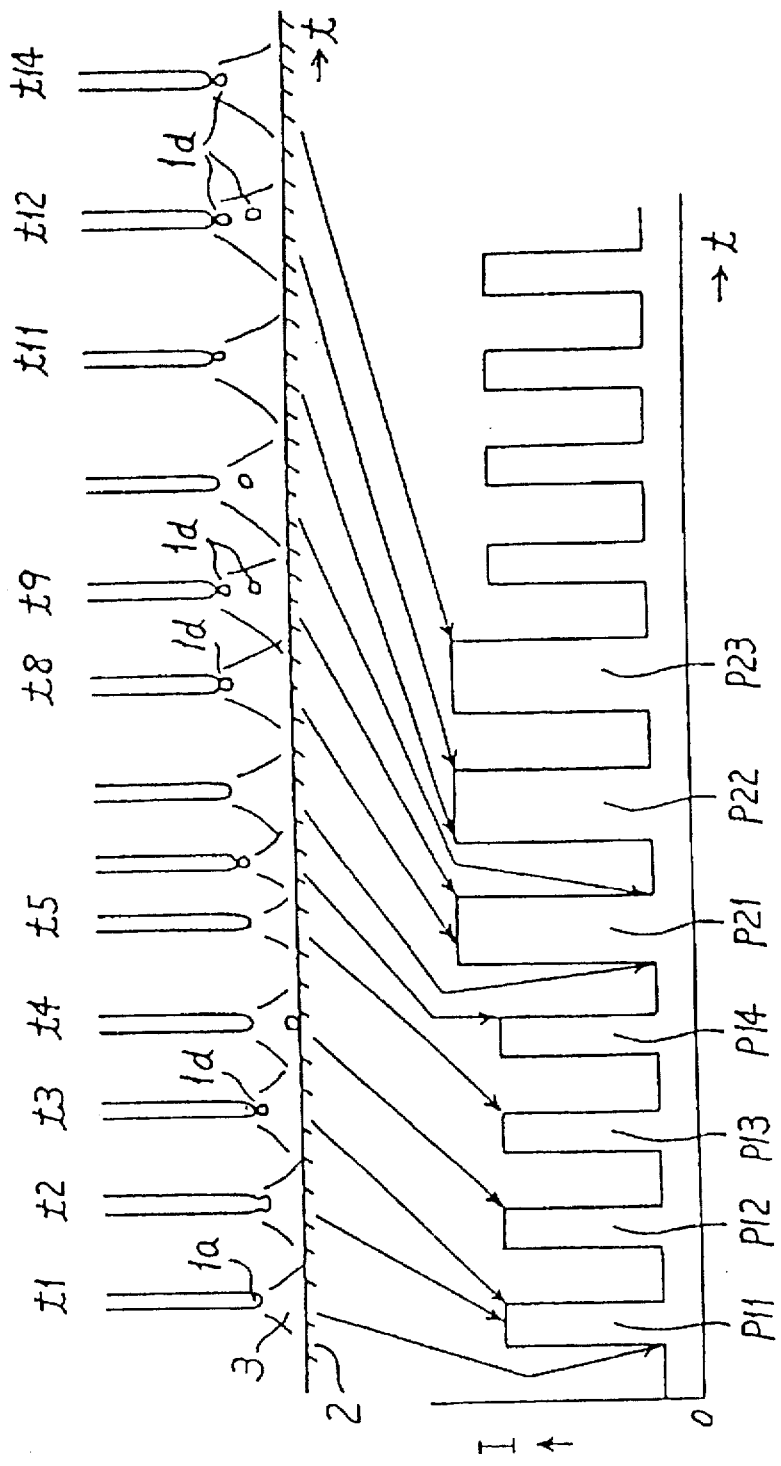
FIG. 30 (A) is a structural model view showing a time passage of phenomenon to separate the molten metal grain form the terminal of wire when the first pulse currents group carries out a plurality of pulses to one molten metal grain transfer.

Description of FIG. 30

With reference to FIGS. 28 and 29, the arc length is made shorter by decreasing the pulse current value IP, the pulse duration TP or the both of them to a size smaller than the 1P1D one pulse to one molten metal grain transfer range shown by a oblique line. Thus, at the time t3 shown in FIG. 30 (A), there is generated a state just after the separation of the molten bead 1d from the wire terminal 1a. The pulse at this time synchronizes with the pulse P11 at the first position of the first pulse group. After that, the molten metal grain is not transferred with the pulse currents P12 to P14 at the second to the fourth positions. That is, in the first pulse current group, there is generated a plurality of pulses to one molten metal grain mode in which one pulse current among a plurality of pulse currents synchronizes with the one molten metal transfer. The plurality of pulses to one molten metal grain transfer range nP1D has no spatter generated therein and is practically useful in the same way as the one pulse to one molten metal grain range 1P1D.

However, when the pulse current Ip or pulse energizing time TP or both of them is made lower than the plurality of pulse to one molten metal grain transfer range Δ nP1D, the short circuit starts to generate, and the pulse current does not synchronize with the molten metal transfer. The short circuit at the short circuit transfer range DRP shown in FIGS. 28 and 29 generates the spatter. Accordingly, the short circuit transfer range DRP is excluded from the range for which the present invention is applicable because the short circuit transfer range can not produce a scale bead obtained with the TIG filler arc welding method included in the aluminum MIG arc welding method which is one of the application of the present invention.

With reference to FIG. 28, the arc length is made longer by increasing the pulse current value IP or the pulse duration TP to a size larger than the 1P1D one pulse to one molten metal grain transfer range shown by a oblique line. Thus, at the time t8 and t9 shown in FIG. 30 (A), there is generated a state which causes, two times, the separation of the molten bead 1d from the wire terminal 1a. The pulse at this time synchronizes with the pulse P21 at the first position of the first pulse group. After that, there occurs a case at which the molten metal grain 1d separates two times with the pulse current P22 at the second position. That is, during a pulse period between a pulse current and the next pulse current, a plurality of molten metal grains are transferred. At least one of the molten transfer is a one pulse to plurality of molten metal grains transfer range Δ1PnD which is synchronizing with the pulse current.

When the pulse current value and the pulse duration are made larger than those in this range, the molten metal extends into a string so that the molten metal transfer mode is changed to a so called streaming transfer mode STR which is in no relation with the energizing of the pulse current, that is, which does not synchronize with the pulse current. Within this range STR, the arc length can not follow the variation in the wire extension length or wire feed rate, and produces a short circuit to generate spatter.

It is noted that a so called project transfer range is a range at which the molten metal transfer synchronizes with the energizing of the pulses comprising those of three ranges of the one pulse to a plurality of molten metal grains range Δ1PnD, the one pulse to one molten metal grain range 1P1D, and a plurality of pulses to one molten metal grain nP1D. Therefore, in the welding method the first pulse current group is set to a short range corresponding to the short arc length at the plurality of pulses to one molten metal grain transfer range nP1D whereas the second pulse current group is set to the long range corresponding to a long arc length at the one pulse to a plurality of molten metal grains Δ1PnD. The welding method can be said to be a method to switch between the both of the first and second pulse current groups. Further, the welding method is aimed to be applicable for the ranges of a plurality of pulse to one molten metal grain transfer range nP1D and the one pulse to a plurality of molten metal grains Δ1PnD which are positioned outside of the one pulse to one molten metal grain transfer range 1P1D. As a result, the pulse current value and the pulse duration can be extended to a enlarged range. This makes it possible to enlarge the variation value of the arc length Le to extend the application field in various uses.

Embodiment 11, Description of FIG. 29

FIG.29 is a graph showing a molten metal transfer in connection with the pulse duration TP ms (horizontal axis) and the pulse current value Ip A (vertical axis) when the pulse MIG arc welding method is carried out by using a stainless steel. Reference characters STR, Δ1PnD, 1P1D, nP1D and DPR are expressed in a similar way to that of FIG. 28 and accordingly, their description will be omitted.

In a pulse MAG arc welding method carried out by energizing the pulse welding current obtained by switching between the first pulse current group and the second pulse current group, a first welding method manages the wire to be fed at constant feed rate determined in advance and the pulse current value, the pulse period, the pulse duration (pulse energizing time) of each pulse of the first current group and a base current value to be set to a value by which the molten metal transfer from the consumable electrode to the welding material synchronizes with one of a plurality of pulse currents to form the plurality of pulses to one molten metal transfer mode. The pulse current value, the pulse duration and the pulse frequency of the second pulse group and the base current are energized by a pulse welding current set to a value different from that of the first current group within a range to form the one pulse to one molten metal transfer model. Then, the wire extension length between the terminal of the electric supplying tip and the terminal of the wire is changed, while the arc length between the terminal of the wire and the surface of the welding material is switched periodically. When the arc length varies due to the unbalance between the wire feed rate and the wire melting speed, the arc length is recovered by changing the pulse period, the pulse duration, the base current or the pulse current so that the pulse MAG arc welding is carried out only by the spray transfer mode.

A second welding method is a method carried out by the one pulse to plurality of molten metal grains transfer mode in place of the one pulse to one molten metal grain transfer mode of the second pulse current group described with the first welding method mentioned above.

A welding method is to carry out the welding within the range at which the slight short circuit generates as mentioned with FIGS. 24 and 25 when the pulse current ratio of the first pulse current group is relatively small or the arc length is short. The welding method may additionally carry out the welding within the one pulse to one molten metal grain transfer range excluding the range at which the slight short circuit generates.

Figure 31:
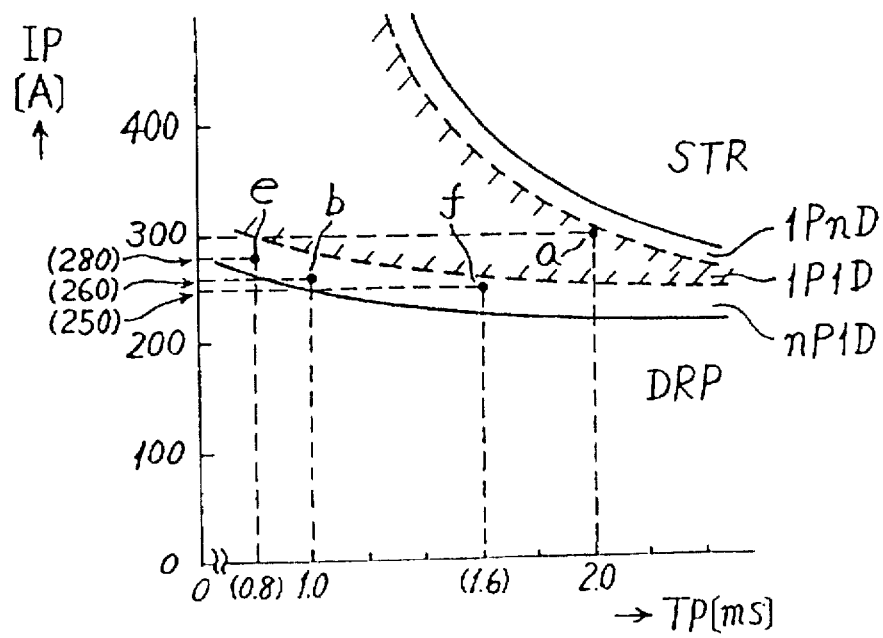
FIG. 31 is a graph illustrating the relationship between a pulse duration TP and a pulse current IP when the MIG welding is carried out by switching periodically between a plurality of pulses to one pulse molten metal grain transfer range of the first pulse currents group and one pulse to one molten metal grain transfer range of the second pulse currents group under using an aluminum wire of 1.2 mm diameter.

Embodiment 12, Description of FIG. 31

FIG. 31 is a graph showing the molten metal transfer mode in connection with a pulse duration TP ms (horizontal axis) and the pulse current value IP A (vertical axis) when the welding is carried out at the welding current average value of Ia=100 A by switching periodically between the first pulse current group and the second current group with an aluminum wire A5183 of 1.2 mm diameter. In FIG. 31, the relationship among the pulse current, the pulse duration and the molten metal transfer mode is obtained by photographing the molten metal transfer state at a high speed and by waveform analysis. In FIG. 31, reference characters STR, Δ1PnD, 1P1D, nP1D and DRP denote the streaming transfer range, one pulse to plurality of molten metal grains transfer range, one pulse to one molten metal grain transfer range, a plurality of pulses to one molten metal grain transfer range and the short circuit transfer range in a similar way to those of FIG. 28.

The welding method is carried out by a setting condition of the first pulse current group as shown in the following: The arc length is short and in 2 mm. The pulse current value and the pulse duration at the plurality of pulse to one molten metal transfer range nP1D can be expressed by points b, e, and f in FIG. 31, that is, 260 A–1.0 ms, 280 A–0.8 ms, and 250 A–1.6 ms. Next, the second pulse current setting condition is that the arc length is long and the pulse current value and the pulse duration shown by a point a in the one pulse to one molten metal grain transfer range is 300 A–2.0 ms. The welding method is carried out by switching between the first pulse current group and the second pulse current group. When the arc length Lt or Left and right MM is changed by changing the wire feed rate against the setting condition of the first pulse current group, that is, points b, e, and f, the number of the short circuit Nst times/sec increases rapidly with a decrease in the arc length below 2 mm. Therefore, the arc length lower than 2 mm is not suitable for the application of the present invention. Accordingly, in the welding method according to the present invention, it is necessary to make the arc length longer than 2 mm at the first pulse current group setting condition.

Figure 32:
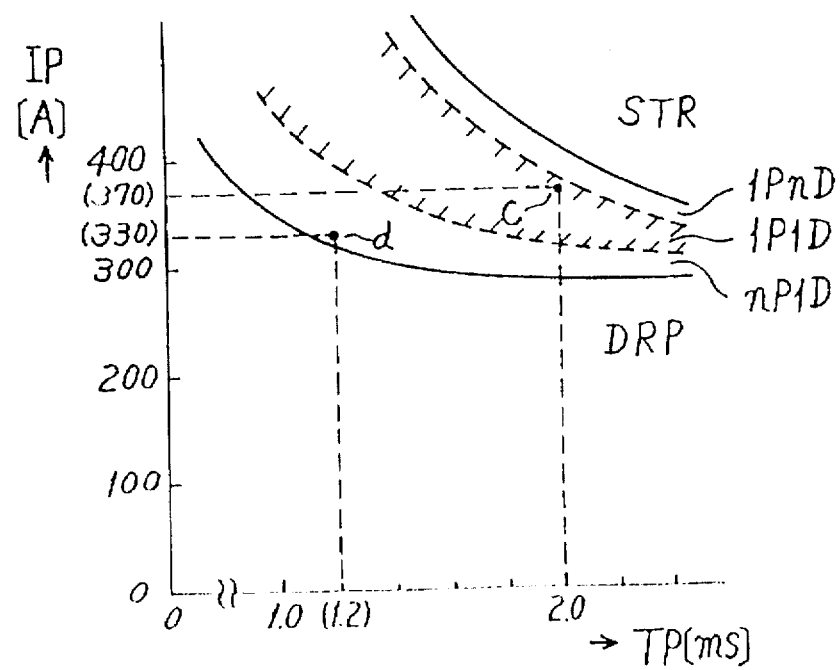
FIG. 32 is a graph illustrating the relationship between a pulse duration TP and a pulse current IP when the MIG welding is carried out by switching periodically between a plurality of pulses to one pulse molten metal grain transfer range of the first pulse currents group and one pulse to one molten metal grain transfer range of the second pulse currents group under using an aluminum wire of 1.6 mm diameter.

Embodiment 13, description of FIG. 32

FIG. 32 is a graph showing the molten metal transfer mode in connection with a pulse duration TP ms (horizontal axis) and the pulse current value IP A (vertical axis) when the welding is carried out at the welding current average value of Ia=120 A by switching periodically between the first pulse current group and the second current group with an aluminum wire A5183 of 1.6 mm diameter. In FIG. 32, reference characters STR, Δ1PnD, 1P1D, nP1D and DRP denote the streaming transfer range, one pulse to plurality of molten metal grains transfer range, one pulse to one molten metal grain transfer range, a plurality of pulses to one molten metal grain transfer range and the short circuit transfer range in a similar way to those of FIG. 28.

The welding method is carried out by a setting condition of the first pulse current group as shown in the following: The arc length is short and in 3 mm. The pulse current value and the pulse duration at the plurality of pulse to one molten metal transfer range nP1D can be expressed by a point d in FIG. 32, that is, 330 A-1.2 ms. Next, the second pulse current setting condition is that the arc length is long and the pulse current value and the pulse duration shown by c point in the one pulse to one molten metal grain transfer range 1P1D are 370 A and 2.0 ms, respectively. When the welding method is carried out by switching the first pulse current group and the second pulse current, it is necessary to make the arc length longer than 2 mm at the first pulse current group setting condition in a similar way to that of FIG. 31.

Figure 33:
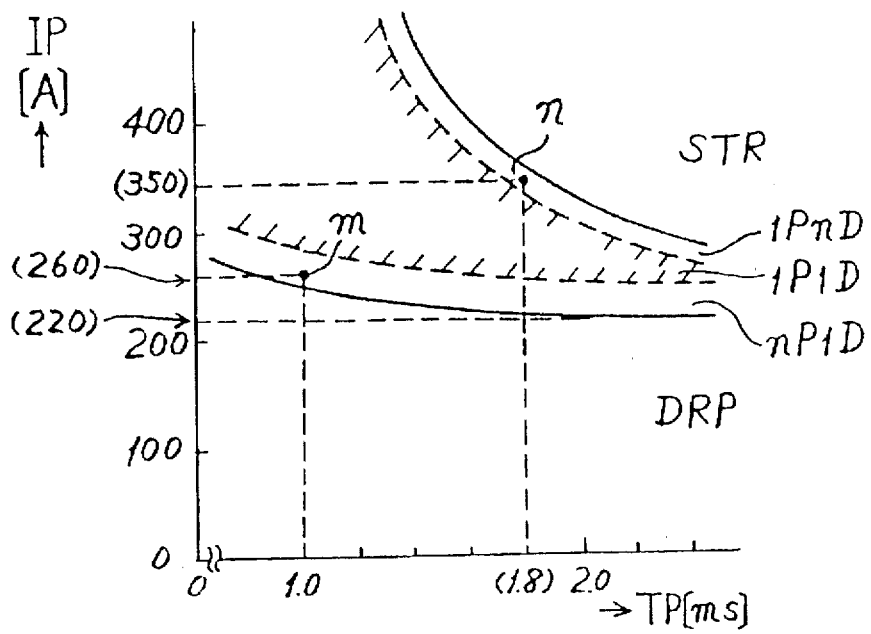
FIG. 33 is a graph illustrating the relationship between a pulse duration TP and a pulse current IP when the MIG welding is carried out by switching periodically between a plurality of pulses to one pulse molten metal grain transfer range of the first pulse currents group and one pulse to a plurality of molten metal grains transfer range of the second pulse currents group under using an aluminum wire of 1.2 mm diameter.

Embodiment 14, Description of FIG. 33

FIG. 33 is a graph showing the molten metal grain transfer mode in the same way as that of FIG. 31. In the welding method the first pulse current group setting condition is that the arc length is short and 2 mm and the pulse current value and the pulse duration in the plurality of pulses to one molten metal grain transfer range can be expressed by a point m in FIG. 33, that is, 260 A–1.0 ms. Next, the second pulse current group setting condition is that the arc length is long, and the pulse current value and the pulse duration can be expressed by a point n in the one pulse to plurality of molten metal grains transfer range 1PnD, that is, 350 A–1.8 ms. When the arc length is lower than 2 mm especially 1.5 mm, the number of the short circuit rapidly increases. As a result, the range of the arc length lower than 2 mm is not suitable for the welding method according to the present invention. It is necessary to make the arc length longer than 2 mm at the first pulse current group setting condition in a similar way to that of FIG. 31.

Figure 34:
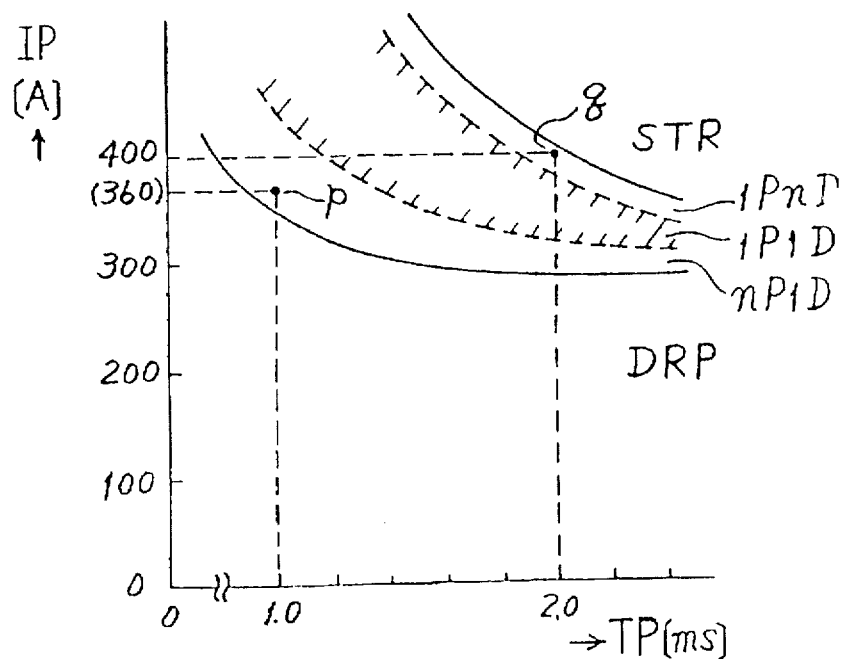
FIG. 34 is a graph illustrating the relationship between a pulse duration TP and the maximum value of the arc length variation Le in connection with a welding method for switching periodically between a plurality of pulses to one pulse molten metal grain transfer range of the first pulse currents group and one pulse to a plurality of molten metal grains transfer range of the second pulse currents group under using an aluminum wire of 1.6 mm diameter.

Embodiment 15, Description of FIG. 34

FIG. 34 is a graph showing the molten metal grain transfer mode in the same way as that of FIG. 32. In the welding method the first pulse current group setting condition is that the arc length is short and 3 mm, and the pulse current value and the pulse duration in the plurality of pulses to one molten metal grain transfer range nP1D can be expressed by a point p in FIG. 34, that is, 360 A–1.0 ms. Next, the second pulse current group setting condition is that the arc length is long, and the pulse current value and the pulse duration can be expressed by a point q in the one pulse to plurality of molten metal grains transfer range 1PnD, that is, 400 A–2.0 ms. When the welding method is carried out by switching the first current group and the second current group, it is necessary to make the arc length longer than 2 mm at the first pulse current group setting condition in a similar way to that of FIG. 33.

Figure 35:
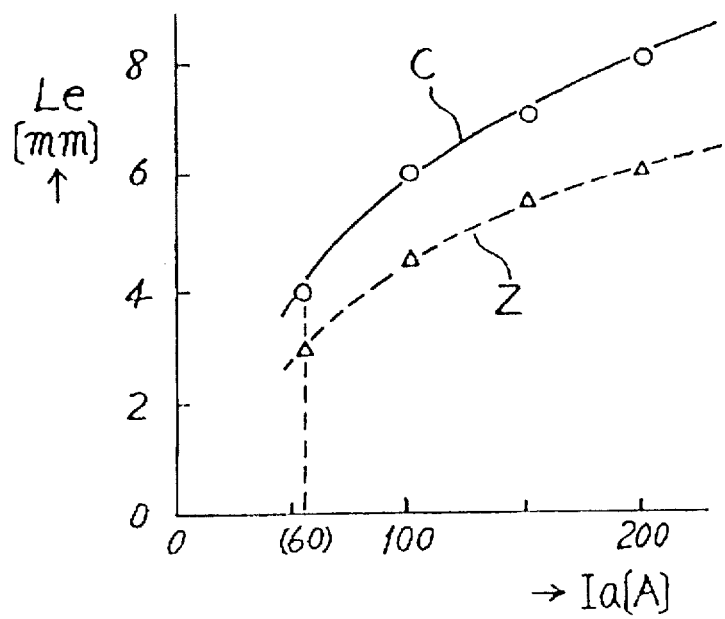
FIG. 35 is a graph showing the relationship between the average value of the welding current Ia and the maximum value of the arc length variation Le in connection with a welding method (a solid line C) for switching between a plurality of pulses to one molten metal grain transfer range and one pulse to a plurality of molten metal grains transfer range and a welding method (a dotted line Z) based on the one pulse to one molten metal grain transfer range, wherein each of methods uses an aluminum wire of 1.2 mm diameter.

Description of FIG. 35

FIG. 35 is a graph showing the relationship between the average value of the arc welding current Ia A (horizontal axis) and the maximum value of the variation value of the arc length Le mm, in connection with a welding method within a switching range (referred to a project range) between a plurality of pulse to one molten metal grain transfer range nP1D shown by a solid line C and a one pulse to one molten metal grain transfer range 1P1D and a welding method in a one pulse to one molten metal grain transfer range (1P1D) shown by a dotted line Z in a case when an aluminum wire A5183 of a diameter 1.2 mm is used. With reference to FIG. 35, at the average value of the welding current Ia=60 A, the welding method 1P1D shown by a dotted line has the maximum value of the arc length variation value Le Feibush mm whereas the welding method within a project range has the maximum value of the arc length variation value Le=4 mm. Further, at the average value of the pulse current Ia=200 A, the maximum value of the arc length according to the welding method of 1P1D is Le=6 mm whereas the maximum value of arc length according to the project range is Le=8 mm which is two times larger than that of the welding method at 1P1D range. As a result, the welding method within the project range can expand the application field to be carried out by the welding method 1P1D in connection with the welding for the thin plate executed by a low current.

Figure 36:
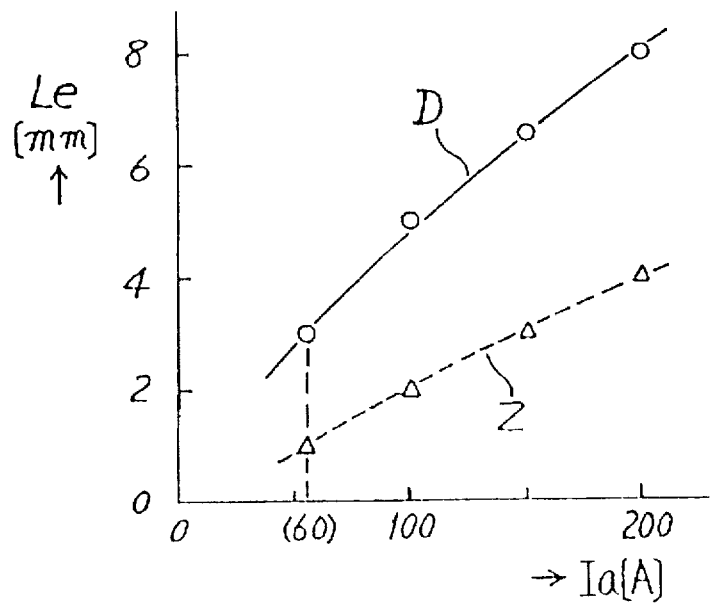
FIG. 36 is a graph showing the relationship between the average value of the welding current Ia and the maximum value of the arc length variation Le in connection with a welding method (a solid line C) for switching between a plurality of pulses to one molten metal grain transfer range and one pulse to a plurality of molten metal grains transfer range and a welding method (a dotted line Z) based on the one pulse to one molten metal grain transfer range, wherein each of methods uses a stainless steel wire of 1.2 mm diameter

Description of FIG. 36

FIG. 36 is a graph showing the relationship between the average value of the arc welding current Ia A (horizontal axis) and the maximum value of the variation value of the arc length Le mm, in connection with a welding method within a project range shown by a solid line D and a welding method of 1P1D range shown by a dotted line in a case when a stainless steel wire SUS308 of a diameter 1.2 mm is used. With reference to FIG. 35, at the average value of the welding current Ia=60 A, the welding method 1P1D has maximum value of the arc length variation value Le=1.0 mm whereas the welding method within a project range has the maximum value of the arc length variation value Le Feibush mm. Further, at the average value of the pulse current Ia=200 A, the maximum value of the arc length according to the welding method of 1P1D is Le=4 mm whereas the maximum value of arc length according to the project range is Le=8 mm which is two times larger than that of the welding method at 1P1D range. As a result, the welding method within the project range can expand the application field to be carried out by the welding method 1P1D in connection with the welding for the thin plate executed by a low current.

In a pulse MAG arc welding method carried out by energizing the pulse welding current obtained by switching between the first pulse current group and the second pulse current group, a first welding method manages the wire to be fed at constant feed rate determined in advance, and the pulse current value, the pulse period, the pulse duration (pulse energizing time) of each pulse of the first current group and a base current value to be set to a value by which the molten metal transfer from the consumable electrode to the welding material synchronizes with one of a plurality of pulse currents to form the plurality of pulses to one molten metal transfer mode. The pulse current value, the pulse duration and the pulse frequency of the second pulse current group and the base current are energized by a pulse welding current set to a value different from that of the first current group within a range to form the one pulse to one molten metal transfer model. Then, the wire extension length between the terminal of the electric supplying tip and the terminal of the wire is changed, while the arc length between the terminal of the wire and the surface of the welding material is switched periodically. When the arc length varies due to the unbalance between the wire feed rate and the wire melting speed, the arc length is recovered by changing the pulse period, the pulse duration, the base current or the pulse current so that the pulse MAG arc welding is carried out only by the spray transfer mode.

A second welding method is a method carried out by the one pulse to plurality of molten metal grains transfer mode in place of the one pulse to one molten metal grain transfer mode of the second pulse current group described with the first welding method mentioned above.

A welding method is to carry out the welding within the range at which the slight short circuit generates as mentioned with FIGS. 24 and 25 when the pulse current value of the first pulse current group is relatively small or the arc length is short. A welding method is to carry out the welding within the one pulse to one molten metal grain transfer range excluding the range shown in FIGS. 24 and 25 at which the slight short circuit generates.

Figure 37:
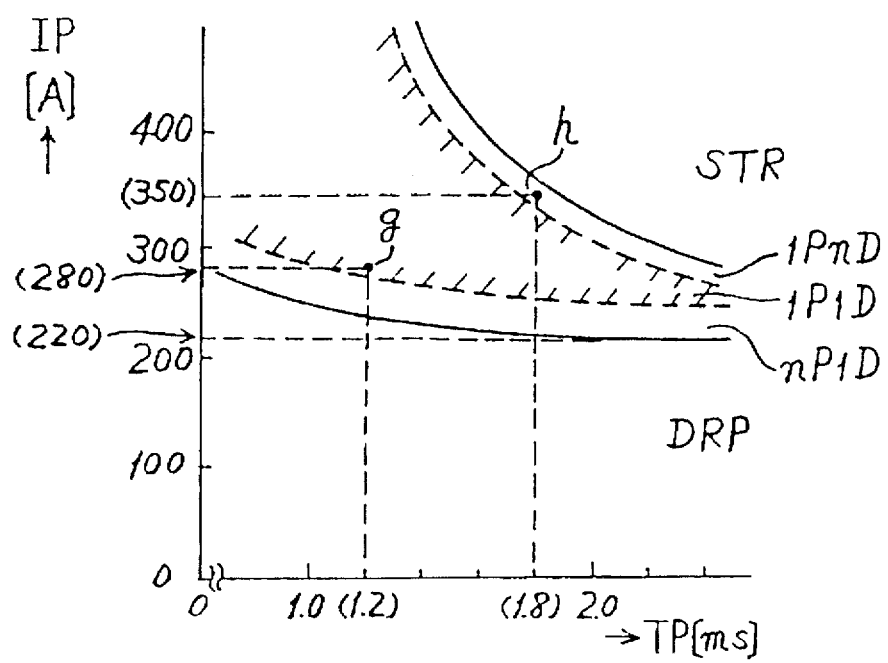
FIG. 37 is a graph illustrating the relationship between a pulse duration TP and a pulse current IP when the MIG welding is carried out by switching periodically between a plurality of pulses to one pulse molten metal grain transfer range of the first pulse currents group and one pulse to a plurality of molten metal grains transfer range of the second pluse currents group under using an aluminum wire of 1.2 mm diameter.
Figure 39:
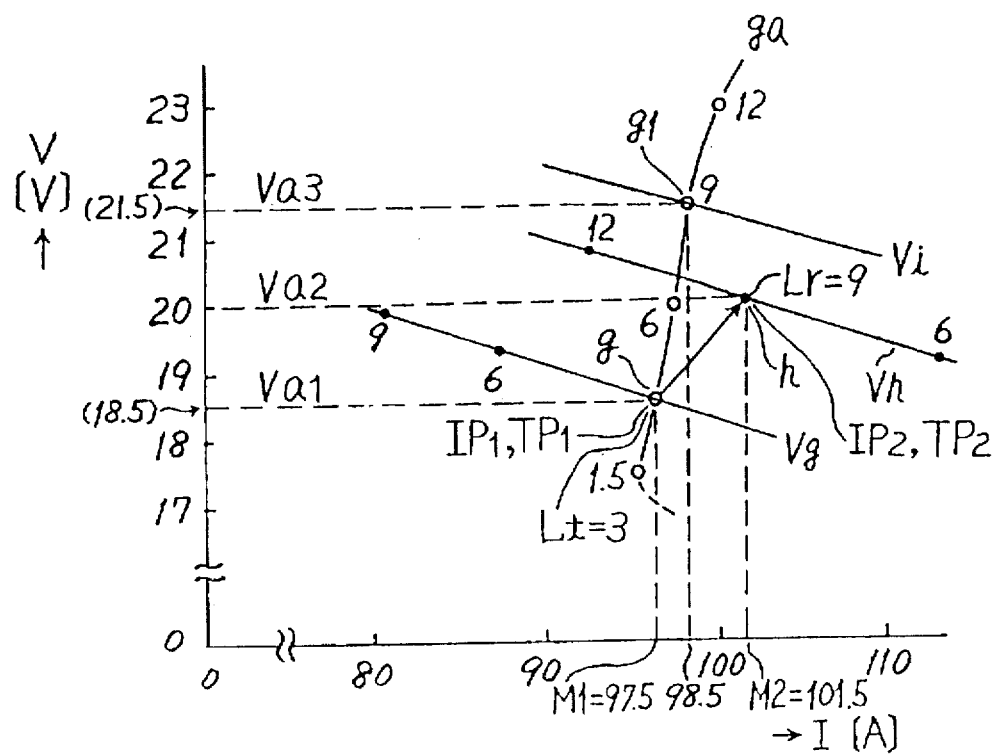
FIG. 39 is a graph showing the experimental result on the relationship between a welding current I and an arc voltage V when the welding is carried out by managing the pulse condition to change the arc length Lt into Left and right at a constant wire feed rate.

Embodiment 16, Description of FIGS. 37 and 39

FIG. 37 is a graph showing the molten metal grain transfer mode in the same way as that of FIG. 31. In welding method the first pulse current group setting condition is that the arc length is short and 3 mm, and the pulse current value and the pulse duration in the one pulse to one molten metal grain transfer range 1P1D can be expressed by a point g in FIG. 37, that is, 280 A–1.2 ms. Next, the second pulse current group setting condition is that the arc length is long, and the pulse current value and the pulse duration can be expressed by a point h in the one pulse to plurality of molten metal grains transfer range 1PnD, that is, 350 A–1.8 ms.

When the welding method is carried out by switching between the first current group and the second current group, the first and second pulse current groups are changed in the setting condition into points g and h, respectively so as to change the arc length to Lt and Left and right with the constant wire feed rate WF=500 cm/min. A graph shown in FIG. 39 indicates the relationship between the average values of welding currents during the first and the second pulses energizing times M1 and M2 A (horizontal axis) and the arc voltages Va1 and Va2 V (vertical axis) corresponding to the average values of welding currents, respectively.

With reference to FIG. 39, at an operation point g of the first pulse current IP1=280 A and the first pulse duration TP1=1.2 ms, the following conditions are held; the arc length Lt Feibush mm, the first arc voltage value Va1=18.5 V, and the average value of the welding current during the first pulse energizing time M1=97.5 A. At the operation point h of the second pulse current value IP2=350 A and the second pulse duration TP2=1.8 ms, the following conditions are held; the arc length Left and right=9 mm, the second arc voltage value Va2=20.0 V and the average value of the welding current during the second pulse energizing time M2=101.5 A.

When the first arc voltage setting circuit VS1 of the welding apparatus manages the first arc voltage setting value Vs1 to cause the arc length of 9 mm, the pulse frequency or the base current value increases and moves to an operation point g1 on the curve ga. At this point, the arc voltage value is Va3=21.5 V, and the welding current value is 98.5 A. It is interesting to compare the point g1 with a point h against the point g. Without changing the pulse current and pulse duration, but with changing the pulse frequency or the base current value, a variation from the point g to a point g1 requires the variation value 3 V in the arc voltage. On the other hand, a variation from the point g to the point h with changing the pulse current value and the pulse duration requires the variation rate in the welding current average value (101.5−97.5)/97.5×100=4.1% whereas the variation in the arc voltage value is only Va2-Va1=1.5 V. That is, when the arc length is changed from 3 mm to 9 mm, a variation from the point g to the point g1 requires the variation of 3 V in the arc voltage. However, a variation from the point g to the point h requires a slight increase (4%) in the welding current average value but a variation in the arc voltage of 1.5 V which is half of the voltage required for the former case. This means that the variation in the arc length from the point g to the point h results not only in the variation in the arc voltage but also in the increase in the wire melting speed. Accordingly, at the point g, the increase in the wire melting speed permits the plurality of pulse to one molten metal grain mode to be completed and hence, it is possible to hold the stable arc free from the short circuit. In FIG. 39, the straight lines Vg, Vh and Vi indicates the arc voltage obtained with the variation in the pulse frequency of the welding electric source or the variation in the base current under keeping the pulse current value and pulse duration the same as those of the operation points g, h and g1. Numerals 1, 5, 3, 6, 9 and 12 on the curves and the lines of FIG. 39 how the arc lengths mm at the operation points of output current values and the arc voltage values.

Figure 38:
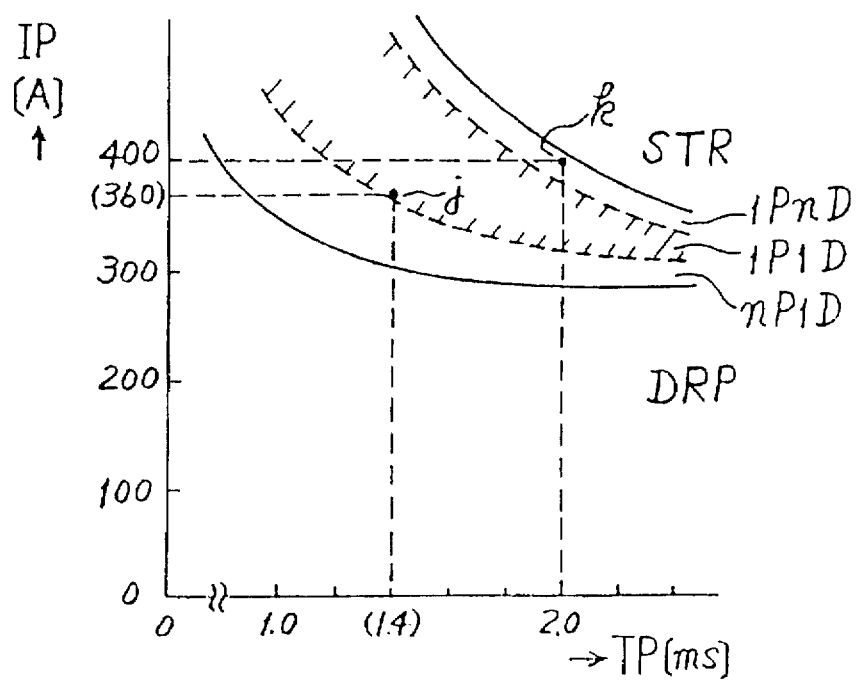
FIG. 38 is a graph illustrating the relationship between a pulse duration TP and a pulse current IP when the MIG welding is carried out by switching periodically between a plurality of pulses to one pulse molten metal grain transfer range of the first pulse currents group and one pulse to a plurality of molten metal grains transfer range of the second pulse currents group under using an aluminum wire of 1.6 mm diameter.

Embodiment 17, description of FIG. 38

FIG. 38 is a graph showing the molten metal grain transfer mode in a similar way to FIG. 32. The welding method is carried out by a setting condition of the first pulse current group as shown in the following: The arc length is short and in 3 mm. The pulse current value and the pulse duration at the plurality of pulse to one molten metal transfer range nP1D can be expressed by a point j in FIG. 38, that is, 330 A−1.2 ms with the pulse current value-the pulse duration. Next, the second pulse current setting condition is that the arc length is long and the pulse current value and the pulse duration shown by a point k in the one pulse to a plurality of molten metal grains transfer range 1PnD is 400 A−2.0 ms. The welding method is carried out by switching between the first pulse current group and the second pulse current group.

Figure 40:
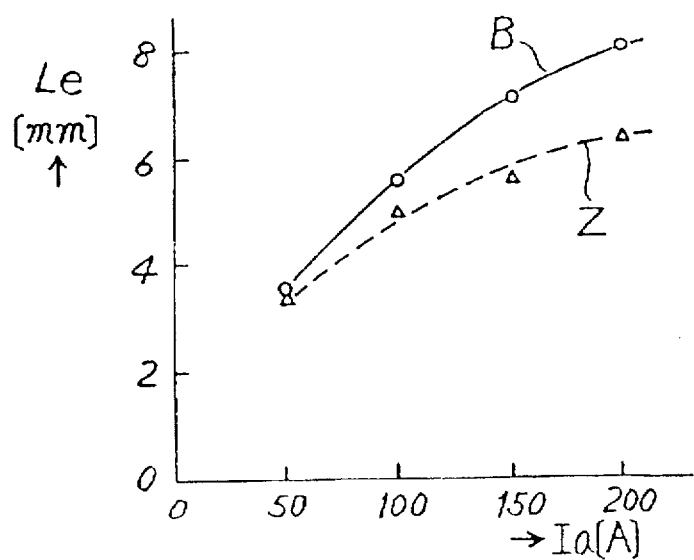
FIG. 40 is a graph showing the relationship between the average value of the welding current Ia and the maximum value of the arc length variation Le in connection with a welding method (a solid line B) for switching between one pulse to one molten metal grain transfer range and one pulse to a plurality of molten metal grains transfer range and a welding method (a dotted line Z) based on the one pulse to one molten metal grain transfer range.

Description of FIG. 40

FIG. 40 is a graph showing the relationship between the average value of the arc welding current Ia A (horizontal axis) and the maximum value of the variation value of the arc length Le mm, in connection with a welding method within a switching range (referred to a nP1D−1P1D range) between a plurality of pulse to one molten metal grain transfer range nP1D shown by a solid line C and a one pulse to one molten metal grain transfer range 1P1D and a welding method in a one pulse to one molten metal grain transfer range (1P1D) shown by a dotted line Z in a case when an aluminum wire A5183 of a diameter 1.2 mm is used. With reference to FIG. 35, at the average value of the welding current Ia=200 A, the welding method 1P1D shown by a dotted line has the maximum value of the arc length variation value Le=6 mm whereas the welding method within a project range has the maximum value of the arc length variation value Le=8 mm. As a result, the welding method within the nP1D−1P1D range can expand the application field to be carried out by the welding method 1P1D.

A welding method is to change the first arc length Lt and the second arc length Left and right by switching the welding current value periodically.

The average value Ia of welding current in the pulse current can be expressed by the following equation with reference to FIG. 11:

$$Ia=\{IP \times TP+IB(D-TP)\}/D$$

where IP=pulse current, TP=pulse duration, IB=base current and D=pulse period (D=1/f; f is a pulse frequency).

Therefore, the average value Ia of welding current can be switched by switching one of the IP, TP, IB and f with the switching frequency F.

Against the external disturbance due to the variation in the wire feed rate and the variation in the distance between the surface of the welding material and the electric supplying tip, it is necessary to keep the first arc length Lt and the second arc length Left and right at a value within the range predetermined and to prevent the short circuit or too much enlargement of the arc length. In order to satisfy this requirement, it is necessary to change the average value of the welding current with the arc voltage control signal Cm2 obtained from the difference between the arc voltage setting signal Vs1 and the arc voltage detection signal Vd.

The average value of welding current Ia can be controlled by the above f, TP, IB or IP. The change in the pulse frequency f3, pulse duration TP3, base current IB or pulse current IP3 can control the wire melting speed to maintain the first and second arc lengths.

The welding method can be carried out by the following four kinds of methods.

1. A case when the pulse frequency f3 is controlled with the arc voltage control signal Cm3.

The first welding current I1 and the second welding current I2 are switched by one, two or three combination of pulse current IP, pulse duration Tp and base current IB.

2. A case when the pulse duration TP3 is controlled by the arc voltage control signal Cm2.

The first welding current I1 and the second welding current I2 are switched by one, two or three combination of pulse current IP, pulse frequency f and base current IB.

3. A case when the base current value IB3 is controlled by the arc voltage control signal Cm2.

The first welding current I1 and the second welding current I2 are switched by one, two or three combination of pulse current IP, pulse duration TP and pulse frequency f.

4. A case when the pulse current value IP3 is controlled by the arc voltage control signal Cm2.

The first welding current I1 and the second welding current I2 are switched by one, two or three combination of pulse duration TP, pulse frequency f and base current value IB.

A difference between a second welding method described hereinbelow and the welding method described immediately above is as follows: In the welding method described immediately above, the arc voltage setting signal Vs1 is used in common to the first arc length and the second arc length. On the other hand, in the second welding method, the first arc length Lt is set by the first arc voltage setting signal Vs1 and the second arc length Left and right is set by the second arc voltage setting signal Vs2.

In the welding method described immediately above, in order to switching between the first arc length Lt and the second arc length Left and right, it is necessary to switch at least one setting value selected from the group of pulse frequency f, pulse duration TP, base current value and pulse current value IP. On the other hand, in the second welding method, the first arc voltage setting signal Vs1 and the second arc voltage setting signal Va2 are switched to each other. Hence, the first welding current value is controlled by the first arc voltage control signal Cm2 obtained with the difference between the first arc voltage setting signal Vs1 and the arc voltage detection signal Vd, whereas the second welding current value I2 is controlled by the second arc voltage control signal Cm2 obtained with the difference between the second arc voltage setting signal Vs2 and the arc voltage detection signal Vd.

As a result, the first arc voltage control signal Cm2 controls the pulse frequency f31, pulse duration TP31, base current IB31 or pulse current value IP31, while the second arc voltage control signal Cm2 controls the pulse frequency f32, pulse duration TP32, base current IB32 or pulse current value IP32.

Accordingly, in the second welding method it is necessary to switch between the first arc voltage setting signal Vs1 and the second arc voltage setting signal Vs2. However, with the welding method described immediately above, it is not always necessary to switch the setting signal for the pulse current value IP, pulse duration TP, pulse frequency f or base current value IB.

For the purpose of expanding the application field of the second welding method the switching method similar to that of the method described immediately above can be used for switching one, two or three setting signals for the pulse current value IP, pulse duration TP, pulse frequency f and base current value IB.

In another welding method, the first arc voltage value Va1 and the second arc voltage value Va2 are 0.3 or 4 V and are narrow in the adjustment range. The variation value of the arc length Le is largely affected by the variation value of the arc voltage $\Delta Va$. Accordingly, the first arc voltage setting value Vs1 and the second arc voltage setting value Vs2 must be monotonously adjusted.

The welding method thus described is to memorize the second arc voltage setting value Vs2 corresponding to the first voltage setting Vs1 and then to read out the second arc voltage setting value Vs2 corresponding to the first arc voltage setting Vs1 determined in advance in order to energize the first pulse current group and second pulse current group.

In another welding method, the suitable setting values of the first arc voltage value Va1 and the second arc voltage value Va2 are determined in connection with the wire feed rate.

The welding method thus described is to memorize in advance the first arc voltage setting value Vs1 corresponding to the wire feed rate Wf and to memorize the second arc voltage setting value Vs2 corresponding to the first arc voltage setting value Vs1. Then, the welding method is to read out the first arc voltage setting value Vs1 corresponding to the predetermined wire feed rate setting value Wf and the second arc voltage Vs2 corresponding to the first arc voltage setting value Vs1 and then to energize the first and the second pulse current groups.

Figure 41:
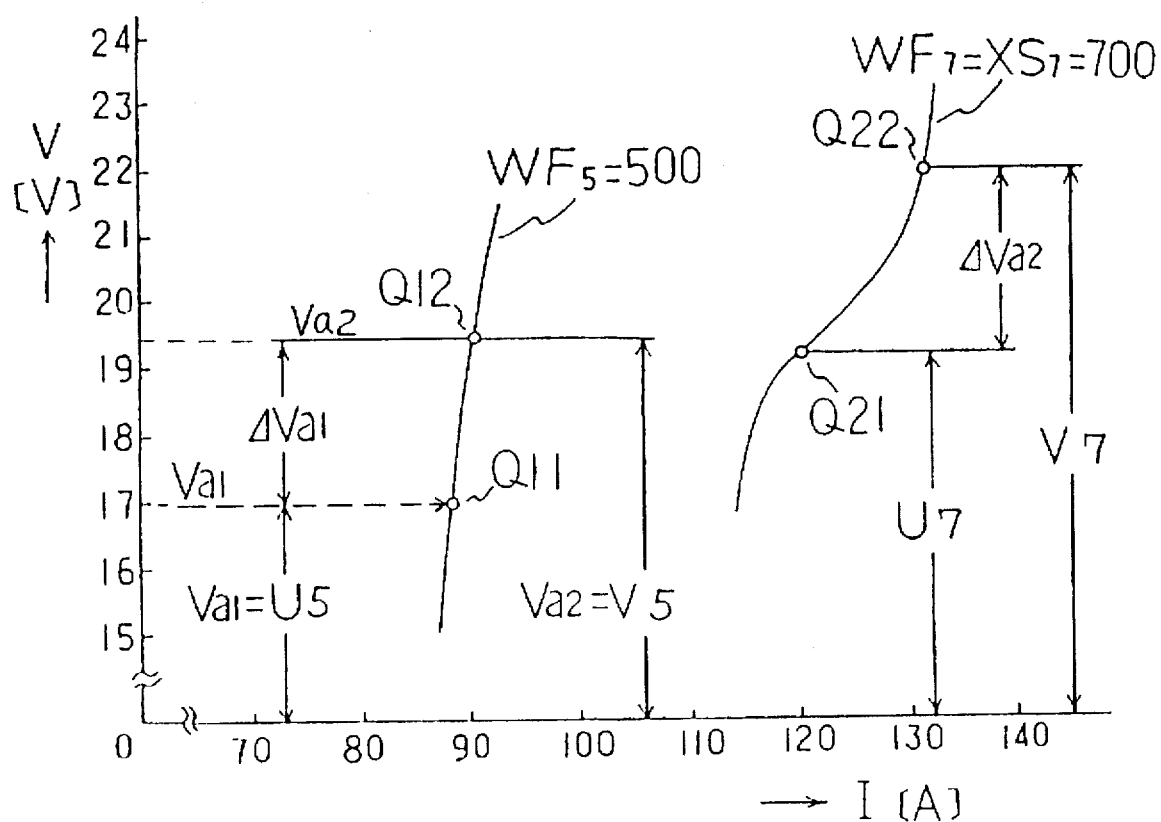
FIG. 41 is a graph showing the relationship between a welding current and an arc voltage when a MAG arc welding is carried out at a predetermined wire feed rate and illustrating a welding method of a preferred embodiment according to the present invention.

Description of FIGS. 41 and 42

FIG. 41 is a graph showing the relationship between the welding current value I A (horizontal axis) and the arc voltage V (vertical axis) when the pulse MAG arc welding method is carried out with an aluminum alloy 5052 plate of 5 mm thickness at a wire feed rate WF5=500 cm/min and WF7=700 cm/min by using an aluminum alloy 5183 of 1.2 mm diameter.

FIG. 42 is a data table in which the first arc voltage setting values Un=U1, U2 ... are predetermined in connection with the wire feed rates Wn=W1, W2 ... when the wires are fed at predetermined wire feed rates and another data table in which the second arc voltage setting values Vn=V1, V2 .. . are predetermined in connection with the first arc voltage setting values Un=U1, U2 ...

First, with reference to FIGS. 41 and 42, the standard data formation will be described with the curve WF5=500 which is directed to a wire feed rate of 500 cm/min in connection with the formation of the table of data to be memorized among the data included. In order to determine the operation point on this curve, it is necessary to determine the arc length corresponding to the arc voltage. When it is determined that the first arc voltage value is Va1=17 V, the operation point is a point Q11. The program determines the arc voltage setting value Un=U1, U2 ... Un for obtaining the first arc voltage value Va1 corresponding to the wire feed rate in respect to the wire feed rates Wn=W1, W2 ... Wn as shown in the upper table of FIG. 42 and memorizes these data. Next, when it is determined that the variation value $\Delta Va$ of the arc voltage is, for example, 2.5 V, the second arc voltage value is determined as follows;

$$Va2=Va1+\Delta Va=17+2.5=19.5V$$

and then the operation point is Q12. The program further determines second arc voltage setting values Vn=V1, V2 ... . Vn for obtaining the second arc voltage Va2=V1 in response to the first arc voltage setting values Un=U1, U2 . . . Un memorized in advance as shown in the lower table in FIG. 42 and memorizes these data. The relationship among the setting values of Wn, Un, and Vn are predetermined in the following way; for example, W5 is a wire feed rate of 500 cm/min; U5 is an arc voltage of 17 V (operation point Q11); V5 is an arc voltage of 19.5 V (operation point Q12). In a similar way to the above, the following are predetermined; W7 is a wire feed rate of 700 cm/min; U7 is an arc voltage of 19.3 V (operation point Q21); V7 is an arc voltage of 19.3+2.5=21.8 V (operation point Q22).

The following description will be directed to a method that the program reads out the memorized data as shown in FIG. 42 and controls the first and the second voltages Va1 and Va2. When Wn=W5 is selected from the wire feed rates Wn=W1, W2 ... Wn in FIG. 42, the wire feed rate is 500 cm/min. The program reads out the first arc voltage setting value U5 from the first arc voltage setting values Un=U1, U2, ... Un in a corresponding way to the setting value W5 and controls the first arc voltage shown by an operation point Q11 to be 17 V. Further, the program reads out the second arc voltage setting value V5 corresponding to the setting value U5 and controls the second arc voltage shown by an operation point Q12 to be 19.5 V. When Wn=W7 is selected, the wire feed rate is 700 cm/min. The program reads out the first arc voltage setting value U7 in a corresponding way to the setting value W7 and controls the first arc voltage shown by an operation point Q21 to be 19.3 V. Further, the program reads out the second arc voltage setting value V7 corresponding to the setting value U7 and controls the second arc voltage shown by an operation point Q22 to be 21.8 V.

The basic welding method according to the present invention is to switch the welding electric source between the first welding current value and the second welding current value with the wire feed rate at a constant value as described above and to change the welding current ratio between I2 and I1 within the narrow range of 1.03 to 1.10.

The additional welding method according to the present invention is to increase the wire melting amount to improve the reinforcement in addition to the basic welding method according to the present invention. Accordingly, the additional welding method is to switch the wire feed rate between the first wire fed rate and the second wire feed rate at the switching frequency F=0.5 to 5 Hz and to change the ratio of the second welding current value I2 to the first current value I1 within the narrow range of 1.05 to 1.20.

The switching of the wire feed rate according to the prior art has been practically carried out at only 3 Hz due to the mechanical inertia because the variation value in the wire feed rate has been large. The additional welding method according to the present invention can be practically carried out at the switching frequency of 5 Hz because the variation in the wire feed rate is low. It is noted that when the ratio of the second current value I2 to the first current value I1 is high, the effect according to the basic welding method of the present invention is decreased. Therefore, it is necessary to hold the ratio in a range between 1.05 and 1.20.

A welding method of another embodiment is to switch between the first wire feed rate setting signal Im1 and the second wire feed rate setting signal Im2 and between the first arc voltage setting signal Vs1 and the second arc voltage setting signal Vs2 at the switching frequency F. Then, the first pulse current group is energized by controlling the pulse frequency f31, pulse duration TP31, base current value IB31 or pulse current value IP31 with the arc control signal Cm2 obtained with the difference between the first arc voltage setting signal Vs1 and the arc voltage detection signal Vd. Further, the second pulse current group is energized by controlling the pulse frequency f32, pulse duration TP 32, base current value IB321 or pulse current value IP32 with the arc control signal Cm2 obtained with the difference between the second arc voltage setting signal Vs2 and the arc voltage detection signal Vd.

The welding method of another embodiment is a method which memorizes the second arc voltage setting values Vs2 corresponding to the first arc voltage setting values Vs1 at the wire feed rates Im2 and energizes the first pulse current group and the second current group by reading out the second arc voltage setting values Vs2 corresponding to the first arc voltage setting values Vs1 determined in advance.

The welding method of another embodiment is a method which memorizes the first arc voltage setting values Vs1 corresponding to the first wire feed rate setting values Im1, memorizes the second arc voltage setting values Vs1 corresponding to the first arc voltage setting values Va1 at the second wire feed rates Im2 and energizes the first pulse current group and the second current group by reading out the first arc voltage setting values Vs1 corresponding to the first wire feed rates Im1 determined in advance, and the second arc voltage setting values Vs2 corresponding to the second wire feed rates Im2 determined in advance.

Description of FIG. 43

FIG. 43 is a data table in which the first arc voltage setting values Un=U1, U2 . . . Un are predetermined in connection with the wire feed rates Wn=W1, W2 . . . Wn when the MAG arc welding method is carried out by feeding wires at a rate obtained by switching periodically between the first and the second wire feed rates determined in advance and another data table in which the second arc voltage setting values Vn=V1, V2 . . . are predetermined in connection with the first arc voltage setting values Un at the second wire feed rates Xn=X1, X2 . . . Xn.

First, with reference to FIGS. 41 and 43, the standard data formation will be described with the curve WF5=500 which is directed to a wire feed rate of 500 cm/min in connection with the formation of the table of data to be memorized. In order to determine the operation point on this curve, it is necessary to determine the arc length corresponding to the arc voltage. When it is determined that the first arc voltage value is Va1=17 V, the operation point is a point Q11. The program determines the arc voltage setting value Un=U1, U2 . . . Un for obtaining the first arc voltage value Va1 corresponding to the wire feed rate in respect to the wire feed rates Wn=W1, W2 . . . Wn as shown in the upper table of FIG. 42 and memorizes these data. Next, when it is determined that the variation value ΔVa of the arc voltage is, for example, 2.5 V, the second arc voltage value is determined as follows;

$$Va2=Va1+\Delta Va=17+2.5=19.5 \ V$$

The second arc voltage value Va2 is corresponding to the operation point Q12 on the curve WF5=500 having the operation point Q12 of the first arc voltage value Va1, and is a different value when switched to the second wire feed rate in a similar way to the welding method described above. For example, when the second wire feed rate is 700 cm/min and expressed by a curve WF7=700, the operation point Q12 on the curve WF5=500 becomes an operation point Q22 on the curve VF=700. Therefore, in order to determine the operation point of the second arc voltage value at the second wire feed rate, it is necessary to obtain both of the first arc voltage value and the second wire feed rate. That is, the second arc voltage setting values Vn=V1, V2 . . . Vn must be determined from the first arc voltage setting values Un=U1, U2 . . . Un and the second wire feed rates Xn=X1, X2 . . . Xn. The program determines the second voltage setting values Vn=V1, V2 . . . Vn corresponding to the first arc voltage setting values Un=U1, U2 . . . Un in a way as follows: The second arc voltage setting values Vn=V11, V12 . . . V1n for the Xn=X1; Vn=V21, V22 . . . Vn2 for the Xn=X2; VN=Vn1, Vn2 . . . Vnn for the Xn=Xn. These data are memorized. The relationship among the setting values of Wn, Un, and Xn are predetermined in the following way; for example, W5 is a wire feed rate of 500 cm/min; U5 is an arc voltage of 17 V (operation point Q11); W7 is a wire feed rate of 700 cm/min; U7 is an arc voltage of 21.8 V (operation point Q22).

The following description will be directed to a method that the program reads out the memorized data as shown in FIG. 43 and controls the first and the second voltages Va1 and Va2. When Wn=W5 is selected from the wire feed rates Wn=W1, W2 . . . Wn in FIG. 42, the wire feed rate is 500 cm/min. The program reads out the first arc voltage setting value U5 from the first arc voltage setting values Un=U1, U2, . . . Un in a corresponding way to the setting value W5 and controls the first arc voltage shown by an operation point Q11 to be 17 V. Further, when the program reads out Xn31 X7 from the second wire feed rate setting values Xn=X1, X2 . . . Xn, the second wire feed rate is 700 cm/min. The program reads out the second voltage setting value Vn=V75 from this setting value X7 and the setting value U5 read out previously and controls the second arc voltage shown by the operation point Q22 to be 21.8 V.

Figure 44:
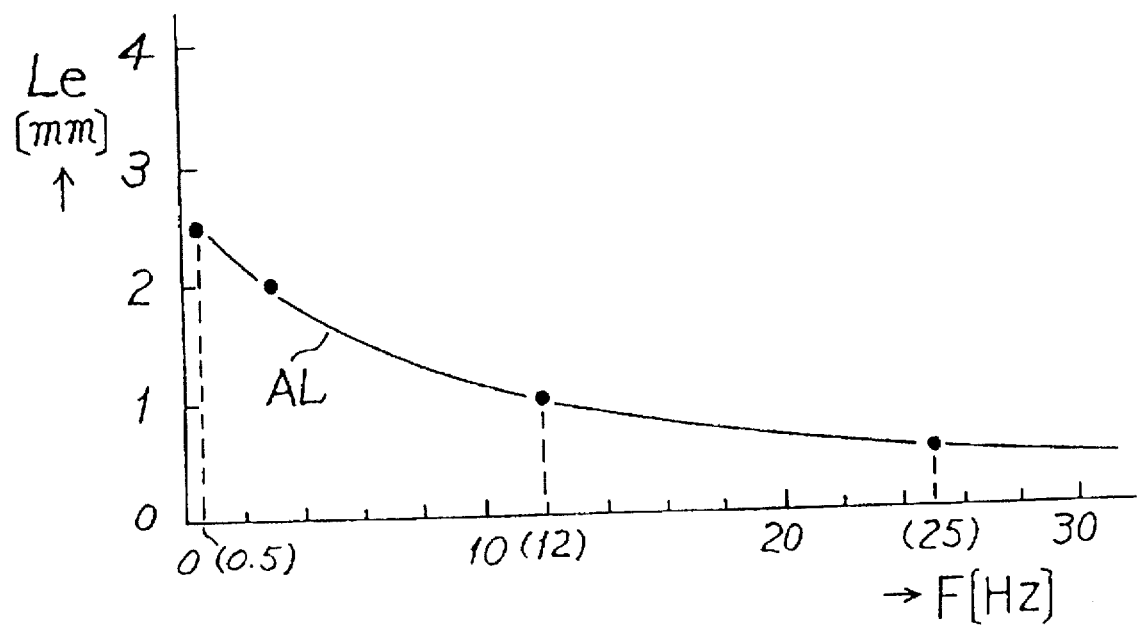
FIG. 44 is a graph showing a relationship between a switching frequency F (horizontal axis) necessary for producing the vibration at the molten pool and an arc length variation Le (vertical axis) between the first arc length Lt and the second arc length Left and right when an aluminum plate AL is welded by a MIG welding method.

Description of FIG. 44

FIG. 44 is a graph showing the relationship between the variation value Le in the arc length between the first arc length Lt and the second arc length Left and right (vertical axis) and the switching frequency F (horizontal axis) in a range between 0.5 to 25 Hz necessary for generating the vibration at the molten metal pool to obtain the effect of the present invention when the MIG welding method according to the present invention is carried out with an aluminum AL plate.

In FIG. 44, a solid line indicates the lower limit of the variation value Le in the arc length for generating the vibration at the molten metal pool in order to obtain the effect of the present invention. Positions of F=0.5 Hz, F=12 Hz and F=25 Hz require the variation values Le more than Le=2.5 mm, Le=1 mm and Le=0.5 mm, respectively. In the welding for aluminum, the molten aluminum pool has a resonance frequency Fr of 20 to 25 Hz. Therefore, when the switching frequency F is more than 15 Hz, the resonance vibration permits the molten aluminum pool to vibrate sufficiently with the variation value Le of the arc length in a small value of 0.5 mm.

Embodiment 18

The embodiment 18 is an embodiment of pulse MIG arc welding method for an aluminum plate according to the present invention.

Figure 45:
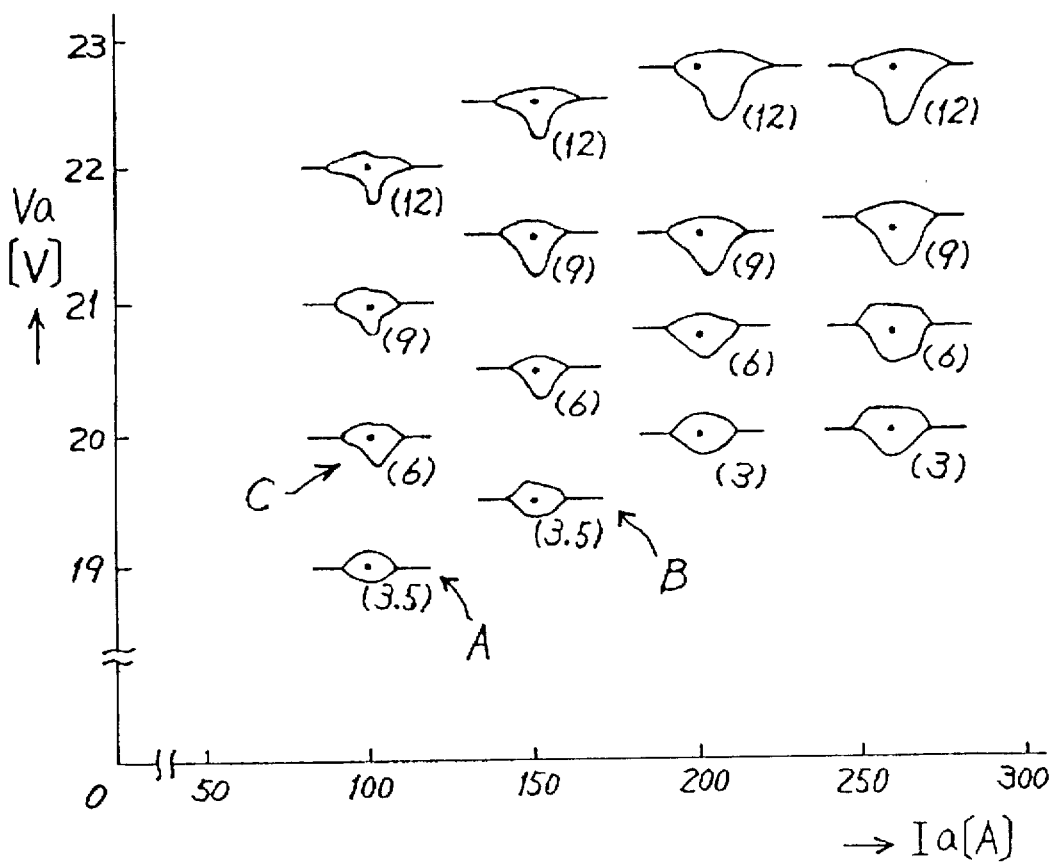
FIG. 45 is a graph showing a sectional view of bead obtained by changing the average value of welding current Ia (horizontal axis) and the average value of an arc voltage Va (vertical axis) and showing also the arc length.

Description of FIG. 45

FIG. 45 is a graph having the average value of the welding current Ia A (referred to welding current I hereinafter) plotted at the horizontal axis and the average value of the arc voltage Va V (referred to arc voltage V hereinafter) plotted at the vertical axis and showing the sectional form of the welding beads and the arc length as a function of Ia and Va. In connection with FIG. 45, the welding condition is as follows: An aluminum alloy A5052 plate in a thickness of 12 mm is welded at a welding seed of 25 cm/min by using an aluminum alloy A5183 wire in a diameter of 1.2 mm as a consumable electrode.

With reference to FIG. 45, the welding condition is changed, for example, from the first welding condition shown by a symbol A of welding current=100 A, arc voltage=19 V and arc length=3.5 mm to the second welding condition shown by a symbol B of welding current=150 A which is larger by 50% than the former and arc voltage=19.5 V. The apparent arc length at the second welding condition shows 3.5 mm which is the same as that of the first welding condition. Further, there is no significant difference in the sectional form of the welding bead between the position of a symbol A and the position of symbol B. This means that it is not possible for this method to obtain the scale bead in regular ripple pattern in a similar way to that of the TIG filler arc welding method.

On the other hand, the welding condition is changed from the first welding condition shown by a symbol A to the second welding condition shown by a symbol C at which the welding current is 100 A the same as that of the first welding condition and the arc voltage is increased to 20 V by adding 1 V. The arc length at the symbol C is increased to 6 mm with an increment of 2.5 mm. There is a significant difference in the sectional form of the welding bead between the position of the symbol A and the position of the symbol C. This means that it is possible for this welding method to obtain the scale bead in regular ripple pattern in a similar way to the TIG filler arc welding method. In such a way, it is possible to obtain the scale bead in regular ripple pattern by increasing the apparent arc length by a size more than 2.5 mm between the first welding condition and the second welding condition.

Figure 46:
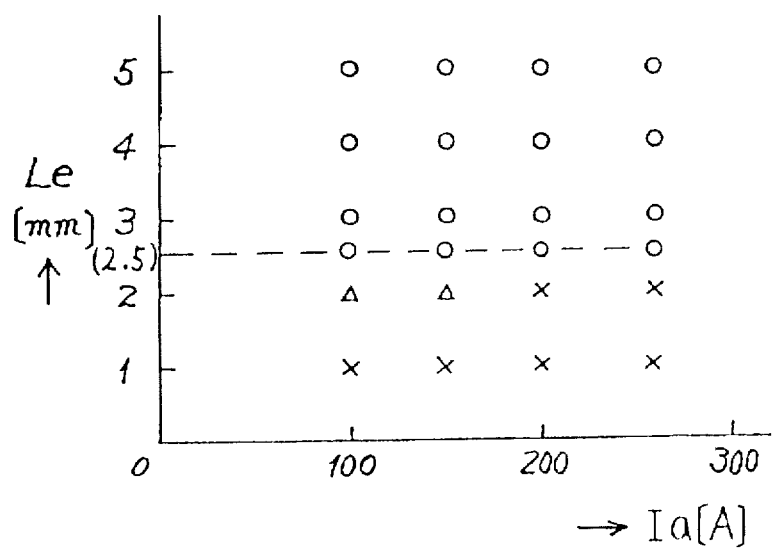
FIG. 46 is a graph showing a forming condition of the scale bead obtained with the variation in the average value of welding current Ia (a horizontal axis) and the arc length variation value Le (a vertical axis).

Description of FIG. 46

FIG. 46 is a graph showing whether the scale bead in regular ripple pattern is formed or not as a function of the relationship between the welding current I A (horizontal axis) and the arc length variation value Le mm (vertical axis). With reference to FIG. 46, a symbol×indicates a range at which the scale bead is not formed and the arc length variation value is 1 to 2 mm, a symbol Δ indicates a range at which the scale bead is not in regular ripple pattern and the arc length variation value is 2 mm and a symbol≠ indicates a range at which the scale bead in regular ripple pattern is obtained in a similar way to the TIG filler arc welding method and the arc length variation value is more than 2.5 mm.

Figure 47:
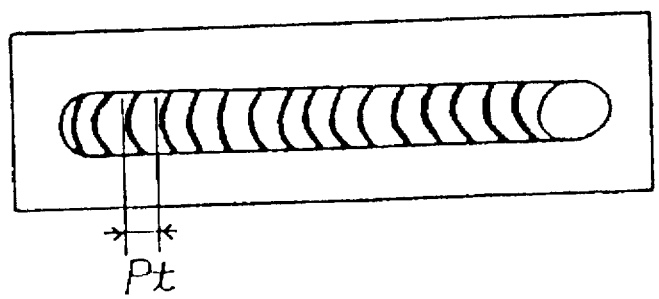
FIG. 47 is a perspective view showing a pitch and a scale bead obtained with the MIG arc welding method to change the arc length according to the present invention.

When an aluminum plate is welded with the pulse MIG arc welding method to change the arc length according to the present claim, it is possible to obtain the scale bead shown in FIG. 47. The welding condition at this time is as follows: The welding material is an aluminum alloy A5052 plate in a thickness of 12 mm. A consumable electrode is an aluminum alloy A5183 wire in a diameter of 1.2 mm. The welding is carried out by switching between the first welding condition of welding current 140 A and the arc voltage 20.0 V and the second welding condition of welding current 170 A and arc voltage 23.0 V with a switching frequency 2 Hz at a welding speed 40 cm/min. Since the MIG arc welding method executed on an aluminum material with an aluminum consumable electrode of 1.2 mm diameter has a critical current of 150 A, the pulse MIG arc welding method is adapted for the purpose of using only the spray transfer mode without the short circuit transfer mode.

According to the above description, since the welding current value of the one or both welding conditions is lower than the critical current corresponding to the diameter of the wire, the welding is carried out by the pulse MIG arc welding method for obtaining the spray transfer mode. When the both of the welding conditions have the welding current higher than the critical current, it is possible for the flat dc current to obtain the scale bead in regular ripple pattern in a similar way to the TIG filler arc welding method. The embodiment for this case is shown as follows: The welding material is an aluminum alloy A5052 plate in a thickness of 12 mm. A consumable electrode is an aluminum alloy A5183 wire in a diameter of 1.2 mm. The welding is carried out by keeping the welding current at a constant value of 180 A higher than the critical current value and switching between the arc voltages of 22 V and 24 V with a switching frequency 2 Hz at a welding speed 40 cm/min. As a result, the arc length variation value is 4 mm. It is possible to obtain the scale bead in regular ripple pattern.

Embodiment 19

The embodiment 19 is aimed at the pulse MIG arc welding method for copper. In the MIG arc welding for copper, copper has a melting point of 1085° C. which is higher than that of aluminum. In addition, copper has a thermal conductivity of 0.95 cal/cm.sec.° C. which is larger than 0.53 cal/cm.sec.° C. of aluminum and has a high thermal diffusion coefficient to permit the molten copper to solidify rapidly. Accordingly, the molten copper pool enlarged with the variation in the arc length solidifies as it is and forms the scale bead after movement of the arc. A pure copper plate in a thickness of 6 mm is preheated at 400° C. and is subjected to the MIG arc welding method with the pure copper consumable electrode of 1.2 mm diameter by switching periodically between the arc voltages 22 V and 25 V with a switching frequency 2 Hz at a welding current of 200 A and a welding speed of 35 cm/min. It is possible to obtain the scale bead the same as that shown in FIG. 47.

Figure 48:
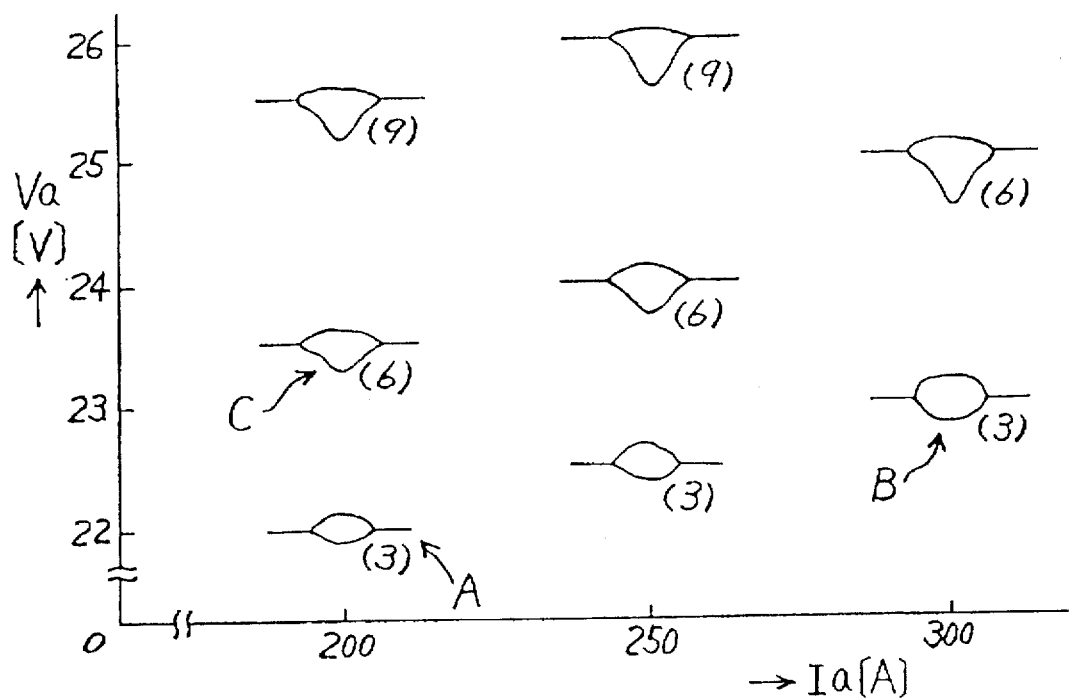
FIG. 48 is a graph showing the sectional view and the arc length of a bead obtained with the variation in the average value of welding current Ia and the average value of arc voltages Va in a pulse MIG arc welding method applied for a copper plate.

Description of FIG. 48

FIG. 48 is a graph having the average value of the welding current Ia A plotted at the horizontal axis and the average value of the arc voltage Va V plotted at the vertical axis and showing the sectional form of the welding beads and the arc length obtained with the MIG arc welding method. In connection with FIG. 48, the welding condition is as follows: A copper plate in a thickness of 10 mm is preheated at a temperature of 400° C. and is welded at a welding seed of 25 cm/min by using a copper consumable electrode in a diameter of 1.2

With reference to FIG. 48, the welding condition is changed, for example, from the first welding condition shown by a symbol A of welding current=200 A, arc voltage=22 V and arc length=3 mm to the second welding condition shown by a symbol B of welding current=300 A which is larger by 50% than the former and arc voltage=23 V. When the apparent arc length at the second welding condition shows 3 mm which is the same as that of the first welding condition, there is no significant difference in the sectional form of the welding bead between the position of a symbol A and the position of symbol B. This means that it is not possible for this method to obtain the scale bead in regular ripple pattern in a similar way to that of the TIG filler arc welding method. On the other hand, the welding condition is changed from the first welding condition shown by a symbol A to the second welding condition shown by a symbol C at which the welding current is 200 A the same as that of the first welding condition and the arc voltage is increased to 23.5 V by adding 1.5 V. The arc length at the symbol C is increased to 6 mm with an increment of 3 mm. There is a significant difference in the sectional form of the welding bead between the position of the symbol A and the position of the symbol C. This means that it is possible for this welding method to obtain the scale bead in regular ripple pattern in a similar way to the TIG filler arc welding method. In such a way, it is possible to control the penetration shape by changing alternatively the sectional form of the bead by increasing the apparent arc length by a size more than 3 mm between the first welding condition and the second welding condition.

The appearance of the bead is determined by the relationship between the welding speed WS cm/min and the switching frequency F Hz shown in Table 1. In general, the pitch Pt mm of the scale bead shown in FIG. 47 is governed by the following equation;

$$Pt = WS/60F$$

The conventional TIG filler arc welding method generates the scale bead in regular ripple pattern having a pitch Pt 1 to 5 mm. As a result, in view of the relationship between the above equation and the Table 1, it is possible for the MAG welding method according to the present claim to obtain the scale bead in regular ripple pattern in a similar way to that of the TIG filler arc welding method even with the welding speed higher than that of the TIG filler arc welding method. For example, in a case when the welding speed WS=180 cm/min and the switching frequency F=15 Hz, the pitch Pt is 2 mm. In a case when WS=300 cm/min, and the switching frequency f=15 Hz, the pitch Pt is 3.3 mm.

Embodiment 20 . . . Description of FIG. 49

Figure 49:
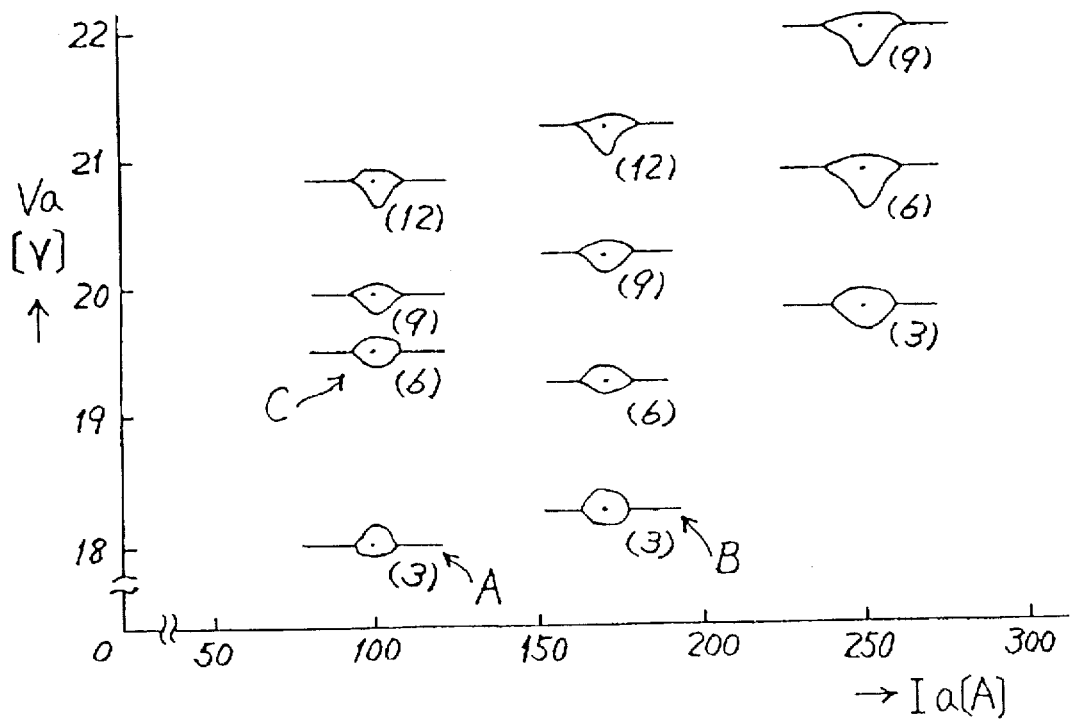
FIG. 49 is a graph showing the sectional view and the arc length of a bead obtained with the variation in the average value of welding current Ia and the average value of arc voltages Va in a pulse MIG arc welding method applied for a stainless steel plate.

The embodiment is aimed at the pulse MIG arc welding method with a stainless steel. FIG. 49 is a graph having the average value of the welding current Ia A plotted at the horizontal axis and the average value of the arc voltage Va V plotted at the vertical axis and showing the sectional form of the welding beads and the arc length obtained with the MIG arc welding method. In connection with FIG. 49, the welding condition is as follows: A stainless steel SUS304L plate in a thickness of 8 mm is welded at a welding speed of 25 cm/min by using a stainless steel SUS308 in a diameter of 1.2 mm.

With reference to FIG. 49, the welding condition is changed, for example, from the first welding condition shown by a symbol A of welding current=100 A, arc voltage=18 V and arc length=3 mm to the second welding condition shown by a symbol B of welding current=170 A which is larger by 70% than the former and arc voltage=18.3 V. When the apparent arc length at the second welding condition shows 3 mm which is the same as that of the first welding condition, there is no significant difference in the sectional form of the welding bead between the position of a symbol A and the position of symbol B. On the other hand, the welding condition is changed from the first welding condition shown by a symbol A to the second welding condition shown by a symbol C at which the welding current is 100 A the same as that of the first welding condition and the arc voltage is increased to 19.5 V by adding 1.5 V. The arc length at the symbol C is increased to 6 mm with an increment of 3 mm. There is a significant difference in the sectional form of the welding bead between the position of the symbol A and the position of the symbol C. In such a way, it is possible to control the penetration shape by changing alternatively the sectional form of the bead by increasing the apparent arc length by a size more than 3 mm between the first welding condition and the second welding condition.

A steel such as stainless or alloy steel has a thermal conductivity in a low size, for example, iron has a thermal conductivity of 0.14 cal/cm.sec.° C. which is greatly lower than those of aluminum and copper. Therefor, it is difficult for the steel to obtain the scale bead in a similar way to that of aluminum or copper. However, the steel material has the oxide film adhered thereto more weakly than aluminum and does not cause the arc to fly far away to the oxide film. The actual arc length is nearly equal to the theoretical arc length. Accordingly, with the steel material, it is possible to control the apparent arc length by adjusting the arc voltage. Hence, the periodic change in the arc voltage makes it possible to obtain the penetration shape differed from the conventional single form by melting together a plurality of bead sectional form and the reinforcement.

A welding method of another embodiment is to carry out a butt welding with the maximum gap value 3.0 mm at the welding speed of 30 cm/min and the maximum gap value of 1.5 mm at the welding speed of 100 cm/min with the switching frequency of 0.5 to 15 Hz and the variation value Le of arc length more than 3 mm.

Embodiment 21 . . . Description of FIGS. 50 and

Figure 50:
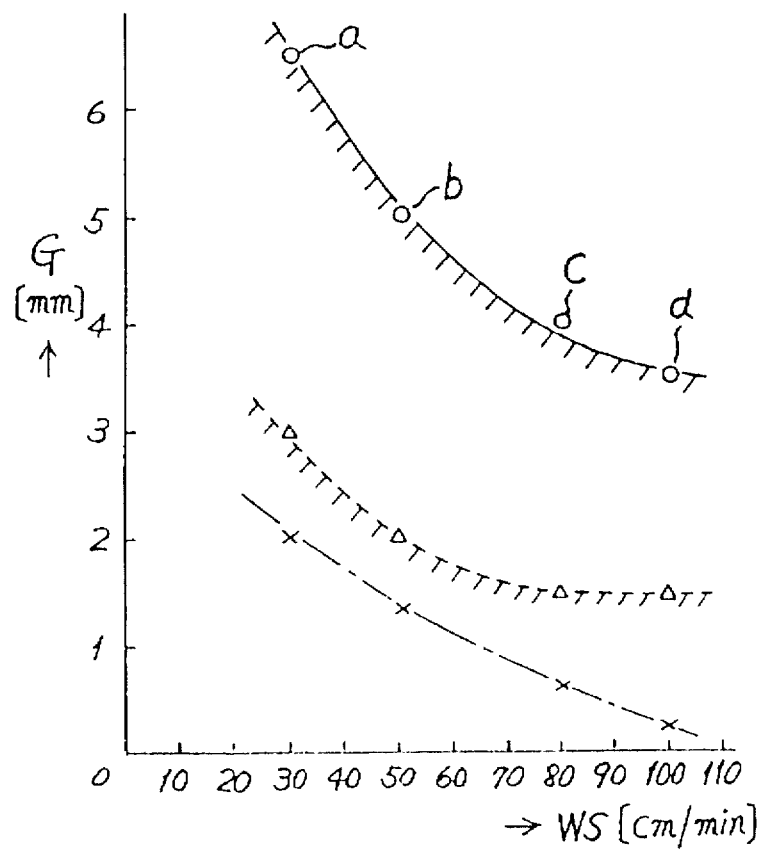
FIG. 50 is a graph showing an effect of the embodiment carried out at the butt joint by the welding method of a preferred embodiment according to the present invention and showing also a comparison between the methods according to the present invention and to the prior art.
Figure 51:
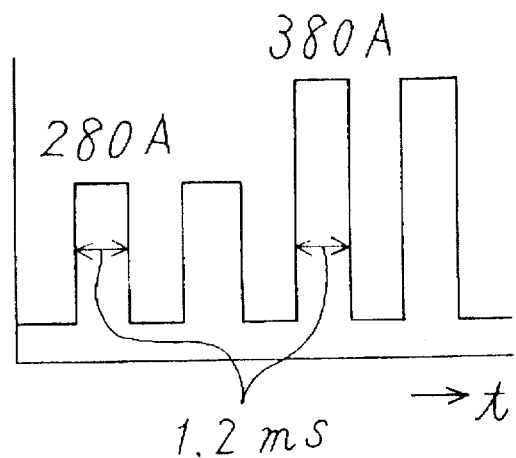
FIG. 51 is a graph showing a time passage of a pulse current used in the butt joint welding shown in FIG. 50.

FIG. 50 is a graph having the gap G mm of the butt at the welding line plotted at a vertical axis and the welding speed WS cm/min plotted at a horizontal axis and showing a range (shown by a oblique line) at which there is no melt down and a capability of welding when the welding speed is changed between 30 and 100 cm/min and the gap is also changed from 0.5 to 3 mm in connection with a butt welding for an aluminum alloy A5052 plate of 1.5 mm thickness. In FIG. 50, a symbol x and a one point chain line show the upper limit of the gap capable of being welded when the welding is carried out with the variation in the welding speed at the pulse current value of 280 A and the pulse duration 1.2 ms under the conventional unit pulse mode (one pulse to one molten metal grain transfer mode) by taking the average value of welding current 60 to 100 A. At the welding speed in a low speed of 30 cm/min, the gap of 2.0 mm is a upper limit for the welding. At the welding speed higher than 30 cm/min, the upper limit is lowered. With the welding speed of 80 cm/min the upper limit for the welding gap is decreased to 0.5 mm. After the first pulse current group is energized under lowering the arc voltage to 16.5 to 18.5 V at the one pulse to one molten metal grain transfer mode by using the first pulse current comprising the pulse current value 280 A and pulse duration 1.2 ms shown in FIG. 51 in a way shown by a symbol Δ and a dotted line, the pulse arc welding is carried out by increasing the pulse current to 380 A and at the same time energizing the second pulse current group controlled by a pulse period to maintain the one pulse to one molten metal grain transfer mode. Even with a gap of 3 mm, it is possible to carry out the welding without the melt down at a welding speed of 30 cm/min. Even when the welding speed is 100 cm/min, a gap of 1.5 mm can be welded. The reason for the high speed welding even with the gap can be explained by taking the following case that the high speed welding is carried out by decreasing the arc length with the one pulse to one molten metal grain transfer mode. When the arc length is enlarged by increasing the pulse current value, pulse duration or the both of them even with the gap of butt joint, the welding material at the vicinity of the gap is melted by the expansion of the arc to an area wider than the gap. It is possible to prevent the melt down and to elevate the limit for the high speed welding by making the arc length shorter and building up the gap area.

A welding method of another embodiment is to carry out the lap welding under the following conditions: the switching frequency is 0.5 to 15 Hz; the arc length variation value is more than 3 mm ; the gap maximum value is 3 mm at the welding speed 30 cm/min; the gap maximum value is 2 mm at the welding speed 100 cm/min.

Embodiment 22 . . . Description of FIGS. 52 and

Figure 52:
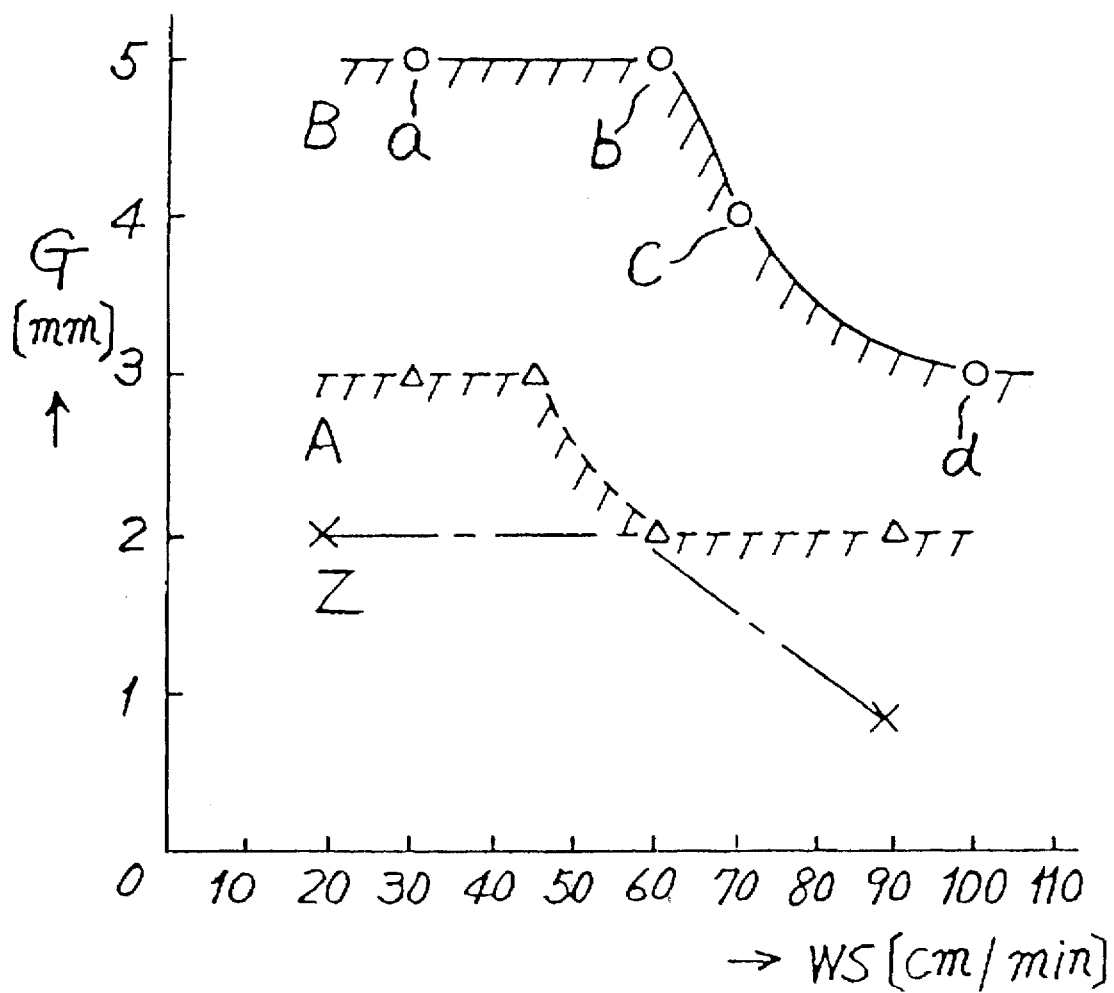
FIG. 52 is a graph showing an effect of the embodiment carried out at the gap of lap joint by the welding method of a preferred embodiment according to the present invention and showing also a comparison between the methods according to the present invention and to the prior art.
Figure 53:
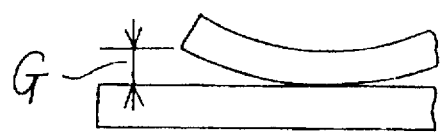
FIG. 53 is a perspective view of a gap of lap join used in the welding shown in FIG. 52.

FIG. 52 is a graph having a gap G mm of lap joint at the welding line plotted at a vertical axis and a welding speed WS cm/min plotted at a horizontal axis and showing a range (shown by a oblique line) at which the welding can be carried out without melt down when the welding speed is changed from 30 to 90 cm/min and the gap is also changed from 1 to 3 mm in connection with the lap welding for aluminum alloy A5052 plate in a thickness of 1.5 mm . In FIG. 52, a symbol x and a one point chain line show the upper limit of the gap capable of being welded when the welding is carried out with the variation in the welding speed at the pulse current value of 280 A and the pulse duration 1.2 ms under the conventional unit pulse mode (one pulse to one molten metal grain transfer mode) without switching the pulse by taking the average value of welding current 60 to 100 A. At the welding speed in a low speed of 30 to 60 cm/min, the gap of 2.0 mm is a upper limit for the welding. At the welding speed higher than the above value, the upper limit is lowered. With the welding speed of 90 cm/min, the upper limit for the welding gap is decreased to 1 mm. After the first pulse current group is energized under lowering the arc voltage to 16.5 to 18.5 V at the one pulse to one molten metal grain transfer mode by using the first pulse current comprising the pulse current value 280 A and pulse duration 1.2 ms shown in FIG. 51 in a way shown by a symbol Δ and a dotted line, the pulse arc welding is carried out by increasing the pulse current to 380 A and at the same time energizing the second pulse current group controlled by a pulse period to maintain the one pulse to one molten metal grain transfer mode. Even with a gap of 3 mm , it is possible to carry out the welding without the one side melt down at the upper plate at a welding speed of 20 to 45 cm/min. Even when the welding speed is 60 to 90 cm/min, a gap of 2 mm can be welded. The reason for the high speed welding even with the gap can be explained by taking the following case that the arc length at the second pulse duty period T2 is longer than that of the first pulse duty period. In addition, this pulse current variation value can maintain the one pulse to one molten metal grain transfer mode by changing slightly the pulse period and can prevent the arc length from being too much long. The second pulse current group having the long arc length melts the upper and lower plates. The first pulse current group having the short arc length causes the arc force to be weak and builds up the gap with the molten metal. This prevents the one side melt down at the upper plate and increases the number of the gap which can be welded. Accordingly, it is possible to prevent the one side melt down at the upper plate even when the upper plate is deformed into a wave form with the thermal stress generated during the welding.

A welding method includes the step of switching the energizing ratio between the first welding current energizing time T1 and the second welding current energizing time T2; Ds=T1/(T1+T2)

A welding method includes the step of charging the energizing ratio Ds in accordance with the voltage detection value Vd.

The following description will be directed to the welding method including the changing step which is applicable for the butt welding and the lap welding.

The welding method manages the arc length to recover when the arc length varies with the external disturbance as described above. The welding method has been much improved in the tolerance of the gap size in connection with a process to prevent the melt down due to the gap of butt joint or to prevent the melt down at the upper plate when there is a gap at the lap joint or a gap due to the thermal deformation.

In such a way, the variation in the gap causes the variation in the arc length. However, the welding method is not provided with a circuit for correcting the variation in the arc length resulted from the variation in the gap and therefore the rated phenomenon will be described in the following.

Problem at the time of gap variation of butt welding . . . Description of FIGS. 54 and 55

Figure 54:
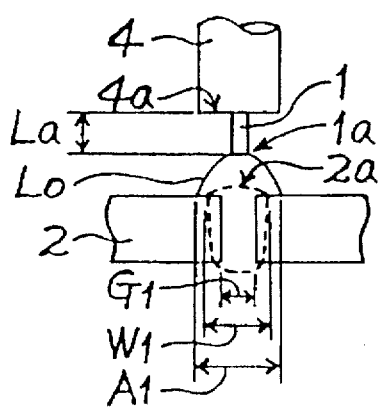
FIGS. 54 (A), (B) and (C) are structural model views illustrating a phenomenon occurring with the increase in the gap of butt joint treated with the butt welding method and FIGS. 54 (D) and (E) are graphs showing the time passage of the pulse current corresponding to the gaps of butt joints shown in FIGS. (A) and (B).
Figure 54:
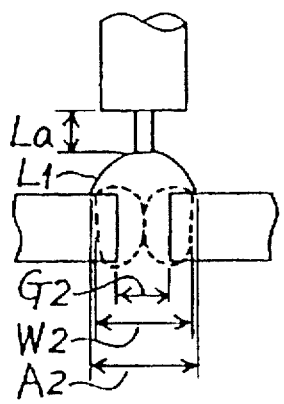
Figure 54C:
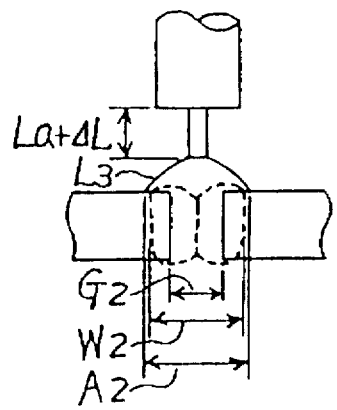
Figure 54:
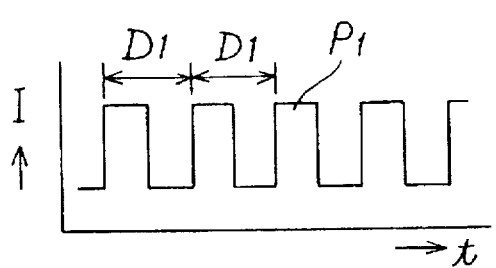
Figure 54:
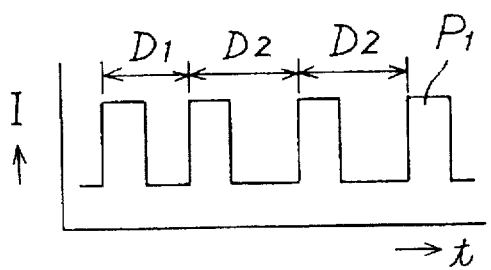

With reference to FIGS. 54 (A) to (E), the following description will be directed to the phenomenon when the gap of butt joint becomes larger.

As shown by FIG. 54 (D), when the pulse current P1 is energized by a period determined by a frequency f1, it is assumed that a wire extension length between the terminal 4a of a electric supplying tip and the terminal of the wire 1a is denoted by La when there is the gap G1 of butt joint as shown in FIG. 54 (A). A reference character L0 denotes an actual arc length; a reference character W1, a molten metal pool width; and a reference character A1, an outside diameter of the arc.

Next, as shown by FIG. 54 (E), when the pulse current P1 of the first pulse current group is energized by a period D1 determined by a frequency f1, the gap of the butt joint increases in the size. After the increase in the gap, the wire extension length becomes La. The increase in the gap G2 results in the increase in molten metal pool width W2. Since the arc flies to the outside of the molten metal pool width W2, the outside diameter of the arc increases to a size A2. Accordingly, the actual arc length increases from L0 to L1 to increase the arc voltage. The arc voltage detection circuit VD detects the increase in the arc voltage and causes the pulse frequency to decrease from f1 to f2. As a result, the period of the pulse current P1 is increased as shown by a character D2 of FIG. 54 (E). Accordingly, the melting speed of the wire becomes lower and the wire extension length becomes longer.

The wire extension length is increased to a length La+ΔL as shown in FIG. 54 (C) while the actual arc length decreases from L0 to L3 and then the arc voltage decreases. At the state shown in FIG. 54 (C), the wire terminal 1a is very close to the surface of the molten metal pool 2a, that is, the arc length is very short. When the state shown in FIG. 54 (C) continues, the wire terminal puts into the molten metal pool to generate the arc cutting. Further, there occurs the melt down caused by the partial melting of one side of welding plates.

In FIG. 54 (B), the arc easily flies on the oxide film. It is noted that an aluminum oxide is easily formed on aluminum metal. The arc flies on the outside of molten metal pool having the oxide film rather than the inside of the molten metal pool having no oxide film. This causes the actual arc length to be longer than the theoretical arc length to increase the arc voltage.

With reference to FIGS. 55 (A) to (D), the following description will be directed to the phenomenon when the gap of butt joint is smaller.

As shown by FIG. 55(A), a wire extension length La is actually L0; the molten metal pool width, W1; and the outside diameter of the arc, A1.

Next, as shown in FIG. 55 (B), the gap of butt joint G3 decreases and the wire extension length is La after the decrease in the gap. As shown in FIG. 55 (C), the decrease in the gap causes an increase in the molten metal pool width and the reinforcement. The increase in the reinforcement causes the arc to fly on the outside of the molten metal pool width W3. Thus, the actual arc length L5 is larger than L0 to increase the arc voltage.

In FIG. 55 (B), the outside diameter A1 of the arc is larger than the molten metal pool width W1. In FIG. 55 (C), the outside diameter A3 is larger than the molten metal pool width W3. Further in view of FIGS. 55 (B) and (C), W1<W3 and then finally A3≠A1. The actual arc length L5 shown in FIG. 55 (C) is larger than the arc length L0 shown in FIG. 55 (A) to increase the arc voltage.

When this state continues, the detection circuit controls the arc length to become shorter by detecting the increase in the arc voltage. Then, the wire extension length shown in FIG. 55 (A) is larger than La and becomes to La+Δ L as shown in FIG. 55 (D). Finally, the wire terminal 1a is in contact with the surface 2a of the reinforcement to cause the arc cutting or a number of the generation of spatter.

Problem at the time of gap variation of the lap welding . . . Description of FIGS. 56 and 57

Figure 56:
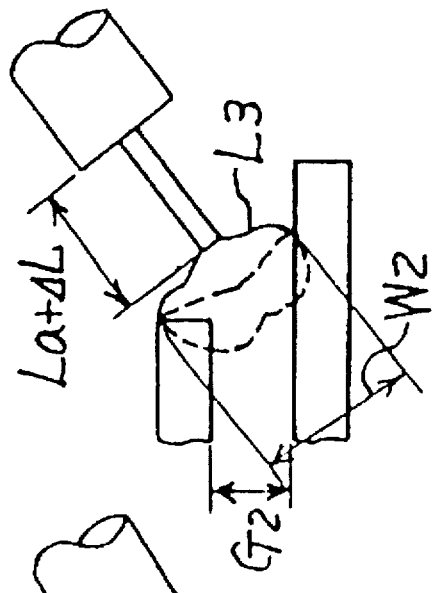
FIGS. 56 (A), (B) and (C) are structural model views illustrating a phenomenon occurring with the increase in the gap of lap joint treated with the lap welding method of a preferred embodiment of the present invention and FIGS. 54 (D) and (E) are graphs showing the time passage of the pulse current corresponding to the gaps of lap joints shown in FIGS. (A) and (B).
Figure 56:
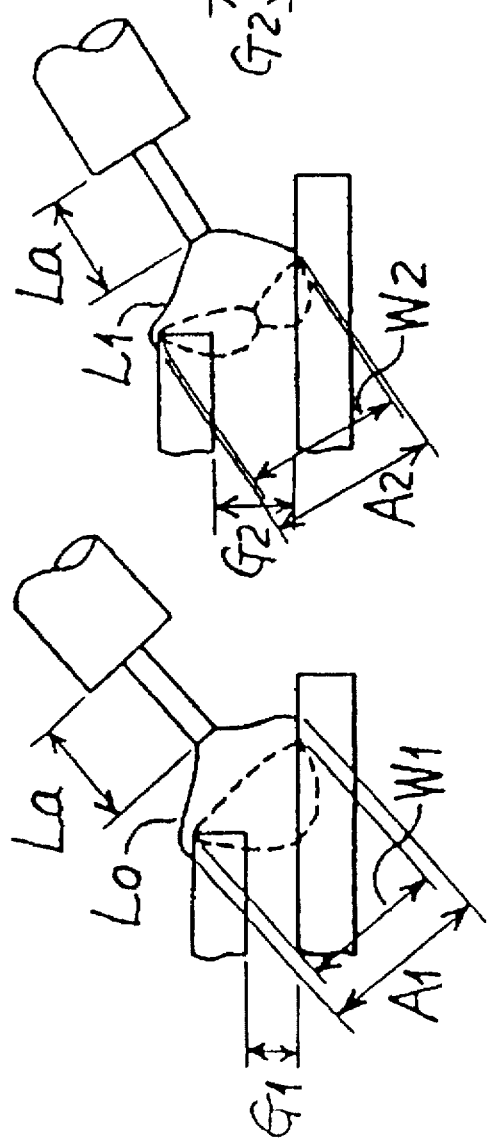
Figure 56:
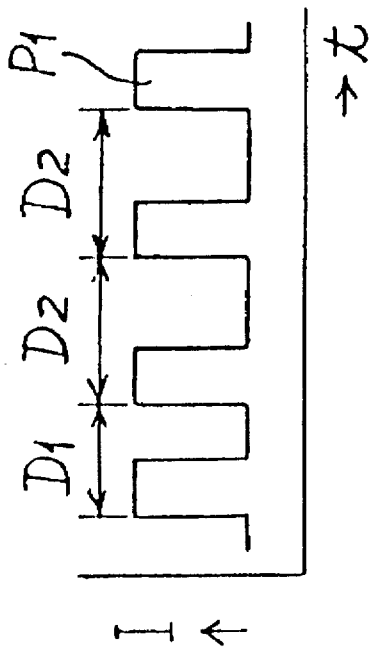
Figure 56:
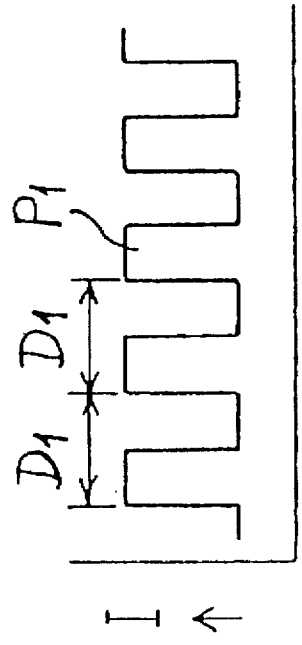

FIGS. 56 (A) to (C) are structural model views illustrating the phenomenon when the gap of lap joint becomes larger. FIGS. 56 (D) and (E) are graphs showing the time passage of the period of pulse currents corresponding to FIGS. 56 (A) and (B), respectively.

Figure 57:
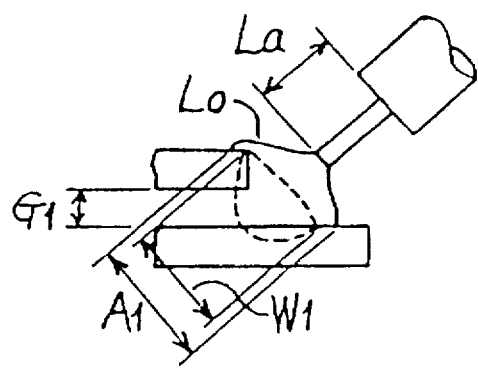
FIGS. 57 (A) to (D) are structural model views for illustrating the phenomenon occurring with the decrease in the gap of lap joint in the lap welding method of a preferred embodiment of the present invention.
Figure 57:
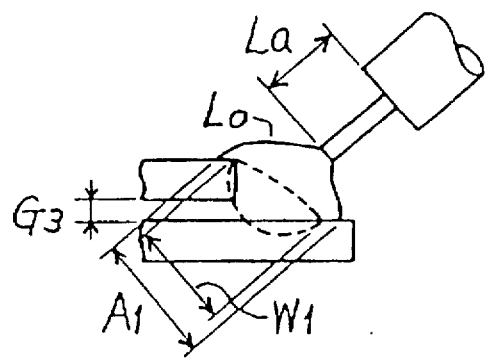
Figure 57:
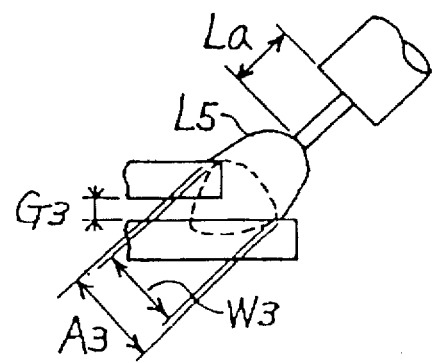
Figure 57:
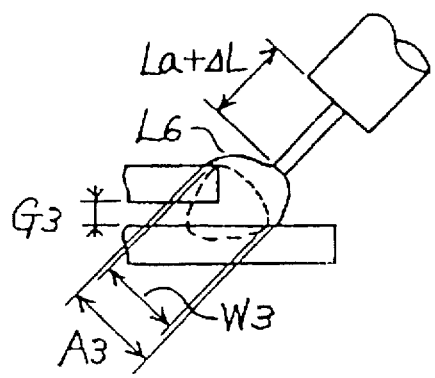

FIGS. 57 (A) to (D) are structural model views illustrating the phenomenon when the gap of lap joint becomes smaller.

The description with the phenomenon for the variation in the gap of lap joint shown in FIGS. 56 (A) to (E) and FIGS. 57 (A) to (D) is the same as that of the phenomenon for the variation in the gap of butt joint shown in FIGS. 54 (A) to (E) and FIGS. 55 (A) to (D) by exchanging the word 'butt plane' to 'lap plane' and should be omitted.

Correction method at the time of gap variation

A welding method described above is first to detect the change in the arc voltage when the variation in the arc length occurs with the unbalance between the wire feed rate and wire melting speed due to the external disturbance. Then, the wire melting speed is changed by changing the pulse frequency with the circuit in a high response time. In addition to the effect to recover rapidly the arc length, the welding method is to detect the variation in the arc voltage in a low response time appearing after a given time has passed when the gap is changed during the lap welding or the butt welding and to carry out the pulse MAG arc welding method under correction of the arc length in accordance with the variation in the gap.

A welding method described above is based on a pulse MAG arc welding method to carry out the welding by using the pulse welding current obtained by switching between the first pulse current group and the second pulse current group different from the first pulse current group. The consumable electrode is fed at a predetermined feed rate while each value of pulse current value, pulse duty time, pulse frequency and base current value of the first pulse current group is set to a value capable of forming a project transfer mode in which the molten metal grain transfers from the consumable electrode to the welding material in a synchronizing way to each of the pulse currents. The pulse current value, pulse duty time, pulse frequency and base current of the second pulse current group is set to a value different from that of the first pulse current group within the range to hold the project transfer mode. Then, the arc length is periodically switched by energizing the pulse welding current. When the arc length varies with the imbalance between the wire feed rate and the wire melting speed, the arc length is rapidly recovered by changing quickly the pulse frequency, pulse duration, base current value or pulse current value with the detected arc voltage. At the same time, the arc voltage varied with the variation in the gap is detected. A pulse MAG arc welding method is completed after the arc length is provided with the correction corresponding to the gap by controlling the energizing ratio Ds between the first pulse duty time and the second pulse duty time by the detected arc voltage.

Before the description of the welding method first the description is directed to the welding method capable of recovering the arc length when the arc length is changed by the external disturbance. Next, the description will be directed to the welding method to make the arc length correction in accordance with the variation in the gap when the welding material has the gap changed during the lap welding or the butt welding.

Description of the recovery of changed arc length

First, the description will be directed to the effect to recover the arc length variation. In a pulse arc welding method switching between the first pulse current group and the second pulse current group, when the arc length varies with the unbalance between the wire feed rate and the wire melting speed, the arc voltage is quickly detected to compare the arc voltage detection signal Vd to the first arc voltage setting signal Vs1 and to the second arc voltage setting signal Vs2. The pulse frequency control signal Vf3 is changed in accordance with the signal Cm2 obtained from the comparison among the above signals. In response to the variation of the pulse frequency control signal Vf3, the pulse current outputted from the welding electric source circuit PS varies in the frequency and causes the wire melting speed to vary. As a result, the arc length variation can be recovered.

That is, when the arc voltage increases with the increase in the arc length, the decrease in the pulse frequency results in the increase in the pulse period. Then, the wire melting speed becomes lower, and the arc length accordingly decreases to recover the original length. In a reverse way, when the arc voltage decreases with the decrease in the arc length, the increase in the pulse frequency causes the pulse period to be shorter and the wire melting speed to be higher. As a result, the arc length increases to recover the original length.

Description of the arc length correction corresponding to the variation in the gap of the butt joint.

Figure 58:
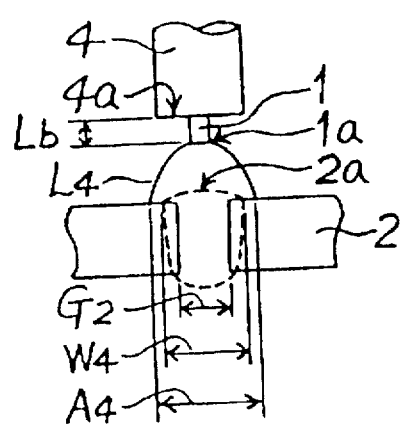
FIG. 58 (A) is a structural model view illustrating the effect of the correction in the arc length carried out by the welding of a preferred embodiment of the present invention method when the gap of butt joint is increased and FIG. 58 (B) is a structural model view illustrating the effect of the correction of the arc length when the gap of butt joint is decreased.
Figure 58:
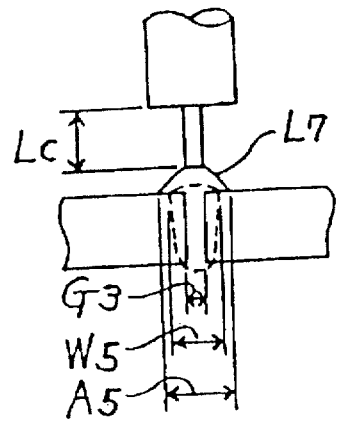

With reference to FIGS. 58 (A) and (B) in addition to FIGS. 54 and 55 by which the description has been made with the variation in the arc length and the arc voltage with the variation in the gap of butt joint, the second effect of the welding method will be described.

The phenomenon occurring when the gap of butt joint is larger and the variation in the arc voltage can be caused by the increase in the wire extension length to La+ΔL as shown in FIG. 54 (C). Therefore, the actual arc length is decreased from L0 to L3 and then the arc voltage decreases. There is a time delay until the occurrence of the decrease in the arc voltage. This time delay is corresponding to the switching frequency (1to 15 Hz) between the first pulse duty time T1 and the second pulse duty time T2. This switching period does not respond to the variation in the arc voltage having a high variation speed similarly to the arc variation due to the unbalance between the wire feed rate and the wire melting speed but to the variation in the arc voltage generated with the decrease in the arc length caused by the decrease in the wire melting speed due to the decrease in the pulse frequency.

Next, the description will be directed to the arc length correction when the arc voltage decreases with the variation in the gap.

As shown in FIG. 54 (C), when the arc voltage decreases with the increase in the gap size, the detection signal to detect the decrease in the arc voltage causes, for example, the second pulse duty time T2 having the average value of pulse current in a large size to be longer or the first pulse current duty time T1 having a small average pulse current to be shorter. Alternatively, T1 is made shorter while T2 is made longer at the constant value of (T1+T2). As a result, it is possible to increase the arc length with the increase in the wire melting speed as shown in FIG. 58 (A). The wire extension length can be made shorter from La to Lb at the time before the variation in the gap. Then, the actual arc length is L4 (L4≠L0). This causes the arc outside diameter to be larger to A4 (A4≠A2) and the molten metal pool width to be also larger to W4 (W4≠W2). Thus, the welding material 2 is melted sufficiently at the both side of the gap. Therefore, the reinforcement is in a flat shape to prevent a generation of the welding defect. Further, the arc length correction and the flat shape of the reinforcement causes the arc length between the wire terminal 1a and the surface 2a of the molten metal pool to be longer and prevents the contact between the wire terminal 1a and the surface 2a of the molten metal pool and finally the generation of the arc cutting.

The phenomenon occurring when the gap of butt joint is smaller in a reverse way and the arc voltage variation cause the actual arc length L5 to be larger than L0 and the arc voltage to increase as shown in F55 (C).

There is a time delay until the increase in the arc voltage which occurs with the operation where the arc flies to the outside of the reinforcement formed with the molten wire at the same arc length in spite of the smaller gap. This time delay responds to the switching frequency (0.5 to 15 Hz) between the first pulse duty time T1 and the second pulse duty time T2 and to the variation in the arc voltage resulting from the variation in gap.

Next, the description will be directed to the arc length correction when the arc voltage increases with the variation in the gap. When the actual arc length extends to the outside of the reinforcement due to the decrease in the gap and causes the arc voltage to increase as shown in FIG. 55 (C), the detection signal to detect the decrease in the arc voltage causes, for example, the second pulse duty time T2 having the average value of pulse current in a large size to be shorter or the first pulse current duty time T1 having a small average pulse current to be longer. Alternatively, T1 is made longer while T2 is made shorter at the constant value of (T1+T2). As a result, it is possible to decrease the arc length with the decrease in the wire melting speed as shown in FIG. 58 (B). The wire extension length can be made longer from La at the time before the variation in the gap to Lc. Then, the actual arc length is L7 (L7<L0). This causes the arc outside diameter to be shorter to A5 (A5<A1) and the molten metal pool width to be also smaller to W5 (W5<W1). Thus, the arc length is corrected into a short size with the decrease in the gap size. It is possible to obtain the stable arc and to prevent the contact between the wire terminal 1a and the surface 2a of the molten metal pool and finally the generation of the arc cutting.

Figure 59:
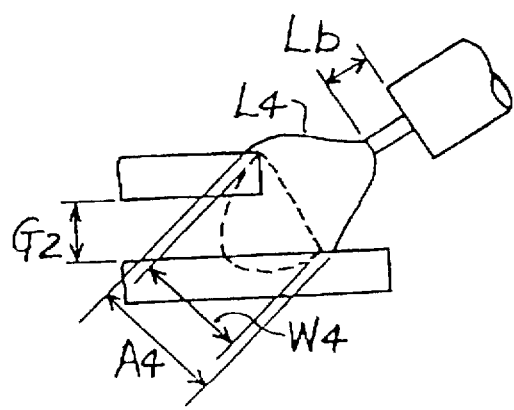
FIG. 59 (A) is a structural model view illustrating the effect of the correction in the arc length carried out by the welding method when the gap of lap joint is increased and FIG. 58 (B) is a structural model view illustrating the effect of the correction of the arc length of a preferred embodiment of the present invention when the gap of lap joint is decreased.
Figure 59:
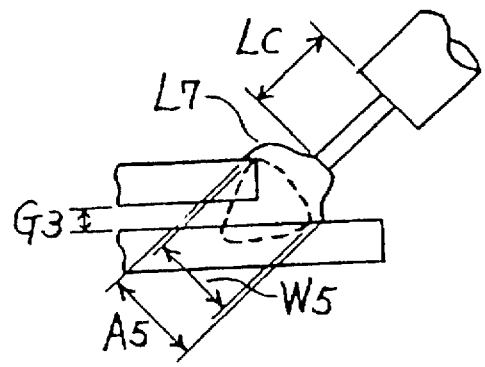

Description of arc length correction corresponding to the variation in the gap of lap joint FIGS. 59 (A) and (B) are structural model views illustrating the arc length correction when the gap of lap joint varies. The description with the arc length correction with the variation in the gap of lap joint shown in FIGS. 59 (A) and (B) is the same as that of the arc length correction with the gap of the butt joint shown in FIGS. 58 (A) and (B) by exchanging the word 'butt plane' to 'lap plane' and should be omitted.

Embodiment 23 . . . Description of butt welding shown in FIG. 50

FIG. 50 is a graph having the gap G mm of the butt at the welding line plotted at a vertical axis and the welding speed WS cm/min plotted at a horizontal axis and showing a range (shown by a oblique line) at which there is no melt down and a capability of welding when the welding speed is changed between 30 and 100 cm/min and the gap is also changed from 1.5 to 6.5 mm in connection with a butt welding for an aluminum alloy A5052 plate of 1.5 mm thickness.

In FIG. 50, the welding condition is that the welding current average value is 100 to 175 A, and arc voltage is 17.5 to 21 V. The first pulse current group of the pulse current value 280 A having the pulse duration 1.2 msec and the second pulse current group of the pulse current value 380 A of the pulse duration 1.2 ms are switched to each other with the switching frequency 2.5 Hz.

In FIG. 50, a symbol a and a dotted line show the upper limit of the gap capable of being welded when the welding is carried out with the energizing ratio Ds held at the constant value of 0.5 according to the welding method by claim 25. The gap of 3 mm is an upper limit which can be welded at the low welding speed of 30 cm/min. With the welding speed higher than 30 cm/min, the upper limit for the welding is lowered. When the welding speed is higher than 70 cm/min, the upper limit for the welding is decreased to 1.5 mm of the gap.

A pulse arc welding is carried out at the same condition as the above other than the energizing ratio Ds which is made variable from 0.3 to 0.7 by an arc voltage detection signal. As shown by a open circle and a solid line, at the low welding speed of 30 cm/min, the limit size of the gap which can be welded is increased from 3 mm which is obtained with the constant energizing ratio Ds to 6.5 mm according to the welding method mentioned above. At the welding speed of 70 cm/min, the limit size of the gap for welding is 1.5 mm with the constant energizing ratio Ds but can be extended to 3.5 mm at a variable Ds.

The reason for making the limit size of gap for welding larger than the size at the constant energizing ratio Ds is that the arc length correction is made by controlling the energizing ratio Ds by the arc voltage detection signal as described in FIGS. 58 (A) and (B) with the problem mentioned in FIGS. 54 (C) and 55 (D)

Embodiment 24 . . . Description of lap welding shown in FIG. 52

FIG. 52 is a graph having the gap G mm of the butt at the welding line plotted at a vertical axis and the welding speed WS cm/min plotted at a horizontal axis and showing a range (shown by a oblique line) at which there is no melt down and a capability of welding when the welding speed is changed between 30 and 100 cm/min and the gap is also changed from 2 to 5 mm in connection with a lap welding for an aluminum alloy A5052 plate of 1.5 mm thickness.

In FIG. 52, the welding condition is that the welding current average value is 60 to 120 A, and arc voltage is 16.5 to 19 V. The first pulse current group of the pulse current value 280 A having the pulse duration 1.2 msec and the second pulse current group of the pulse current value 380 A of the pulse duration 1.2 ms are switched to each other with the switching frequency 2.5 Hz.

In FIG. 52, a symbol Δ and a dotted line show the upper limit of the gap capable of being welded when the welding is carried out with the energizing ratio Ds held at the constant value of 0.5 according to the welding method by claim 26 The gap of 3 mm is an upper limit which can be welded at the low welding speed of 30 to 50 cm/min. With the welding speed higher than the above value, the upper limit for the welding is lowered. When the welding speed is higher than 60 cm/min, the upper limit for the welding is decreased to 2 mm of the gap.

A pulse arc welding is carried out at the same condition as the above other than the energizing ratio Ds which is made variable from 0.3 to 0.7 by an arc voltage detection signal. As shown by a open circle and a solid line, at the low welding speed of 30 to 60 cm/min, the limit size of the gap which can be welded is able to be increased from 3 mm which is obtained with the constant energizing ratio Ds to 5 mm with the variable Ds. At the gap of 5 mm , there is no partial melt down and capability of welding. At welding speed of 100 cm/min, the limit size of the gap for welding can be extended from 2 mm with the constant energizing ratio Ds to 3 mm at a variable Ds.

The reason for making the limit size of gap for welding larger than the size at the constant energizing ratio Ds is that the arc length correction is made by controlling the energizing ratio Ds by the arc voltage detection signal as described in FIGS. 59 (A) and (B) with the problem mentioned in FIGS. 56 (C) and 57 (D).

A welding method includes the step of switching the wire feed rate WF between the first wire feed rate and the second wire feed rate with a switching frequency F=0.5 to 5 Hz and to manage the ratio between the second welding current value I2 and the first welding current value I1 to be 1.05 to 1.20. The following description will be directed to the case in which the welding method including the switching step is applied for the butt welding and the lap welding as mentioned above.

The welding method including the switching step is to give a shape correction to the reinforcement by switching the wire feed rate with the controlled energizing ratio Ds in addition to the effect to give the arc length correction corresponding to the gap by controlling the energizing ratio Ds.

In a welding method as mentioned above, the detection signal detects the decrease in the arc voltage with the increase in the gap and makes the arc length correction by managing the energizing ratio Ds to increase the arc length. As a result, it has bee possible to extend the limit size of the gap for welding much larger than the size with the constant energizing Ds.

For the butt welding and lap welding method it is possible to extend the range at which there is no melt down by giving the arc length a correction when the gap is larger. However, with the increase in the gap size, the lack of the molten metal causes the reinforcement to be low in the building-up height and in a flat appearance of the bead.

In the welding method the detection signal detects the decrease in the arc voltage with the large variation in the gap size and makes the arc length correction by managing the energizing ratio Ds to increase the arc length. At the same time, the wire feed rate is increased in accordance with the energizing ratio Ds to increase the welding current as well as the molten metal amount. The molten metal fills the enlarged gap without the lack and builds up the reinforcement having a beautiful appearance of bead.

In a reverse way, in the welding method the detection signal detects the increase in the arc voltage with the decrease in the gap size and makes the arc length correction by managing the energizing ratio Ds to decrease the arc length. It is possible to make the limit size of the gap for welding larger than the size at the constant energizing ratio Ds as shown in the embodiment 23.

In the butt welding and lap welding method the arc length correction to make the arc length shorter with the decrease in the gap size can extend the range at which the welding can be carried out. However, with the decrease in gap size, the molten metal in a too much amount makes the reinforcement to be too high in the build up height.

In the welding method the detection signal detects the increase in the arc voltage with the decrease in the gap size and makes the arc length correction by managing the energizing ratio Ds to decrease the arc length. The wire feed rate is decreased in accordance with the switched energizing ratio Ds so that the welding current as well as the molten metal amount decreases. It is possible to prevent the contact between the wire terminal and the surface of the molten metal resulting in the arc cutting even with the arc length set to a short size by decreasing the height of the reinforcement.

Comparison of the wire feed rate at the butt welding between the constant value and the switching value

TABLE 2

|   | constant feed rate | feed rate switching | |
|---|---|---|---|
|   | average value of welding current Ia (A) | welding current of first pulse M1 (A) | welding current of second pulse M2 (A) |
| a | 100 | 100 | 120 |
| b | 110 | 110 | 130 |
| c | 130 | 130 | 155 |
| d | 150 | 150 | 175 |

In a welding method shown in FIG. 50, Table 2 indicates the average value of welding current Ia at the points a to d on a solid curve in connection with the welding method in a constant value of the wire feed rate and average value of the welding current M1 of the first pulse duty time T1 and the average value of the welding current M2 of the second pulse duty time T2 at points a to d on the solid curve in connection with the welding method having the wire feed rate switched.

Figure 60:
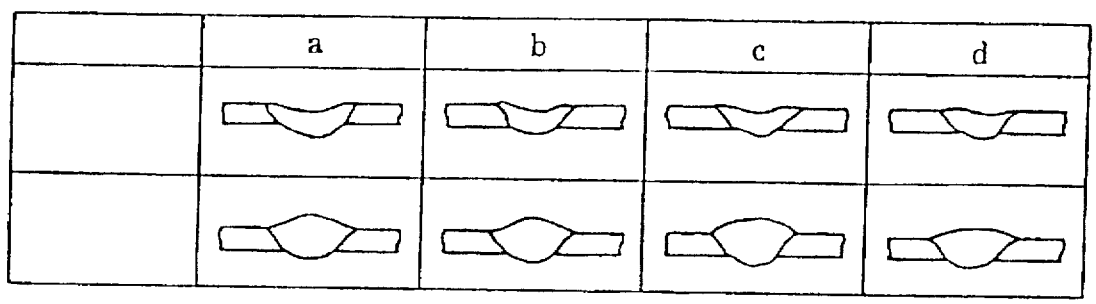
FIG. 60 illustrates sectional views of welding beads obtained at a, b, c and d points on the solid line of FIG. 50 when the welding method shown in FIG. 50 is carried out at a constant wire feed rate and at the switched wire feed rate, respectively.

FIG. 60 is a sectional view of the beads obtained at points a to d on a solid line when the welding method according to FIG. 50 is carried out at a constant wire feed rate and the beads obtained at points a to d on a solid line when the welding method according to FIG. 50 is carried out at switched wire feed rate.

With the comparison between the sectional views of the beads obtained by the different two ways, it is clear that the bead obtained at the constant wire feed rate has the insufficient reinforcement, whereas the bead obtained at the switched wire feed rate has the sufficient reinforcement produced with the increased wire molten amount resulted from the increase in the welding current value higher by 10 to 20% than the usual average value of the welding current.

Comparison between the lap welding methods at a constant wire feed rate and switched wire feed rate

TABLE 3

|   | constant feed rate | feed rate switching | |
|---|---|---|---|
|   | average value of welding current Ia (A) | welding current of first pulse M1 (A) | welding current of second pulse M2 (A) |
| a | 60 | 60 | 70 |
| b | 70 | 70 | 85 |
| c | 85 | 85 | 100 |
| d | 100 | 100 | 120 |

In a welding method shown in FIG. 52, Table 3 indicates the average value of welding current Ia at the points a to d on a solid curve in connection with the welding method in a constant value of the wire feed rate and average value of the welding current M1 of the first pulse duty time T1 and the average value of the welding current M2 of the second pulse duty time T2 at points a to d on the solid curve in connection with the welding method having the wire feed rate switched.

Figure 61:
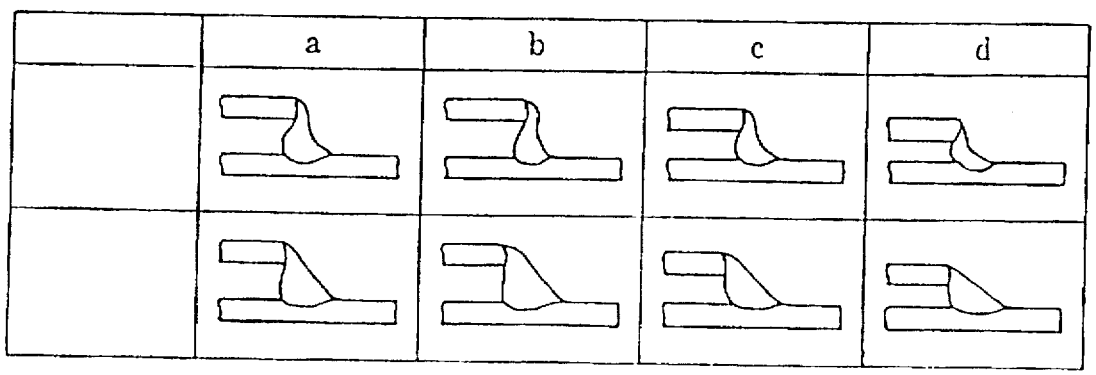
FIG. 61 illustrates sectional views of welding beads obtained at a, b, c and d points on the solid line of FIG. 52 when the welding method shown in FIG. 52 is carried out at a constant wire feed rate and at the switched wire feed rate, respectively.

FIG. 61 is a sectional view of the beads obtained at points a to d on a solid line when the welding method according to FIG. 52 is carried out at a constant wire feed rate and the beads obtained at points a to d on a solid line when the welding method according to FIG. 50 is carried out at switched wire feed rate.

With the comparison between the sectional views of the beads obtained by the different two ways, it is clear that the bead obtained at the constant wire feed rate has the insufficient reinforcement whereas the bead obtained at the switched wire feed rate has the sufficient reinforcement produced with the increased wire molten amount resulted from the increase in the welding current value higher by 10 to 20% than the usual average value of the welding current.

Figure 62:
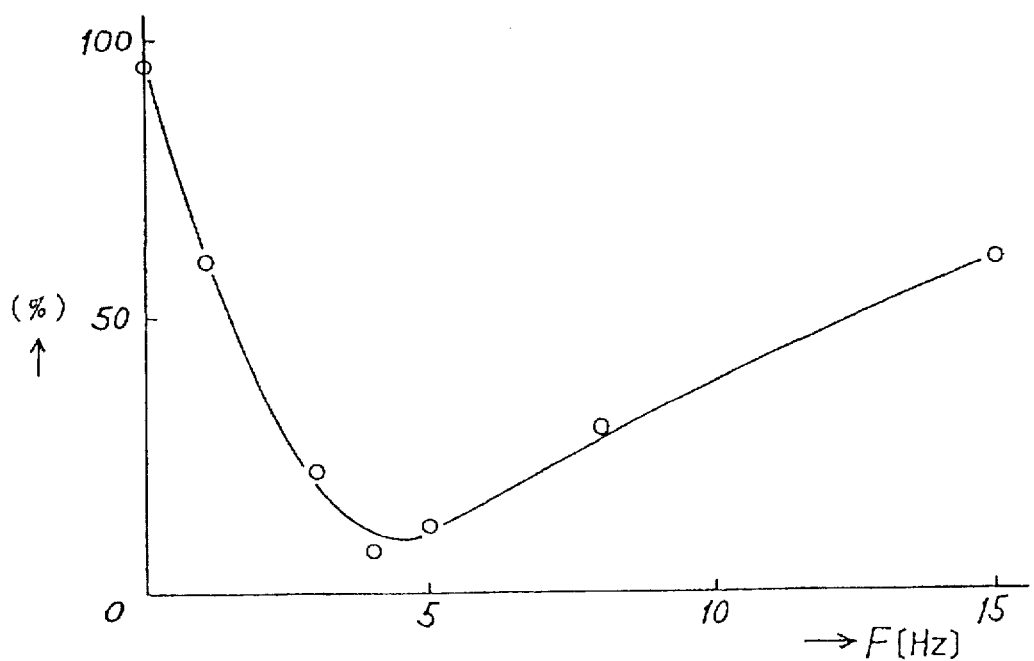
FIG. 62 is a graph showing the relationship between a switching frequency and a cracking ratio in connection with a welding method of a preferred embodiment of the present invention.
Figure 63:
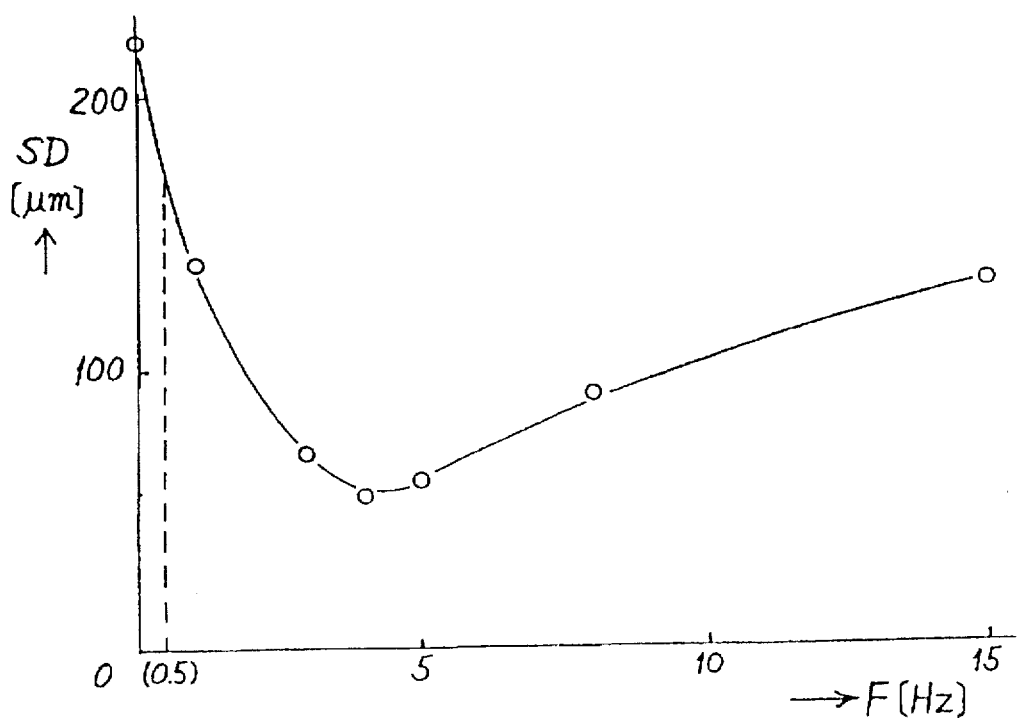
FIG. 63 is a graph showing the relationship between the switching frequency F and the average crystal grain size SD in connection with a welding method of a preferred embodiment of the present invention.
Figure 64:
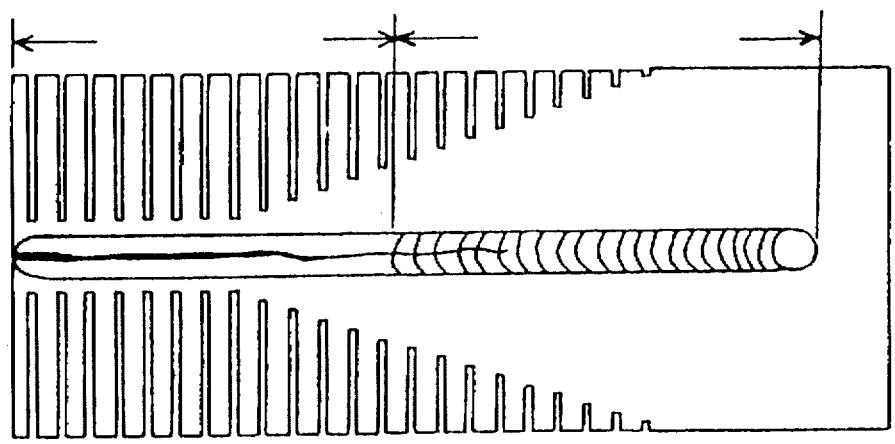
FIG. 64 illustrates the effect on the cracking in connection with a welding method according to prior art and the welding method characterized by fine grain size of a preferred embodiment according to the present invention.

Description of FIGS. 62 to 64

FIG. 62 is a graph showing a cracking test result using the test specimen to be described in FIG. 64 and having a cracking ratio (LC/LW)×100% plotted at the vertical axis and a switching frequency of pulse current plotted at the horizontal axis. A reference character LC denotes the cracking length (mm) and a character reference LW denotes a welding length (mm). It is clear from FIG. 62 that the cracking ratio is minimum at the switching frequency of 4 Hz.

FIG. 63 is a graph showing the relationship between the switching frequency and the average grain size of the welded metal subjected to the same welding condition as that of FIG. 62. It is clear from FIG. 63 that the average grain size is minimum at the switching frequency of about 4 Hz. Accordingly, it is clear that the decrease in the average grain size of the welded metal results in the decrease in the cracking ratio.

FIG. 64 is a structural model view illustrating the comparison between the beads obtained with the conventional pulse MIG arc welding method and with the pulse MIG arc welding method for changing the arc length to obtain the fine grain size according to the present invention. The welding length is achieved at the half by the conventional pulse MIG arc welding method and at another half achieved subsequentially by the MIG arc welding method according to claim of the present invention. The conventional pulse MIG arc welding method generates the cracks over all the welding length. The welding method according to the claim of the present invention is carried out subsequently to the conventional welding method and does not generate the crack after the delay time at which a slight crack is generated. This confirms the effect of the claim of the present invention.

Figure 65:
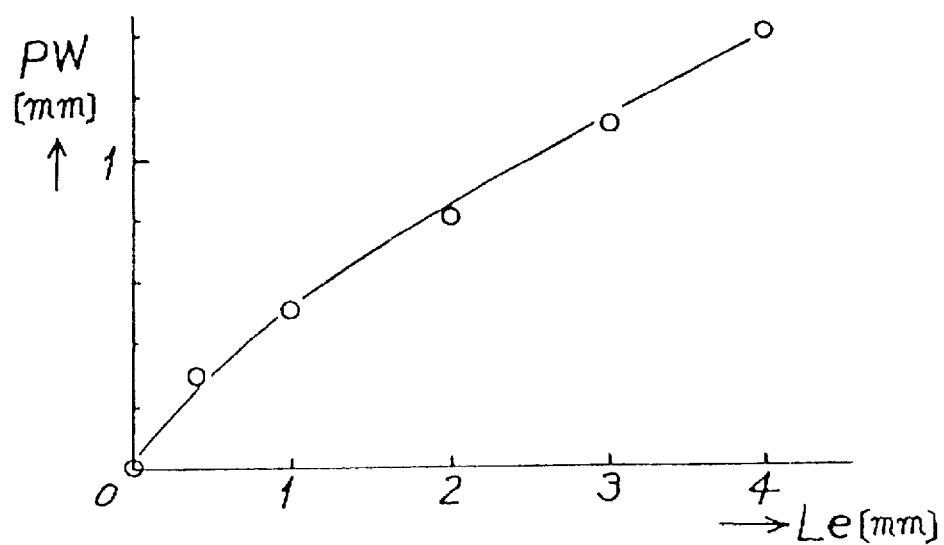
FIG. 65 is a graph showing the relationship between the arc length variation value Le and the amplitude PW of the vibration of the molten pool.
Figure 67:
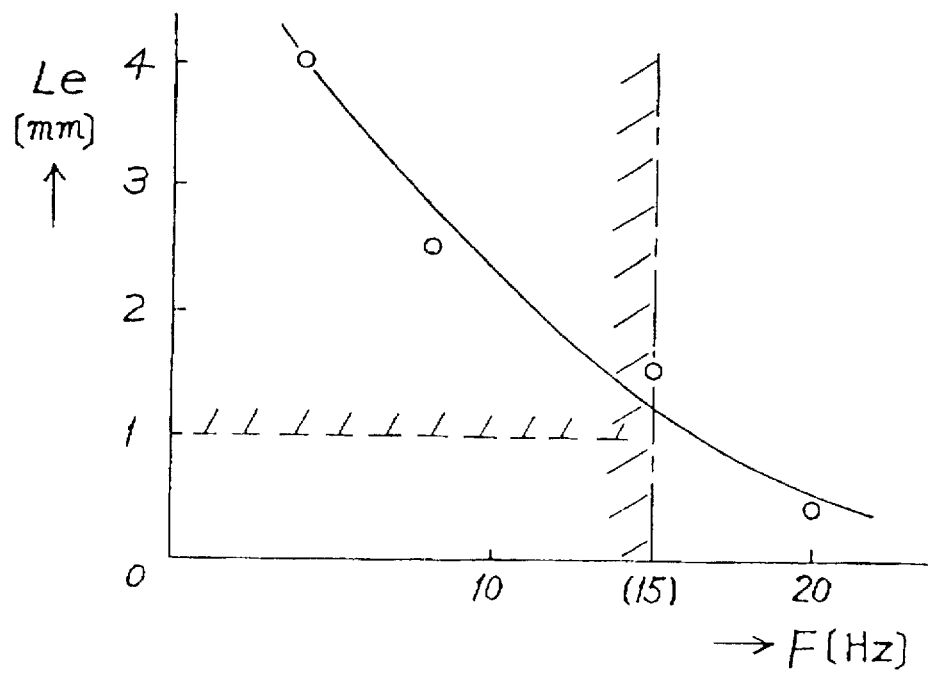
FIG. 67 is a graph showing the relationship between the switching frequency F and the arc length variation value Le in connection with a welding method of a preferred embodiment of the present invention.

Description of FIGS. 65 and 67

FIG. 65 is a graph showing the relationship between the variation value of the arc length Le mm (horizontal axis) and a molten metal pool vibration width PW mm (vertical axis). The welding condition is that the pulse current is switched by the switching frequency 4 Hz. As shown in FIG. 65, the increase in the variation value Le causes the increase in the molten metal pool vibration width PW.

Figure 66:
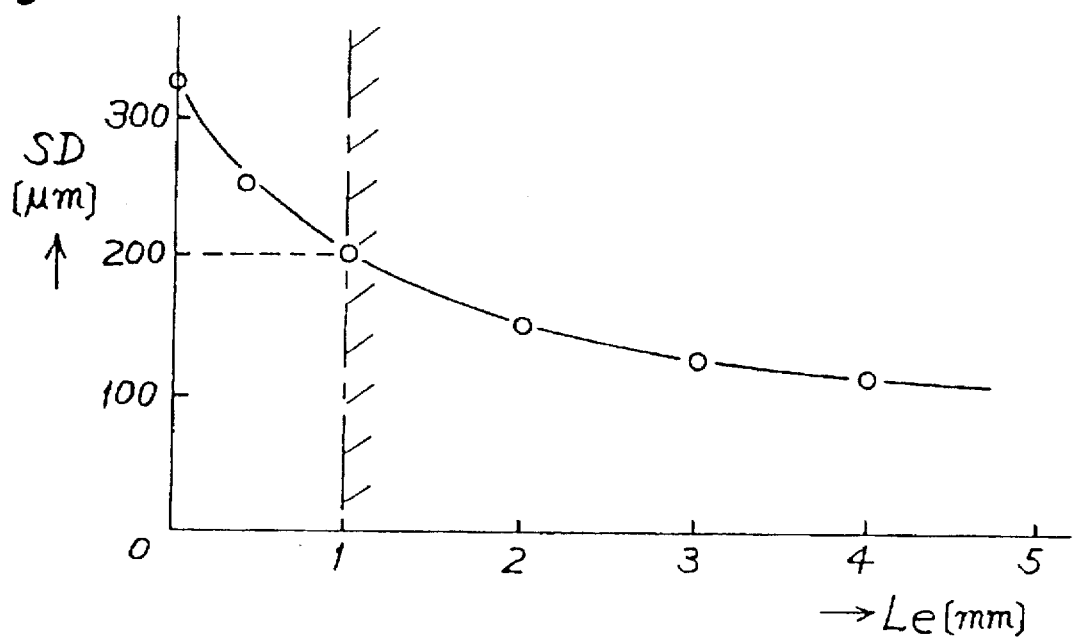
FIG. 66 is a graph showing the relationship between the arc length variation value Le and the average crystal grain size SD in connection with a welding method of a preferred embodiment of the present invention.

FIG. 66 is a graph showing the relationship between the arc length variation value Le mm (horizontal axis) and the average grain size SD micro millimeter (vertical axis). The welding condition is that the pulse current is switched by a switching frequency 4 Hz. It is clear from FIG. 66 that the average grain size becomes larger than 200 micron millimeter when the arc length variation Le is less than 1 mm. Since the cracking is easily generated at the average grain size higher than 200 micron millimeter, the arc length variation value Le is required to be higher than one mm.

FIG. 67 is a graph showing the relationship between the switching frequency F Hz (horizontal axis) and the arc length variation value Le mm (vertical axis). From FIG. 66, it is clear that the arc length variation value Le is required to be higher than 1 mm in order to make the average grain size SD to be less than 200 micron millimeter. In order to achieve this requirement, FIG. 67 indicates that the switching frequency F is required to be less than 15 Hz. It is difficult for the melt length at the wire extension length to follow the switching frequency F at the switching frequency F higher than 15 Hz. On the other hand, it is clear from FIG.63 that the average grain size SD less than 200 micron millimeter can be achieved by the switching frequency F higher than 0.5 Hz. As a conclusion, in the welding method according to the claim of the present invention, it is necessary that the arc length variation value Le is less than 1 mm and the switching frequency F is 0.5 to 15 Hz.

The welding method is to prevent the generation of the cracking and to improve the accuracy in the non-destructive test by stirring the stainless steel molten pool in order to obtain the fine grain size.

Figure 68:
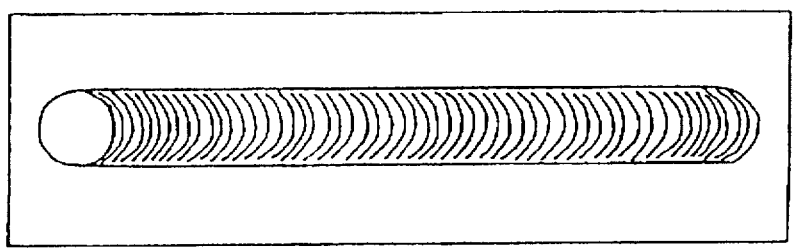
FIG. 68 (A) is a perspective view of the weld bead obtained with the welding method of a preferred embodiment of the present invention.
Figure 68:
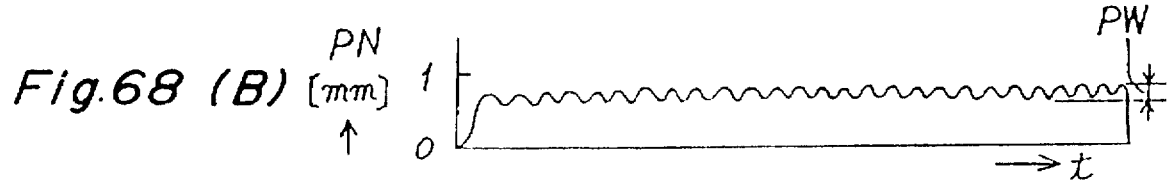
Figure 68:
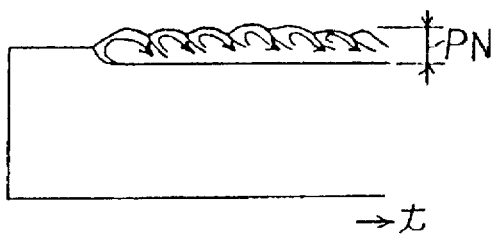

Description of FIG. 68

FIG. 68 (A) is a perspective view of the bead obtained when a stainless steel of 4 mm thickness is welded at the average value of the welding current 100 A and a pulse current of average arc voltage of 19 V at a welding speed of 30 cm/min with stainless wire of 1.0 mm diameter by the pulse MIG arc welding method to generate the variation value of the arc length Le in accordance with the above welding method FIG. 68 (B) and (C) are graph showing the variation in the vibration width PW and the height PN of the molten metal pool with time, respectively.

The bead obtained with the above welding condition shows a wave pattern of solidified metal as shown in FIG. 68 (A). The vibration of the molten metal pool under welding according to the present claim is photographed by a high speed video camera and analyzed with the video analyzing apparatus. The vibration width PW is 1.0 mm as shown in FIG. 68 (B). It is clear from FIG. 68 (C) that the convection in the molten metal pool is sufficiently carried out from the surface to the inside to produce fine grain boundaries in the solidified metal having columnar crystal. Since the cracking due to the solidification usually moves along with the grain boundaries, the fine grain boundaries causes the cracking to move with difficulty. The cracking is filled with the molten metal in an accelerated way due to the molten metal vibration induced by the cracking itself (referred to healing phenomenon in the welding solidification metallurgy) when the vibration in the molten metal is large. In view of this point, the large vibration is useful for the prevention of the cracking.

Embodiment . . . Description of FIG. 69

Figure 69:
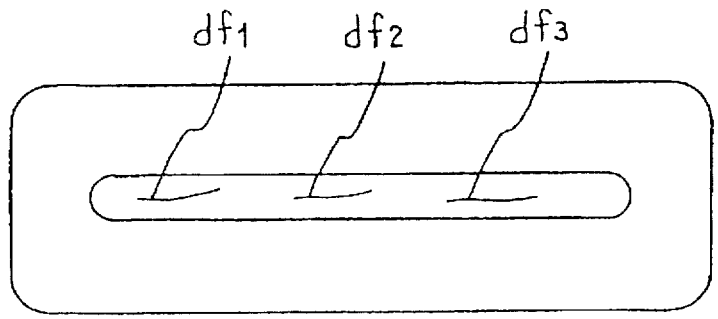
FIG. 69 (A) and (B) indicate the radiation transmitting test results on the materials by a conventional MIG welding method and a welding method of a preferred embodiment of the present invention.
Figure 69:
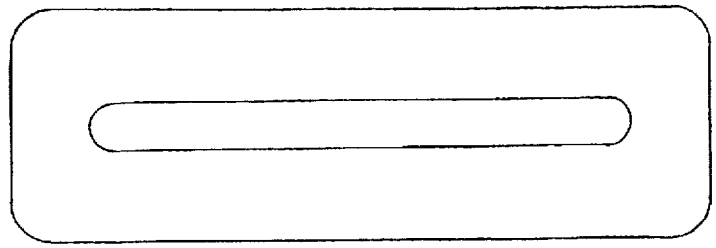

FIG. 69 (A) is a perspective view of the bead after the radiographic test on the welding bead obtained with the welded stainless steel 18Cr8Ni subjected to conventional MIG welding method. In can be seen that the welding bead shows a black shadow at the positions df1, df2 and df3 along with the grain boundary of large crystals. These black shadow can be seen in the bead when the cracking generates at the welding metal. It is difficult to determine whether the black shadow is due to the cracking or not.

FIG. 69 (B) is a perspective view of the bead after the radiographic test on the welding bead with the stainless steel 18Cr8Ni subjected to the MIG arc welding method according to the present claim. The disturbance of the molten metal pool due to the periodic variation in the arc length causes the grain size to decrease. Accordingly, the black shadow shown in FIG. 69 (A) can not be seen. It is concluded that the pulse MIG arc welding method according to the present invention causes the grain size of welded stainless steel to be small and prevents the generation of the cracking. The radiographic test does not produce the black shadow which may suggest the possible cracking.

Figure 70:
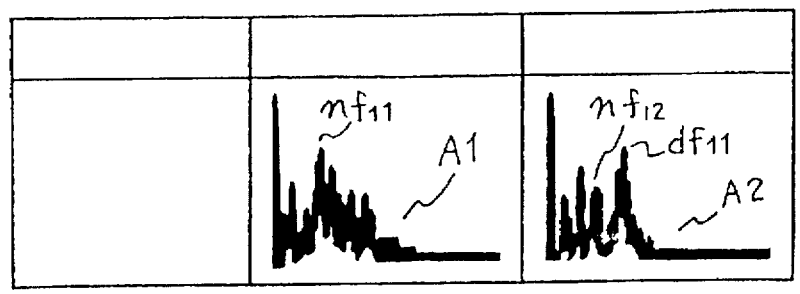
FIG. 70 (A) and (B) indicate waveforms of echo of the ultrasonic defect finding test carried out on materials by a conventional MIG welding method and the welding method of a preferred embodiment of the present invention.
Figure 70:
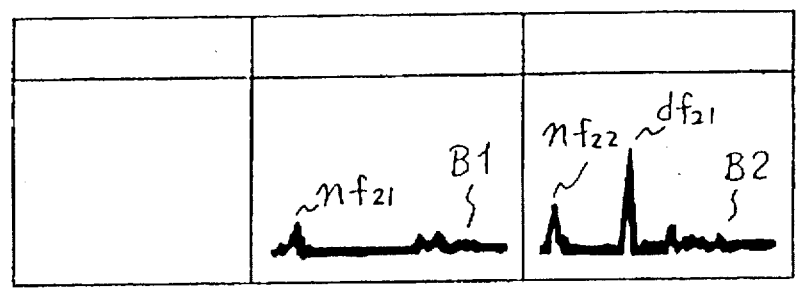

Description of FIG. 70

FIG. 70 (A) is a graph showing a echo figure of the ultrasonic test on the 18–8 stainless steel subjected to the conventional MIG welding method. It is seen from FIG. 70 (A) that the sample having no defect due to the welding shows various peaks nf11 whereas the sample having the defect prepared in advance to the test shows the various peaks nf12 ad df11. The peak df11 seems to be corresponding to the defect but the peaks nf12 has no reason to appear and makes the ultrasonic test uncertain. The detection accuracy for the defect is very low.

On the other hand, FIG. 70 (B) is a graph showing an echo figure of the ultrasonic test on the 18–8 stainless steel subjected to the pulse MIG arc welding method described above. It is seen from FIG. 70 (B) that the sample having no defect shows an echo figure showing a slight peak nf21 whereas the sample having a defect prepared in advance to the test shows a peak df21 corresponding clearly to the defect and a slight peak nf22. The slight peak nf21 and nf22 may be resulted from the fine grain size and are apparently different from the large peak df21 in the height. Therefore, the defect due to the welding can be clearly detected by the radiographic test in connection with the pulse MIG arc welding method.

Figure 71:
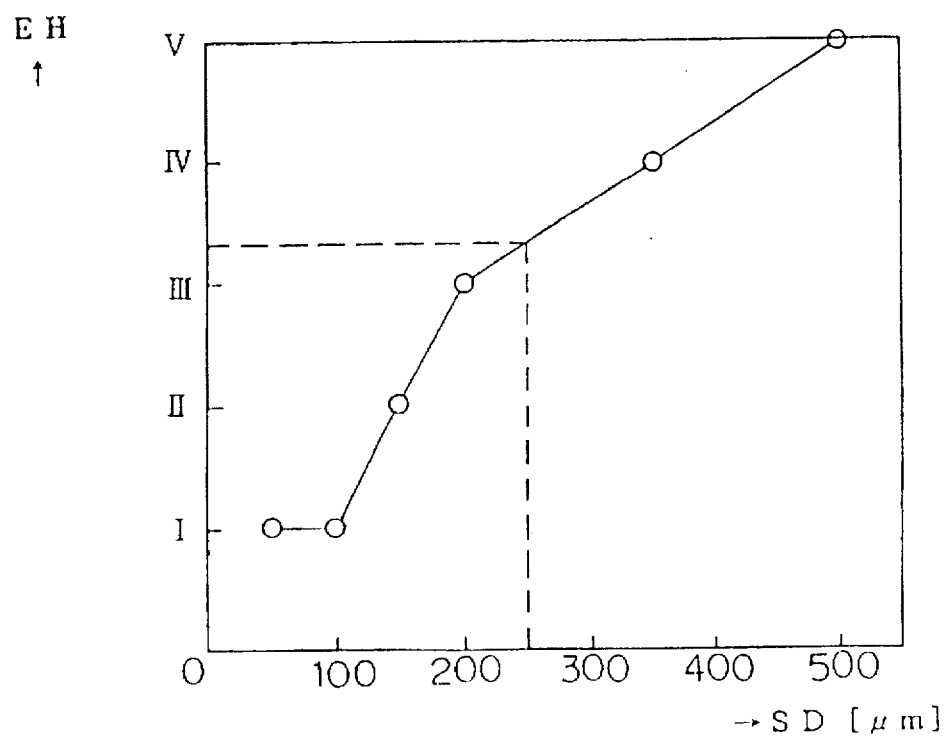
FIG. 71 is a graph showing the relationship between an average crystal grain size SD and a height of the echo in connection with the welding method of a preferred embodiment of the present invention.

Description of FIG. 71

FIG. 71 is a graph showing the relationship between the level range I to V for the echo height EH detected in accordance with the JIS (Japanese Industrial Standard) Z3060 (vertical axis) and the average grain size SD micro millimeter (horizontal axis). The range III is a standard of echo height for determining the class in accordance with JIS Z3060. The echo height higher than that of the range III appears at a grain size larger than 300 micro millimeter. When the average grain size is higher than 250 micron millimeter, the bead has the a long stray crystal generated at the center thereof. The radiographic test on such a sample detects a black shadow df1 to df3 along with the stray crystal and decreases the detection accuracy on the defect.

Figure 72:
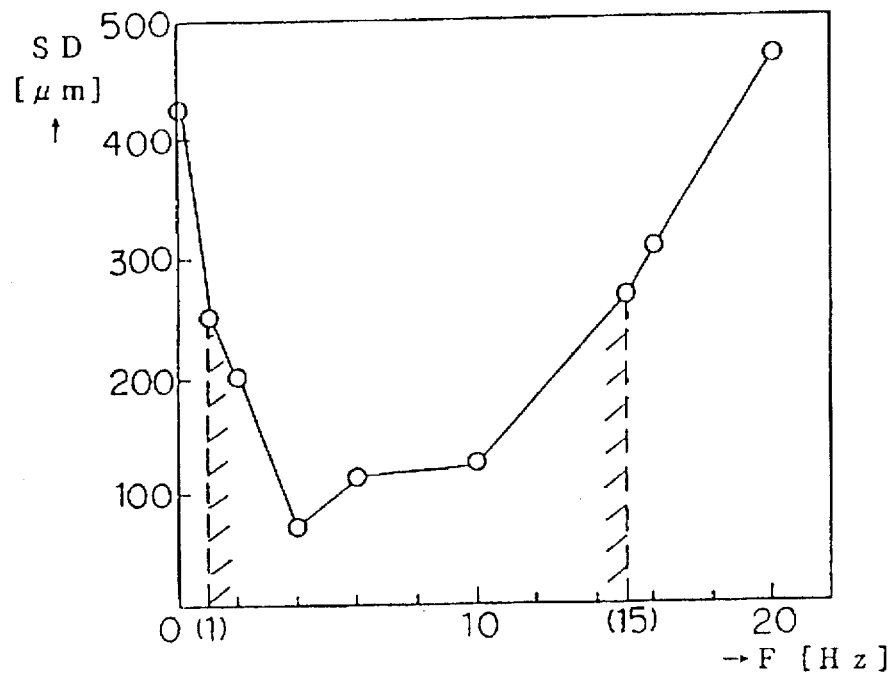
FIG. 72 is a graph showing the relationship between a switching frequency F and an average crystal grain size SD in connection with the welding method of a preferred embodiment of the present invention.

Description of FIG. 72

FIG. 72 is a graph showing the relationship between the switching frequency F Hz (horizontal axis) and the average grain size micron millimeter in connection with the welding condition the same as that of FIG. 71. It is clear from FIG. 72 that the switching frequency of 4 Hz shows the minimum grain size while the frequency range lower than 1 Hz or more than 15 Hz generates the average grain size more than 300 micron millimeter. The average grain size more than 300 micron millimeter causes the non-destructive test such as radiographic test and the ultrasonic test to decrease the accuracy.

Figure 73:
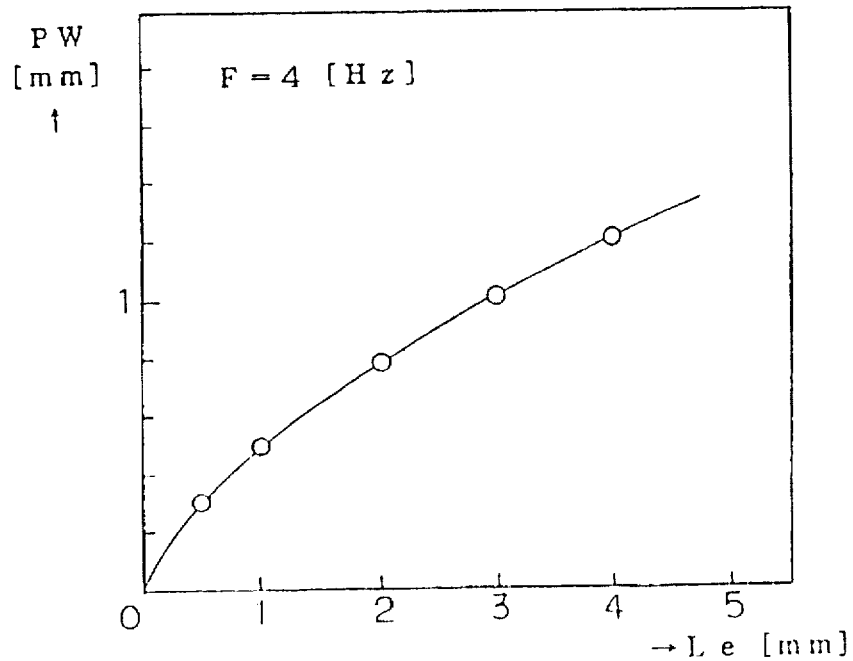
FIG. 73 is a graph showing the relationship between an arc length variation value Le and an amplitude PW of the vibration of the molten pool in connection with the welding method of a preferred embodiment of the present invention.

Description of FIG. 73

FIG. 73 is a graph showing the relationship between the variation value of the arc length Le mm (horizontal axis) and the vibration width of molten metal pool PW mm (vertical axis). The welding is carried out by switching the pulse current with the switching frequency 4 Hz. As shown in FIG. 73, an increase in the variation value of the arc length Le results in the increase in the vibration width of the molten metal pool.

Figure 74:
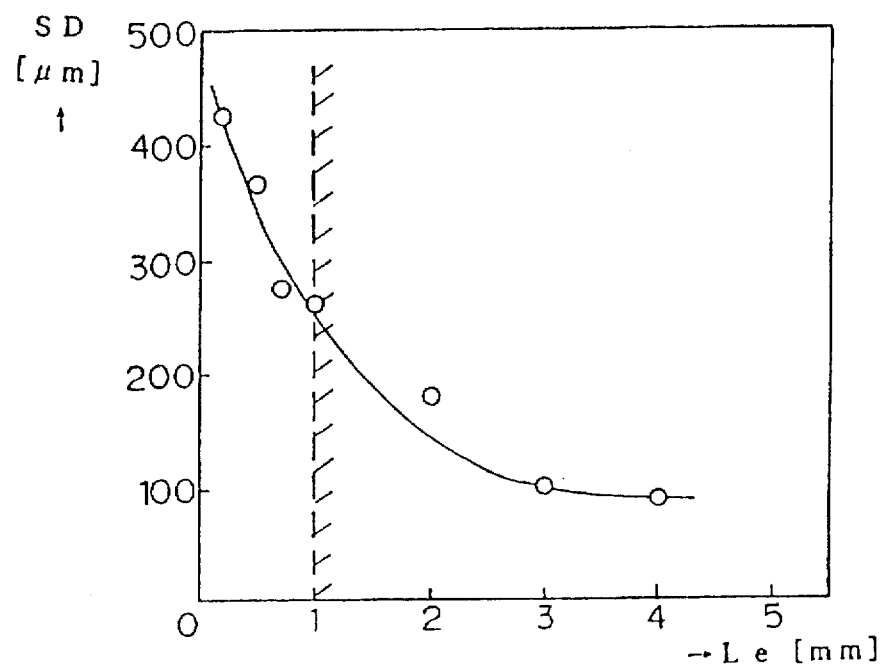
FIG. 74 is a graph showing the relationship between an arc length variation value Le and an average crystal grain size SD in connection with the welding method of a preferred embodiment of the present invention.

Description of FIG. 74

FIG. 74 is a graph showing the relationship between the variation value of the arc length Le mm (horizontal axis) and the average grain size micro millimeter (vertical axis). The welding is carried out by switching the pulse current with the switching frequency 4 Hz. As shown in FIG. 73, an increase in the variation value of the arc length Le results in the decrease in the average grain size due to the increased disturbance of the molten metal pool. The variation value in the arc length Le is less than 1 micron millimeter shows the average grain size higher than 250 micron millimeter. The average grain size higher than 300 micron millimeter causes the non-destructive test to decrease in the accuracy and also generates more frequently the cracking. Therefore, it is necessary for the grain size more than to 300 micron millimeter obtain the variation value in the arc length more than 1 micron millimeter.

Figure 75:
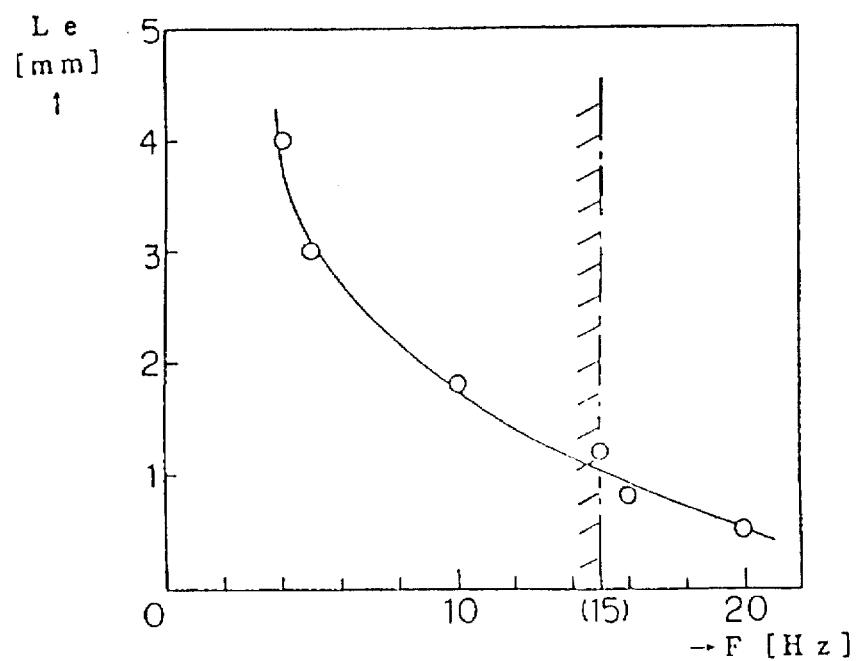
FIG. 75 is a graph showing the relationship between a switching frequency F and an arc length variation value Le in connection with the welding method of a preferred embodiment of the present invention.

Description of FIG. 75

FIG. 75 is a graph showing the relationship between the switching frequency Hz (horizontal axis) and the variation in the arc length Le mm (vertical axis). As shown in FIG. 74, it is necessary for the grain size more than 300 micron millimeter to obtain the variation value in the arc length more than 1 micron millimeter. As a result, the switching frequency must be lower than 15 Hz. With the switching frequency more than 15 Hz, it is difficult for the variation in the extension length at the terminal of the molten metal to follow the switching frequency. In such a way, the average grain size SD lower than 250 micron millimeter requires the frequency more than 1 Hz as mentioned with FIG. 72. Hence, it is necessary to keep the switching frequency within 1 to 15 Hz and the variation value in the arc length more than 1 mm.

Figure 76:
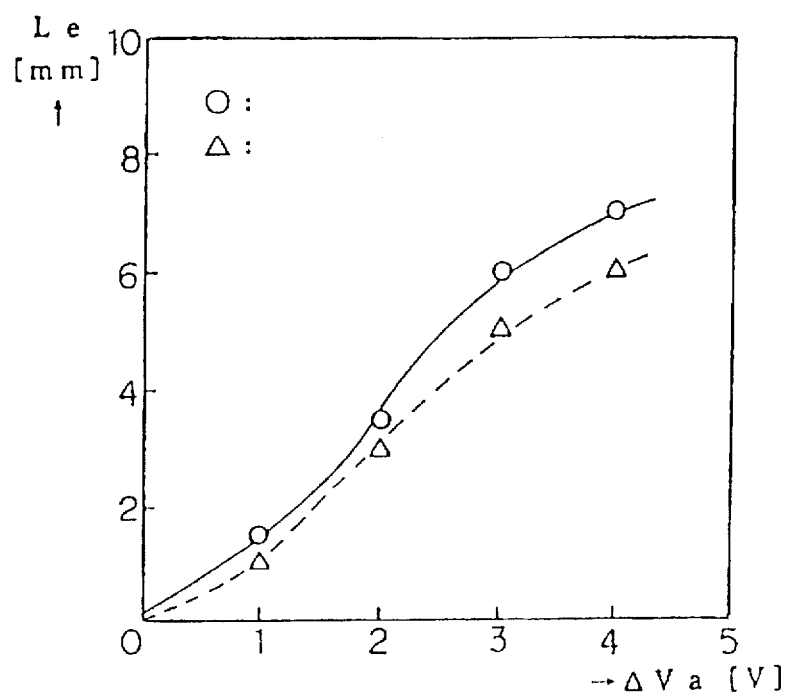
FIG. 76 is a graph showing the relationship between an arc voltage variation value ΔVa and an arc length variation value Le in connection with the welding method without using the pulse.

Description of FIG. 76

FIG. 76 is a graph showing the relationship between the variation value in the arc voltage ΔVa V (horizontal axis) and the variation value of the arc length Le mm (vertical axis) at the MIG arc welding without pulse. The welding condition is; the welding electric current=200 A, the first arc voltage=23 V and the arc length Feibush mm at the first welding condition with a given constant rate of feeding of stainless steel SUS 308 of 1.0 mm diameter. The relation between the variation value in the arc voltage ΔVa V and the variation value in the arc length Le at the second welding condition is shown by a dotted line and Δ symbol. The stainless steel SUS 308 in a diameter of 1.2 mm is fed at a given constant rate. The first welding condition is; the welding current=250 A, the first arc voltage=25 V and the arc length Feibush mm. The relation between the variation in the arc voltage ΔVa V and the variation value in the arc length Le at the second welding condition is shown by a solid line and a open circle. The arc length is changed within the spray transfer range since the first and the second welding conditions are provided with the welding current higher than the critical value Ic.

Figure 77:
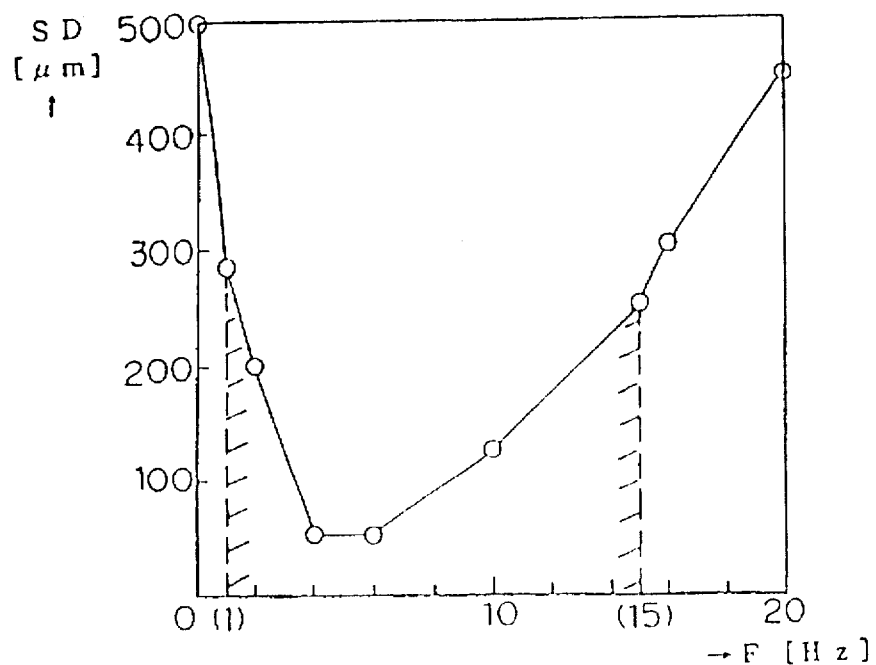
FIG. 77 is a graph showing the relationship between a switching frequency F and an average crystal grain size SD in connection with the welding method without using the pulse.

Description of FIG. 77

FIG. 77 is a graph showing the relationship between the switching frequency F Hz (horizontal axis) and the average grain size SD micron millimeter (vertical axis) at the MIG arc welding without pulse. The welding condition is that the welding electric current=200 A, the first arc voltage=23 V and the arc length Feibush mm at the first welding condition with a given constant rate of feeding of stainless steel SUS 308 of 1.0 mm diameter. The second welding condition is in an arc voltage of 26 V. It is clear from FIG. 77 that the switching frequency of 4 Hz shows the minimum grain size while the frequency range lower than 1 Hz or more than 15 Hz generates the average grain size more than 300 micron millimeter in a similar way to that of FIG. 72. The average grain size more than 300 micron millimeter causes the non-destructive test such as radiographic test and the ultrasonic test to decrease the accuracy.

The welding method also prevents the generation of porosity by stirring the molten aluminum pool under the welding condition that the switching frequency is 0.5 to 25 Hz and the variation in the arc length Le is more than 1 mm.

Figure 78:
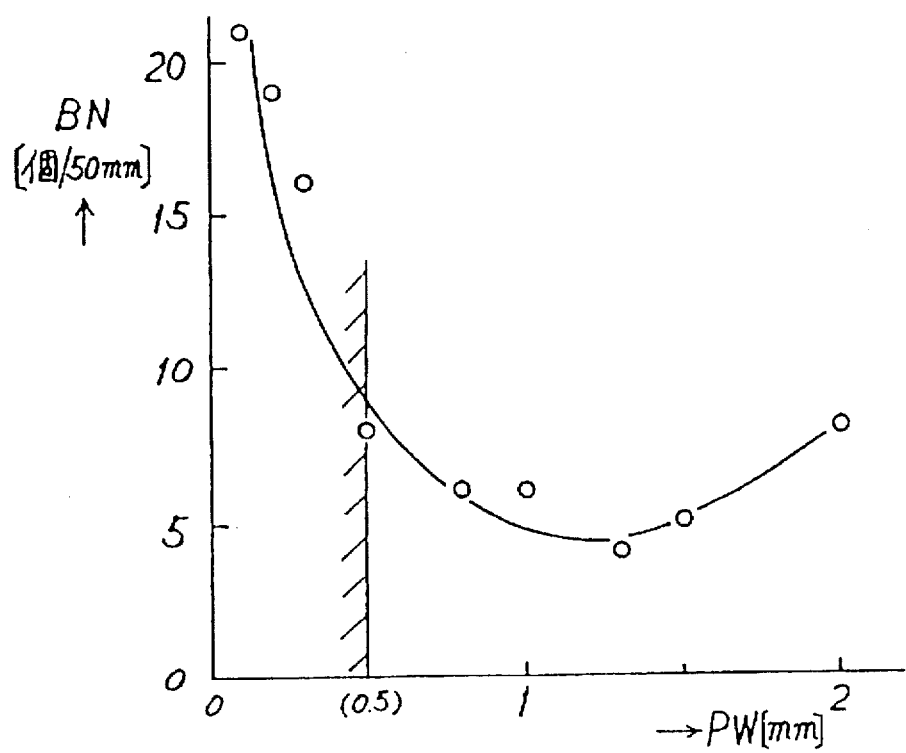
FIG. 78 is a graph showing the relationship between an amplitude PW of the vibration of the molten pool and the number of pores BN per 50 mm of welding length in connection with the welding method without using the pulse.

Description of FIG. 78

FIG. 78 is a graph showing the relationship between the molten metal pool width Pw mm (horizontal axis) and a number of porosity (pieces/50 mm) at the welding length of 50 mm (vertical axis) with the welding having the pulse current to flow. It is clear from FIG. 78 that the molten metal pool width PW lower than 0.5 mm shows a rapid increase in the porosity. The decrease in the porosity requires the molten metal pool width larger than 0.5 mm. The welding condition for the data in FIG. 78 is that aluminum plate is welded in an argon gas including intentionally 0.1% of hydrogen by using aluminum wire of 1.6 mm diameter for a purpose to determine the number of porosity.

At this time the first pulse current group P1 is that the first pulse current IP1=280 A, the first pulse duration TP1=1.2 ms, the first base current value IB1=30 A, the pulse frequency=about 100 Hz. The second pulse current group P2 is in a condition; the second pulse current value=300 A, the second pulse duration TP=2.0 ms, the second base current value IB2=30 A and the pulse frequency=70 Hz. The first pulse current group P1 and the second pulse current group P2 are switched periodically to each other at the switching frequency 4 Hz. At the pulse current duty time, the first arc voltage value Va1 and the second arc voltage Va2 are 17.5 V and 20 V, respectively, and the arc length variation value Le is 3.5 mm.

Figure 79:
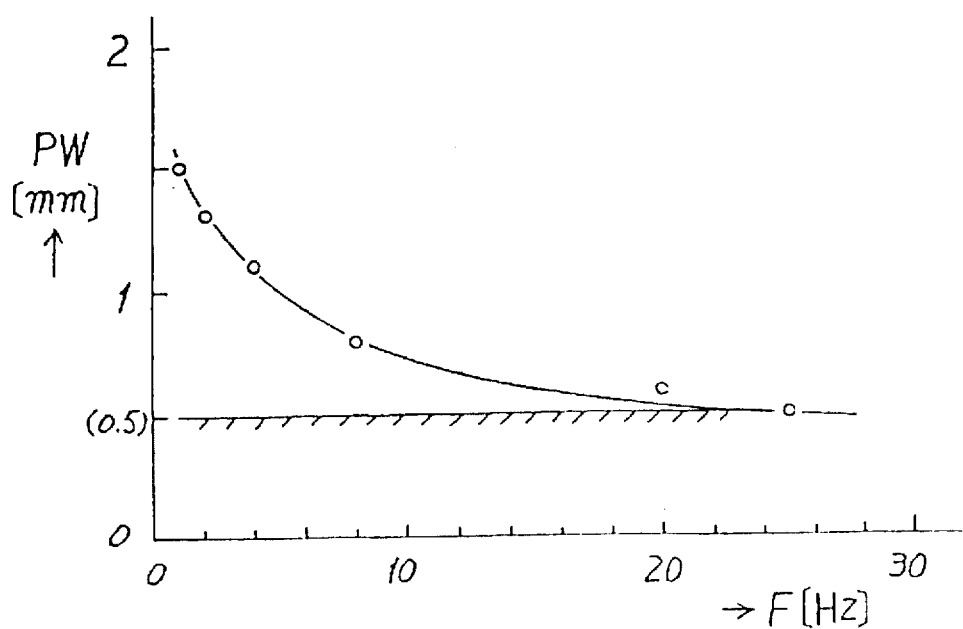
FIG. 79 is a graph showing the relationship between a switching frequency F and an amplitude PW of the vibration of the molten pool in connection with the welding method of a preferred embodiment of the present invention.
Figure 80:
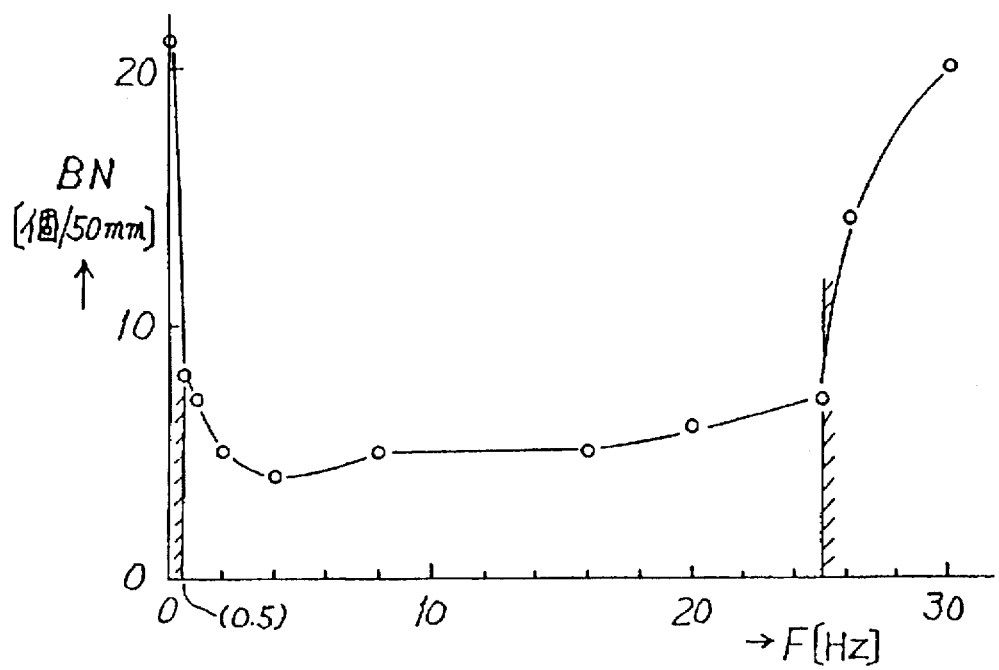
FIG. 80 is a graph showing the relationship between a switching frequency F and the number of pores BN per 50 mm of welding length in connection with the welding method of a preferred embodiment of the present invention.
Figure 81:
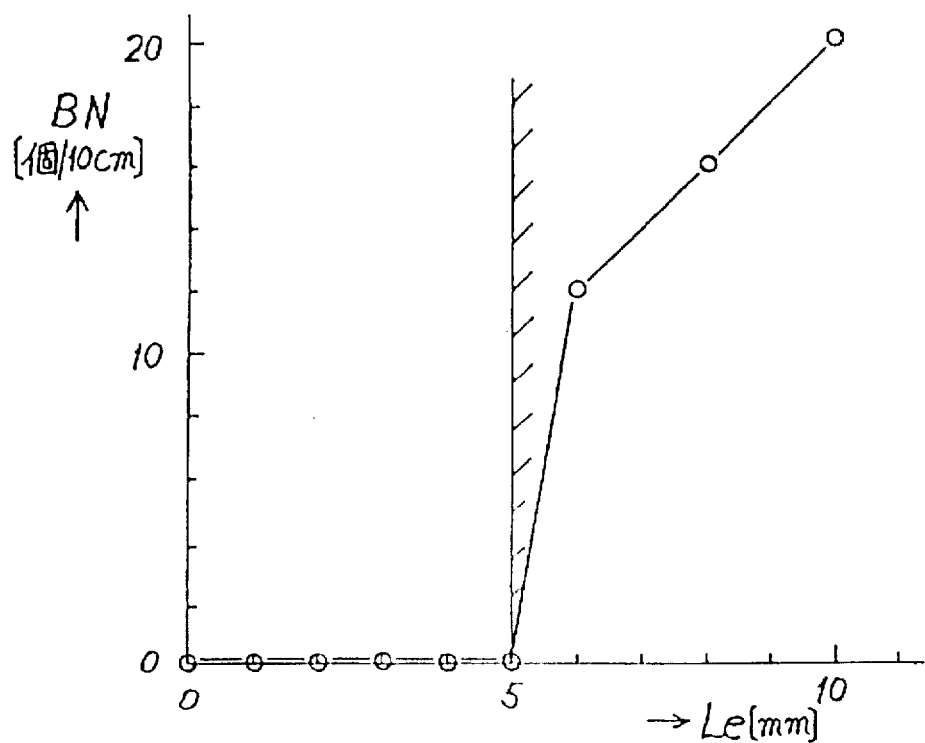
FIG. 81 is a graph showing the relationship between an arc length variation value Le and the number of pores BN per 10 cm of welding length in connection with the welding method of a preferred embodiment of the present invention.

Description of FIGS. 79 to 81

FIG. 79 is a graph showing the relationship between the switching frequency F Hz (horizontal axis) and the molten metal pool width PW mm (vertical axis) with the welding energized by the pulse current. It is seen from FIG. 79 that the molten metal pool width higher than 0.5 mm requires the switching frequency F Hz lower than 25 Hz.

FIG. 80 is a graph showing the relationship between the switching frequency F Hz (horizontal axis) and the number of porosity (vertical axis) at the welding length of 50 mm BN (pieces/50 mm) when the welding is carried out at the same condition as that of FIG. 79. As shown in FIG. 80, the number of porosity increases rapidly with the switching frequency lower than 0.5 Hz or higher than 25 Hz. A small number of porosity can be obtained by keeping the switching frequency between 0.5 and 25 Hz. The switching frequency lower than 0.5 Hz can not vibrate the molten metal pool. On the other hand, the switching frequency higher than 25 Hz causes the variation in the molten metal length at the terminal of the wire extension length not to follow the frequency F.

FIG. 81 is a graph showing the relationship between the number of the porosity at the welding length of 10 mm m BN (pieces/10 mm m) (vertical axis) and the variation in the arc length Le mm (horizontal axis) when aluminum alloy A5052 plate in a thickness of 3 mm is welded with aluminum alloy wire in a diameter of 1.2 mm. At this time, the condition is in the following; the average value of the welding current Ia=100 A, the average value of the arc voltage Va=19 V and the switching frequency=0.5 to 2 Hz. It is clear from FIG. 81 that the variation value of the arc length Le more than 5 mm causes a rapid increase in the number of the porosity. This comes from the following the reason: In connection with the gas sealed nozzle 5 commercially available, the arc length is set to a short size of 3 mm for the purpose of preventing the short circuit. The variation value in the arc length more than 5 mm results in the arc length more than 8 mm. The terminal 1a of the wire reaches the vicinity of the gas sealed nozzle and disturbs the gas sealed atmosphere. The insufficient gas sealed atmosphere causes the generation of the porosity. Therefore, it is suitable to keep the variation in the arc length Le lower than 5 mm.

Figure 82:
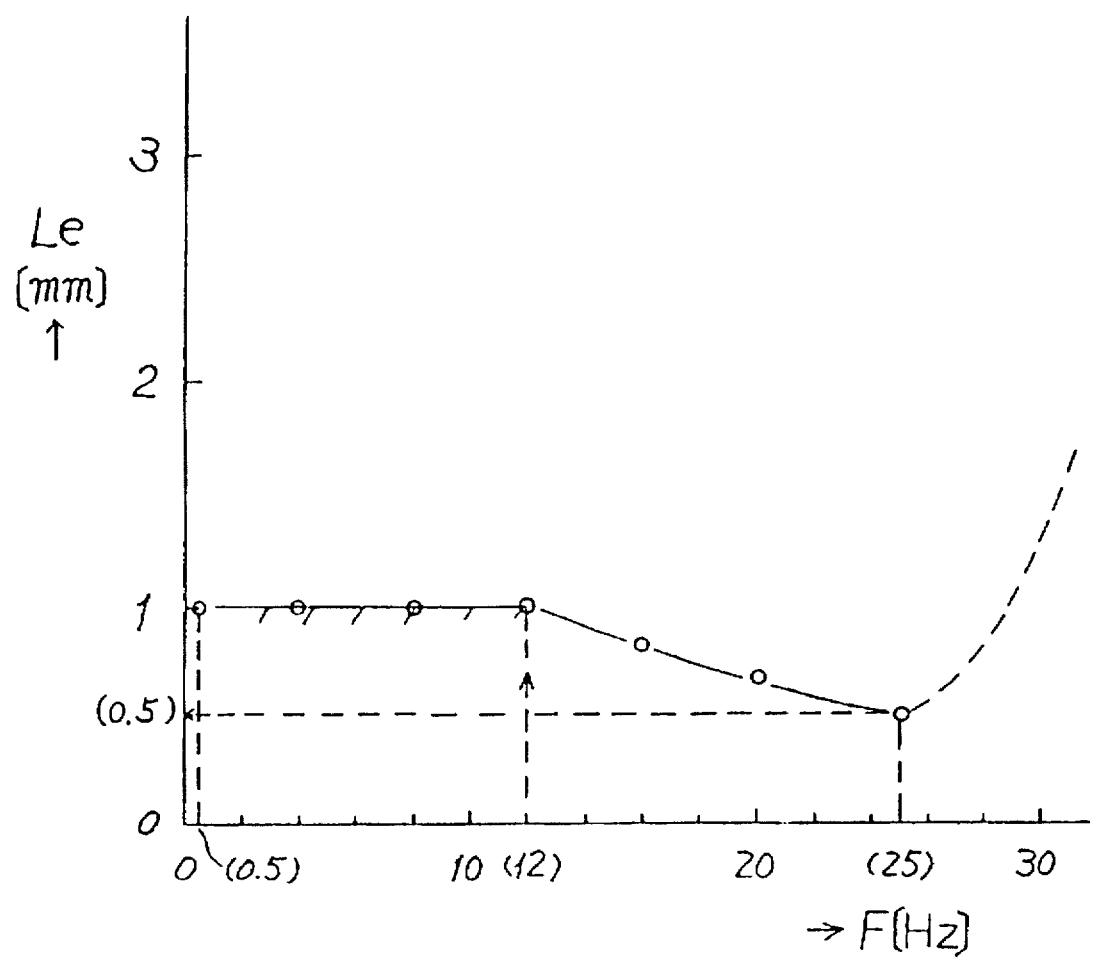
FIG. 82 is a graph showing the relationship between an arc length variation value Le and a switching frequency F in order to generate the amplitude PW of the molten pool in a size more than 0.5 mm in connection with the welding method of a preferred embodiment of the present invention.

FIG. 82 is a graph showing the relation between the switching frequency F Hz necessary for obtaining the vibration width of the molten metal pool more than 0.5 mm (horizontal axis) and the variation value of arc length Le (vertical axis). It is seen that the molten metal pool vibration width more than 0.5 mm can be obtained at the range upper the curve by the welding method according to claim 29. At the range of switching frequency F=0.5 to F=12 Hz, the variation in the arc length Le is required to be more than 1 mm and at the range of switching frequency F=25 Hz, the variation in the arc length Le is required to be more than 0.5 mm. It is necessary that the variation value in the arc length Le is more than 0.5 mm and is less than 5 mm in accordance with the description in FIG. 81. The arc welding method accordingly requires the switching frequency to be 0.5 to 25 Hz. It is necessary to keep the variation value in the arc length Le in a range more than 0.5 mm and less than 5 mm in accordance with the increase in the switching frequency.

In FIG. 82, the variation value in the arc length Le necessary for obtaining the molten metal pool width more than 0.5 mm is 1 mm at a range of switching frequency F less than 12 Hz and then is smaller with the increase in the switching frequency. However it is possible to obtain the molten metal pool width more than 0.5 mm at the increased frequency range. This may be resulted from the following reason: With reference to FIG. 81, the welding condition is set to the following; the average value of the welding current Ia=100 A, the average value of the welding voltage Va=19 V and welding speed WS=40 cm/min. As a results, the molten metal pool diameter is about 1 cm. The relationship between the molten metal pool diameter and the resonance frequency of the metal Fr can be expressed by the following equation 1:

$$Fr = (\text{surface tension/density} \times \text{diameter of molten metal pool})^{1/2}$$

Aluminum has a surface tension of 900 dyn/cm and density of 2.5 g/cc. The Fr can be calculated from the equation 1 for the molten metal pool diameter of 1 cm, Fr=19 Hz This is a resonance frequency of the molten aluminum pool. When the switching frequency is equivalent to this Fr, a slight variation value in the arc length Le permits the molten aluminum pool to vibrate in a considerably large degree.

As a practical matter, the usual MIG welding method can produce the resonance frequency of molten metal pool of about 10 to 25 Hz. Hence, the switching frequency of 10 to 25 Hz permits the molten metal pool to vibrate easily. However, it is necessary to change forcedly the arc length in a large degree for the purpose of vibrating the molten metal pool with the switching frequency other than 10 to 25 Hz. The switching frequency less than 10 Hz permits the arc length to vary easily in a large degree. However, at the switching frequency higher than 25 Hz, it is necessary for the vibration of the molten metal pool to obtain the large variation value in the arc length Le. As a practical matter, the variation in the molten metal length at the wire extension length can not follow the switching frequency. Therefore, it is concluded that the suitable switching frequency is 0.5 to 25 Hz.

Welding apparatus according to the present invention

The general structure of the welding apparatus is based on a pulse MAG welding apparatus capable of switching between the first pulse current group to obtain the first arc length Lt and the second current group to obtain the second arc length Left and right with a switching signal according to the present invention.

The welding apparatus of the present invention comprises the following functions: An arc voltage control circuit comprises the arc voltage detection circuit VD for outputting the arc voltage detection signal Vd upon detecting the arc voltage, and a comparator CM2 outputting an arc voltage control signal Cm2 from the difference between the arc voltage detection signal Vd and the arc voltage switching signal S6 obtained by switching between the arc voltage setting signal Vs1 and the second arc voltage setting signal Vs2 or the first arc voltage setting signal Vs1.

A pulse base current control circuit outputs the pulse base current control signal controlling the pulse frequency f3 corresponding to the arc voltage control signal Cm2, the pulse duration TP3, the base current value IB3 or the pulse current value IP3.

A first pulse base current setting circuit outputs the first pulse base current setting signal setting three conditions excluding the condition to control with the pulse base current control signal among the four conditions of the pulse current value, pulse duration, the pulse frequency and the base current of the first pulse current group. A second pulse base current setting circuit outputs the second pulse base current setting signal setting three conditions excluding the condition to control with the pulse base current control signal among the four conditions of the pulse current value, pulse duration, the pulse frequency and the base current of the second pulse current group.

A switching circuit HL outputs the switching signal H2 under switching with the switching frequency f=0.5 to 25 Hz.

A plurality of switching setting circuit outputs the arc voltage switching signal S6 obtained by switching the first arc voltage setting signal Vs1 and the second arc voltage setting signal Vs2 with a switching signal H1, a switching setting signal obtained by switching the first pulse base current setting signal and the second pulse base current setting signal with a switching signal H1 or both of these signals. A pulse control signal generator outputs the first pulse control signal Pf1 and the second pulse control signal Pf2 upon receiving the pulse base current control signal and the switching setting signal. A welding power control circuit outputs the first pulse current group upon receiving the first pulse control signal Pf1 and the second pulse control signal Pf2 upon receiving the second pulse control signal Pf2.

Described hereinbelow are three cases of the present invention when the arc voltage is controlled by the pulse frequency. A pulse base current control circuit for outputting the pulse base control signal comprises a pulse frequency control signal generator Vf3 for outputting a pulse frequency control signal controlling the pulse frequency f3. The first pulse current setting circuit for outputting the first pulse base current setting signal comprises the pulse current setting circuit IP1 for setting the pulse current value setting signal Ip1, the pulse duration setting circuit TP1 for setting the pulse duration setting signal Tp1, and a base current setting circuit IB1 for setting the base current setting signal Ib1.

The welding apparatus according to a first embodiment is a pulse MAG welding apparatus comprising the following functions: A second pulse base current setting circuit for outputting the second pulse base current setting signal comprises a second pulse current value setting circuit IP2 for setting the second pulse current value setting signal Ip2, a pulse duration setting circuit TP1 for setting a pulse duration setting signal Tp1 and a base current setting circuit IB1 for setting a base current setting signal Ib1.

A switching setting circuit for outputting a switching setting signal comprises a pulse current value switching circuit SW1 for outputting a switching pulse current value signal S1 obtained by switching between the pulse current value setting signal Ip1 and the second pulse current setting signal Ip2. A pulse control signal generator for receiving pulse base current control signal and the switching setting signal comprises a pulse frequency signal generator circuit VF3 for outputting the pulse frequency control signal Vf3 upon receiving the arc voltage control signal Cm2, a pulse duration frequency signal generator DF3 for outputting the first pulse duration frequency signal Df3 consisting of the pulse frequency signal Vf3 and the first pulse duration signal Tp1 and a base pulse current switching circuit SW5 for switching between the pulse current value switching signal S1 and the base current setting signal Ib1 with the pulse duration frequency signal Df3.

Figure 83:
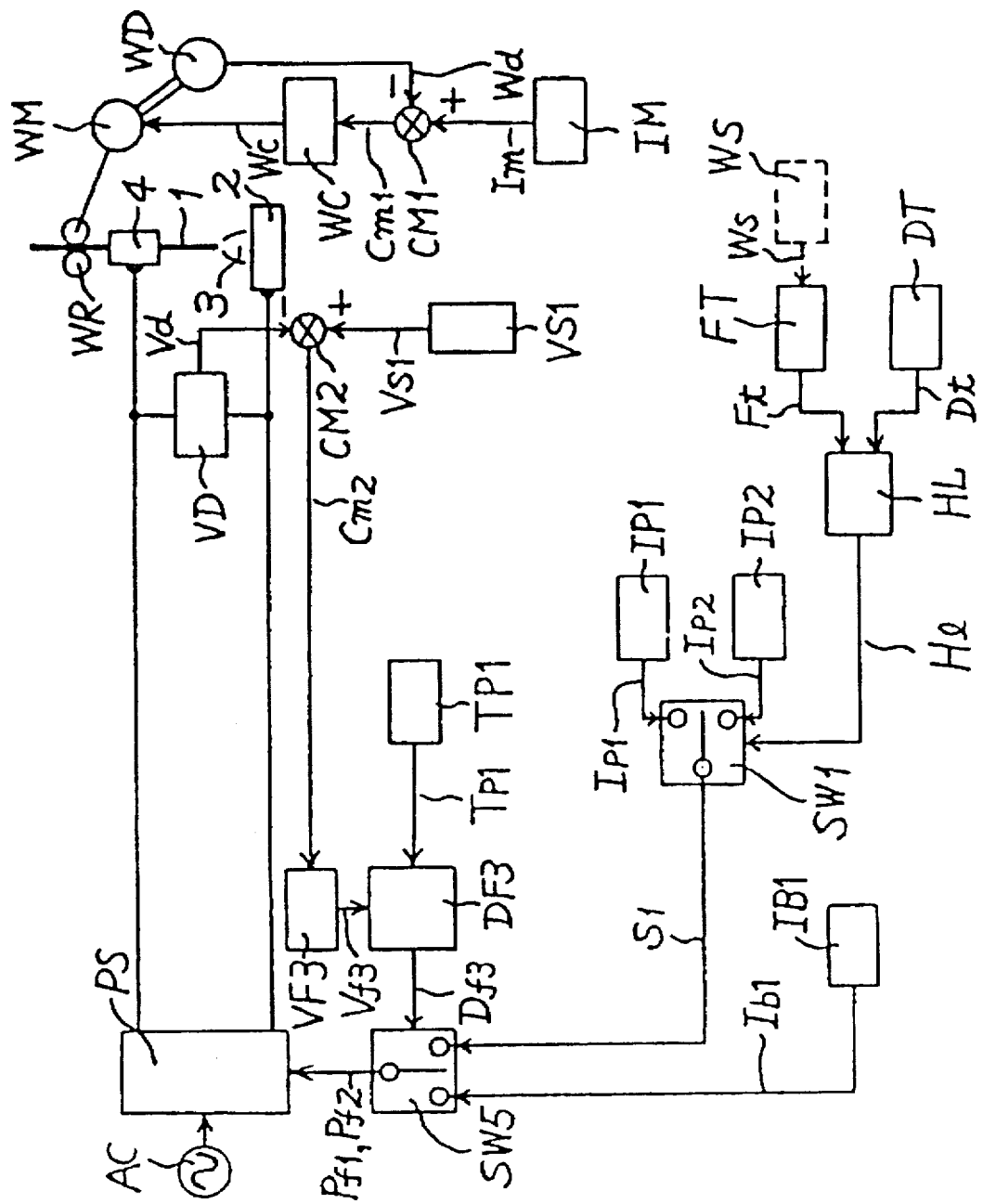
FIG. 83 is a block diagram of the first embodiment of the welding apparatus wherein the arc voltage is controlled by pulse frequency.

Description of FIG. 83

Figure 92:
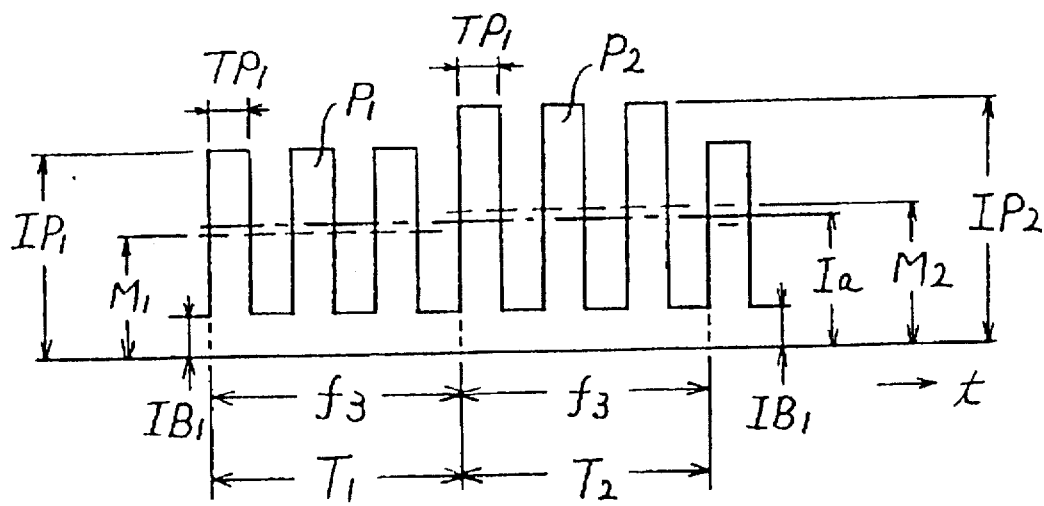
FIG. 92 shows a waveform of the output current of the welding apparatus shown in the block diagram of FIG. 83.

FIG. 83 is a block diagram of the first embodiment of the welding method having the welding waveform shown in FIG. 92 of the present invention.

In FIG. 83, a welding power control circuit PS having the power supplied from the commercial AC electric supplier supplies the power between a power supplying tip 4 of a consumable electrode 1 and a welding material 2, and generates an arc 3. The consumable electrode 1 is fed by a wire feeding roller Wr rotated with a wire feeding motor WM. A wire feeding rate control circuit WC receives a wire feeding rate control signal Cm1 from a wire feeding rate comparing circuit (the first comparison circuit hereinafter) to compare a signal Im described later with a feeding rate detection signal Wd of a wire feeding rate detection circuit WD of a wire feeding motor WM and sends a wire feeding motor WM a wire feeding rate control signal Wc. The arc voltage setting circuit VS1 is to set the arc voltage and outputs an arc voltage setting signal Vs1. A second caparison circuit CM2 outputs an arc voltage control signal Cm2 from the difference between the arc voltage setting signal Vs1 and the arc voltage detection signal Vd of the arc voltage detection circuit VD. A duty frequency setting circuit FT is to set a switching frequency F of a switching signal H1 to switch between the first pulse duty time T1 and the second pulse duty Time T2, and outputs a duty frequency signal Ft which is suitably in a range from 0.5 to 25 Hz. The welding speed is in a close relation with the switching frequency F to obtain a suitable welding result. The switching circuit HL receives a duty frequency signal F corresponding to the welding speed after the duty frequency setting circuit Ft receives the welding speed setting signal Ws of the welding speed setting circuit WS. A duty ratio setting circuit DT is to set a ratio of the second pulse duty time T2 at the second welding condition to the first pulse duty time T1 at the first welding condition and outputs a duty ratio signal Dt. The switching signal generator HL outputs a switching signal H1 to switch periodically between the first pulse duty time T1 and the second pulse duty time T2 upon receiving the signal Ft and the signal Dr. The first pulse current value setting circuit IP1 and the second pulse current value setting circuit IP2 output the first pulse current value setting signal Ip1 and the second pulse current value setting signal Ip2, respectively. The circuit SW1 outputs a pulse current switching signal S1 obtained by switching between the signals Ip1 and Ip2 with a switching signal H1.

A pulse frequency signal VF3 outputs a pulse frequency control signal Vf3 in accordance with the arc voltage control signal Cm2. The pulse duration frequency control signal generator DF3 outputs a pulse duration frequency control signal Df3 consisting of a pulse duration setting signal Tp1 and the pulse frequency control signal Vf3. A pulse base current switching circuit SW5 outputs a pulse control signal Pf1 obtained by switching, with a pulse duration frequency control signal Df3, between a pulse current switching signal Ip1 of the first welding condition and a base current setting signal Ib1 at the first welding condition, and a pulse control signal Pf2 obtained by switching, with a pulse duration frequency control signal Df3, between a pulse current switching signal Ip2 of the second welding condition and a base current setting signal Ib1 at the second welding condition. Both signals Pf1 and Pf2 are inputted to the welding power control circuit PS.

Description of FIG. 92

In FIG. 92, reference characters P1, P1, . . . P1 denote a first pulse current group consisting of a first pulse current value IP1, a first pulse duration TP1, a first pulse frequency f3 and a first base current IB1. Reference characters P2, P2 . . . . P2 denote a second pulse current group consisting of a second pulse current value IP2, a second pulse duration TP1 the same as the first pulse duration, a second pulse frequency f3 the same as the first pulse frequency and a second base current IB1 the same as the first base current. The first pulse duty time T1 and the second pulse duty time Y2 are switched to each other with the switching signal H1 at a switching period T1+T2 of a low frequency of, for example, 0.5 to 25 Hz.

Reference characters M1 and M2 denote the average value of the welding current at the first and the second pulse duty times T1 and T2, respectively, reference character Ia denotes an average value of the welding current.

The welding apparatus according to a second embodiment is a pulse MAG welding apparatus comprising the following functions: A second pulse base current setting circuit for outputting the second pulse base current setting signal comprises a pulse current value setting circuit IP1 for setting the pulse current value setting signal Ip1, a second pulse duration setting circuit TP2 for setting a second pulse duration setting signal Tp2 and a base current setting circuit IB1 for setting a base current setting signal Ib1.

A switching setting circuit for outputting a switching setting signal comprises a pulse current value switching circuit SW2 for outputting a pulse duration switching signal S2 obtained by switching between the pulse duration setting signal Tp1 and the second pulse duration setting signal Tp2. A pulse control signal generator for receiving pulse base current control signal and the switching setting signal comprises a pulse frequency signal generator circuit VF3 for outputting the pulse frequency control signal Vf3 upon receiving the arc voltage control signal Cm2, a pulse duration frequency signal generator DF3 for outputting the first pulse duration frequency signal Df31 consisting of the pulse frequency signal Vf3 and the first pulse duration signal Tp1 and the second pulse duration frequency signal Df32 consisting of the pulse frequency signal Vf3 and the second pulse duration signal Tp2 and a base pulse current switching circuit SW5 for switching between the pulse current value setting signal IP1 and the base current setting signal Ib1 with the second pulse duration frequency signal Df32.

Figure 84:
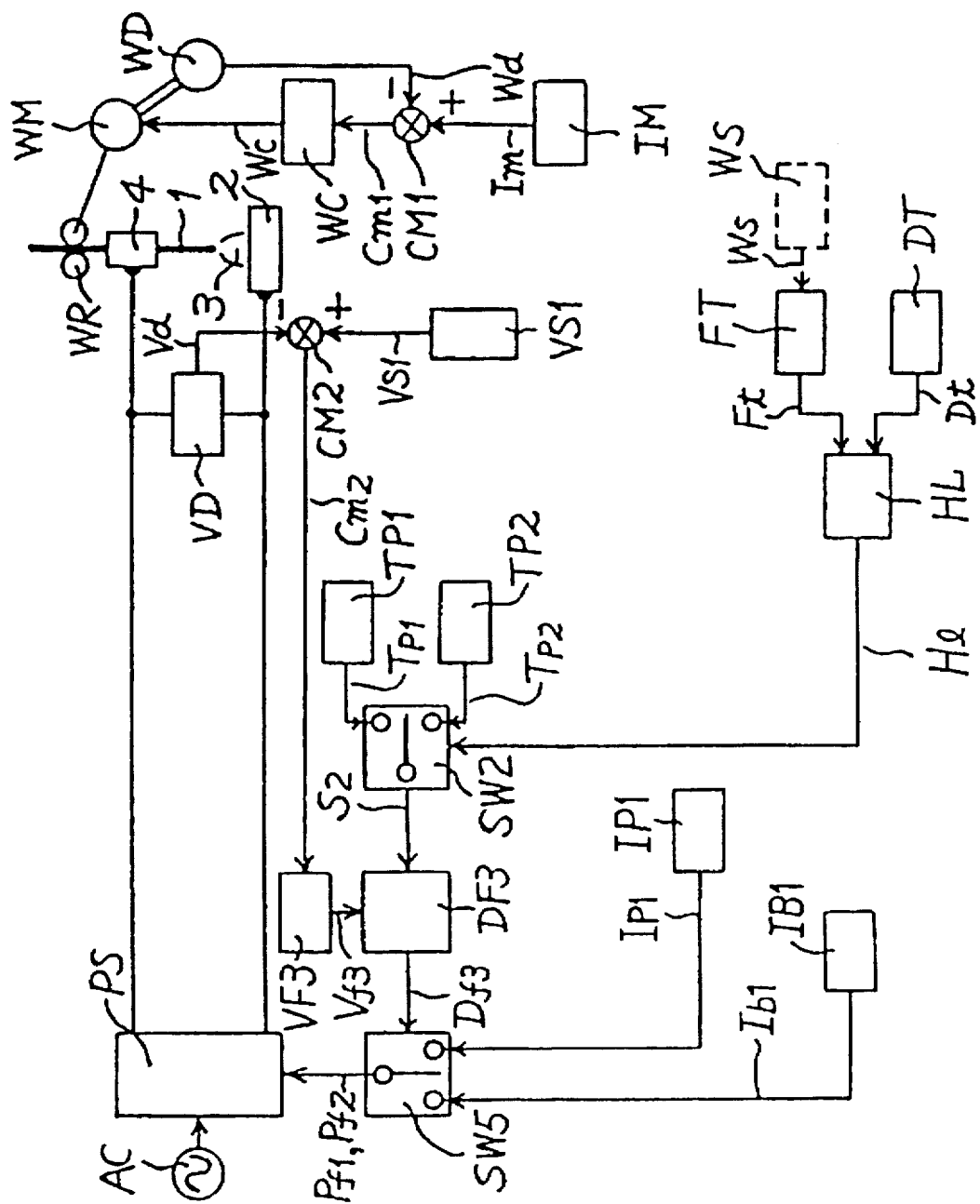
FIG. 84 is a block diagram of the second embodiment of the welding apparatus wherein the arc voltage is controlled by pulse frequency.
Figure 93:
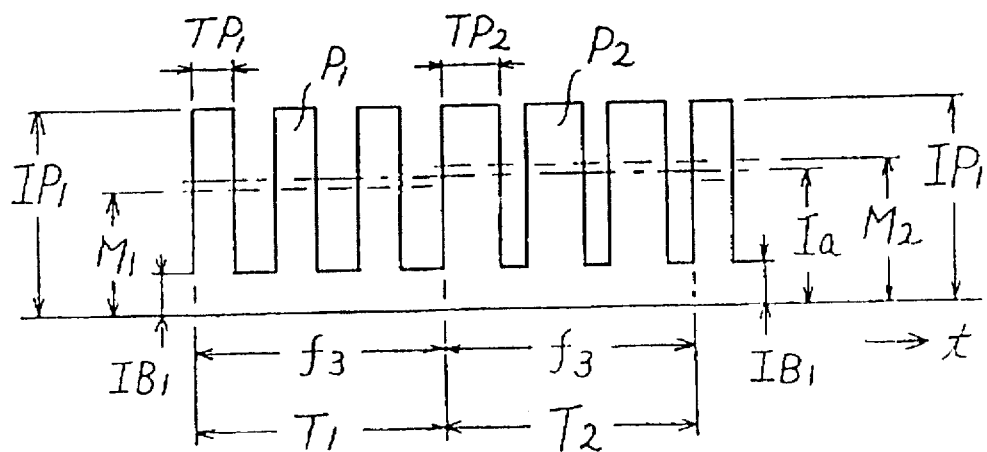
FIG. 93 shows a waveform of the output current of the welding apparatus shown in the block diagram of FIG. 84.

FIG. 84 is a block diagram of the second embodiment of the welding method having the welding waveform shown in FIG. 93.

In FIG. 84, the structures the same as those of FIG. 83 are denoted with the same characters the same as those of FIG. 83 and are omitted in the description. Only different points are described hereinbelow.

The first pulse duration setting circuit TP1 and the second pulse duration setting circuit TP2 output the first pulse duration setting signal Tp1 and the second pulse current duration setting signal Tp2, respectively. The circuit SW2 outputs a pulse duration switching signal S2 obtained by switching between the signals Tp1 and Tp2 with a switching signal H1.

A pulse frequency signal circuit VF3 outputs a pulse frequency control signal Vf3 in accordance with the arc voltage control signal Cm2. The pulse duration frequency control signal generator DF3 outputs a pulse duration frequency control signal Df31 consisting of a pulse duration setting signal Tp1 and the pulse frequency control signal Vf3 in accordance with the first welding condition and a second pulse duration frequency control signal Df32 consisting of a second pulse duration setting signal Tp2 and the pulse frequency control signal Vf3 in accordance with the second welding condition. A pulse base current switching circuit SW5 outputs a pulse control signal Pf1 obtained by switching, with a pulse duration frequency control signal Df3, between a pulse current switching signal Ip1 of the first welding condition and a base current setting signal Ib1 at the first welding condition, and a pulse control signal Pf2 obtained by switching, with a pulse duration frequency control signal Df3, between a pulse current switching signal Ip2 of the second welding condition and a base current setting signal Ib1 at the second welding condition. Both signals Pf1 and Pf2 are inputted to the welding power control circuit PS.

Description of FIG. 93

In FIG. 92, reference characters P2, P2, . . . P2 denote a second pulse current group consisting of a second pulse current value IP1 the same as the first pulse current value, a second pulse duration TP2, a second pulse frequency f3 the same as the first pulse frequency and a second base current IB1 the same as the first base current. Others are the same as those of FIG. 92 and should be omitted.

The welding apparatus according to a third embodiment is a pulse MAG welding apparatus comprising the following functions: A second pulse base current setting circuit for outputting the second pulse base current setting signal comprises a pulse current value setting circuit IP1 for setting the pulse current value setting signal Ip1, a first pulse duration setting circuit TP1 for setting a pulse duration setting signal Tp1 and a second base current setting circuit IB2 for setting a second base current setting Ib2.

A switching setting circuit for outputting a switching setting signal comprises a base current value switching circuit SW3 for outputting a base current switching signal S3 by switching between a first base current setting signal Ib1 and the second base current setting signal Ib2. A pulse control signal generator for receiving pulse base current control signal and the switching setting signal comprises a pulse frequency signal generator circuit VF3 for outputting the pulse frequency control signal Vf3 upon receiving the arc voltage control signal Cm2, a pulse duration frequency signal generator DF3 for outputting the first pulse duration frequency signal Df31 consisting of the pulse frequency signal Vf3 and the first pulse duration signal Tp1 and the pulse duration frequency signal Df3 consisting of the pulse frequency signal Vf3 and the pulse duration signal Tp1 and a base pulse current switching circuit SW5 for switching between the pulse current value setting signal IP1 and the base current switching signal S3 with the pulse duration frequency signal Df3.

Figure 85:
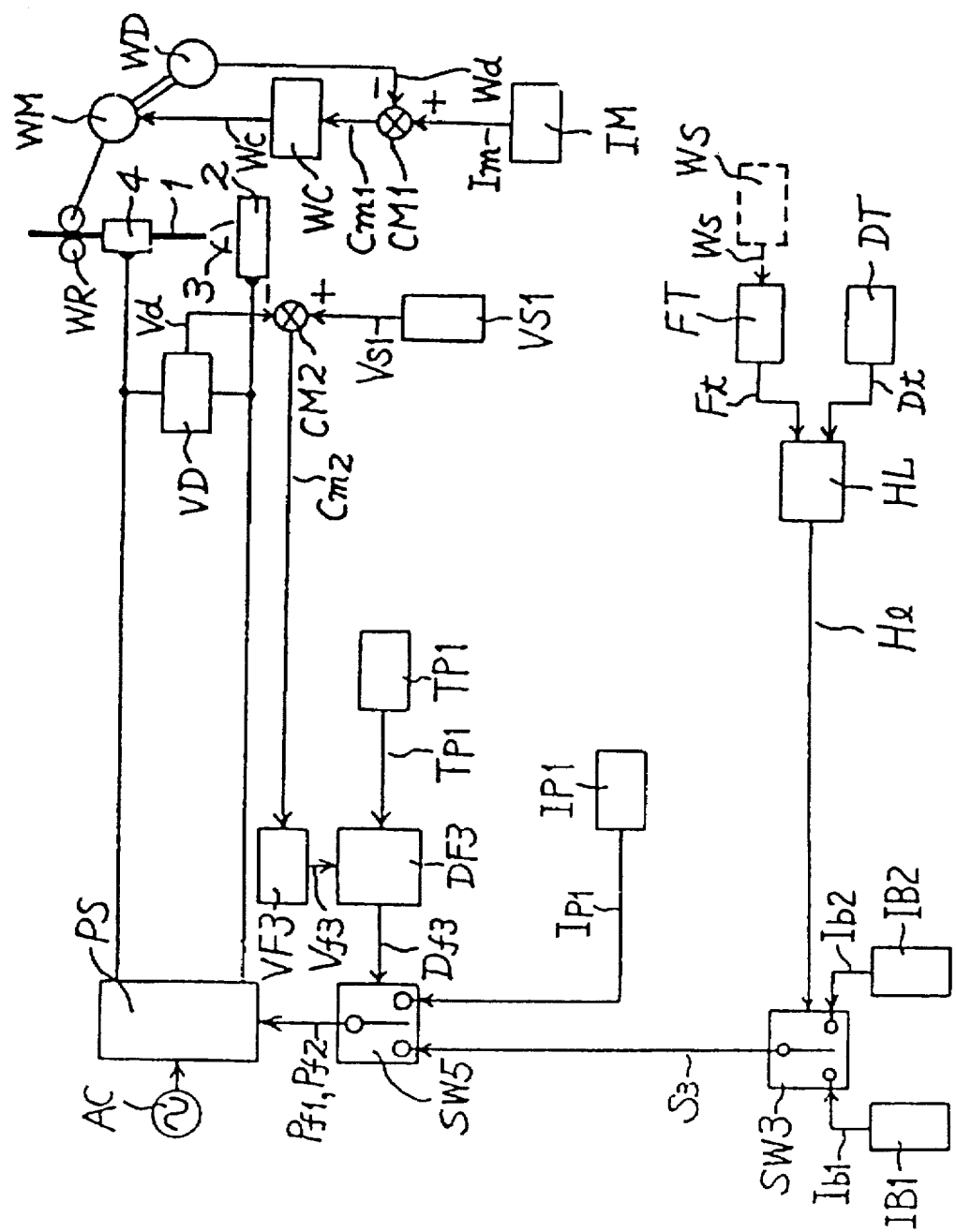
FIG. 85 is a block diagram of the third embodiment of the welding apparatus wherein the arc voltage is controlled by pulse frequency.

Description of FIG. 85

Figure 94:
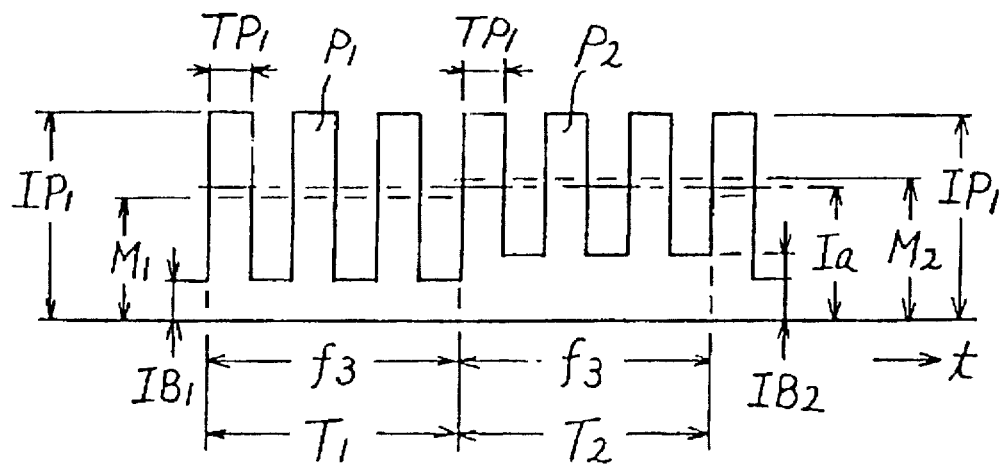
FIG. 94 shows a waveform of the output current of the welding apparatus shown in the block diagram of FIG. 85.

FIG. 85 is a block diagram of the third embodiment of the welding method having the welding waveform shown in FIG. 94.

In FIG. 85, the structures the same as those of FIG. 83 are denoted with the same characters the same as those of FIG. 83 and are omitted in the description. Only different points are described hereinbelow.

The first base current setting circuit IB1 and the second base current setting circuit IB2 output the first base current setting signal Ib1 and the second base current setting signal Ib2. The circuit SW3 outputs a base current switching signal S2 obtained by switching between the signals Ib1 and Ib2 with a switching signal H1.

A pulse frequency signal VF3 outputs a pulse frequency control signal Vf3 in accordance with the arc voltage control signal Cm2. The pulse duration frequency control signal generator DF3 outputs a pulse duration frequency control signal Df3 consisting of a pulse duration setting signal Tp1 and the pulse frequency control signal Vf3 in accordance with the first welding condition. A pulse base current switching circuit SW5 outputs a pulse control signal Pf1 obtained by switching, with a pulse duration frequency control signal Df3, between a pulse current switching signal Ip1 of the first welding condition and a base current setting signal Ib1 at the first welding condition, and a pulse control signal Pf2 obtained by switching, with a pulse duration frequency control signal Df3, between a pulse current switching signal Ip2 of the second welding condition and a base current setting signal Ib1 at the second welding condition. Both signals Pf1 and Pf2 are inputted to the welding power control circuit PS.

Description of FIG. 94

In FIG. 94, reference characters P2, P2, ... P2 denote a second pulse current group consisting of a second pulse current value IP1 the same as the first pulse current value, a second pulse duration TP1 the same as the first pulse duration, a second pulse frequency f3 the same as the first pulse frequency and a second base current IB2. Others are the same as those of FIG. 92 and should be omitted.

The welding apparatus according to a fourth embodiment is a pulse MAG welding apparatus comprising the following functions: A second pulse base current setting circuit for outputting the second pulse base current setting signal comprises a pulse current value setting circuit IP1 for setting the pulse current value setting signal Ip1, a second pulse duration setting circuit TP2 for setting a second pulse duration setting signal Tp2 and a base current setting circuit IB1 for setting a first base current setting signal Ib1.

A switching setting circuit for outputting a switching setting signal comprises a pulse current value switching circuit SW1 for outputting a pulse current switching signal S1 by switching between a first pulse current setting signal Ip1 and the second pulse current setting signal Ip2 and a pulse duration switching circuit SW2 for outputting a pulse duration switching signal S2 by switching between the first pulse duration setting signal Tp1 and the second pulse duration setting signal Tp2.

A pulse control signal generator for receiving pulse base current control signal and the switching setting signal comprises a pulse frequency signal generator circuit VF3 for outputting the pulse frequency control signal Vf3 upon receiving the arc voltage control signal Cm2, a pulse duration frequency signal generator DF3 for outputting the first pulse duration frequency signal Df31 consisting of the pulse frequency signal Vf3 and the first pulse duration signal Tp1 and the pulse duration frequency signal Df32 consisting of the pulse frequency signal Vf3 and the pulse duration signal Tp2 and a base pulse current switching circuit SW5 for switching between the pulse current value switching signal S1 and the base current setting signal Ib1 with the first pulse duration frequency signal Df31 and the second pulse duration frequency control signal Df32.

Figure 86:
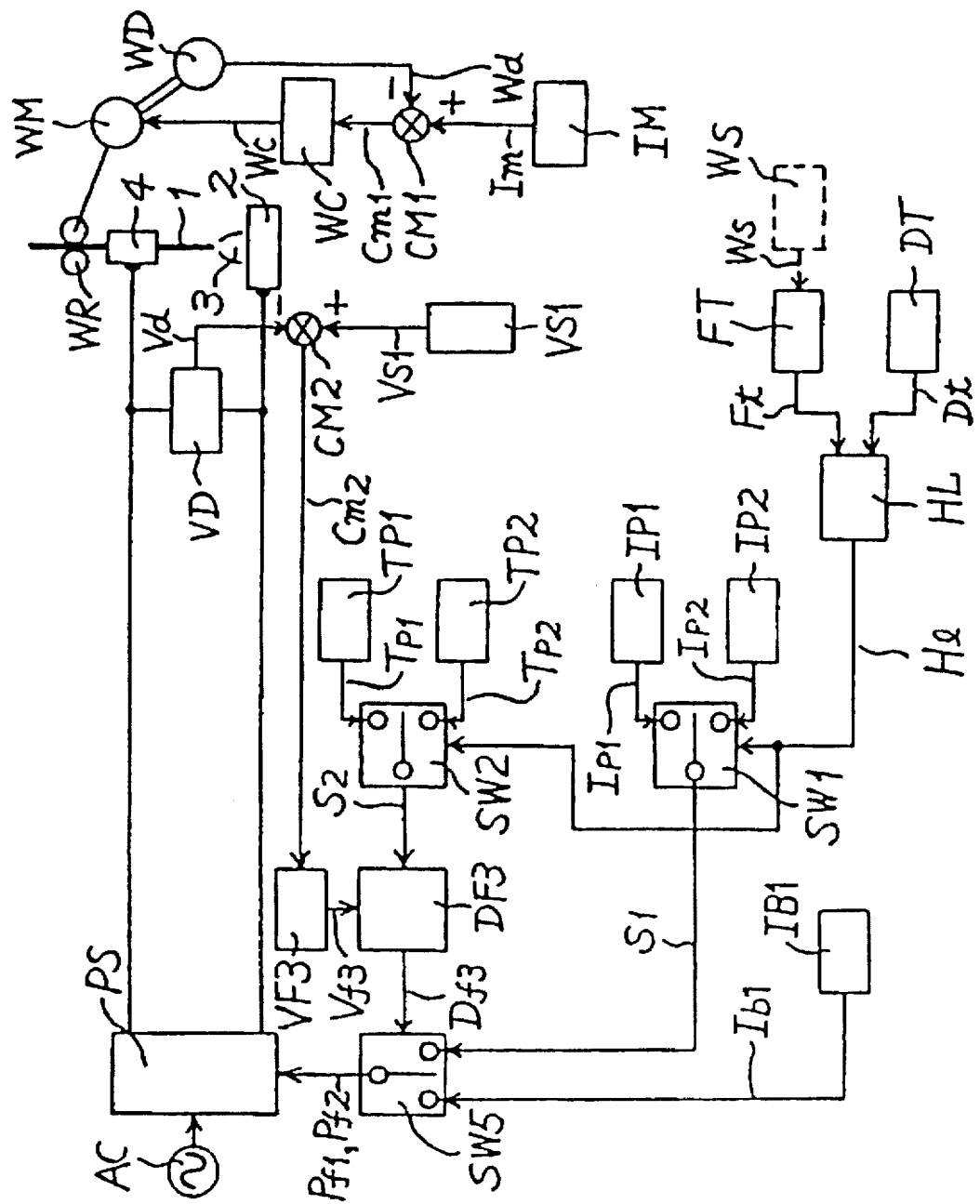
FIG. 86 is a block diagram of the fourth embodiment of the welding apparatus wherein the arc voltage is controlled by pulse frequency.

Description of FIG. 86

Figure 95:
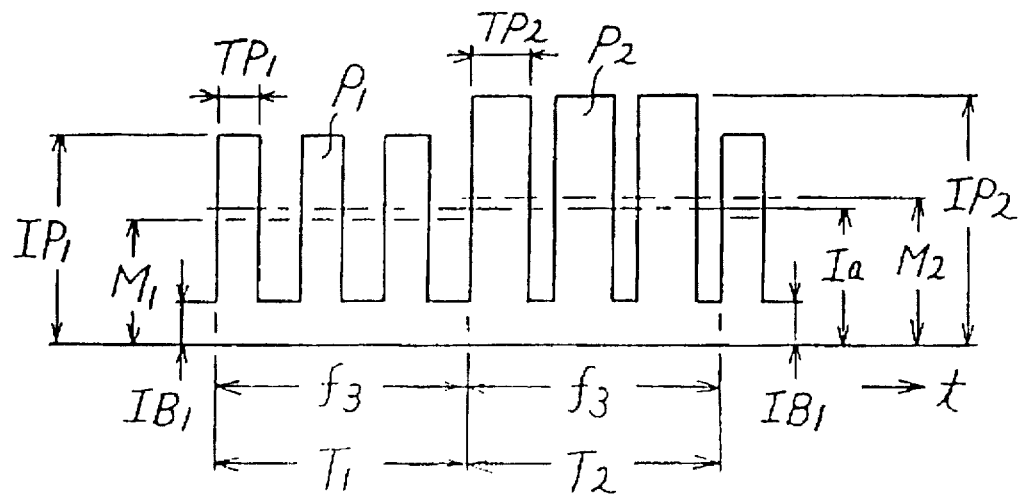
FIG. 95 shows a waveform of the output current of the welding apparatus shown in the block diagram of FIG. 86.

FIG. 86 is a block diagram of the forth embodiment of the welding method having the welding waveform shown in FIG. 95.

In FIG. 86, the structures the same as those of FIG. 83 are denoted with the same characters the same as those of FIG. 83 and are omitted in the description. Only different points are described.

A second pulse base current setting circuit for outputting the second pulse base current setting signal comprises a pulse current value setting circuit IP1 for setting the pulse current value setting signal Ip1, a second pulse duration setting circuit TP2 for setting a second pulse duration setting signal Tp2 and a base current setting circuit IB1 for setting a first base current setting signal Ib1.

A switching setting circuit for outputting a switching setting signal comprises a pulse current value switching circuit SW1 for outputting a pulse current switching signal S1 by switching between a first pulse current setting signal Ip1 and the second pulse current setting signal Ip2 and a pulse duration switching circuit SW2 for outputting a pulse duration switching signal S2 by switching between the first pulse duration setting signal Tp1 and the second pulse duration setting signal Tp2.

A pulse control signal generator for receiving pulse base current control signal and the switching setting signal comprises a pulse frequency signal generator circuit VF3 for outputting the pulse frequency control signal Vf3 upon receiving the arc voltage control signal Cm2, a pulse duration frequency signal generator DF3 for outputting the first pulse duration frequency signal Df31 consisting of the pulse frequency signal Vf3 and the first pulse duration signal Tp1 and the pulse duration frequency signal Df32 consisting of the pulse frequency signal Vf3 and the pulse duration signal Tp2 and a pulse base current switching circuit SW5 outputs a pulse control signal Pf1 obtained by switching, with a pulse duration frequency control signal Df3, between a pulse current switching signal Ip1 of the first welding condition and a base current setting signal Ib1 at the first welding condition, and a pulse control signal Pf2 obtained by switching, with a pulse duration frequency control signal Df3, between a pulse current switching signal Ip2 of the second welding condition and a base current setting signal Ib1 at the second welding condition. Both signals Pf1 and Pf2 are inputted to the welding power control circuit PS.

Description of FIG. 95

In FIG. 95, reference characters P2, P2, . . . P2 denote a second pulse current group consisting of a second pulse current value IP2, a second pulse duration TP2, a second pulse frequency f3 the same as the first pulse frequency and a second base current IB1 the same as the first base current. Others are the same as those of FIG. 92 and should be omitted.

The welding apparatus according to a fifth embodiment is a pulse MAG welding apparatus comprising the following functions: A second pulse base current setting circuit for outputting the second pulse base current setting signal comprises a second pulse current value setting circuit IP2 for setting the pulse current value setting signal Ip2, a second pulse duration setting circuit TP2 for setting a second pulse duration setting signal Tp2 and a second base current setting circuit IB2 for setting a second base current setting signal Ib2.

A switching setting circuit for outputting a switching setting signal comprises a pulse current value switching circuit SW1 for outputting a pulse current switching signal S1 by switching between a first pulse current setting signal Ip1 and the second pulse current setting signal Ip2 and a pulse duration switching circuit SW2 for outputting a pulse duration switching signal S2 by switching between the first pulse duration setting signal Tp1 and the second pulse duration setting signal Tp2 and a base current switching circuit SW3 for outputting a base current switching signal S3 obtained by switching the first base current setting signal Ib1 and the second base current setting signal Ib2.

A pulse control signal generator for receiving pulse base current control signal and the switching setting signal comprises a pulse frequency signal generator circuit VF3 for outputting the pulse frequency control signal Vf3 upon receiving the arc voltage control signal Cm2, a pulse duration frequency signal generator DF3 for outputting the first pulse duration frequency signal Df31 consisting of the pulse frequency signal Vf3 and the first pulse duration signal Tp1 and the pulse duration frequency signal Df32 consisting of the pulse frequency signal Vf3 and the pulse duration signal Tp2 and a base pulse current switching circuit SW5 for switching between the pulse current value switching signal S1 and the base current switching signal S3 with the first pulse duration frequency signal Df31 and the second pulse duration frequency control signal Df32.

Figure 87:
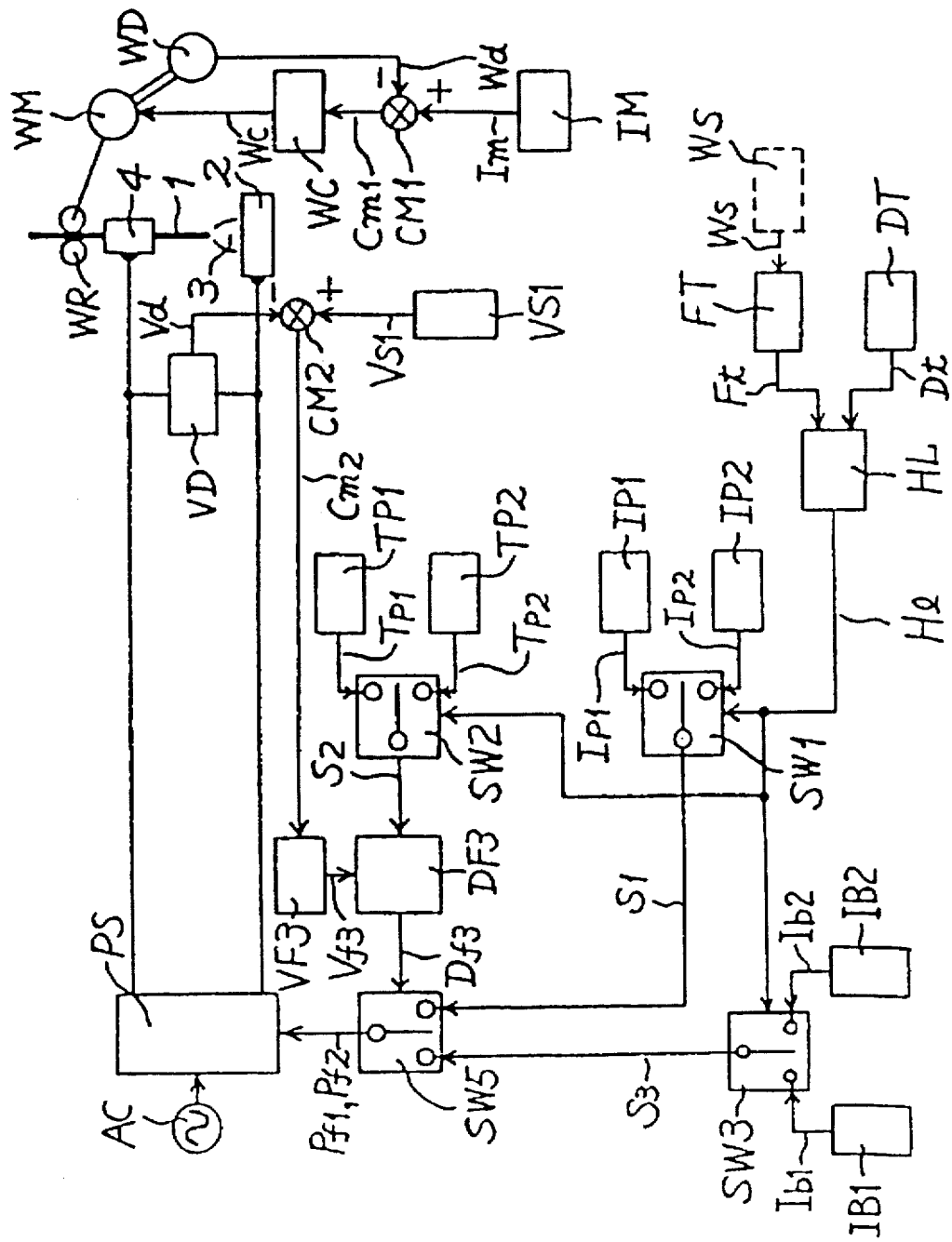
FIG. 87 is a block diagram of the fifth embodiment of the welding apparatus wherein the arc voltage is controlled by pulse frequency.

Description of FIG. 87

Figure 96:
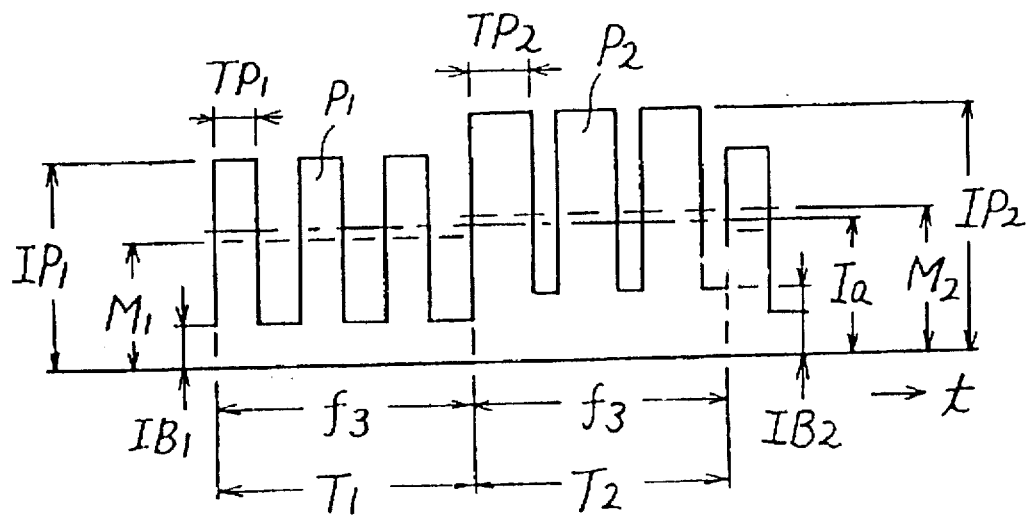
FIG. 96 shows a waveform of the output current of the welding apparatuses shown in the block diagrams of FIG. 87 to FIG. 89.

FIG. 87 is a block diagram of the fifth embodiment of the welding method having the welding waveform shown in FIG. 96.

In FIG. 87, the structures the same as those of FIG. 83 are denoted with the same characters the same as those of FIG. 83 and are omitted in the description. Only different points are described.

A second pulse base current setting circuit for outputting the second pulse base current setting signal comprises a second pulse current value setting circuit IP2 for setting the pulse current value setting signal Ip2, a second pulse duration setting circuit TP2 for setting a second pulse duration setting signal Tp2 and a second base current setting circuit IB2 for setting a second base current setting signal Ib2.

A switching setting circuit for outputting a switching setting signal comprises a pulse current value switching circuit SW1 for outputting a pulse current switching signal S1 by switching between a first pulse current setting signal Ip1 and the second pulse current setting signal Ip2 and a pulse duration switching circuit SW2 for outputting a pulse duration switching signal S2 by switching between the first pulse duration setting signal Tp1 and the second pulse duration setting signal Tp2 and a base current switching circuit SW3 for outputting a base current switching signal S3 obtained by switching the first base current setting signal Ib1 and the second base current setting signal Ib2.

A pulse control signal generator for receiving pulse base current control signal and the switching setting signal comprises a pulse frequency signal generator circuit VF3 for outputting the pulse frequency control signal Vf3 upon receiving the arc voltage control signal Cm2, a pulse duration frequency signal generator DF3 for outputting the first pulse duration frequency signal Df31 consisting of the pulse frequency signal Vf3 and the first pulse duration signal Tp1 and the pulse duration frequency signal Df32 consisting of the pulse frequency signal Vf3 and the pulse duration signal Tp2 and a pulse base current switching circuit SW5 outputs a pulse control signal Pf1 obtained by switching, with a pulse duration frequency control signal Df3, between a pulse current switching signal Ip1 of the first welding condition and a base current setting signal Ib1 at the first welding condition, and a pulse control signal Pf2 obtained by switching, with a pulse duration frequency control signal Df3, between a pulse current switching signal Ip2 of the second welding condition and a base current setting signal Ib1 at the second welding condition. Both signals Pf1 and Pf2 are inputted to the welding power control circuit PS.

Description of FIG. 96

In FIG. 96, reference characters P2, P2, . . . P2 denote a second pulse current group consisting of a second pulse current value IP2, a second pulse duration TP2, a second pulse frequency f3 the same as the first pulse frequency and a second base current IB2.

The description with reference to FIGS. 92 to 95 is directed to a case when the value of the second welding condition is larger than that of the first welding condition, that is, IP1<IP2, TP1<TP2, or IB1<IB2. However, the condition MI<M2 permits the value of the second welding condition lower than that of the first welding condition; that is IB1>IB2, when IP1<IP2, and TP1<TP2. Others are the same as the those in FIG. 92 and should be omitted.

The welding apparatus according to the second case when arc voltage is controlled by pulse frequency comprises the following functions: A second pulse base current setting circuit for outputting the second pulse base current setting signal comprises a second arc voltage value setting circuit VS2 for setting the arc voltage value setting signal Vs2, a pulse duration setting circuit TP1 for setting a pulse duration setting signal Tp1, a base current setting circuit IB1 for setting a base current setting signal Ib1 and a pulse current value setting circuit IP1 for outputting a pulse current value setting signal Ip1.

A switching setting circuit for outputting a switching setting signal comprises an arc voltage switching circuit SW6 for outputting an arc voltage switching signal S1 by switching between a first arc voltage setting signal Vs1 corresponding to the first arc length and the second arc voltage setting signal Vs2 corresponding to the second arc length.

A pulse control signal generator for receiving pulse base current control signal and the switching setting signal comprises a pulse frequency signal generator circuit VF3 for outputting the pulse frequency control signal Vf31 corresponding to the arc voltage setting signal Vs1 and the second pulse frequency control signal Vf32 corresponding to the second arc voltage setting signal Vs1, a pulse duration frequency signal generator DF3 for outputting the first pulse duration frequency signal Df31 consisting of the first pulse frequency signal Vf31 and the first pulse duration signal Tp1 and the pulse duration frequency signal Df32 consisting of the second pulse frequency signal Vf32 and the pulse duration signal Tp1 and a base pulse current switching circuit SW5 for switching between the pulse current value setting signal Ip1 and the base current setting signal Ib1 with the first pulse duration frequency signal Df31 and the second pulse duration frequency control signal Df32.

Figure 88:
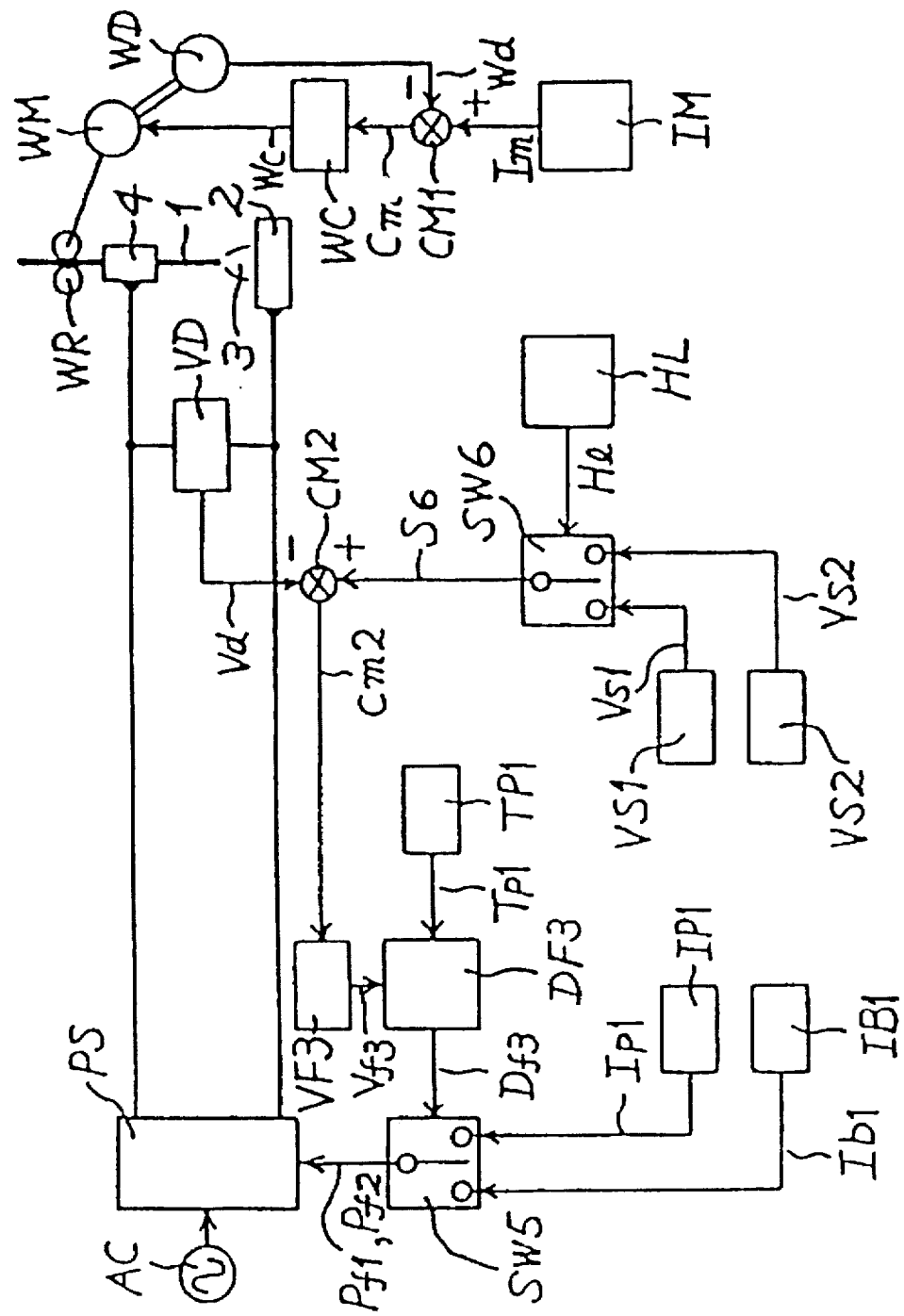
FIG. 88 is a block diagram of an embodiment of the welding apparatus for producing the welding current waveform shown in FIG. 97.

Description of FIG. 88

Figure 97:
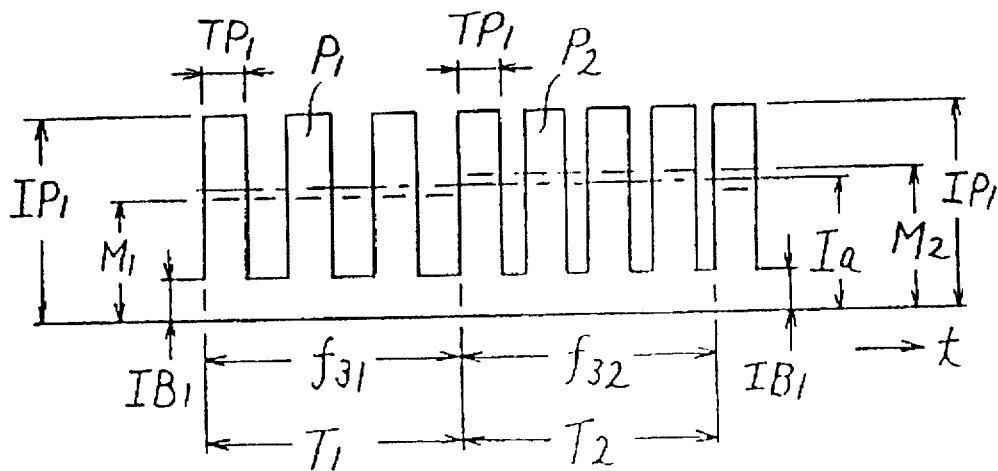
FIG. 97 shows a waveform of the output current of the welding apparatus shown in the block diagram of FIG. 88.

FIG. 88 is a block diagram of the embodiment of the welding method having the welding waveform shown in FIG. 97.

In FIG. 88, the structures the same as those of FIG. 83 are denoted with the characters the same as those of FIG. 83 and are omitted in the description. Only different points are described.

The welding apparatus according to the second case is a pulse MAG welding apparatus comprising the following functions: The first arc voltage value setting circuit VS1 and a second arc voltage value setting circuit VS2 are to set the arc voltage values at the first welding condition and the second welding condition, respectively and output the first arc voltage setting signal Vs1 and the second arc voltage setting signal Vs2, respectively.

An arc voltage switching circuit SW6 outputs an arc voltage switching signal S1 by switching between a first arc voltage setting signal Vs1 and the second arc voltage setting signal Vs2 with the switching signal H1 The second comparison circuit CM2 outputs the arc voltage control signal from the difference between the signal S6 and the arc voltage detection signal Vd of the arc voltage detection circuit VD.

A pulse frequency signal generator circuit VF3 outputs a signal under switching, with a switching frequency F of the switching signal H1, between the pulse frequency control signal Vf31 corresponding to first welding condition and the second pulse frequency control signal Vf32 corresponding to the second welding condition in accordance with the arc voltage control signal Cm2. A pulse duration frequency signal generator DF3 outputs the first pulse duration frequency signal Df31 consisting of the first pulse frequency signal Vf31 and the first pulse duration signal Tp1 in accordance with the first welding condition and the pulse duration frequency signal Df32 in accordance with the second welding condition in a similar way to that of the first pulse duration frequency signal Df31. A base pulse current switching circuit SW5 outputs the pulse control signal Pf1 obtained by switching between the pulse current value setting signal Ip1 and the base current setting signal Ib1 with the first pulse duration frequency signal Df31 at the first welding condition and the pulse control signal Pf2 obtained by switching between the pulse current value setting signal Ip1 and the base current setting signal Ib1 with the second pulse duration frequency signal Df32 at the second welding condition. Both pulse control signals Pf1 and Pf2 are inputted to the welding power control circuit PS.

Description of FIG. 97

In FIG. 97, reference characters P1, P1, . . . P1 denote a first pulse current group consisting of a first pulse current value IP1, a first pulse duration TP1, a first pulse frequency f3 and a first base current IB1. Reference characters P2, P2, . . . P2 denote a second pulse current group consisting of a second pulse current value IP1 the same as the first pulse current value, a second pulse duration TP1 the same as the first pulse duration, a second pulse frequency f3 the same as the first pulse frequency and a second base current IB1 the same as the first base current. Others are the same as those of FIG. 92 and should be omitted.

The welding apparatus according to third case when arc voltage is controlled by pulse frequency comprises the following functions: A second pulse base current setting circuit for outputting the second pulse base current setting signal comprises a second arc voltage value setting circuit VS2 for setting the arc voltage value setting signal Vs2, a second pulse duration setting circuit TP2 for setting a second pulse duration setting signal Tp2, a second base current setting circuit IB2 for setting a second base current setting signal Ib2 and a second pulse current value setting circuit IP2 for outputting a second pulse current value setting signal Ip2.

A switching setting circuit for outputting a switching setting signal comprises an arc voltage switching circuit SW6 for outputting an arc voltage switching signal S1 by switching between a first arc voltage setting signal Vs1 corresponding to the first arc length and the second arc voltage setting signal Vs2 corresponding to the second arc length, a pulse current value switching circuit SW1 for outputting a pulse current switching signal S1 by switching between a first pulse current setting signal Ip1 and the second pulse current setting signal Ip2 and a pulse duration switching circuit SW2 for outputting a pulse duration switching signal S2 by switching between the first pulse duration setting signal Tp1 and the second pulse duration setting signal Tp2 and a base current switching circuit SW3 for outputting a base current switching signal S3 obtained by switching the first base current setting signal Ib1 and the second base current setting signal Ib2.

A pulse control signal generator for receiving pulse base current control signal and the switching setting signal comprises a pulse frequency signal generator circuit VF3 for outputting the pulse frequency control signal Vf3 upon receiving the arc voltage control signal Cm2, a pulse duration frequency signal generator DF3 for outputting the first pulse duration frequency signal Df31 consisting of the pulse frequency signal Vf3 and the first pulse duration signal Tp1 and the pulse duration frequency signal Df32 consisting of the pulse frequency signal Vf3 and the pulse duration signal Tp2 and a base pulse current switching circuit SW5 for switching between the pulse current value switching signal S1 and the base current switching signal S3 with the first pulse duration frequency signal Df31 and the second pulse duration frequency control signal Df32.

A pulse control signal generator for receiving pulse base current control signal and the switching setting signal comprises a pulse frequency signal generator circuit VF3 for outputting the pulse frequency control signal Vf31 corresponding to the arc voltage setting signal Vs1 and the second pulse frequency control signal Vf32 corresponding to the second arc voltage setting signal Vs1, a pulse duration frequency signal generator DF3 for outputting the first pulse duration frequency signal Df31 consisting of the first pulse frequency signal Vf31 and the first pulse duration signal Tp1 and the pulse duration frequency signal Df32 consisting of the second pulse frequency signal Vf32 and the pulse duration signal Tp1 and a base pulse current switching circuit SW5 for switching between the pulse current value setting signal Ip1 and the base current setting signal Ib1 with the first pulse duration frequency signal Df31 and the second pulse duration frequency control signal Df32.

Figure 89:
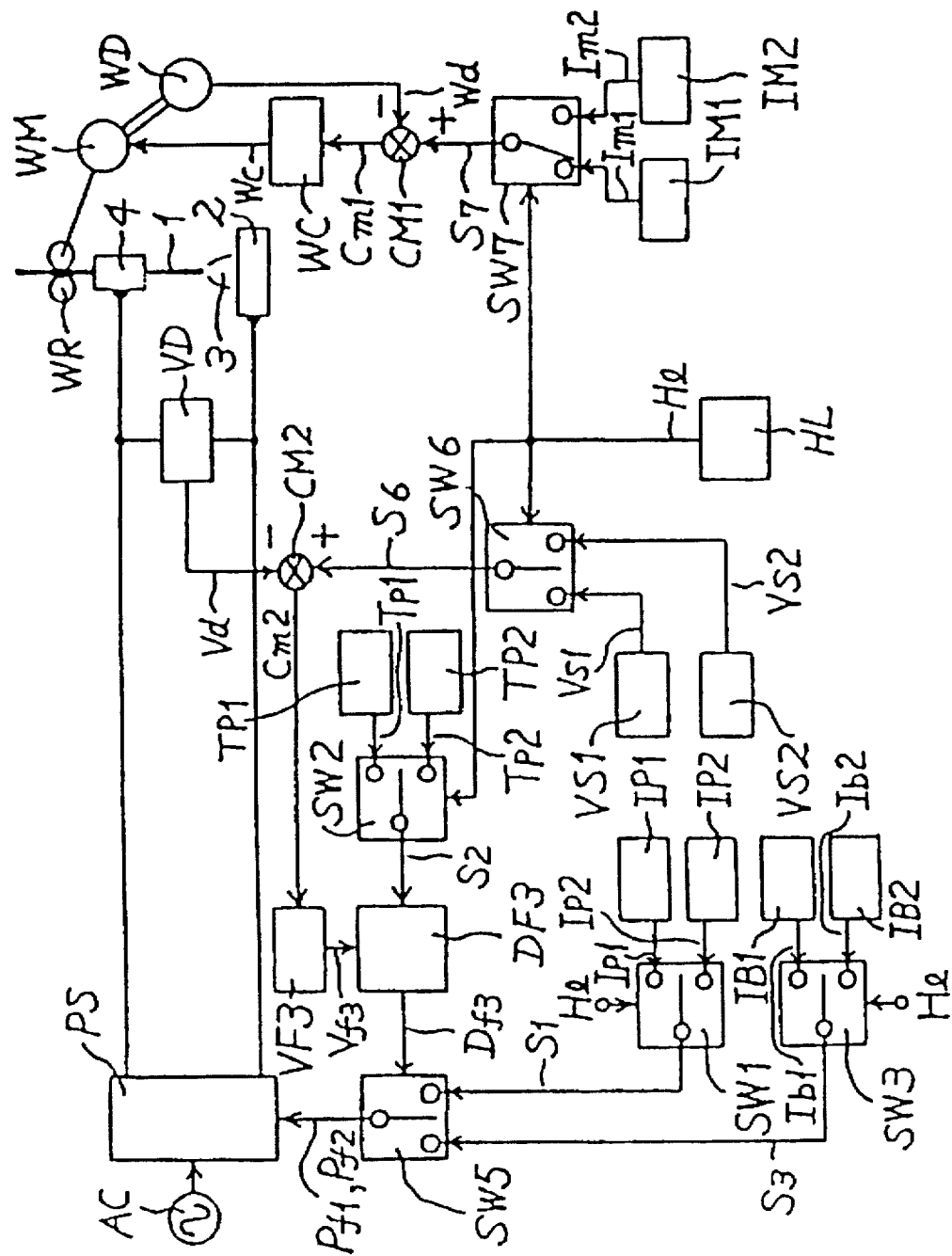
FIG. 89 is a block diagram of an embodiment of the welding apparatus for producing the welding current waveform shown in FIG. 96.

Description of FIG. 89

FIG. 89 is a block diagram of the embodiment of the welding method having the welding waveform shown in FIG. 96.

In FIG. 89, the structures the same as those of FIG. 87 are denoted with the characters the same as those of FIG. 87 and are omitted in the description. Only different points are described.

In FIG. 89, a first point different from that of FIG. 87 is that the structure in FIG. 89 comprises a first arc voltage setting circuit VS1 and the second arc voltage setting circuit VS2 in place of the arc voltage setting circuit VS1 of FIG. 87. These circuits set the average values of arc voltage at the first pulse duty time T1 and the second pulse duty time T2 and output the first arc voltage setting signal Vs1 and the second arc voltage setting signal Vs2. An arc voltage switching circuit SW6 outputs an arc voltage switching signal S6 by switching between a first arc voltage setting signal Vs1 and the second arc voltage setting signal Vs2 with the switching signal H1. The second comparison circuit CM2 outputs an arc voltage control signal Cm2 from the difference between the signal S1 and the arc voltage detection signal Vd of the arc voltage detection circuit VD. A pulse frequency signal generator circuit VF3 outputs the pulse frequency control signal Vf3 obtained by switching between the first pulse frequency control signal Vf31 corresponding to the first welding condition and the second pulse frequency control signal Vh32 corresponding to the second welding condition with a switching frequency of a switching signal H1 upon receiving the arc voltage control signal Cm2. A pulse duration frequency signal generator DF3 outputs the first pulse duration frequency signal Df31 consisting of the pulse frequency signal Vf3 and the first pulse duration signal Tp1 at the first welding condition and the pulse duration frequency signal Df3 consisting of the pulse frequency signal Vf3 and the pulse duration signal Tp2 at the second welding condition. A base pulse current switching circuit SW5 outputs a pulse control signal Pf1 obtained by switching between the pulse current value setting signal Ip1 of the signa S1 and the base current setting signal Ib1 of the signal S3 with the first pulse duration frequency signal Df31 and a second pulse control signal Pf2 obtained by switching between the second pulse current value setting signal Ip2 of the second signal S2 and the base current setting signal Ib21 of the signal S3 with the second pulse duration frequency signal Df32. Both signals Pf1 and Pf2 are inputted to the welding power control circuit PS.

The description with reference to FIGS. 87 and 89 is directed to the welding apparatus comprising the second pulse current value setting circuit IP2, the second pulse duration setting circuit TP2 and the second base current setting circuit IB2. An apparatus comprising one or two of these setting circuits is included within the scope of the first and third cases when arc voltage is controlled by pulse frequency as shown in the first to fifth embodiments of claim 31. The welding apparatus shown in FIG. 89 comprises a wire feeding rate switching circuit SW7 for a wire feeding rate switching signal S7 by switching between the first welding current setting signal Im1 sent from the first welding current setting circuit IM1 and the second welding current setting signal Im2 sent from the second welding current setting circuit IM2 as shown in FIG. 89. These structures are not necessary for the third case described hereinabove.

Figure 90:
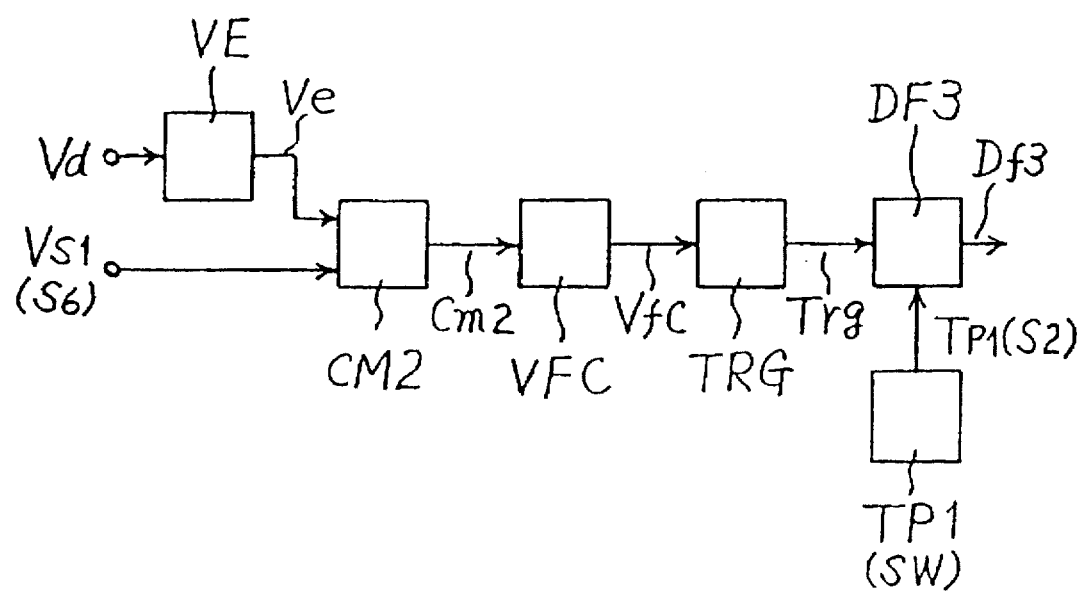
FIG. 90 is a block diagram of a circuit of a pulse frequency control signal generator shown in the block diagrams of FIGS. 83 to 89.
Figure 91A:
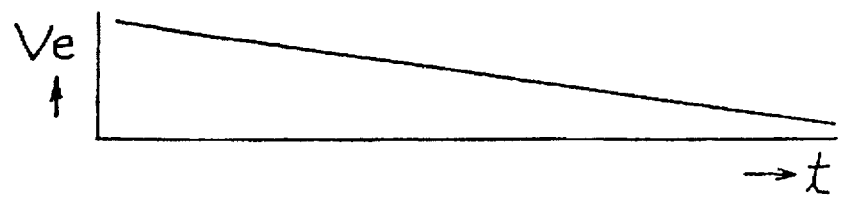
FIGS. 91(A)–91(F) are graphs showing the time passage of the output signal in the block diagram shown in FIG. 90.
Figure 91B:
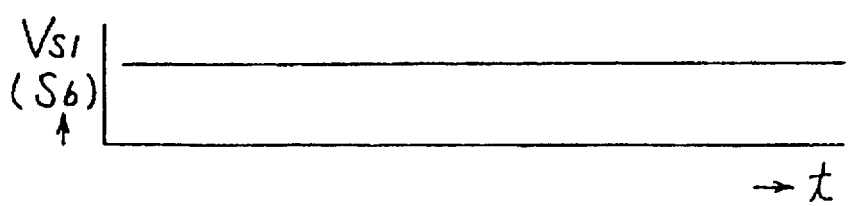
Figure 91C:
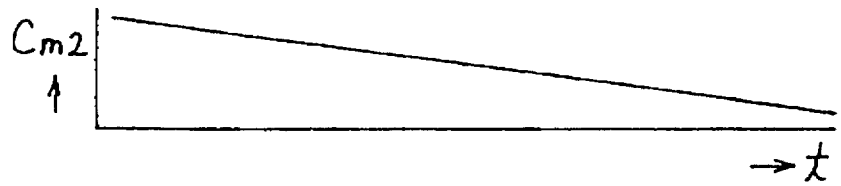
Figure 91D:
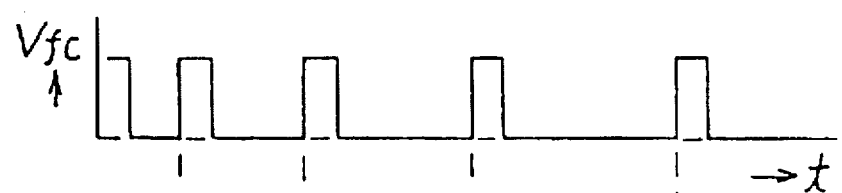
Figure 91E:
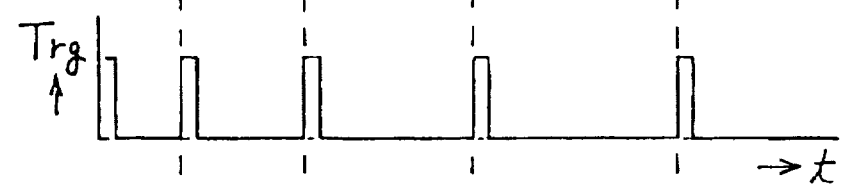
Figure 91F:
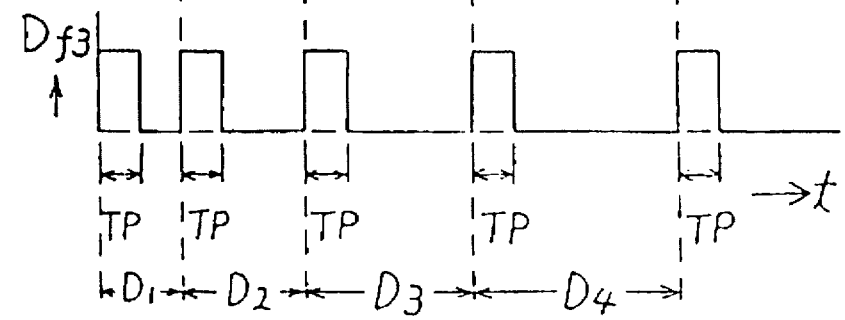

Description of FIGS. 90 and 91

FIG. 90 is a block diagram of a circuit from the input of the arc voltage detection signal Vd to the output of the pulse duration frequency control signal Df3 selected from the block diagram of the embodiment of the welding apparatus of the first and third cases of the present invention. FIG. 91 is a graph showing the time passage of the input signal and the output signal at the various stages of the circuit shown in FIG. 90. The input signal and the output signal of the circuit of FIG. 90 are described as follows: A reference character VE denotes a flat circuit for outputting a flat signal Ve shown in FIG. 91 (A) upon receiving the arc voltage detection signal Vd. A reference character CM2 denotes a second comparison circuit for outputting the arc voltage control signal Cm2 shown in FIG. 91 (C) upon receiving the flat signal Ve and an arc voltage setting signal Vs1 shown in FIG. 91 (B) or the arc voltage switching signal S6. A reference character VFC denotes a Vf convertor for outputting the pulse frequency signal Vfc shown in FIG. 91 (D) having a frequency corresponding to the arc voltage control signal Cm2. A reference character TRG denotes a trigger circuit for outputting a trigger signal Trg in a given pulse duration shown in FIG. 91 (E) in a synchronizing way with the pulse frequency signal Vfc. A reference character TP1 or SW2 is a pulse duration setting circuit TP1 or the pulse duration switching circuit SW2 for outputting the pulse duration setting signal Tp1 or the pulse duration switching signal S2. A reference character DF3 denotes a pulse duration frequency control circuit comprising mono-multi vibrator circuit for outputting the pulse duration frequency control signal Df3 shown in FIG. (F) upon receiving the trigger signal and the pulse duration setting signal Tp1 or the switching pulse duration signal S2. It is noted that the circuit or the signal having the same reference character as each other between FIGS. 90 and 83 have the same circuit or the same signal.

Described hereinbelow are three cases of the present invention where the arc voltage is controlled by the pulse duration. As described above, the pulse base current control circuit for outputting the pulse base current control signal is a comparison circuit CM2 for outputting the arc voltage control signal Cm2 to control the pulse duration. A first pulse base current setting circuit for outputting the first pulse base current setting signal comprises a pulse frequency setting circuit FP1 for setting a pulse frequency setting signal Fp1, a base current setting circuit IB1 for setting a base current setting signal Ib1 and a pulse current value setting circuit IP1 for outputting a pulse current value setting signal Ip1.

The welding apparatus according to a first case when arc voltage is controlled by pulse duration comprises the following functions: A second pulse base current setting circuit for outputting the second pulse base current setting signal comprises a second pulse frequency setting circuit FP2 for setting a second pulse frequency setting signal Fp2, a second base current setting circuit IB2 for setting a second base current setting signal Ib2 and a second pulse current value setting circuit IP2 for outputting a second pulse current value setting signal Ip2.

A switching setting circuit for outputting a switching setting signal comprises a pulse current switching circuit Sw1 for outputting a pulse current value switching signal S1 by switching between a pulse current value setting signal Ip1 and the second pulse current setting signal Ip2, a base current switching circuit SW3 for outputting a base current switching signal S3 obtained by switching the first base current setting signal Ib1 and the second base current setting signal Ib2 and a pulse frequency switching circuit SW4 for outputting pulse frequency switching signal S4 by switching between the pulse frequency setting signal Fp1 and the second frequency setting signal Fp2.

A pulse control signal generator for receiving pulse base current control signal and the switching setting signal comprises a pulse frequency signal generator circuit VF for outputting the first pulse frequency signal Vf1 and the second pulse frequency signal Vf2 upon receiving the pulse frequency switching signal S4, a pulse duration frequency signal generator DF3 for outputting the first pulse duration frequency signal Df31 consisting of the pulse frequency signal Vf1 and the pulse duration signal Tp2 corresponding to the arc voltage control signal Cm2 and the pulse duration frequency signal Df32 consisting of the second pulse frequency signal Vf2 and the pulse duration signal Tp2 and a base pulse current switching circuit SW5 for switching between the pulse current value switching signal S1 and the base current switching signal S3 with the first pulse duration frequency signal Df31 and the second pulse duration frequency control signal Df32.

Figure 98:
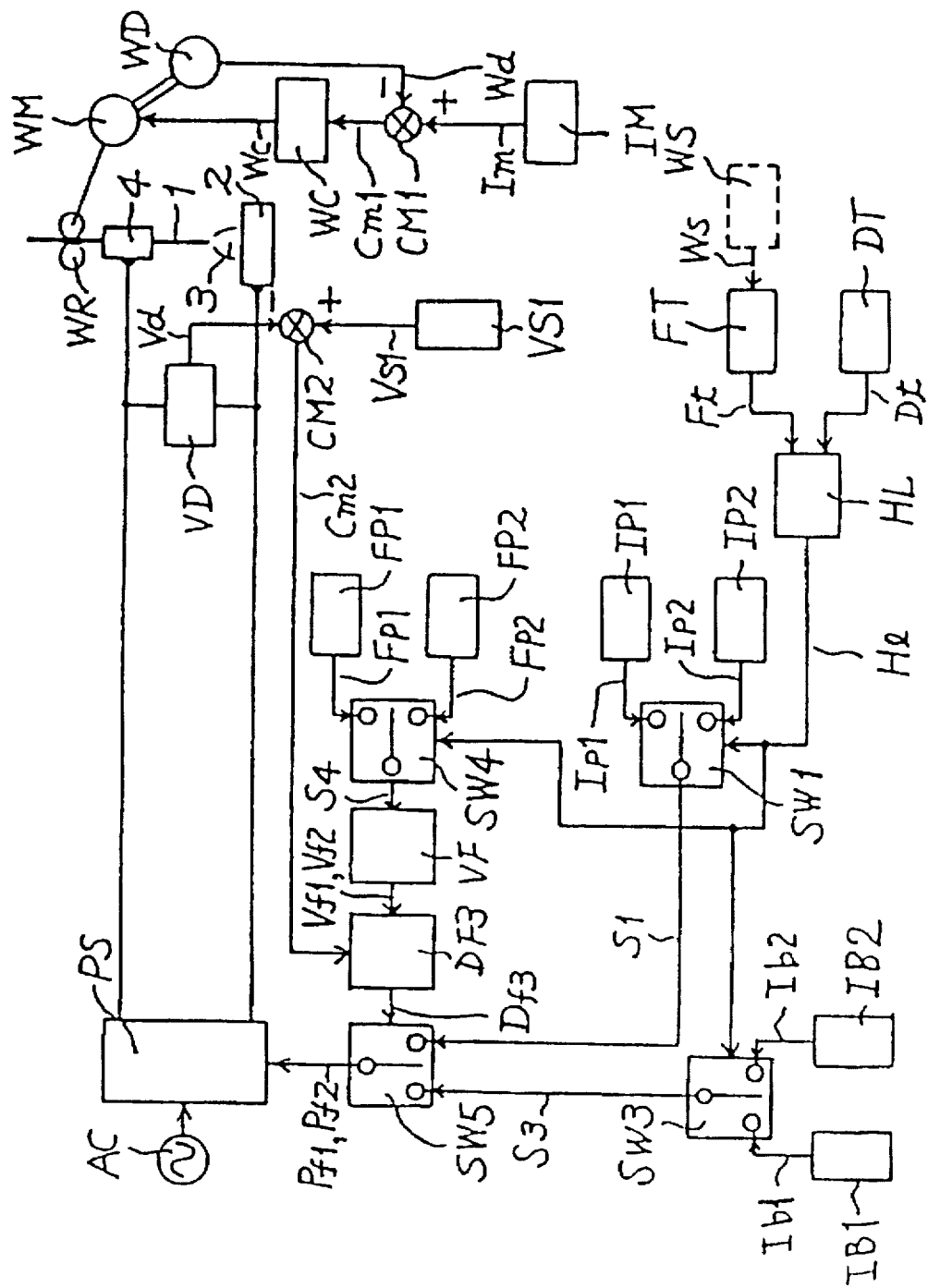
FIG. 98 is a block diagram of an embodiment of the welding apparatus wherein the arc voltage is controlled by pulse duration.

Description of FIG. 98

Figure 102:
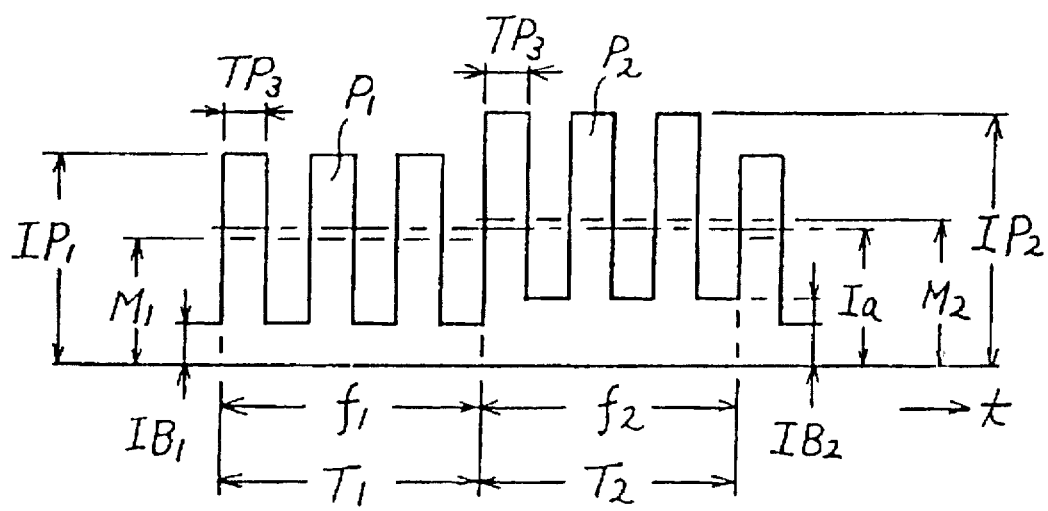
FIG. 102 shows a waveform of the output current of the welding apparatus shown in the block diagram of FIGS. 98 and 100.

FIG. 98 is a block diagram of the embodiment of the welding method having the welding waveform shown in FIG. 102.

In FIG. 98, the structures the same as those of FIG. 83 are denoted with the characters the same as those of FIG. 87 and are omitted in the description. Only different points are described.

A first pulse current setting circuit IP1 and a second pulse current value setting circuit IP2 outputs a first pulse current setting signal Ip1 and a second pulse current value setting signal Ip2.

A pulse current switching circuit Sw1 outputs a pulse current value switching signal S1 by switching between a pulse current value setting signal Ip1 and the second pulse current setting signal Ip2 with switching signal H1. A first pulse frequency setting circuit FP1 and a second pulse frequency setting circuit FP2 set first pulse frequency f1 and a second pulse frequency f2, respectively and output the first pulse frequency setting signal Fp1 and the second pulse frequency setting signal Fp2, respectively. A pulse frequency switching circuit SW4 outputs a pulse frequency switching signal S4 obtained by switching the first pulse frequency setting signal Fp1 and the second pulse frequency setting signal Fp2. A pulse frequency signal generator circuit VF outputs the first pulse frequency signal Vf1 and the second pulse frequency signal Vf2 upon receiving the pulse frequency switching signal S4. A pulse duration frequency signal generator DF3 outputs the first pulse duration frequency signal Df31 consisting of the pulse frequency signal Vf1 and the pulse duration signal Tp2 corresponding to the arc voltage control signal Cm2 and the pulse duration frequency signal Df32 consisting of the second pulse frequency signal Vf2 and the pulse duration signal Tp2. A base pulse current switching circuit SW5 outputs the first pulse control signal Pf1 obtained by switching between a signal energizing the first pulse current setting signal Ip1 at a period corresponding to the pulse duration determined by the pulse duration control signal formed into the first pulse duration frequency control signal Df31 and the base current setting signal Ib1 with the first pulse duration frequency signal Df31 and the second pulse control signal Pf2 obtained by switching between a signal energizing the second pulse current setting signal Ip2 at a period corresponding to the pulse duration determined by the pulse duration control signal formed into the second pulse duration frequency control signal Df32 and the base current setting signal Ib2 with the second pulse duration frequency signal Df32. control signal Df32. Both pulse control signals Pf1 and Pf2 are inputted to the welding power control circuit PS.

Description of FIG. 102

In FIG. 102, reference characters P1, P1, ... P1 denote a first pulse current group consisting of a first pulse current value IP1, a first pulse duration TP3, a first pulse frequency f1 and a first base current IB1. Reference characters P2, P2, ... P2 denote a second pulse current group consisting of a second pulse current value IP2, a second pulse duration TP3, a second pulse frequency f2 and a second base current IB2. Reference characters M1 and M2 denote the average value of the welding current at the first pulse current duty time T1 and the second pulse duty time T2. A reference character Ia is an average value of a welding current.

The description with reference to FIG. 102 is directed to a case when the value of the second welding condition is larger than that of the first welding condition, that is, IP1<IP2, FP1<FP2, or IB1<IB2. However, the condition Mi<M2 permits the value of the second welding condition lower than that of the first welding condition; that is IB1>IB2, when IP1<IP2, and FP1<FP2. Others are the same as the those in FIG. 92 and should be omitted.

The welding apparatus according a second case when arc voltage is controlled by pulse duration comprises the following functions: A second pulse base current setting circuit for outputting the second pulse base current setting signal comprises a second arc voltage setting circuit VS2 for setting a second arc voltage setting signal Vs2, a base current setting circuit IB1 for setting a base current setting signal Ib1 and a pulse current value setting circuit IP1 for outputting a pulse current value setting signal Ip1.

A switching setting circuit for outputting a switching setting signal comprises an arc voltage switching circuit Sw6 for outputting an arc voltage switching signal S6 by switching between an arc voltage setting signal Va1 corresponding to the first arc length and the second arc voltage setting signal Vs2 corresponding to the second arc length.

A pulse control signal generator for receiving pulse base current control signal and the switching setting signal comprises a pulse frequency signal generator circuit VF for outputting the first pulse frequency signal Vf1 upon receiving the pulse frequency setting signal Fp1, a pulse duration frequency signal generator DF3 for outputting the first pulse duration frequency signal Df31 consisting of the pulse frequency signal Vf1 and the pulse duration signal Tp31 corresponding to the arc voltage setting signal Vs1 and the pulse duration frequency signal Df32 consisting of the pulse frequency signal Vf1 and the pulse duration signal Tp32 corresponding to the second arc voltage setting signal Vs2 and a base pulse current switching circuit SW5 for switching between the pulse current value setting signal Ip1 and the base current setting signal Ib1 with the first pulse duration frequency signal Df31 and the second pulse duration frequency control signal Df32.

Figure 99:
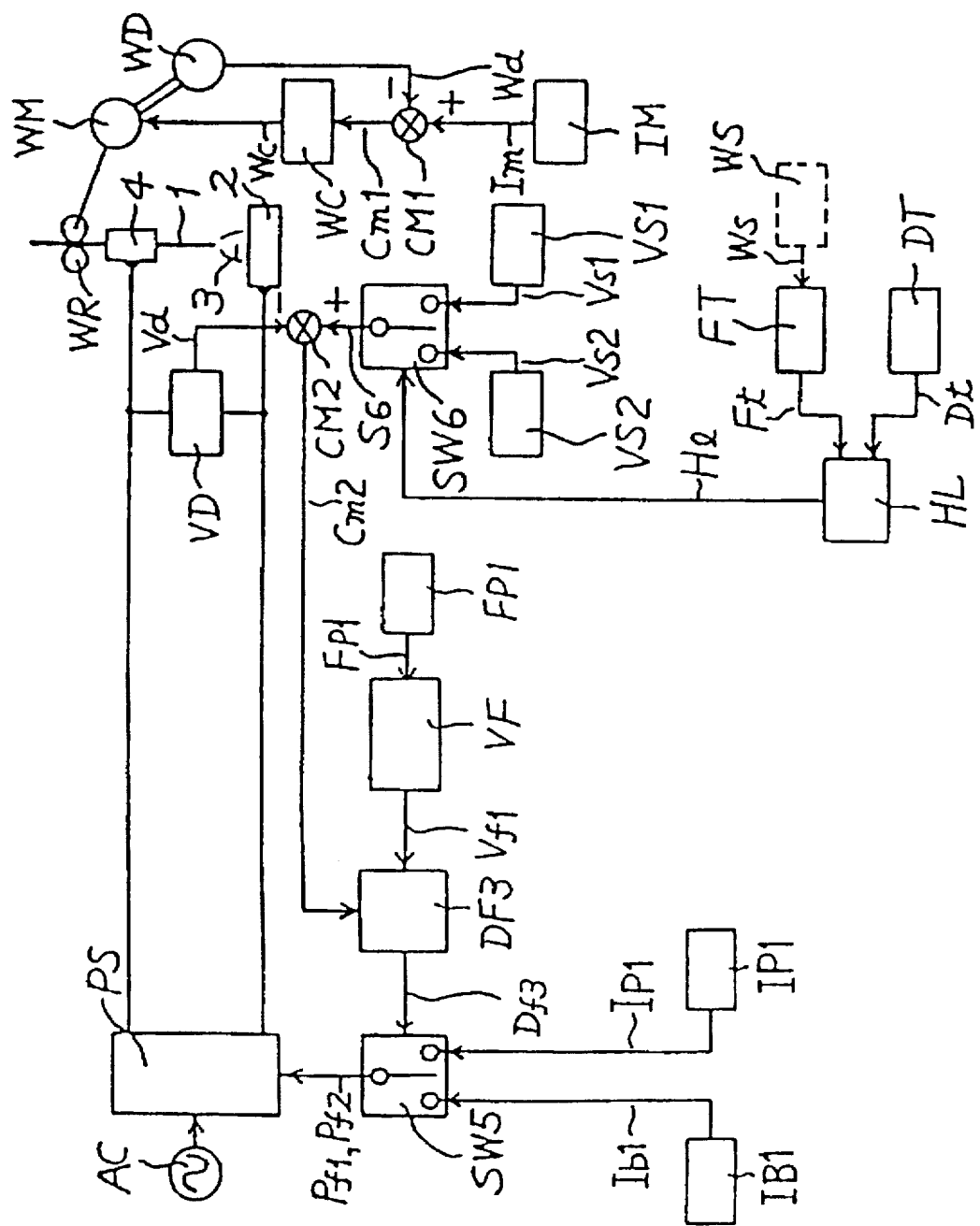
FIG. 99 is a block diagram of an embodiment of the welding apparatus for producing the welding current waveform shown in FIG. 103.

Description of FIG. 99

Figure 103:
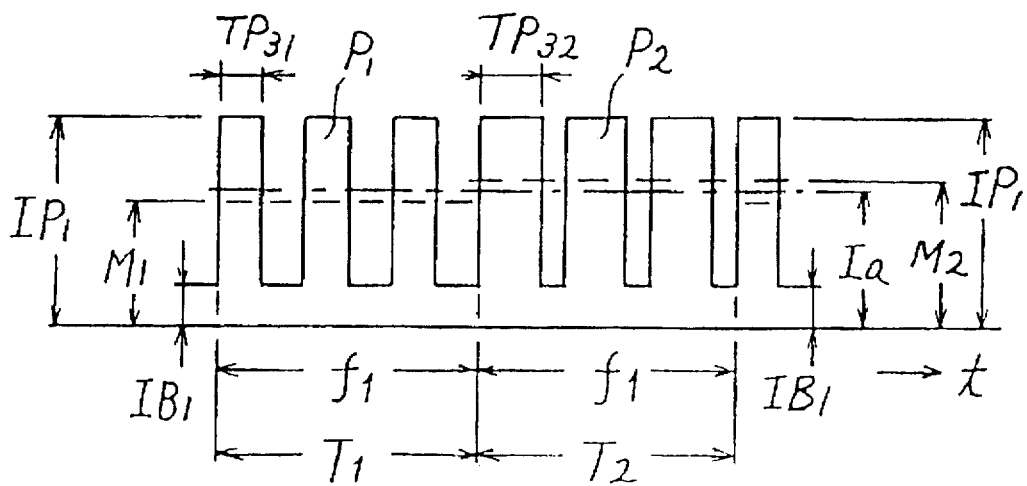
FIG. 103 shows a waveform of the output current of the welding apparatus shown in the block diagram of FIG. 99.

FIG. 99 is a block diagram of the embodiment of the welding method having the welding waveform shown in FIG. 103.

In FIG. 99, the structures the same as those of FIG. 98 are denoted with the characters the same as those of FIG. 87 and are omitted in the description. Only different points are described.

A first arc voltage setting circuit VS1 and a second arc voltage setting circuit VS2 set an average values at a first pulse duty time T1 and a second pulse duty time T2, respectively and output the first arc voltage setting signal Vs1 and a second arc voltage setting signal Vs2, respectively. An arc voltage switching circuit Sw6 outputs an arc voltage switching signal S6 by switching between an arc voltage setting signal Vs1 and the second arc voltage setting signal Vs2 with an switching signal H1. A second comparison circuit CM2 outputs the arc voltage control signal Cm2 from the difference between the signal S6 and the arc voltage detection signal Vd of the arc voltage detection circuit Vd. A pulse frequency setting circuit FP1 outputs the pulse frequency setting signal Fp1 corresponding to the pulse duration (D1=D2).

A pulse frequency signal generator circuit VF outputs the first pulse frequency signal Vf1 upon receiving the pulse frequency setting signal Fp1. A pulse duration frequency signal generator DF3 outputs the first pulse duration frequency signal Df31 consisting of the pulse frequency signal Vf1 and the first arc voltage control signal Cm2 controlling the pulse duration corresponding to the first arc voltage setting signal Vs1 and the pulse duration frequency signal Df32 consisting of the pulse frequency signal Vf1 and the second arc voltage control signal Cm2 controlling the pulse duration corresponding to the second arc voltage setting signal Vs2. A base pulse current switching' circuit SW5 outputs the pulse control signal Pf1 obtained by switching, with the first pulse duration frequency control signal Df31, between a signal energizing the pulse current value setting signal Ip1 at the period corresponding to the pulse duration determined by the pulse duration controlling signal formed into a first pulse duration frequency control signal Df31 and the pulse control signal Pf2 obtained by switching, with the second pulse duration frequency control signal Df32, between a signal energizing the pulse current value setting signal Ip2 at the period corresponding to the pulse duration determined by the pulse duration controlling signal formed into a second pulse duration frequency control signal Df32. Both pulse control signals Pf1 and Pf2 are putted into the welding power control circuit PS.

Description of FIG. 103

In FIG. 103, reference characters P1, P1, . . . P1 denote a first pulse current group consisting of a first pulse current value IP1, a first pulse duration TP31, a first pulse frequency f1 and a first base current IB1. Reference characters P2, P2, . . . P2 denote a second pulse current group consisting of a second pulse current value IP1 the same as the first pulse current value, a second pulse duration TP32, a second pulse frequency f1 the same as the first pulse frequency and a second base current IB1 the same as the first base current. others are the same as the those of FIG. 92 and should be omitted.

The welding apparatus according to a third case when arc voltage is controlled by pulse duration comprises the following functions: A second pulse base current setting circuit for outputting the second pulse base current setting signal comprises a second arc voltage setting circuit VS2 for setting a second arc voltage setting signal Vs2, a second pulse current value setting circuit IP2 for outputting a second pulse current value setting signal Ip2 and a second base current setting circuit IB2 for setting a base current setting signal Ib2.

A switching setting circuit for outputting a switching setting signal comprises an arc voltage switching circuit Sw6 for outputting an arc voltage switching signal S6 by switching between an arc voltage setting signal Vs1 corresponding to the first arc length and the second arc voltage setting signal Vs2 corresponding to the second arc length, a pulse current value switching circuit SW1 for outputting the pulse current value switching signal S1 obtained by switching between the pulse current value setting signal Ip1 and the second pulse current value setting signal Ip2, a pulse frequency switching circuit SW4 for outputting the pulse frequency switching signal S4 obtained by switching the pulse frequency setting signal Fp1 and the second pulse frequency setting signal Fp2 and a base current value switching circuit SW3 for outputting the base current value switching signal S3 obtained by switching between the base current value setting signal Ib1 and the second base current value setting signal Ib2.

A pulse control signal generator for receiving pulse base current control signal and the switching setting signal comprises a pulse frequency signal generator circuit VF for outputting the first pulse frequency signal Vf1 and the second pulse frequency signal Vf2 upon receiving the pulse frequency switching signal S4, a pulse duration frequency signal generator DF3 for outputting the first pulse duration frequency signal Df31 consisting of the pulse frequency signal Vf1 and the pulse duration signal Tp31 corresponding to the arc voltage setting signal Vs1 and the pulse duration frequency signal Df32 consisting of the pulse frequency signal Vf1 and the pulse duration signal Tp32 corresponding to the second arc voltage setting signal Vs2 and a base pulse current switching circuit SW5 for switching between the pulse current value switching signal S1 and the base current switching signal S3 with the first pulse duration frequency signal Df31 and the second pulse duration frequency control signal Df32.

Figure 100:
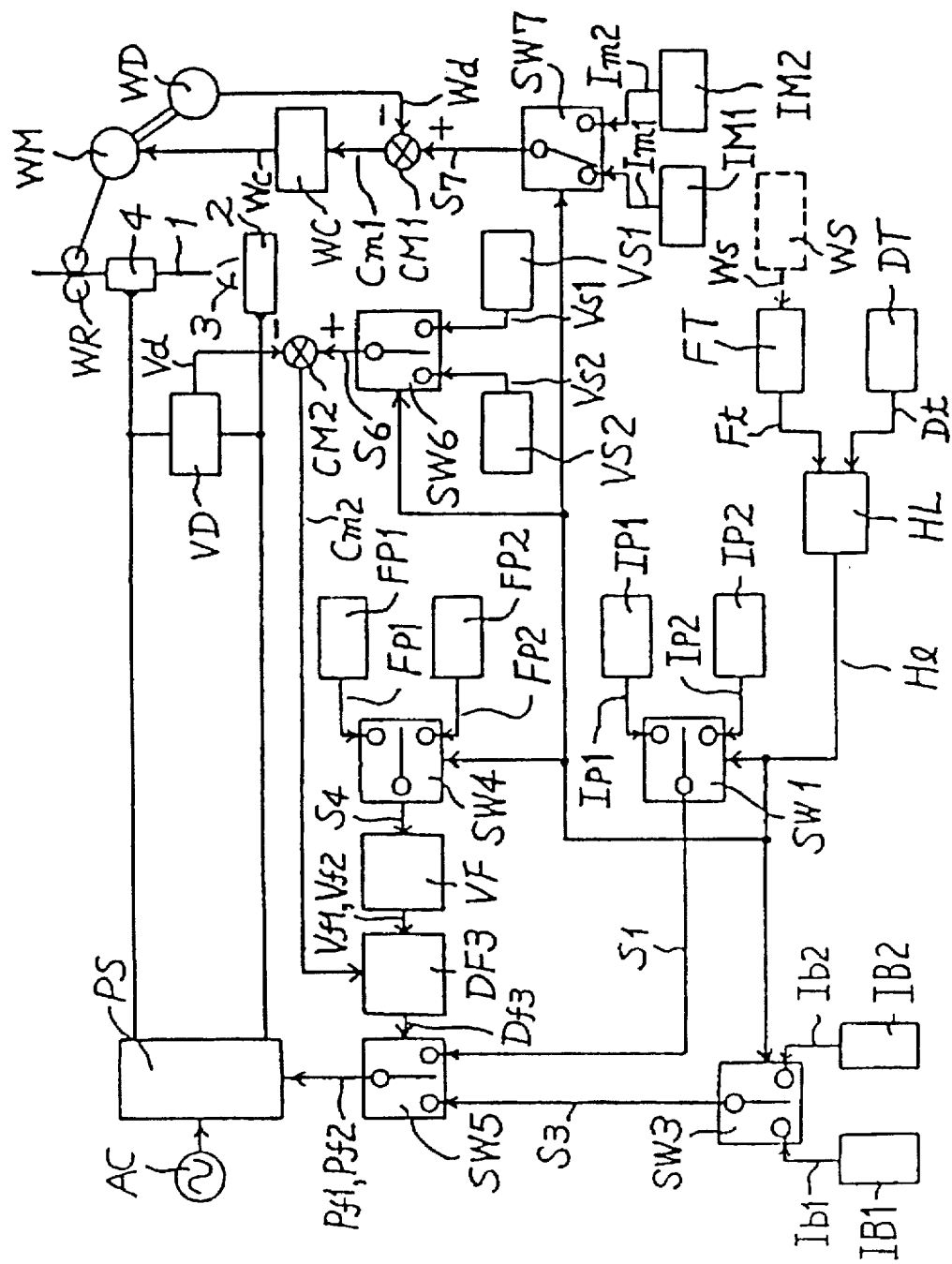
FIG. 100 is a block diagram of an embodiment of the welding apparatus for producing the welding current waveform shown in FIG. 102.
Figure 101A:
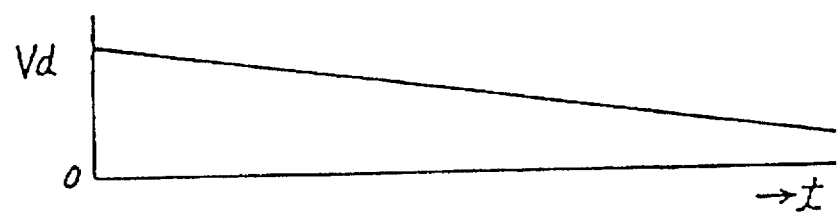
FIGS. 101(A)–101(E) are graphs showing the time passage of the pulse duration control signal shown in the block diagrams of the embodiments of FIGS. 98 to 100.
Figure 101B:
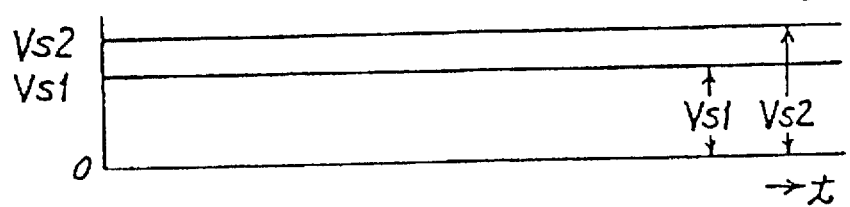
Figure 101C:
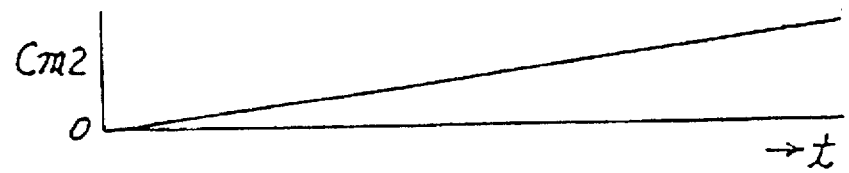
Figure 101D:
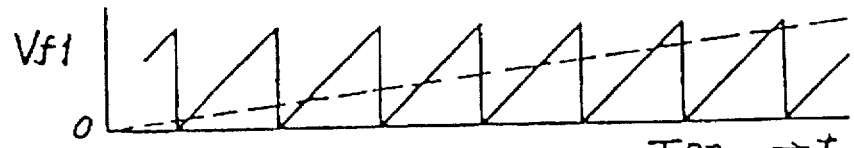
Figure 101E:
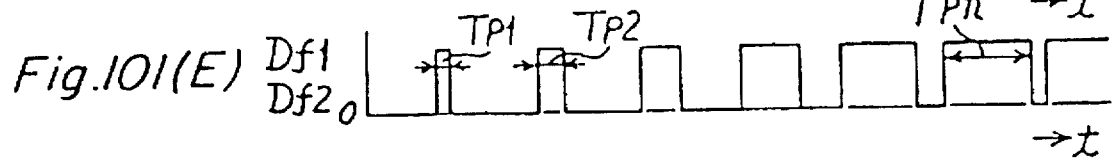

Description of FIG. 100

FIG. 100 is a block diagram of the embodiment of the welding method having the welding waveform shown in FIG. 102.

In FIG. 100, the structures the same as those of FIG. 98 are denoted with the same characters the same as those of FIG. 98 and are omitted in the description. Only different points are described.

In FIG. 100, a first point different from that of FIG. 98 is that the structure in FIG. 100 comprises a first arc voltage setting circuit VS1 and the second arc voltage setting circuit VS2 in place of the arc voltage setting circuit VS1 of FIG. 98. These circuits set the average values of arc voltage at the first pulse duty time T1 and the second pulse duty time T2 and output the first arc voltage setting signal Vs1 and the second arc voltage setting signal Vs2. An arc voltage switching circuit SW6 outputs an arc voltage switching signal S6 by switching between a first arc voltage setting signal Vs1 and the second arc voltage setting signal Vs2 with the switching signal H1. The second comparison circuit CM2 outputs an arc voltage control signal Cm2 from the difference between the signal S1 and the arc voltage detection signal Vd of the arc voltage detection circuit VD. A pulse frequency signal generator circuit VF outputs the pulse frequency signal Vf1 and the second pulse frequency signal Vf2 with a switching frequency of a switching signal H1 upon receiving the pulse frequency switching signal D4. A pulse duration frequency signal generator DF3 for outputting the first pulse duration frequency signal Df31 corresponding to the first pulse duration control signal and the first pulse frequency setting signal Fp1 and the second pulse duration frequency signal Df32 corresponding to the second pulse duration control signal and the second pulse frequency setting signal Fp2. A base pulse current switching circuit SW5 outputs a pulse control signal Pf1 obtained by switching between the pulse current value setting signal Ip1 of the signa S1 and the base current setting signal Ib1 of the signal S3 with the first pulse duration frequency signal Df31 and a second pulse control signal Pf2 obtained by switching between the second pulse current value setting signal Ip2 of the second signal S2 and the base current setting signal Ib21 of the signal S3 with the second pulse duration frequency signal Df32. Both signals Pf1 and Pf2 are inputted to the welding power control circuit PS.

A second different point between the structures of FIGS. 100 and 98 is that the welding apparatus according to FIG.

100 comprises, in place of the average current value setting circuit IM in FIG. 99, the first welding current setting circuit IM1 for outputting the first welding current setting signal Im1, and the second welding current setting circuit IM2 for outputting the second welding current setting signal Im2 and the wire feeding rate switching circuit SW7 for sending the first comparison circuit CM1 the wire feeding rate switching signal S7 obtained by switching between the first welding current setting signal Im1 and the second welding current setting signal Im2 with a switching signal H1.

These additional circuits can achieve the following effects. The average values of welding current M1 and M2 at the first pulse duty time T1 and the second pulse duty time T2 can be obtained by switching the wire feeding rate between the first welding current setting circuit Im1 and the second welding current setting circuit IM2. The above effect achieved by switching the arc length can be enlarged by changing periodically the average values Mi and M2 within a range to maintain the spray transfer mode at the each of the pulse duty times T1 and T2. Specially, in a case of the enlarged gap of the joint, an increase in the welding current due to the increase in the wire feeding rate results in the increase in the molten metal amount. Thus, the enlarged gap can be filled with the increased molten metal and causes the resultant bead to form a beautiful appearance. On the other hand, in a case when the joint gap is smaller, the decrease in the welding current can make the molten metal amount decreased. the smaller gap can be filled with the decreased molten metal amount and causes the resultant bead to form a beautiful appearance.

The description with reference to FIGS. 98 and 100 is directed to a case when the welding apparatus comprises the second pulse current setting circuit IP2, the second pulse frequency setting circuit FP2 and the second base current setting circuit IB2. The welding apparatus comprising one or two circuits is included in the scope of the first and third cases when arc voltage is controlled by pulse duration.

Further, the welding apparatus shown in FIG. 100 comprises a wire feeding rate switching circuit SW7 for outputting the wire feeding rate switching signal S7 obtained by switching the first welding current setting signal Im1 generated from the first welding current setting circuit IM1 and the second welding current setting signal Im2 generated from the second welding current setting circuit IM2. This structure is not necessary for the structure of the welding apparatus according to the third case described hereinabove.

Description of FIG. 101

FIGS. 101 (A) to (E) are graphs showing the waveform of the pulse duration control signals shown in the block diagrams in FIGS. 98 to 100. FIG. 100 (A) shows a case when the arc voltage detection signal Vd decreases gradually in the waveform with time. FIG. 100 (B) shows the time variation of the first and the second arc voltage setting signals Vs1 and Vs2. FIG. 100(C) shows the time variation of the arc voltage control signal Cm2 which increases gradually with time in accordance with the arc voltage detection signal Vd shown in FIG. 100 (A). FIG. 100 (D) shows the time variation of the pulse frequency signal Vf1. FIG. 100 (E) shows the time variation of the pulse duration frequency control signal Df3 generated from the pulse duration frequency control signal generator DF3. It is seen that the pulse duration frequency signal Df3 decreases gradually in the pulse duration (TP1 to TPn) in accordance with the increase in the arc voltage control signal Cm2.

Described hereinbelow are three cases of the present invention when the structure according to claim 30 has the arc voltage controlled with the base current value. A pulse base current control circuit for outputting the pulse base current control signal comprises a base current control circuit IB3 for outputting the base current control signal Ib3 upon receiving the arc voltage control signal Cm 2. A first pulse base current setting circuit for outputting the first pulse base current setting signal comprises a pulse current value setting circuit IP1 for setting the pulse current value setting signal Ip1, a pulse duration setting circuit TP1 for setting a pulse duration setting signal Tp1 and a pulse frequency setting circuit FP1 for setting a pulse frequency setting signal Fp1.

A welding apparatus according to a first embodiment when arc voltage is controlled by base current value comprises the following functions: A second pulse base current setting circuit for outputting the second pulse base current setting signal comprises a second pulse current value setting circuit IP2 for setting the second pulse current value setting signal Ip2, a second pulse duration setting circuit TP2 for setting a second pulse duration setting signal Tp2 and a second pulse frequency setting circuit FP2 for setting a second pulse frequency setting signal Fp2.

A switching setting circuit for outputting a switching setting signal comprises a pulse current value switching circuit SW1 for outputting a switching pulse current value signal S1 obtained by switching between the pulse current value setting signal Ip1 and the second pulse current setting signal Ip2, a pulse duration switching circuit SW2 for outputting a pulse duration switching duration signal S2 obtained by switching between the pulse duration setting signal Tp1 and the second pulse duration setting signal Tp2, and a pulse frequency switching circuit SW4 for outputting pulse frequency switching signal S4 obtained by switching between pulse frequency setting signal Fp1 and the second frequency setting signal Fp2.

A pulse control signal generator for receiving the pulse base current control signal and the switching setting signal comprises a pulse frequency signal generator circuit VF for outputting the first pulse frequency signal Vf1 and the second frequency signal Vf2 upon receiving the pulse frequency switching signal S4, a pulse duration frequency signal generator DF for outputting the first pulse duration frequency signal Df1 consisting of the first pulse frequency signal Vf1 and the first pulse duration signal Tp1 and the second pulse duration frequency signal Df2 consisting of the second pulse frequency signal Vf2 and the second pulse duration signal Tp2, and a base pulse current switching circuit SW5 for switching between the pulse current value switching signal S1 and the arc voltage switching signal S6 with the first pulse duration frequency signal Df1 and the second pulse duration frequency signal Df2.

Figure 104:
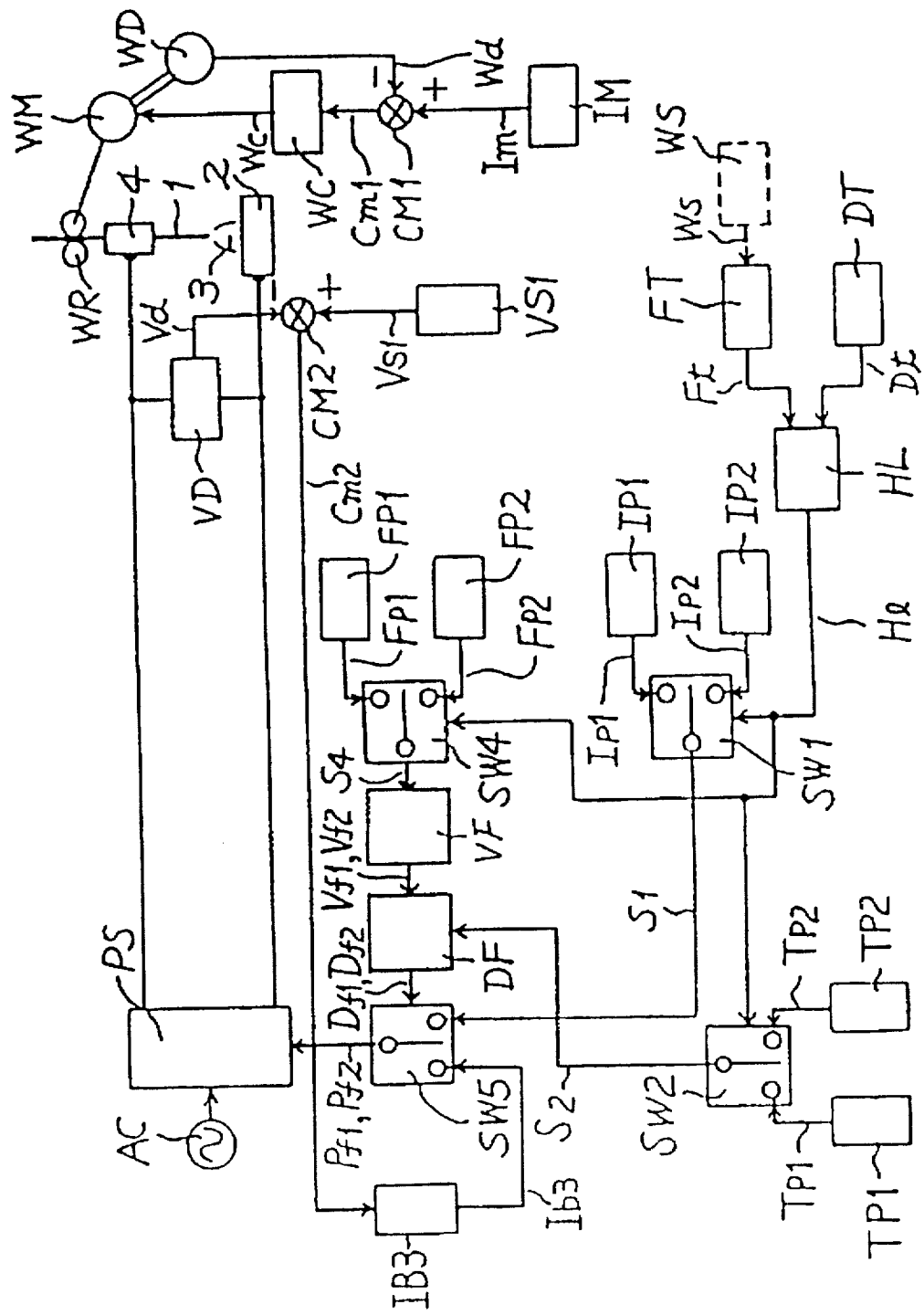
FIG. 104 is a block diagram of an embodiment of the welding apparatus wherein the arc voltage is controlled by base current value.

Description of FIG. 104

Figure 107:
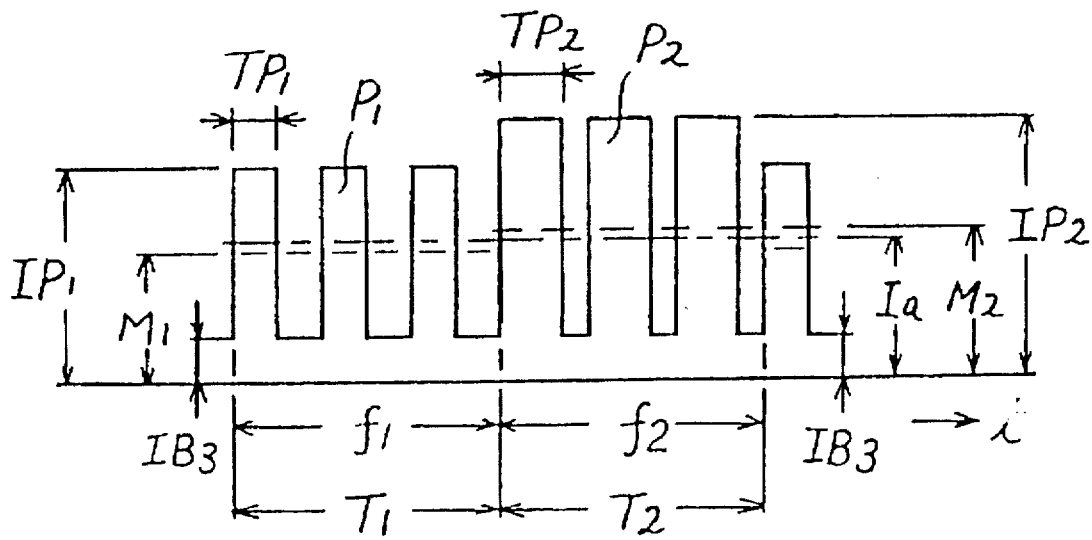
FIG. 107 shows a waveform of the output current of the welding apparatus shown in the block diagram of the embodiments in FIG. 104 and FIG. 106.

FIG. 104 is a block diagram of the embodiment for generating the wave form shown in FIG. 107.

In FIG. 104, the constructions the same as those of FIG. 83 have the same reference characters as those of FIG. 83 and are omitted in the description. The different parts only are described.

The welding apparatus according to the first embodiment when arc voltage is controlled by base current value comprises a base current controlling circuit IB3 and switching signal generator H1 for outputting the switching signal H1 obtained by switching between the first pulse duty time T1 and the second duty time T2. At the first pulse duty time T1, the switching signal H1 causes to energize the first pulse current group determined by the pulse current value and pulse duration and the first base current value controlled by the pulse period and the first arc voltage control signal Cm2 at the small arc length. At the second pulse duty time T2, the switching signal H1 causes to energize the second pulse current group determined by the pulse current value and pulse duration and the second base current value controlled by the pulse period and the second arc voltage control signal Cm2 at the long arc length. Further, the various setting values of the first pulse current group and the second pulse current group are set to change the arc length at the first pulse duty time T1 and the arc length at the second pulse duty time T2 by carrying out the following steps: The first base current value IB31 of the first pulse duty time T1 is set as a value to form a plurality of pulses to one molten metal transfer mode at the short arc length. On the other hand, the second base current value IB32 is changed within the range to form the one pulse to one molten metal transfer or one pulse to plurality of molten metals transfer mode at the long arc length.

The first pulse current value setting circuit IP1 and the second pulse current value setting circuit IP2 are to set the first pulse current value IP1 and the second pulse current IP2, respectively and output the first pulse current value setting signal Ip1 and the second pulse current value setting signal Ip2, respectively. A pulse current value switching circuit SW1 outputs the pulse current value switching signal S1 obtained by switching between the signal Ip1 and the signal IP2 with the switching signal H1.

The first pulse duration setting circuit TP1 and the second pulse duration setting circuit TP2 are to set the first pulse duration TP1 and the second pulse duration TP2, respectively and output the first pulse duration setting signal Tp1 and the second pulse duration setting signal Tp2, respectively. A pulse duration switching circuit SW2 outputs the pulse duration switching signal S2 obtained by switching between the signal Tp1 and the signal TP2 with the switching signal H1.

The first pulse frequency setting circuit FP1 and the second pulse frequency setting circuit FP2 are to set the first pulse frequency FP1 and the second pulse frequency FP2, respectively and output the first pulse frequency setting signal Fp1 and the second pulse frequency setting signal Fp2, respectively. A pulse frequency switching circuit SW4 outputs the pulse frequency switching signal S4 obtained by switching between the signal Fp1 and the signal FP2 with the switching signal H1.

A pulse frequency signal generator circuit VF outputs the first pulse frequency signal Vf1 and the second frequency signal Vf2 upon receiving the pulse frequency switching signal S4. A pulse duration frequency signal generator DF outputs the first pulse duration frequency signal Df1 corresponding to the first pulse frequency signal Vf1 and the first pulse duration signal Tp1 and the second pulse duration frequency signal Df2 corresponding to the second pulse frequency signal Vf2 and the second pulse duration signal Tp2. A base pulse current switching circuit SW5 outputs a pulse control signal Pf1 obtained by switching, with the first pulse duration frequency signal Df1, between the first base current control signal Ib31 and a signal for energizing the first pulse current value setting signal Ip1 at the period corresponding to the pulse duration determined by the pulse duration setting signal Tp1 which is formed into the first pulse duration frequency signal Df1 at the first pulse time T1. Next, a base pulse current switching circuit SW5 outputs a pulse control signal Pf2 obtained by switching, with the second pulse duration frequency signal Df2, between the second base current control signal Ib32 and a signal for energizing the second pulse current value setting signal Ip2 at the period corresponding to the pulse duration determined by the second pulse duration setting signal Tp2 which is formed into the second pulse duration frequency signal Df2 at the second pulse time T2. And both pulse control signals Pf1 and Pf2 are outputted to the welding power control circuit PS.

The welding apparatus according to this embodiment comprises at least one from the group of the second current value setting circuit IP2 and the second pulse frequency setting circuit FP2 and the second pulse duration setting circuit TP2 in addition to the first pulse current value setting circuit IP1, the first pulse frequency setting circuit FP1 and the first pulse duration setting circuit TP1. The switching signal H1 of the switching signal generator HL switches the first pulse duty time T1 and the second pulse duty time T2 and causes to energize the first pulse current group determined by the controlled first base current value IB31, the first pulse current value IP1, the first pulse duration TP1 and the first pulse period D1 at the first pulse duty time T1. At the second pulse duty time T2, the switching signal H1 causes to energize the second pulse current group determined by the controlled second base current value IB32, the second pulse current value IP2, the second pulse duration TP2 and the second pulse period D2.

Description of FIG. 107

In FIG. 107, reference characters P1, P1, . . . P1 denote a first pulse current group consisting of a first pulse current value IP1, a first pulse duration TP1, a first pulse frequency f1 and a first base current IB3. Reference characters P2, P2, . . . P2 denote a second pulse current group consisting of a second pulse current value IP2, a second pulse duration TP2, a second pulse frequency f2 and a second base current IB3.

Reference characters M1 and M2 denote the average value of the welding current at the first pulse current duty time T1 and the second pulse duty time T2, respectively. A reference character Ia is an average value of a welding current.

The description with reference to FIG. 102 is directed to a case when the value of the second welding condition is larger than that of the first welding condition, that is, IP1<IP2, FP1<FP2, or TP1<TP2. However, the condition M1<M2 permits the value of the second welding condition lower than that of the first welding condition; that is FP1>FP2, when IP1<IP2, and TP1<TP2. Others are the same as the those in FIG. 92 and should be omitted.

The welding apparatus according to the second embodiment when arc voltage is controlled by base current value comprises the following functions: A second pulse base current setting circuit for outputting the second pulse base current setting signal comprises a second arc voltage setting circuit VS2 for setting a second arc voltage setting signal Vs2, a pulse current value setting circuit IP1 for outputting a pulse current value setting signal Ip1 and a pulse frequency setting circuit FP1 for setting a pulse frequency setting signal Ib1.

A switching setting circuit for outputting a switching setting signal comprises an arc voltage switching circuit SW6 for outputting an arc voltage switching signal S6 by switching between an arc voltage setting signal Vs1 corresponding to the first arc length and the second arc voltage setting signal Vs2 corresponding to the second arc length.

A pulse control signal generator for receiving pulse base current control signal and the switching setting signal comprises a pulse frequency signal generator circuit VF for outputting the pulse frequency signal Vf1 upon receiving the pulse frequency setting signal Fp1, a pulse duration frequency signal generator DF for outputting the first pulse duration frequency signal Df1 consisting of the pulse duration signal Tp1 and the pulse frequency signal Vf1, and a base pulse current switching circuit SW5 for switching between the pulse current value signal Ip1 and the base current control signal Ib3 corresponding to the arc voltage switching signal S6 with the first pulse duration frequency signal Df1.

Figure 105:
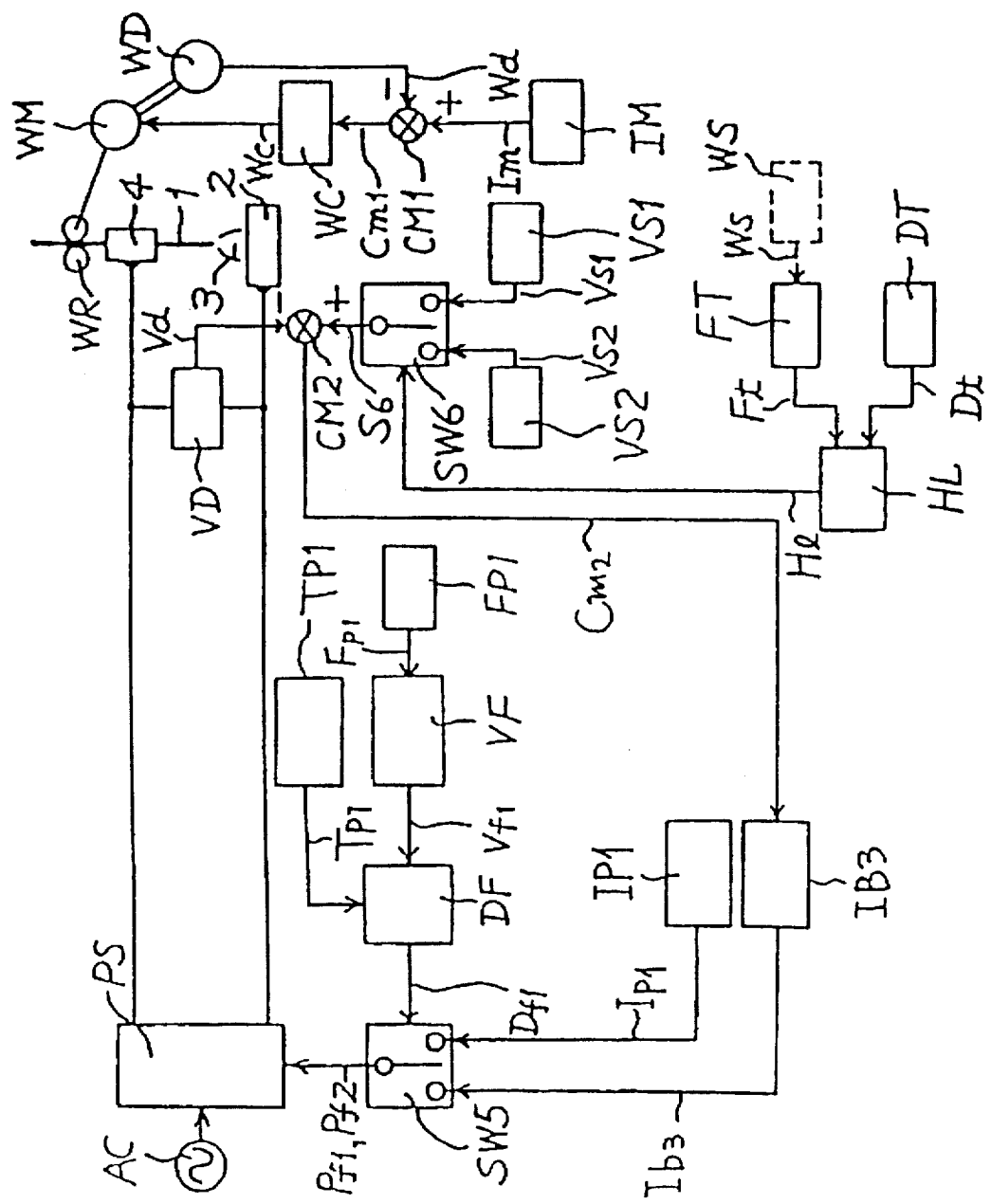
FIG. 105 is a block diagram of an embodiment of the welding apparatus for producing the welding current waveform shown in FIG. 108.

Description of FIG. 105

Figure 108:
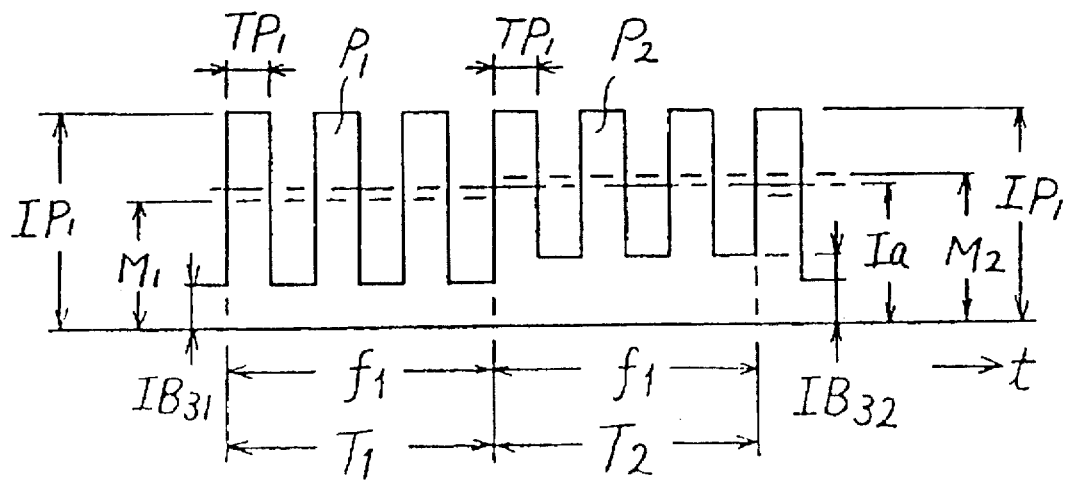
FIG. 108 shows a waveform of the output current of the welding apparatus shown in the block diagram in FIG. 105.

FIG. 105 is a block diagram of the embodiment for generating the wave form shown in FIG. 108.

In FIG. 105, the constructions the same as those of FIG. 104 have the same reference characters as those of FIG. 104 and are omitted in the description. The different parts only are described.

In FIG. 105, the first arc voltage setting circuit VS1 and the second arc voltage setting circuit VS2 are to set the average value of arc voltage at the first pulse duty time T1 and the second duty time T2, respectively and output the first arc voltage setting signal Vs1 and the second arc voltage setting signal Vs2, respectively. An arc voltage switching circuit SW6 outputs the arc voltage switching signal S6 by switching between the signals Vs1 and Vs2 with the switching signal H1. The second comparison circuit CM2 outputs the arc voltage control signal Cm2 from the difference between the signal S6 and the arc voltage detection signal Vd of the arc voltage detection circuit VD. The base current control circuit IB3 outputs the first base current control signal Ib3 and the second base current control signal Ib32 corresponding to the first base current value IB32 and the second base value IB 32 upon receiving the first arc voltage control signal Cm2 at the first pulse duty time T1 and the second arc voltage control signal Cm2 at the second arc duty time T2.

A pulse current value setting circuit IP1 for setting the pulse current value outputs the pulse current setting signal Ip1. A pulse frequency setting circuit FP1 outputs the pulse frequency setting signal Fp1 corresponding to the pulse period (D1=D2). The pulse duration setting circuit TP1 for setting the pulse duration outputs the pulse duration setting signal Tp1. The pulse frequency signal generator VF outputs the pulse frequency signal Vf1 upon receiving the pulse frequency setting signal Fp1. The pulse duration frequency signal generator DF outputs the pulse duration frequency signa Df1 consisting of the pulse duration setting signal Tp1 and the pulse frequency setting signal Vf1. Next, a base pulse current switching circuit SW5 outputs a pulse control signal Pf1 obtained by switching, with the first pulse duration frequency signal Df1, between the first base current control signal Ib31 and a signal for energizing the first pulse current value setting signal Ip1 at the period corresponding to the pulse duration determined by the first pulse duration setting signal Tp1 which is formed into the first pulse duration frequency signal Df1 at the first pulse time T2 and a pulse control signal Pf2 obtained by switching, with the second pulse duration frequency signal Df2, between the second base current control signal Ib32 and a signal for energizing the second pulse current value setting signal Ip2 at the period corresponding to the pulse duration determined by the second pulse duration setting signal Tp2 which is formed into the second pulse duration frequency signal Df2 at the second pulse time T2. Both pulse control signals Pf1 and Pf2 are inputted to the welding current power control circuit PS.

In such a way, the welding apparatus according to FIG. 105 sends the wire feeding motor WA the average current setting signal Im set by the average current setting circuit IM. The pulse current group are set or controlled so as to be the average current value Ia corresponding to the wire feeding rate and the arc voltage setting value. The welding apparatus according to the claim does not carry out the process to switch the average value of the welding current by switching the wire feeding rate in a different way from the conventional welding apparatus and is not affected by the response delay to the wire feeding motor WM. The welding apparatus according to the claim comprises the base current control circuit IB3 and a switching signal generator H1 for outputting the switching signal H1 obtained by switching between the first pulse duty time T1 and the second pulse duty time T2. At the first pulse duty time T1, the switching signal H1 causes to energize the first pulse current group determined by the first base current value which is controlled by the first arc voltage control signal Cm2 at the predetermined pulse current value, pulse duration, pulse period and the short arc length. At the second pulse duty time T2, the switching signal H1 causes to energize the second pulse current group determined by the second base current value which is controlled by the second arc voltage control signal Cm2 at the predetermined pulse current value, pulse duration, pulse period and the long arc length. Further, the various setting values at the first pulse current group and the second pulse current group are set to be a value to form the plurality of pulses to one molten metal transfer mode or one pulse to one molten metal transfer mode of a short arc length at the first pulse duty time T1. At the second pulse duty time T2, these values are changed within the range to form the one pulse to one molten metal transfer mode or the one pulse to plurality of molten metal transfer mode at a long arc length. In such a way, the welding apparatus according to the claim is in a structure for changing the arc length at the first pulse duty time T1 and the arc length at the second pulse duty time T2.

Description of FIG. 108

In FIG. 108, reference characters P1, P1, ... P1 denote a first pulse current group consisting of a first pulse current value IP1, a first pulse duration TP1, a first pulse frequency f1 and a first base current IB3. Reference characters P2, P2, ... P2 denote a second pulse current group consisting of a second pulse current value IP12 the same as the first pulse current, a second pulse duration TP1 the same as the first pulse duration, a second pulse frequency f1 the same as the first pulse frequency and a second base current IB3.

Reference characters M1 and M2 denote the average value of the welding current at the first pulse current duty time T1 and the second pulse duty time T2, respectively. A reference character Ia is an average value of a welding current.

The welding apparatus according to the third embodiment when arc voltage is controlled by base current value comprises the following functions: A second pulse base current setting circuit for outputting the second pulse base current setting signal comprises a second arc voltage setting circuit VS2 for setting a second arc voltage setting signal Vs2, a second pulse current value setting circuit IP2 for outputting a second pulse current value setting signal Ip2, the second pulse duration setting circuit TP2 for setting the second pulse duration setting signal Tp2 and a second pulse frequency setting circuit FP2 for setting a second pulse frequency setting signal Fp2.

A switching setting circuit for outputting a switching setting signal comprises an arc voltage switching circuit Sw6 for outputting an arc voltage switching signal S6 by switching between an arc voltage setting signal Vs1 corresponding to the first arc length and the second arc voltage setting signal Vs2 corresponding to the second arc length, a pulse current value switching circuit SW1 outputting the pulse current value switching signal S1 obtained by switching between the pulse current value setting signal Ip1 and the second pulse current value setting signal Ip2, a pulse duration switching circuit SW2 outputting the pulse duration switching signal S2 obtained by switching between the pulse duration setting signal Tp1 and the second pulse duration setting signal Tp2, and a pulse frequency switching circuit SW4 outputting the pulse frequency switching signal S4 obtained by switching between the pulse frequency setting signal Fp1 and the second pulse frequency setting signal Fp2.

A pulse control signal generator for receiving pulse base current control signal and the switching setting signal comprises a pulse frequency signal generator circuit VF for outputting the pulse frequency signal Vf1 and the second pulse frequency signal Vf2 upon receiving the pulse frequency switching signal S4, a pulse duration frequency signal generator DF for outputting the first pulse duration frequency signal Df1 consisting of the pulse frequency signal Vf1 and the pulse duration signal Tp1, and the second pulse duration frequency signal Df1 consisting of the second frequency signal Vf2 and the second pulse duration signal Tp2, and a base pulse current switching circuit SW5 for switching between the pulse current value switching signal S1 and the base current control signal Ib3 corresponding to the arc voltage switching signal S6 with the first pulse duration frequency signal Df1 and the second pulse duration frequency signal Df2.

Figure 106:
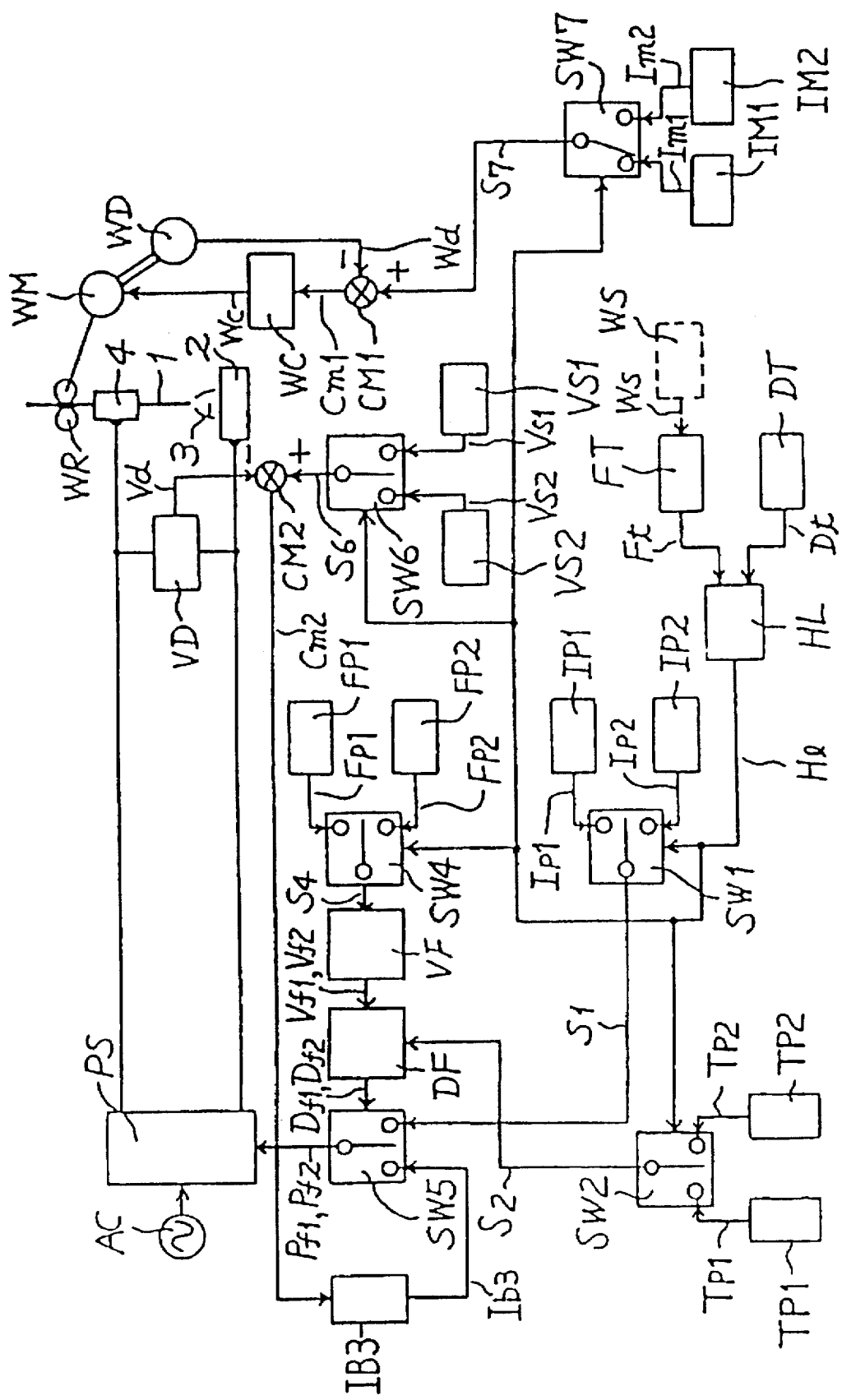
FIG. 106 is a block diagram of an embodiment of the welding apparatus for producing the welding current waveform shown in FIG. 107.

Description of FIG. 106

FIG. 106 is a block diagram of the embodiment for generating the wave form shown in FIG. 107.

In FIG. 106, the constructions the same as those of FIG. 104 have the same reference characters as those of FIG. 104 and are omitted in the description. The different parts only are described.

In FIG. 106, a first different structure form that of FIG. 104 is that the first arc voltage setting circuit VS1 and the second arc voltage setting circuit VS2 are to set the average value of arc voltage at the first pulse duty time T1 and the second duty time T2, respectively and output the first arc voltage setting signal Vs1 and the second arc voltage setting signal Vs2 in place of the first arc voltage setting circuit VS1 shown in FIG. 104. An arc voltage switching circuit SW6 outputs the arc voltage switching signal S6 by switching between the signals Vs1 and Vs2 with the switching signal H1. The second comparison circuit CM2 outputs the arc voltage control signal Cm2 from the difference between the signal S6 and the arc voltage detection signal Vd of the arc voltage detection circuit VD. The base current control circuit IB3 outputs the first base current control signal Ib31 and the second base current control signal Ib32 corresponding to the first base current value IB32 and the second base value IB 32 upon receiving the first arc voltage control signal Cm2 at the first pulse duty time T1 and the second arc voltage control signal Cm2 at the second arc duty time T2.

A second different point between the structures in FIGS. 106 and 104 is that the structure in FIG. 106 comprises the following circuits in place of the average current value setting circuit IM. The welding apparatus shown in FIG. 106 comprises the first welding current setting circuit IM1 for outputting the first welding current setting signal Im1 and the second welding current setting circuit IM2 for outputting the second welding current setting signal Im2 and the wire feeding rate switching circuit SW7 for sending the first comparison circuit CM1 the wire feeding rate switching signal S7 obtained by switching between the first welding current setting signal Im1 and the second welding current setting signal Im2 with the switching signal H1.

Other structures except for the above structures are the same as those of FIG. 105 and should be omitted in the description.

The description with reference to FIGS. 104 and 106 is directed to the welding apparatus comprising the second pulse current setting circuit IP2 and the second pulse duration setting circuit TP2 and the second pulse frequency setting circuit FP2. The welding apparatus comprising one or two circuits are included in the scope of the first and third cases when arc voltage is controlled by base current value.

Further, the welding apparatus shown in FIG. 106 comprises the wire feeding rate switching circuit SW7 for outputting the wire feeding rate switching signal S7 obtained by switching between the first welding current setting signal Im1 generated from the first welding current setting circuit Im1 and the second welding current setting signal Im2 generated from the second welding current setting circuit Im2. The above structure is not necessary for the structure of the third case described hereinabove.

Described hereinbelow are three more embodiments of the present invention when the structure has the arc voltage controlled with the base current value. A pulse base current control circuit for outputting the pulse base current control signal comprises a pulse current control circuit IP3 for outputting the pulse current control signal Ip3 upon receiving arc voltage control signal Cm 2.

A first pulse base current setting circuit for outputting the first pulse base current setting signal comprises a pulse duration setting circuit TP1 for setting the pulse duration setting signal Tp1, a pulse frequency setting circuit FP1 for setting a pulse frequency setting signal Fp1 and a base current setting circuit IB1 for setting a base current setting signal Ib1.

The welding apparatus according to a first embodiment when arc voltage is controlled by pulse current value comprises the following functions: A second pulse base current setting circuit for outputting the second pulse base current setting signal comprises the second pulse duration setting circuit TP2 for setting the second pulse duration setting signal Tp2 and a second pulse frequency setting circuit FP2 for setting a second pulse frequency setting signal Fp2 and a second base current value setting circuit IB2 for outputting a second base current value setting signal Ib2.

A switching setting circuit for outputting a switching setting signal comprises a pulse duration switching circuit SW2 for outputting a pulse duration switching signal S2 by switching between a pulse duration setting signal Tp1 and the second pulse duration setting signal Tp2, a pulse frequency switching circuit SW4 outputting the pulse frequency switching signal S4 obtained by switching between the pulse frequency setting signal Fp1 and the second pulse frequency setting signal Fp2 and a base current value switching circuit SW3 outputting the base current value switching signal S3 obtained by switching between the base current value setting signal Ib1 and the second base current value setting signal Ib2.

A pulse control signal generator for receiving pulse base current control signal and the switching setting signal comprises a pulse frequency signal generator circuit VF for outputting the pulse frequency signal Vf1 and the second pulse frequency signal Vf2 upon receiving the pulse frequency switching signal S4, a pulse duration frequency signal generator DF for outputting the first pulse duration frequency signal Df1 consisting of the pulse frequency signal Vf1 and the pulse duration signal Tp1, and the second pulse duration frequency signal Df2 consisting of the second frequency signal Vf2 and the second pulse duration signal Tp2, and a base pulse current switching circuit SW5 for switching between the base current value switching signal S3 and the pulse current control signal Ip3 corresponding to the arc voltage switching signal S6 with the first pulse duration frequency signal Df1 and the second pulse duration frequency signal Df2.

Figure 109:
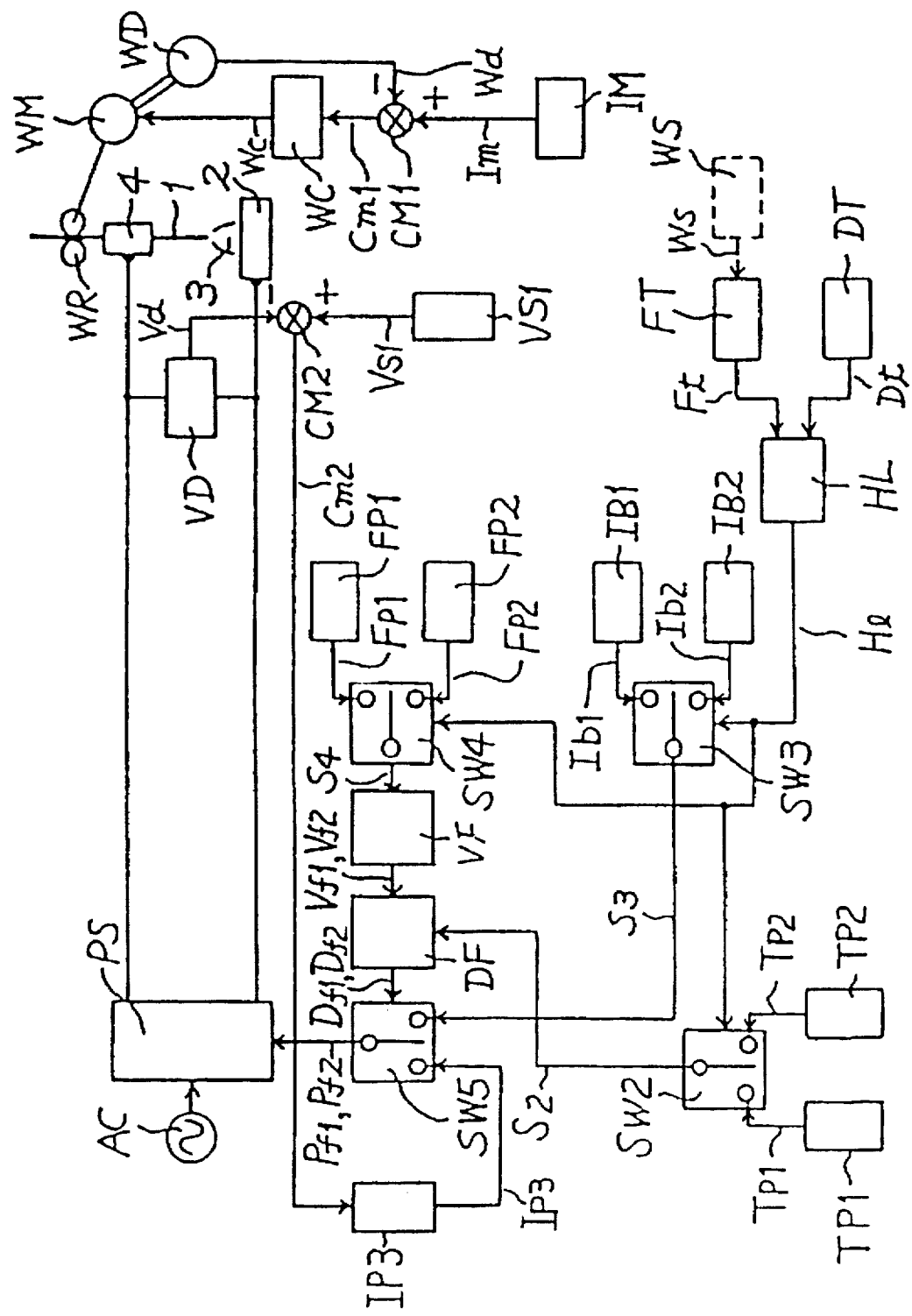
FIG. 109 is a block diagram of an embodiment of the welding apparatus wherein the arc voltage is controlled by pulse current value.

Description of FIG. 109

Figure 112:
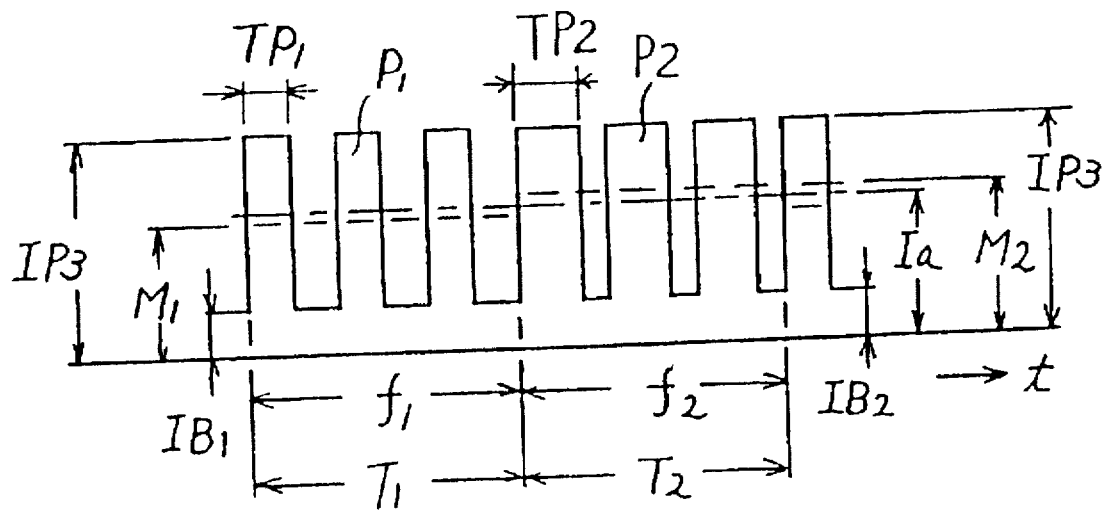
FIG. 112 shows a waveform of the output current of the welding apparatus shown in the block diagram in FIGS. 109 and 111.

FIG. 109 is a block diagram of the embodiment for generating the wave form shown in FIG. 112.

In FIG. 109, the constructions the same as those of FIG. 83 have the same reference characters as those of FIG. 83 and are omitted in the description. The different parts only are described.

The first pulse duration setting circuit TP1 and the second pulse duration setting circuit TP2 for setting the first pulse duration setting signal Tp1 and the second pulse duration setting signal Tp2, respectively output the first pulse duration setting signal Tp1 and the second pulse duration setting signal Tp2, respectively. A pulse duration switching circuit SW2 outputs a pulse duration switching signal S2 by switching between a pulse duration setting signal Tp1 and the second pulse duration setting signal Tp2 with a switching signal H1.

A first pulse frequency setting circuit FP1 and a second pulse frequency setting circuit FP2 set a first pulse frequency setting signal Fp1 and a second pulse frequency setting signal Fp2, respectively. A pulse frequency switching circuit SW4 outputs the pulse frequency switching signal S4 obtained by switching between the pulse frequency setting signal Fp1 and the second pulse frequency setting signal Fp2.

A first base current value setting circuit IB1 and a second base current value setting circuit IB2 for setting a first base current value setting signal Ib1 and a second base current value setting signal Ib2 output a first base current value setting signal Ib1 and a second base current value setting signal Ib2, respectively. A base current value switching circuit SW3 outputs the base current value switching signal S3 obtained by switching between the base current value setting signal Ib1 and the second base current value setting signal Ib2.

A pulse frequency signal generator circuit VF outputs the pulse frequency signal Vf1 and the second pulse frequency signal Vf2 upon receiving the pulse frequency switching signal S4. A pulse duration frequency signal generator DF outputs the first pulse duration frequency signal Df1 consisting of the pulse frequency signal Vf1 and the pulse duration signal Tp1, and the second pulse duration frequency signal Df1 consisting of the second frequency signal Vf2 and the second pulse duration signal Tp2. A base pulse current switching circuit SW5 outputs a pulse control signal Pf1 obtained by switching, with the first pulse duration frequency signal Df1, between a signal for energizing the first pulse current control signal Ip31 and the first base current value setting signal Ib1 at the period corresponding to the pulse duration determined by the first pulse duration setting signal Tp1 which is formed into the first pulse duration frequency signal Df1 at the second pulse time T1. Next, a base pulse current switching circuit SW5 outputs a pulse control signal Pf2 obtained by switching, with the second pulse duration frequency signal Df2, between a signal for energizing the second pulse current control signal Ip32 and the second base current value setting signal Ib2 at the period corresponding to the pulse duration determined by the second pulse duration setting signal Tp2 which is formed into the second pulse duration frequency signal Df2 at the second pulse time T2. And both pulse control signals Pf1 and Pf2 are outputted to the welding power control circuit.

The welding apparatus according to the fourth embodiment comprises at least one of the second pulse duration setting circuit TP2 and the second pulse frequency setting circuit Fp2 and the second base current setting circuit IB2 in addition to the first pulse duration setting circuit TP1, the first pulse frequency setting circuit Fp1 and the first base current setting circuit IB1. The switching signal generator HL outputs a switching signal H1 by switching between the first pulse duty time T1 and the second pulse duty time T2. The switching signal causes to energize the first pulse current group determined by the first pulse current value IP31, the first pulse duration Tp1 and the first base current value IB1 at the first pulse duty time T1. On the other hand, the switching signal H1 causes to energize the second pulse current group determined by the second pulse current value IP32, the second pulse duration Tp2 the second frequency f2 and the second base current value IB2 at the second pulse duty time T2. The various setting values at the first pulse current P1 and the second pulse current P2 are set to a specified value. The first pulse current P1 at the first pulse duration time T1 is set to a value to form the plurality of pulse to one molten metal transfer mode or the one pulse to one molten metal transfer. The second pulse current P2 at the second pulse duty time T2 changes one or more than two of the first pulse duration, the pulse frequency and the base current value other than the first pulse current to change within the range to form the one pulse to one molten metal transfer mode or the one pulse to plurality of molten metal transfer mode. Accordingly, the apparatus according to the present invention can change the arc length at the first pulse duty time T1 and the arc length at the second pulse duty time T2.

In such a way, the welding apparatus sends the wire feeding motor WA the average current setting signal Im set by the average current setting circuit IM. The pulse current group are set and controlled so as to be the average current value Ia corresponding to the wire feeding rate and the arc voltage setting value. The welding apparatus according to this embodiment does not carry out the process to switch the average value of the welding current by switching the wire feeding rate in a different way from the conventional welding apparatus and is not affected by the response delay to the wire feeding motor WM. The welding apparatus according to this embodiment comprises the base current control circuit IB3 and a switching signal generator H1 for outputting the switching signal H1 obtained by switching between the first pulse duty time T1 and the second pulse duty time T2. At the first pulse duty time T1, the switching signal H1 causes to energize the first pulse current group determined by the first base current value which is controlled by the first arc voltage control signal Cm2 at the predetermined pulse current value, pulse duration, pulse period and the short arc length. At the second pulse duty time T2, the switching signal H1 causes to energize the second pulse current group determined by the second base current value which is controlled by the second arc voltage control signal Cm2 at the predetermined pulse current value, pulse duration, pulse period and the long arc length. Further, the various setting values at the first pulse current group and the second pulse current group are set to be a value to form the plurality of pulses to one molten metal transfer mode or one pulse to one molten metal transfer mode of a short arc length at the first pulse duty time T1. At the second pulse duty time T2, these values are changed within the range to form the one pulse to one molten metal transfer mode or the one pulse to plurality of molten metal transfer mode at a long arc length. In such a way, the welding apparatus according this embodiment claim is of a structure capable of changing the arc length at the first pulse duty time T1 and the arc length at the second pulse duty time T2.

Description of FIG. 112

In FIG. 112, reference characters P1, P1, ... P1 denote a first pulse current group consisting of a first pulse current value IP3, a first pulse duration TP1, a first pulse frequency f1 and a first base current IB1. Reference characters P2, P2, ... P2 denote a second pulse current group consisting of a second pulse current value IP3, a second pulse duration TP2, a second pulse frequency f2 and a second base current IB2.

Reference characters M1 and M2 denote the average value of the welding current at the first pulse current duty time T1 and the second pulse duty time T2, respectively. A reference character Ia is an average value of a welding current.

The description with reference to FIG. 112 is directed to a case when the value of the second welding condition is larger than that of the first welding condition, that is, TP1<TP2, FP1<FP2, or IB1<IB2. However, the condition M1<M2 permits the value of the second welding condition lower than that of the first welding condition; that is IB1>IB2, when TP1<TP2, and FP1<FP2. Others are the same as the those in FIG. 92 and should be omitted.

The welding apparatus according to a second embodiment when arc voltage is controlled by pulse current value comprises the following functions: A second pulse base current setting circuit for outputting the second pulse base current setting signal comprises a second arc voltage setting circuit VS2 for setting a second arc voltage setting signal Vs2, the second pulse duration setting circuit TP2 for setting the second pulse duration setting signal Tp2 and a first pulse frequency setting circuit FP1 for setting a first pulse frequency setting signal Fp1 and a first base current value setting circuit IB1 for outputting a first base current value setting signal Ib2.

A switching setting circuit for outputting a switching setting signal comprises an arc voltage switching circuit SW6 for outputting an arc voltage switching signal S6 by switching between an arc voltage setting signal Vs1 corresponding to the first arc length and the second arc voltage setting signal Vs2 corresponding to the second arc length.

A pulse control signal generator for receiving pulse base current control signal and the switching setting signal comprises a pulse frequency signal generator circuit VF for outputting the pulse frequency signal Vf1 upon receiving the pulse frequency setting signal Fp1, a pulse duration frequency signal generator DF for outputting the first pulse duration frequency signal Df1 consisting of the pulse frequency signal Vf1 and the pulse duration signal Tp1, and a base pulse current switching circuit SW5 for switching between the pulse current value switching signal S1 and the base current control signal Ib3 corresponding to the arc voltage switching signal S6 with the first pulse duration frequency signal Df1 and the second pulse duration frequency signal Df2.

Figure 110:
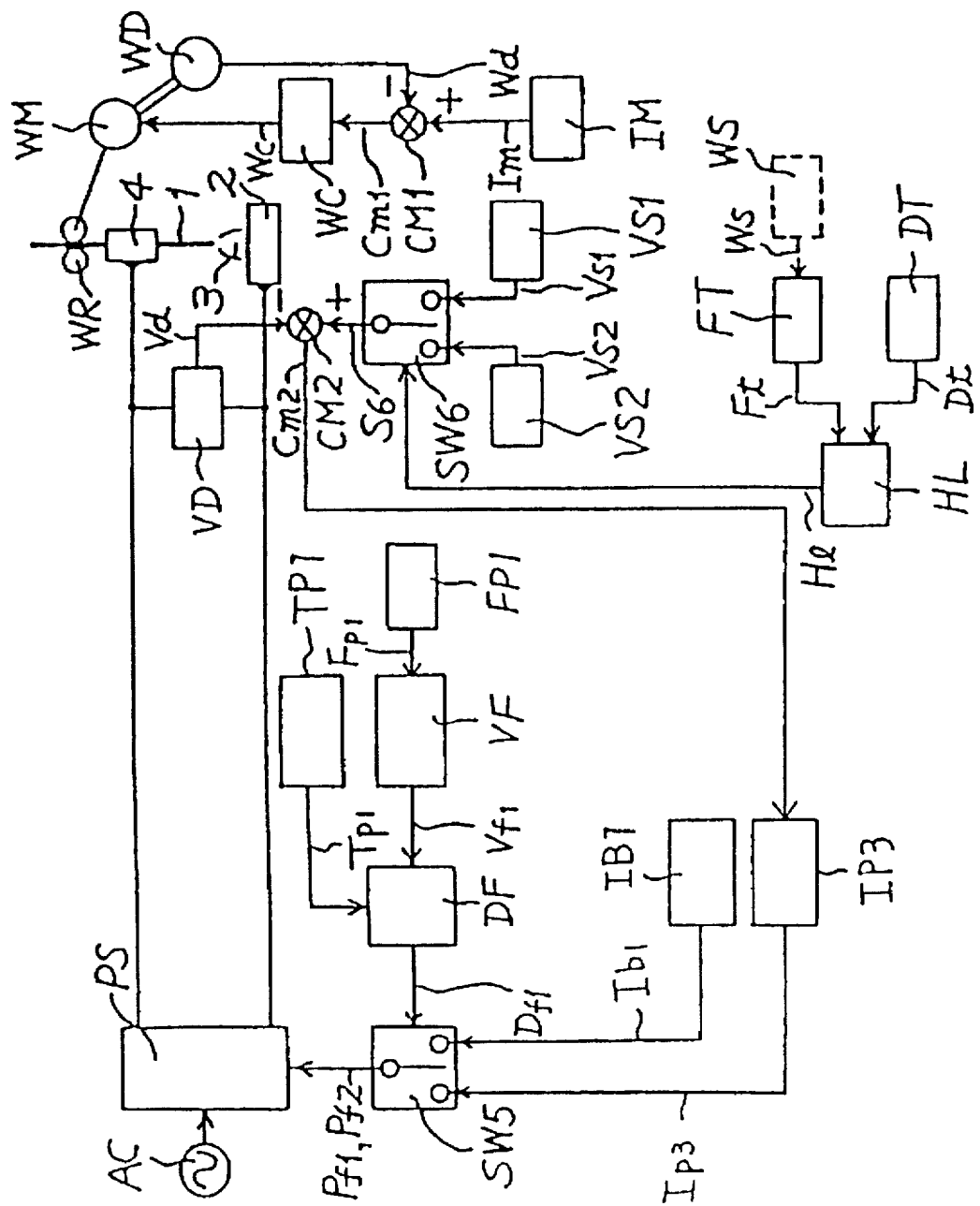
FIG. 110 is a block diagram of an embodiment of the welding apparatus for producing the welding current waveform shown in FIG. 113.

Description of FIG. 110

Figure 113:
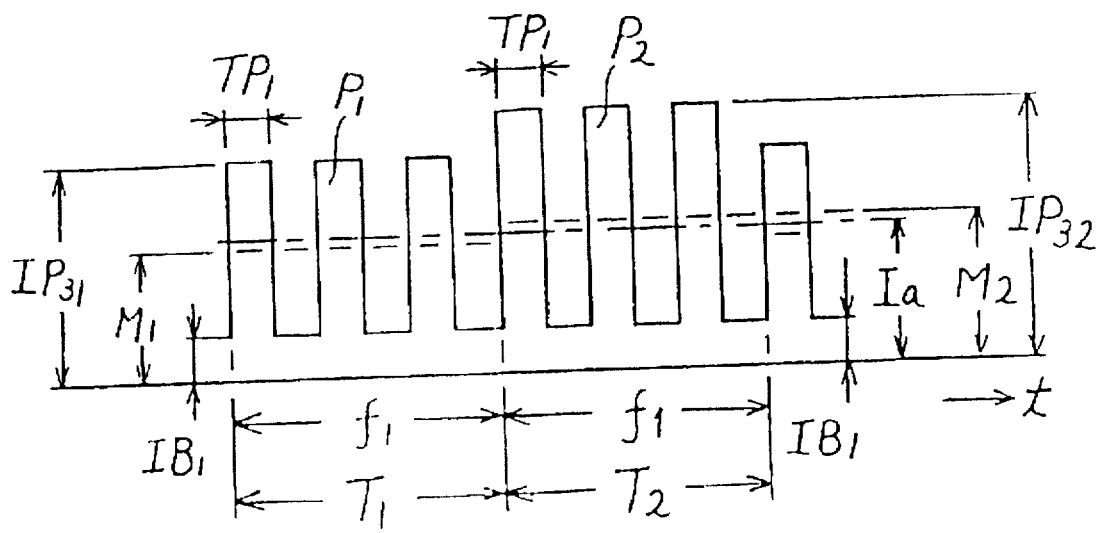
FIG. 113 shows a waveform of the output current of the welding apparatus shown in the block diagram in FIG. 110.

FIG. 110 is a block diagram of the embodiment for generating the wave form shown in FIG. 113.

In FIG. 110, the constructions the same as those of FIG. 109 have the same reference characters as those of FIG. 109 and are omitted in the description. The different parts only are described.

In FIG. 110, the first arc voltage setting circuit VS1 and the second arc voltage setting circuit VS2 are to set the average value of arc voltage at the first pulse duty time T1 and the second duty time T2, respectively and output the first arc voltage setting signal Vs1 and the second arc voltage setting signal Vs2, respectively. An arc voltage switching circuit SW6 outputs the arc voltage switching signal S6 by switching between the signals Vs1 and Vs2 with the switching signal H1. The second comparison circuit CM2 outputs the arc voltage control signal Cm2 from the difference between the signal S1 and the arc voltage detection signal Vd of the arc voltage detection circuit VD. The pulse current control circuit IP3 outputs the first pulse current control signal Ip31 and the second base current control signal Ip32 corresponding to the first pulse current value IP31 and the second pulse value IP32 upon receiving the first arc voltage control signal Cm2 at the first pulse duty time T1 and the second arc voltage control signal Cm2 at the second arc duty time T2.

A pulse frequency setting circuit FP1 outputs the pulse frequency setting signal Fp1 corresponding to the pulse period (D1=D2). The pulse duration setting circuit TP1 for setting the pulse duration outputs the pulse duration setting signal Tp1. The base current setting circuit IB1 for setting the base current value outputs the base current setting signal Ib1. The pulse frequency signal generator VF outputs the pulse frequency signal Vf1 upon receiving the pulse frequency setting signal Fp1. The pulse duration frequency signal generator DF outputs the pulse duration frequency signal Df1 consisting of the pulse duration setting signal Tp1 and the pulse frequency setting signal Vf1. Next, a base pulse current switching circuit SW5 outputs a pulse control signal Pf1 obtained by switching, with the first pulse duration frequency signal Df1, between a signal for energizing the pulse current value control signal Ip3 and the first base current setting signal Ib31 at the period corresponding to the pulse duration determined by the first pulse duration setting signal which is formed into the first pulse duration frequency signal Df1 at the first pulse time T1 and a pulse control signal Pf2 obtained by switching, with the second pulse duration frequency signal Df2, between a signal for energizing the second pulse current value control signal Ip3 and the second base current setting signal Ib12 at the period corresponding to the pulse duration determined by the second pulse duration setting signal Tp2 which is formed into the second pulse duration frequency signal Df1 at the second pulse time T2. Both pulse control signals Pf1 and Pf2 are inputted to the welding current power control circuit PS.

Others are the same as those of FIG. 109 and should be omitted.

Description of FIG. 113

In FIG. 113, reference characters P1, P1, ... P1 denote a first pulse current group consisting of a first pulse current value IP3, a first pulse duration TP1, a first pulse frequency f1 and a first base current IB1. Reference characters P2, P2, ... P2 denote a second pulse current group consisting of a second pulse current value IP32, a second pulse duration TP1 the same as the first pulse duration, a second pulse frequency f1 the same as the first pulse frequency and a second base current IB1 the same as the first base current.

Reference characters M1 and M2 denote the average value of the welding current at the first pulse current duty time T1 and the second pulse duty time T2, respectively. A reference character Ia is an average value of a welding current.

The welding apparatus according to a third embodiment when arc voltage is controlled by pulse current value comprises the following functions. A second pulse base current setting circuit for outputting the second pulse base current setting signal comprises the second arc voltage setting circuit VS2 for outputting the second arc voltage setting signal Vs2, the second pulse duration setting circuit TP2 for setting the second pulse duration setting signal Tp2 and a second pulse frequency setting circuit FP2 for setting a second pulse frequency setting signal Fp2 and a second base current value setting circuit IB2 for outputting a second base current value setting signal Ib2.

A switching setting circuit for outputting a switching setting signal comprises an arc voltage switching circuit SW6 for outputting the arc voltage switching signal S6 by switching between the arc voltage setting signal Vs1 corresponding to the first arc length and the second arc voltage setting signal Vs2 corresponding to the second arc length, a pulse duration switching circuit Sw2 for outputting a pulse duration switching signal S2 by switching between a pulse duration setting signal Tp1 and the second pulse duration setting signal Tp2, and a pulse frequency switching circuit SW4 outputting the pulse frequency switching signal S4 obtained by switching between the pulse frequency setting signal Fp1 and the second pulse frequency setting signal Fp2 and a base current value switching circuit SW3 outputting the base current value switching signal S3 obtained by switching between the base current value setting signal Ib1 and the second base current value setting signal Ib2.

A pulse control signal generator for receiving pulse base current control signal and the switching setting signal comprises a pulse frequency signal generator circuit VF for outputting the pulse frequency signal Vf1 and the second pulse frequency signal Vf2 upon receiving the pulse frequency switching signal S4, a pulse duration frequency signal generator DF for outputting the first pulse duration frequency signal Df1 consisting of the pulse frequency signal Vf1 and the pulse duration signal Tp1, and the second pulse duration frequency signal Df2 consisting of the second frequency signal Vf2 and the second pulse duration signal Tp2, and a base pulse current switching circuit SW5 for switching between the base current value switching signal S3 and the pulse current control signal Ip3 corresponding to the arc voltage switching signal S6 with the first pulse duration frequency signal Df1 and the second pulse duration frequency signal Df2.

Figure 111:
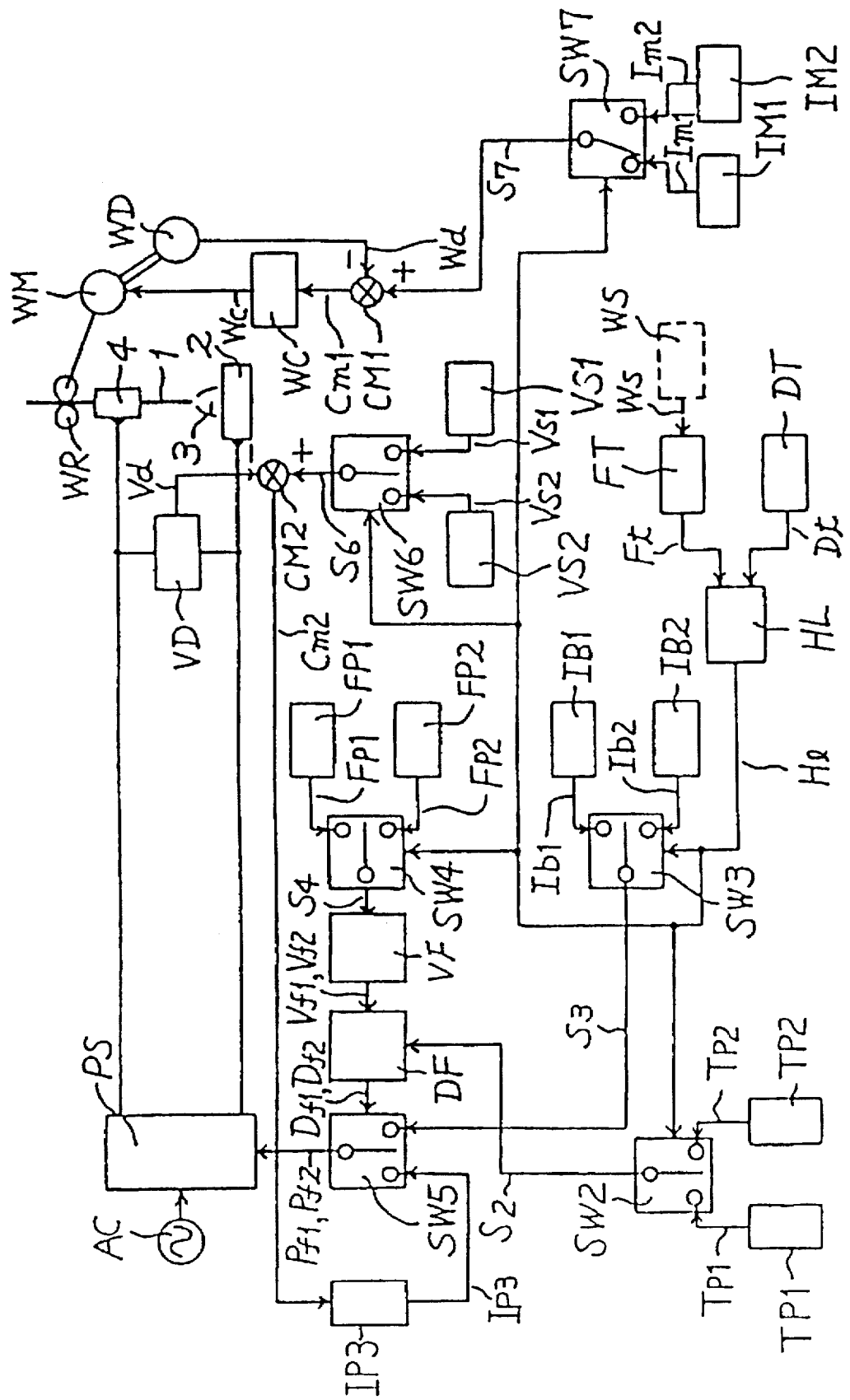
FIG. 111 is a block diagram of an embodiment of the welding apparatus for producing the welding current waveform shown in FIG. 112.

Description of FIG. 111

FIG. 111 is a block diagram of the embodiment for generating the wave form shown in FIG. 112.

In FIG. 111, the constructions the same as those of FIG. 109 have the same reference characters as those of FIG. 109 and are omitted in the description. The different parts only are described.

In FIG. 111, a first different structure from that of FIG. 109 is that in place of the arc voltage setting circuit VS1 shown in FIG. 109, the first arc voltage setting circuit VS1 and the second arc voltage setting circuit VS2 are to set the average value of arc voltage at the first pulse duty time T1 and the second duty time T2, respectively and output the first arc voltage setting signal Vs1 and the second arc voltage setting signal Vs2, respectively. An arc voltage switching circuit SW6 outputs the arc voltage switching signal S6 by switching between the signals Vs1 and Vs2 with the switching signal H1. The second comparison circuit CM2 outputs the arc voltage control signal Cm2 from the difference between the signal S6 and the arc voltage detection signal Vd of the arc voltage detection circuit VD. The pulse current control circuit IP3 outputs the first pulse current control signal Ip31 and the second base current control signal Ip32 corresponding to the first pulse current value IP31 and the second pulse value IP32 upon receiving the first arc voltage control signal Cm2 at the first pulse duty time T1 and the second arc voltage control signal Cm2 at the second arc duty time T2.

A second different point between the structures in FIGS. 111 and 109 is that the structure in FIG. 111b comprises the following circuits in place of the average current value setting circuit IM. The welding apparatus shown in FIG. 111 comprises the first welding current setting circuit IM1 for outputting the first welding current setting signal Im1 and the second welding current setting circuit IM2 for outputting the second welding current setting signal Im2 and the wire feeding rate switching circuit SW7 for sending the first comparison circuit CM1 the wire feeding rate switching signal S7 obtained by switching between the first welding current setting signal Im1 and the second welding current setting signal Im2 with the switching signal H1.

Other structures except for the above structures are the same as those of FIG. 109 and should be omitted in the description.

The description with reference to FIGS. 109 and 111 is directed to the welding apparatus comprising the second pulse duration setting circuit TP2, the second pulse frequency setting circuit FP2 and the second base current setting circuit IB2. The welding apparatus comprising one or two circuits are included in the scope of the first and third embodiments when arc voltage is controlled by pulse current value.

Further, the welding apparatus shown in FIG. 111 comprises the wire feeding rate switching circuit SW7 for outputting the wire feeding rate switching signal S7 obtained by switching between the first welding current setting signal Im1 generated from the first welding current setting circuit Im1 and the second welding current setting signal Im2 generated from the second welding current setting circuit Im2. The above structure is not a necessary factor for the structure of the third embodiment described hereinabove.

The welding apparatus according to a final embodiment is based on a pulse MAG welding apparatus and comprises the first welding current setting circuit IM1 for outputting the first welding current setting signal Im1, the second welding current setting circuit for outputting the second welding current setting signal Im2 and the wire feeding rate switching circuit SW7 for sending the wire feeding rate control circuit WC the wire feeding rate switching signal S7 obtained by switching between the first welding current setting signal Im1 and the second welding current setting signal Im2 with a switching frequency F of 0.5 to 5 Hz.

This embodiment, as is shown in FIGS. 89, 100, 106 and 111, and including these additional circuits can achieve the following effects. The average values of welding current M1 and M2 at the first pulse duty time T1 and the second pulse duty time T2 can obtained by switching the wire feeding rate between the first welding current setting circuit IM1 and the second welding current setting circuit IM2. The above effect achieved by switching the arc length can be enlarged by switching periodically between the first pulse duty time T1 of the short arc length for setting the average values M1 and M2 within a range to maintain a plurality of pulses to one molten metal transfer mode or the one pulse to one molten metal transfer mode at the first pulse duty of the short arc length, and the second pulse duty time T2 of the long arc length for setting the average values M1 and M2 within a range to form the one pulse to one molten metal transfer mode or one pulse to plurality of molten metal transfer mode. Specially, in a case of the enlarged gap of the joint, an increase in the welding current due to the increase in the wire feeding rate results in the increase in the molten metal amount. Thus, the enlarged gap can be filled with the increased molten metal and causes the resultant bead to form a beautiful appearance. On the other hand, in a case when the joint gap is smaller, the decrease in the welding current can make the molten metal amount decreased. The smaller gap can be filled with the decreased molten metal amount and causes the resultant bead to form a beautiful appearance.

EFFECT OF THE PRESENT INVENTION

The following description is to summarize the effects of the welding method according to the present invention.

(1) The welding for aluminum can achieve the appearance of the bead in a regular ripple pattern. (2) The welding for copper and copper alloy can achieves an appearance of the bead in regular ripple pattern. (3) The welding for aluminum can prevent the cracking by making the grain size smaller. (4) The welding for aluminum can prevent the generation of the porosity. (5) The butt welding can prevent the melt down even with the enlarged gap of the butt joint. (6) The lap welding can prevent the partial melting even with the enlarged gap of the lap joint. (7) The welding for stainless steel can control the penetration shape and can make the penetration depth at a constant value in a proceeding direction of the welding bead.

The more detailed description is shown in the following. The conventional welding method has the disadvantage to make the arc length too much long and unstable due to the delay of the mechanical variation, to generate more frequently the sputter due to the short circuit and to generate sometimes the wire extending or the burn back. The welding method according to the present invention can solve these disadvantages. In addition, since the welding method according to the present invention is not based on a type to obtain the scale bead by switching periodically between the spray transfer mode and the short circuit transfer mode, the welding method of the present invention can obtain the scale bead in a regular ripple pattern in a similar way to that of the TIG welding method and also can prevent the generation of the sputter.

Further, the welding method or the apparatus is based on a type to manage the first pulse current group to be in a plurality of pulses to one molten metal mode or the one pulse to one molten metal transfer mode and makes it possible to decrease the arc length to a minimum value of 2 to 3 mm near to the short circuit distance which causes the slight short circuits. Therefore, it is possible for the welding method according to the present invention to carry out the high speed welding for the thin plate in a similar way to that of the pulse arc welding method or apparatus in a conventional mode of one pulse to one molten metal transfer mode. It is possible to change periodically the arc length by increasing periodically the arc length with the enlarged value of one or two factors of the pulse current, pulse duration, pulse frequency or the base current value controlled within a range to form the one pulse to one molten metal transfer mode or the one pulse to plurality of molten metal transfer mode in connection with the second pulse current group. Hence, the welding method according to the present invention can achieve the various effects to prevent the melt down at the upper plate with the gap at the lap welding or the gap caused by the thermal deformation, to prevent the drop down at the vertical up welding to improve the appearance of the bead and to hold the penetration shape at each of oscillating positions with the oscillating welding.

As mentioned above, it is possible for the welding method managing the first current group to be in a one pulse to one molten metal transfer mode or the plurality of pulses to one metal transfer mode according to the present invention to make the arc length short to a distance of 2 to 3 mm to cause the slight short circuits. In addition, the generation of the conventional short circuit and the sputter is very few. In connection with the second pulse current group, it is possible to make the arc length of the first pulse current group short by forming the one pulse to one molten metal transfer mode or the one pulse to a plurality of molten metal transfer mode. Accordingly, the arc length of the second pulse current group can be made to a short distance of 4 to 5 mm. The conventional welding method has the disadvantage to make the arc length too much longer and the arc extended widely at a high current period. The welding method according to present invention can be free from the disadvantage and thus free from the defect for the gas shield. The welding method according to the present invention shows the superior character with the cleaning process of aluminum welding and is able to prevent the unstable arc in a too much long extension between the consumable electrode and the cathode of aluminum welding material.

In connection with the MIG arc welding for stainless steel having a low thermal conductivity, the periodical variation in the arc length makes it possible to control the penetration shape by melting the molten pools in different penetration shapes into one body. This process can expand the allowable gap size at the lap welding and the butt welding and hold the penetration depth at a constant value in a welding direction to control the sectional form of the welding bead.

Further, among the various MAG arc welding method of the present invention, in connection with the MIG arc welding for aluminum or copper having a high thermal conductivity, the variation in the welding current due to the periodical switching of the wire feeding rate can change periodically the molten metal amount. This process makes it possible to form the round scale bead in accordance with the variation in the height of reinforcement. In connection with the MAG arc welding for stainless steel having a low thermal conductivity, the periodic variation in the welding current due to the periodic switching of the wire feeding rate makes it possible to change the wire melting amount so as to control the molten metal amount of the reinforcement in addition to the effect of a periodic switching of the arc length.

We claim:

1. A pulse MAG arc welding apparatus for carrying out an arc welding operation by supplying a pulse welding current that switches between a first pulse current group for generating a short arc length and a second pulse current group for generating a long arc length, said apparatus comprising:

an arc voltage detecting circuit for detecting an arc voltage value and outputting an arc voltage detecting signal corresponding thereto;

a first arc voltage setting circuit for setting a value of arc voltage in accordance with welding conditions and outputting a first arc voltage setting signal corresponding thereto;

a second arc voltage setting circuit for setting a value of arc voltage in accordance with welding conditions and outputting a second arc voltage setting signal corresponding thereto;

a comparison circuit for comparing said arc voltage detecting signal with and arc voltage setting signal and outputting a difference between said two signals as an arc voltage control signal;

a pulse condition control signal generation circuit for generating a pulse condition control signal for controlling one preselected pulse control condition from among four pulse control conditions in common with said first and second pulse current groups in accordance with said arc voltage control signal, said four pulse control conditions comprising pulse frequency, pulse width, base current value and peak current value;

a pulse current setting circuit for setting the remaining three pulse control conditions for said first pulse current group and said second pulse current group which have not been preselected and for outputting pulse current group setting signals including setting signals corresponding to remaining three pulse control conditions other than said pulse condition control signal;

a switching circuit for generating a switching signal for switching said first and second pulse current setting circuits alternatively at a frequency ranging from 0.5 to 25 Hz;

a pulse frequency signal generation circuit for generating a pulse frequency signal in response to either the pulse frequency control reference signal if output from said pulse condition control signal generation circuit, or, the pulse frequency setting signal output from said pulse current setting circuit if not output from said pulse condition control signal generation circuit;

a pulse frequency and width signal generation circuit for outputting a pulse frequency and width signal in response to the pulse frequency control signal and pulse width setting signal if the pulse frequency control reference signal is output from said pulse condition control signal generation circuit, the pulse frequency signal and pulse width control signal if the pulse width control signal is output from said pulse condition control signal generation circuit, or the pulse frequency signal and pulse width setting signal if the peak current control signal or base current control signal is output from said pulse condition control signal generation circuit;

a pulse current control circuit for outputting a first pulse control signal and a second pulse control signal alternatively in response to the pulse frequency and width signal, the peak current setting signal and base current setting signal if the pulse frequency control reference signal or the pulse width control signal is output from said pulse condition control signal generation circuit, the pulse frequency and width signal, the peak current control signal and base current setting signal if the peak current control signal is output from said pulse condition control signal generation circuit, or the pulse frequency and width signal, the peak current setting signal and base current control signal if the base current control signal is output from said pulse condition control signal generation circuit; and a welding power source control circuit for outputting the first pulse current group when the first pulse control signal is output from said pulse current control circuit and the second pulse current group when the second pulse control signal is output from said pulse current control circuit.

2. The pulse MAG arc welding apparatus according to claim 1 wherein said pulse current setting circuit comprising:

a first pulse current setting circuit for setting remaining three pulse control conditions for said first pulse current group which have not been preselected and for outputting first pulse current group setting signals including setting signals corresponding to remaining said three pulse control conditions other than said pulse condition control signal;

a second pulse current setting circuit for setting remaining three pulse control conditions for said second pulse current group which have not been preselected and for outputting second pulse current group setting signals including setting signals corresponding to said remaining said three pulse control conditions other than said pulse condition control signal; and said pulse frequency and width signal generation circuit generates a pulse frequency and width signal in response to the pulse frequency control signal and pulse width setting signal if the pulse frequency control reference signal is output from said pulse condition control signal generation circuit, the pulse frequency signal and pulse width control signal if the pulse width control signal is output from said pulse condition control signal generation circuit, or the pulse frequency signal and pulse width setting signal if the peak current control signal or base current control signal is output from said pulse condition control signal generation circuit; and said switching circuit outputs a switching signal for alternatively switching between said first and second arc voltage setting circuits and between said first and second pulse current setting circuits.

3. The pulse MAG arc welding apparatus according to claim 2 wherein said pulse condition control signal generation circuit generates a pulse frequency control reference signals for controlling the pulse frequency in common with said first and second pulse current groups as said pulse condition control signal and said pulse frequency signal generation circuit generates a pulse frequency signal in response to said pulse frequency control reference signal input thereto.

4. The pulse MAG arc welding apparatus according to claim 2 wherein said pulse condition control signal generation circuit generates a pulse width control signal for controlling the pulse width in common with said first and second pulse current groups as said pulse condition control signal and said pulse frequency and width signal generation circuit outputs a pulse frequency and width signal in response to said pulse frequency signal from said pulse frequency signal generation circuit and said pulse width control signal from said pulse condition control signal generation circuit.

5. The pulse MAG arc welding apparatus according to claim 2 wherein said pulse condition control signal generation circuit generates a peak current value control signal for controlling the peak current value in common with said first and second pulse current groups as said pulse condition control signal.

6. The pulse MAG arc welding apparatus according to claim 2 wherein said pulse condition control signal generation circuit generates a base current value control signal for controlling the base current in common with said first and second pulse current groups as said pulse condition control signal.

7. The pulse MAG arc welding apparatus according to claim 2 further comprising a first wire feeding rate setting circuit for outputting a first wire feeding rate setting signal and a second wire feeding rate setting circuit for outputting a second wire feeding rate setting signal and a wire feeding rate switching circuit for sending a wire feeding rate control circuit a wire feeding rate signal obtained by switching between said first wire feeding rate setting signal and said second wire feeding rate setting signal.

8. The pulse MAG arc welding apparatus according to claim 1 wherein said pulse condition control signal generation circuit generates a pulse frequency control reference signal for controlling the pulse frequency in common with said first and second pulse current groups as said pulse condition control signal and said pulse frequency signal generation circuit generates a pulse frequency signal in response to said pulse frequency control reference signal input thereto.

9. The pulse MAG arc welding apparatus according to claim 1 wherein said pulse condition control signal generation circuit generates a pulse width control signal for controlling the pulse width in common with said first and second pulse current groups as said pulse condition control signal and said pulse frequency and width signal generation circuit outputs a pulse frequency and width signal in response to said pulse frequency signal from said pulse frequency signal generation circuit and said pulse width control signal from said pulse condition control signal generation circuit.

10. The pulse MAG arc welding apparatus according to claim 1 wherein said pulse condition control signal generation circuit generates a peak current value control signal for controlling the peak current value in common with said first and second pulse current groups as said pulse condition control signal.

11. The pulse MAG arc welding apparatus according to claim 1 wherein said pulse condition control signal generation circuit generates a base current value control signal for controlling the base current in common with said first and second pulse current groups as said pulse condition control signal.

12. The pulse MAG arc welding apparatus according to claim 1 further comprising a first wire feeding rate setting circuit for outputting a first wire feeding rate setting signal and, a second wire feeding rate setting circuit for outputting a second wire feeding rate setting signal and a wire feeding rate switching circuit for sending a wire feeding rate control circuit a wire feeding rate signal obtained by switching between said first wire feeding rate setting signal and said second wire feeding rate setting signal.

* * * * *

UNITED STATES PATENT AND TRADEMARK OFFICE
CERTIFICATE OF CORRECTION

PATENT NO. : 5,670,071
DATED : September 23, 1997
INVENTOR(S) : Tomoyuki Ueyama, et al.

It is certified that error appears in the above-identified patent and that said Letters Patent are hereby corrected as shown below:

Column 5, line 32: after "A and" insert --welding voltage--

Column 6, line 21: "speed" should read --speed ...--

Column 10, lines 9, 17, 20, 28, 42, 43: "Left and right" should read --Lr--

Column 16, lines 24 & 62: "Left and right" should read --Lr--

Column 17, lines 56-57 & 65-66: delete "of a preferred embodiment of the present invention"

Column 18, lines 13-14, 17-18, 28-29, 32-33, 35-36, 43-44, 49, 52-53, 56-57, 61 and 64-65: delete "of a preferred embodiment of the present invention"

Column 19, lines 1-2, 18-19, 24, 28 and 33: delete "of a preferred embodiment of the present invention"

Column 21, line 1: "Left and right" should read --Lr--

Column 26, lines 9-10, 16-17, 24 and 31: "Le Feibush" should read --Le =3--

Column 27 lines 33, 40, 48 & 55: "Le Feibush" should read --Le =3--

UNITED STATES PATENT AND TRADEMARK OFFICE
CERTIFICATE OF CORRECTION

PATENT NO. : 5,670,071

DATED : September 23, 1997

INVENTOR(S) : Tomoyuki Ueyama, et al.

It is certified that error appears in the above-identified patent and that said Letters Patent are hereby corrected as shown below:

Column 28, lines 1 & 28: "Ti" should read --T1--

Column 28, lines 57 & 63" "rage" should read --rate--

Column 29, line 29: "no" should read --to--

Column 29, line 45: "rat" should read --rate--

Column 29, lines 47-48 & 61-62: "Left and right" should read --Lr--

Column 30, line 28: "Lt Feibush" should read --Lt =3--

Column 30, line 32: "Left and right" should read --Lr--

Column 32, line 28: "SW" should read --SW8--

Column 35, line 58: "Left and right" should read --Lr--

Column 37, lines 13 & 37: "Feibush" should read -- =3 --

Column 38, lines 35       "Left and right" should read --Lr--

Column 38, line 45: "Feibush" should read -- =3 --

UNITED STATES PATENT AND TRADEMARK OFFICE
CERTIFICATE OF CORRECTION

PATENT NO. : 5,670,071
DATED : September 23, 1997
INVENTOR(S) : Tomoyuki Ueyama, et al.

It is certified that error appears in the above-identified patent and that said Letters Patent are hereby corrected as shown below:

Column 39, line 59": "Left and right" should read --Lr--

Column 40, lines 8, 50 & 54: "Left and right" should read --Lr--

Column 44, line 49: "Left and right" should read --Lr--

Column 46, line 58: "1.2" should read --1.2 mm--

Column 48, line 32: after "and" insert --51--

Column 49, line 15: after "and" insert --53--

Column 50, line 3: "charging" should read --changing--

Column 54, line 28: "symbol a" should read --symbol $\Delta$--

Column 55, line 9: after "26" insert --.--

Column 55, line 52: "bee" should read --been--

Column 58, line 50: after "method" insert --.--

Column 60, lines 58 & 67: "Feibush" should read -- =3 --

Column 61, line 13: "Feibush" should read -- =3 --

Column 62, lines 9 & 10: delete "m"

UNITED STATES PATENT AND TRADEMARK OFFICE
CERTIFICATE OF CORRECTION

PATENT NO. : 5,670,071

DATED : September 23, 1997

INVENTOR(S) : Tomoyuki Ueyama, et al.

It is certified that error appears in the above-identified patent and that said Letters Patent are hereby corrected as shown below:

Column 63, line 25: "Left and right" should read --Lr--

Column 65, line 14: "Dr" should read --Dt--

Column 66, line 17: insert --(Description of Fig. 84)--

Column 72, line 6: after "to" insert --the--

Column 73, line 34: "Df3" should read --Df32--

Column 73, line 39: "signa" should read --signal--

Column 73, lines 54-55: delete "of claim 31"

Column 76, line 14: "Mi" should read --M1--

Column 76, line 18: after "according" insert --to--

Column 78, line 58: "signa" should read --signal--

Column 79, line 66: delete "according to claim 30"

Column 83, line 43: "signa" should read --signal--

Column 88, line 67: after "according" insert --to--

Column 92, line 2: "1116" should read --111--

UNITED STATES PATENT AND TRADEMARK OFFICE
CERTIFICATE OF CORRECTION

PATENT NO. : 5,670,071
DATED : September 23, 1997
INVENTOR(S) : Tomoyuki Ueyama, et al.

It is certified that error appears in the above-identified patent and that said Letters Patent is hereby corrected as shown below:

Column 95, lines 39-40, Claim 1: "alteratively" should read --alternatively--

Column 96, line 31, Claim 3: "claim 2" should read --claim 1--

Column 96, line 41, Claim 4: "claim 2" should read --claim 1--

Column 96, line 52, Claim 5: "claim 2" should read --claim 1--

Column 96, line 58, Claim 6: "claim 2" should read --claim 1--

Column 96, line 65, Claim 7: "claim 2" should read --claim 1--

Column 97, line 7, Claim 8: "claim 1" should read --claim 2--

Column 97, line 16, Claim 9: "claim 1" should read --claim 2--

Column 98, line 2, Claim 10: "claim 1" should read --claim 2--
Column 98, line 9, Claim 11: "claim 1" should read --claim 2--
Column 98, line 15, Claim 12: "claim 1" should read --claim 2--

Signed and Sealed this

Twenty-fifth Day of July, 2000

Attest:

Q. TODD DICKINSON

*Attesting Officer*    *Director of Patents and Trademarks*